FIG. 3A

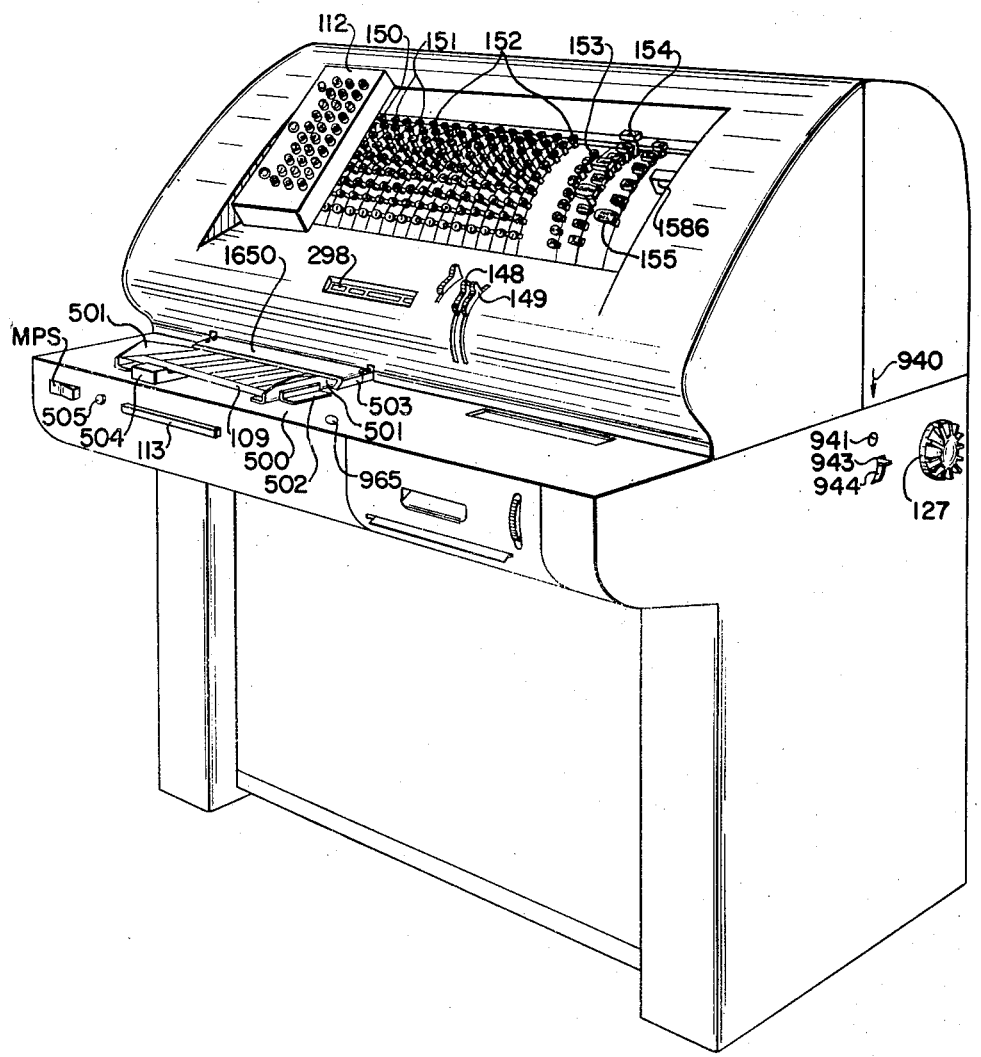

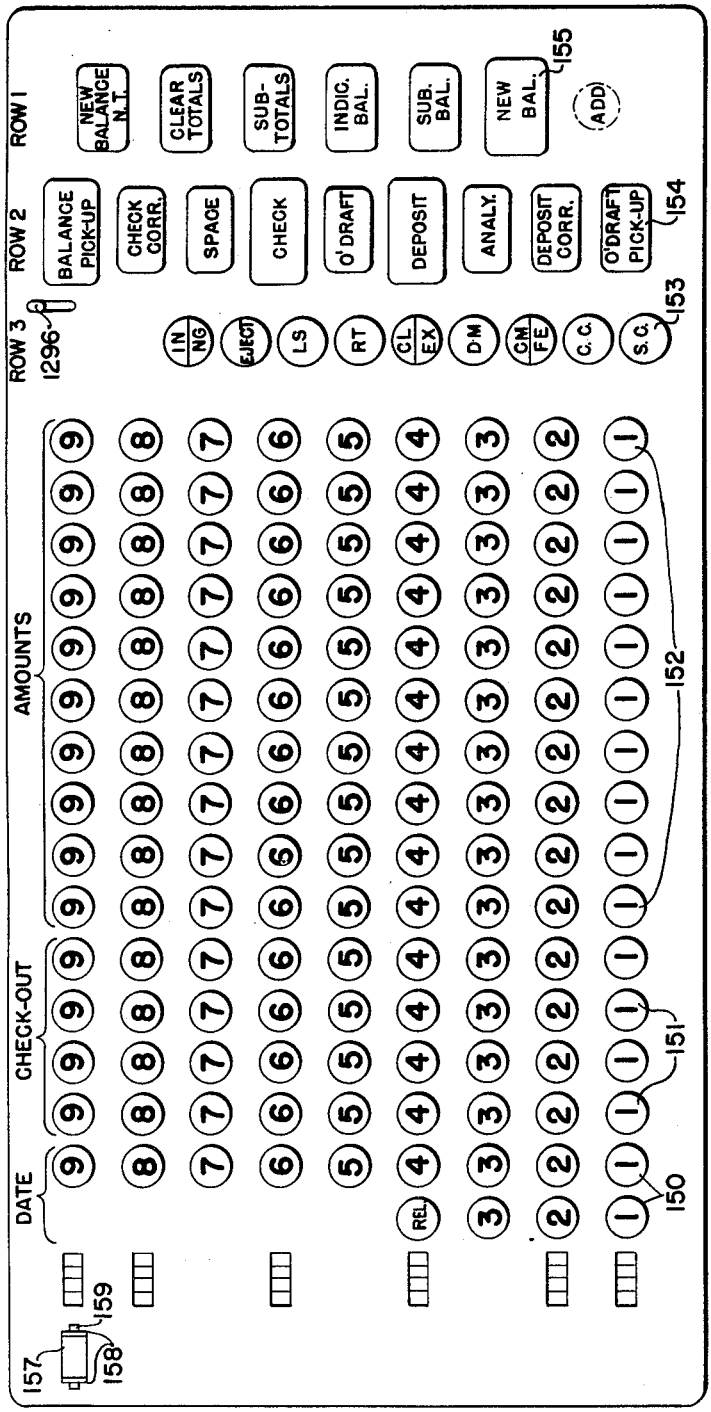

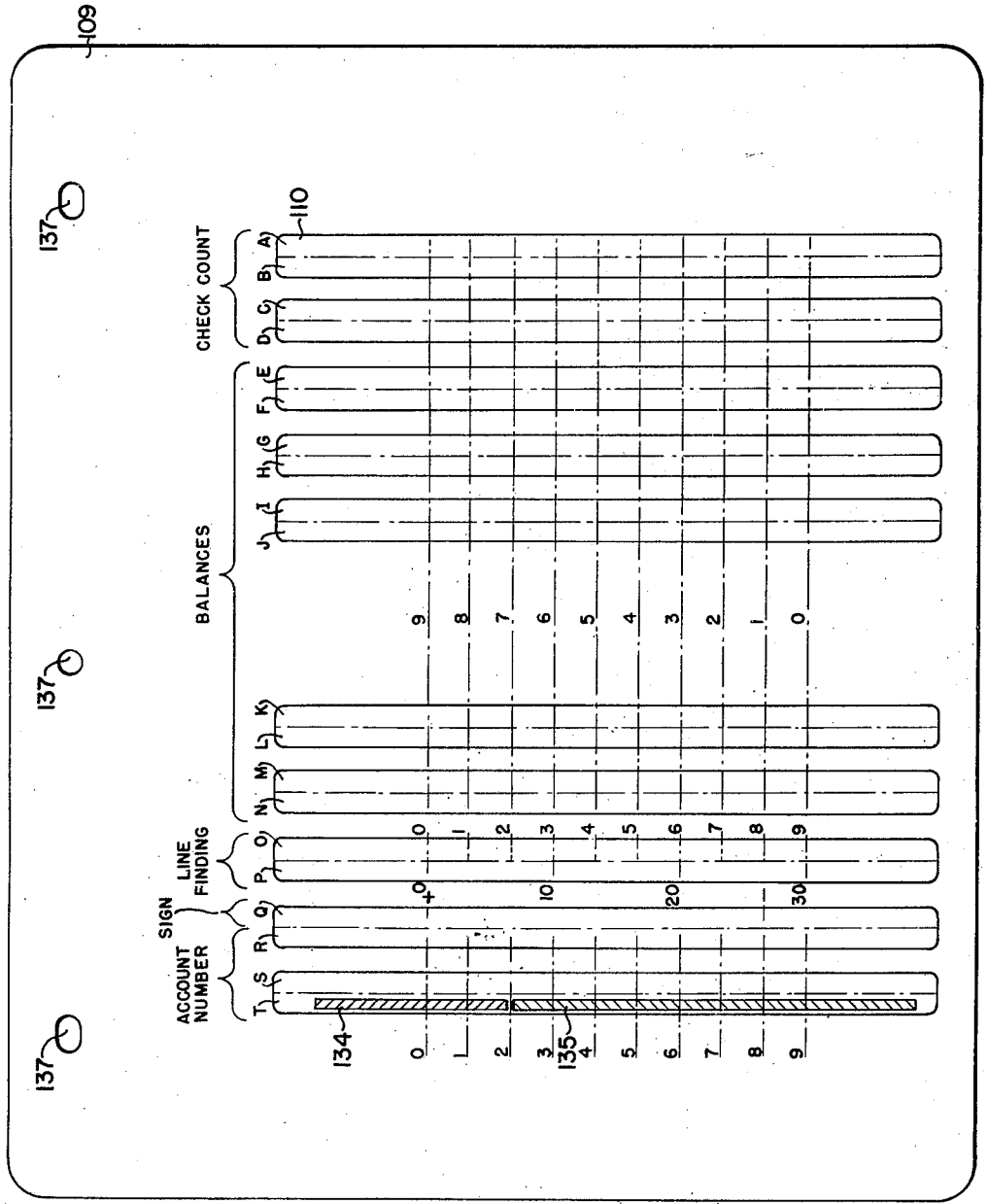

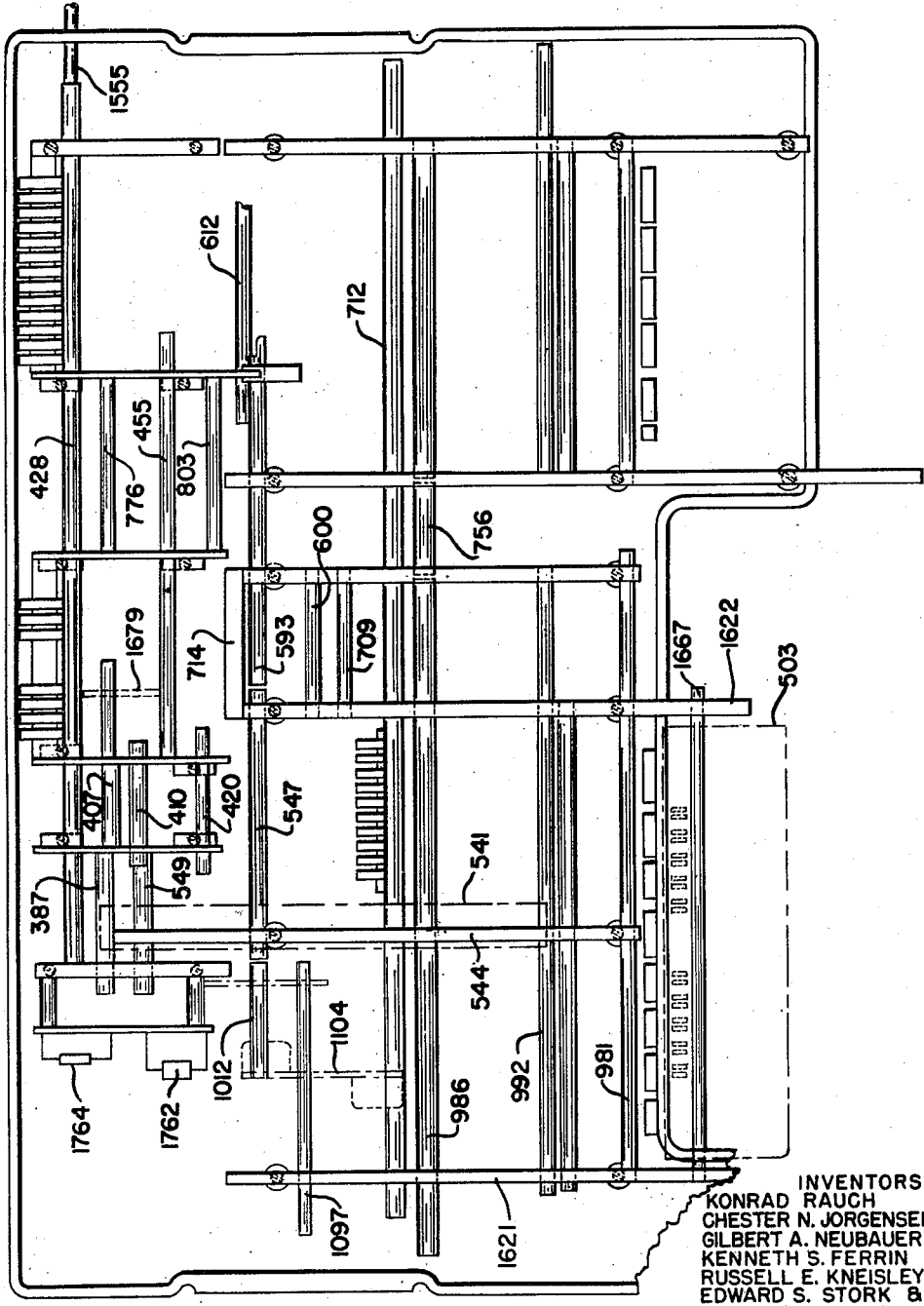

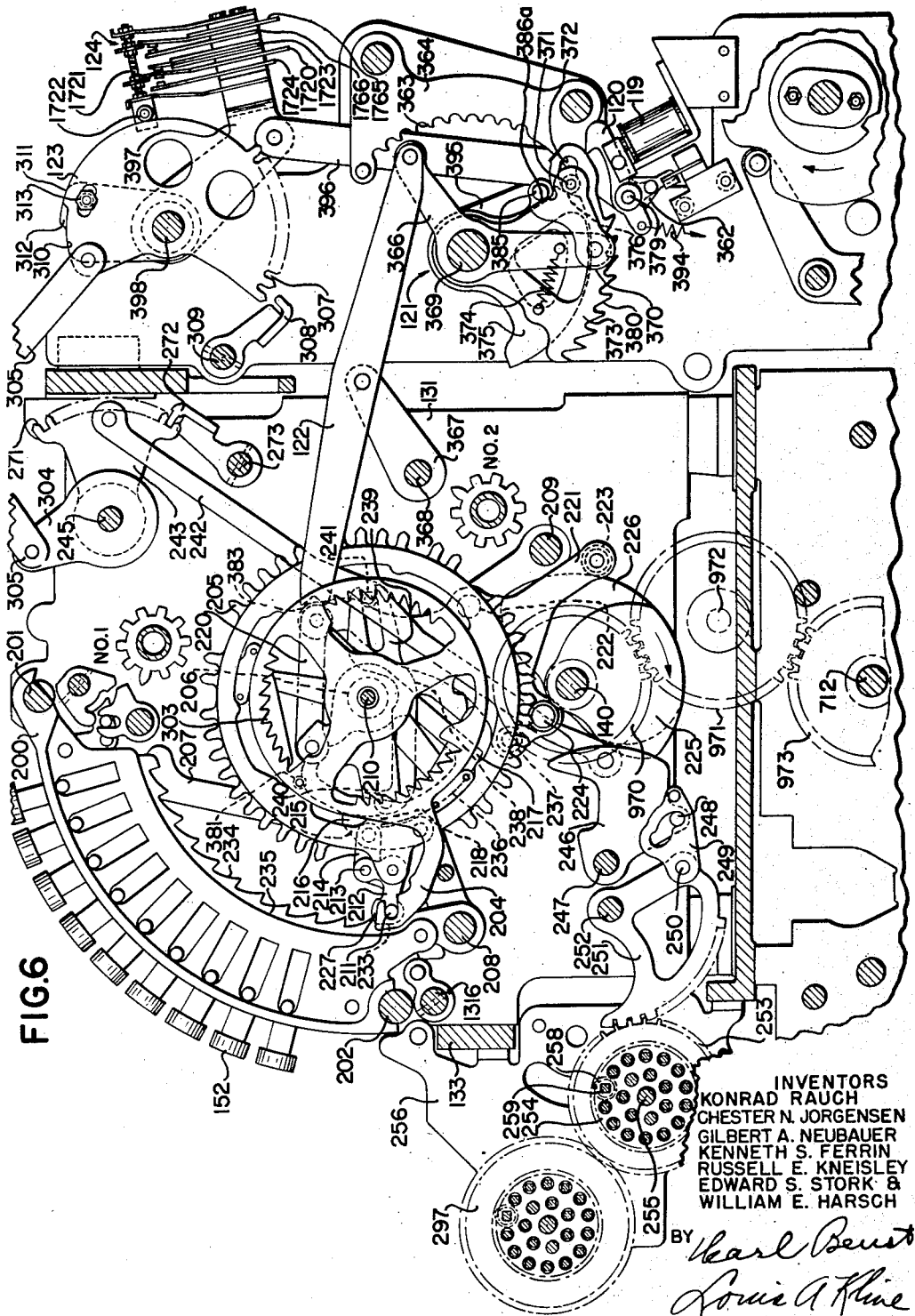

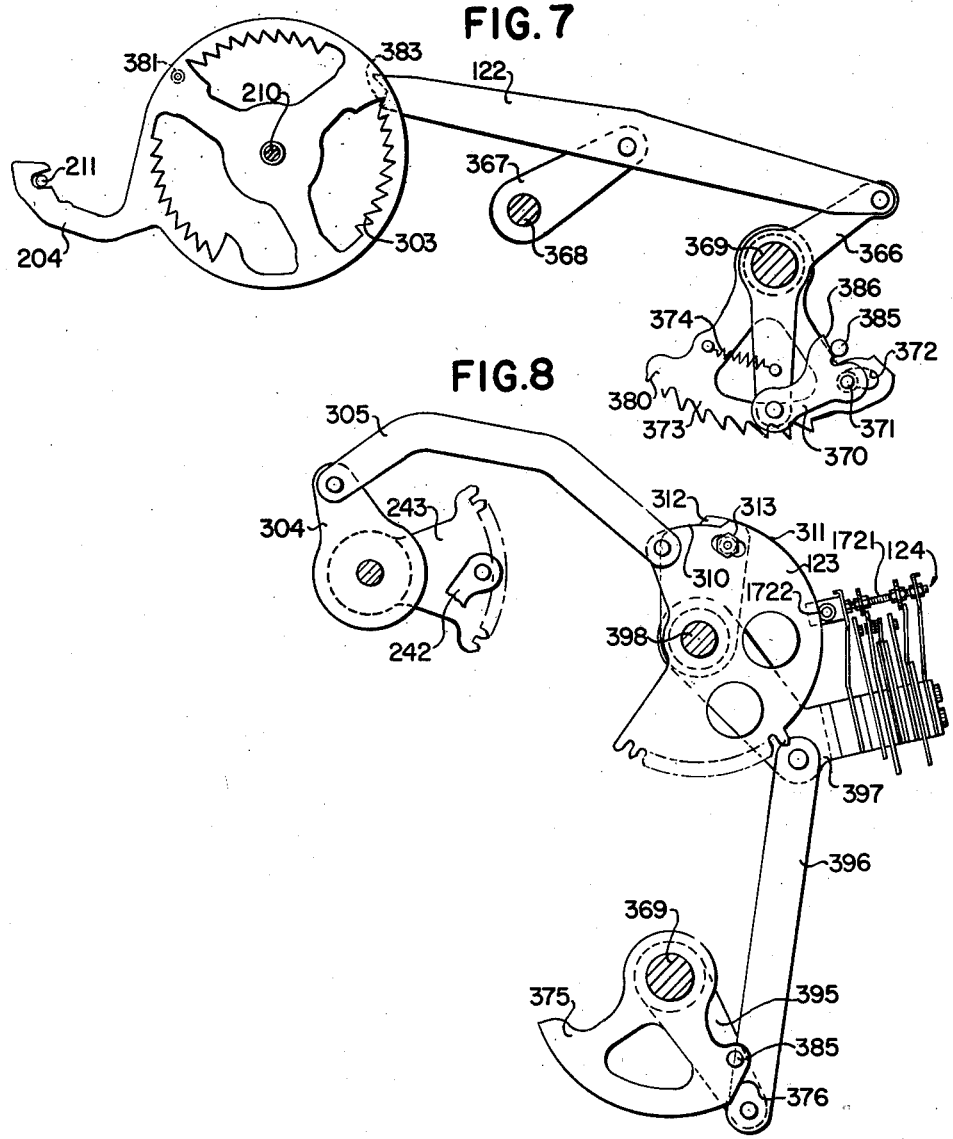

INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH

BY

THEIR ATTORNEYS

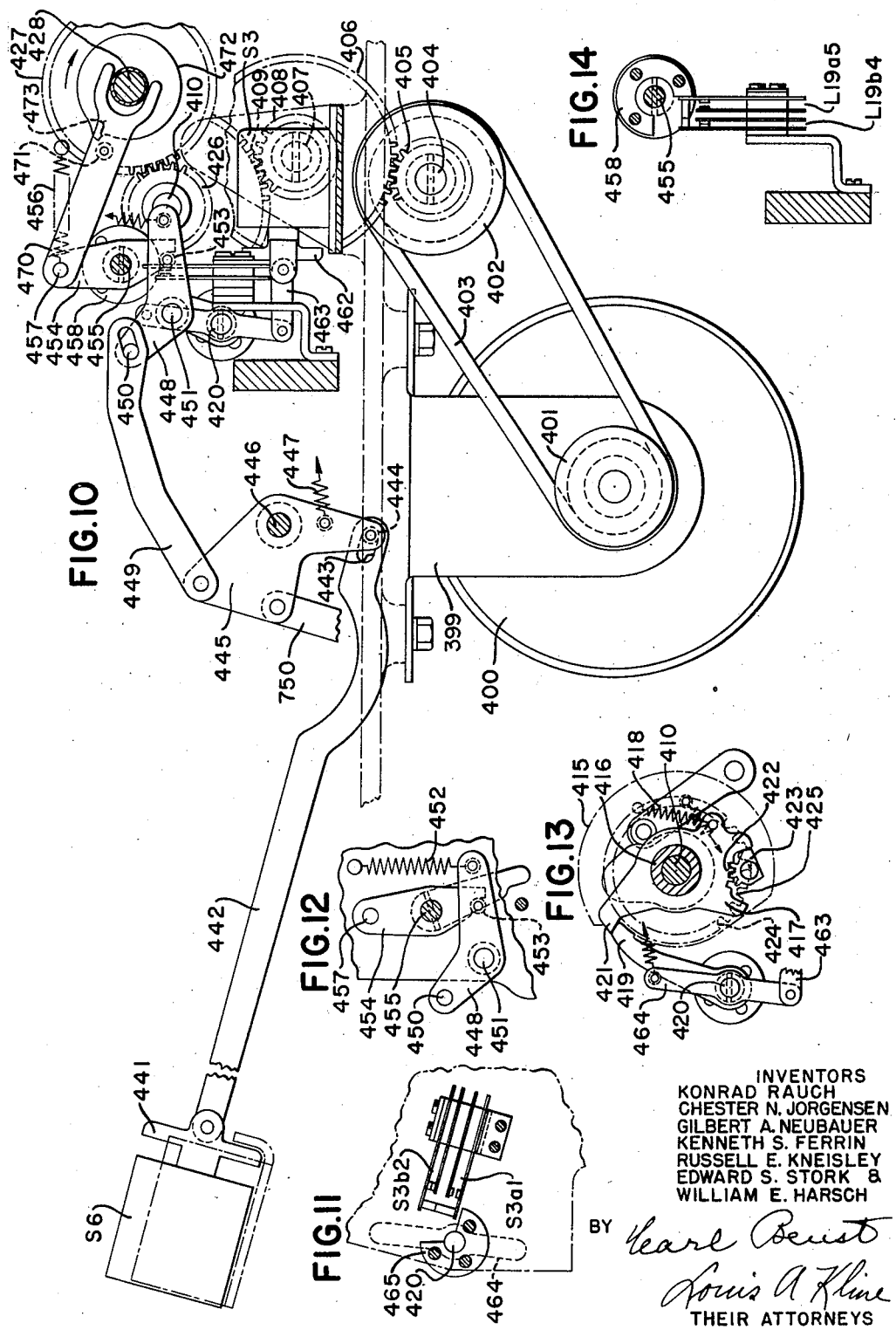

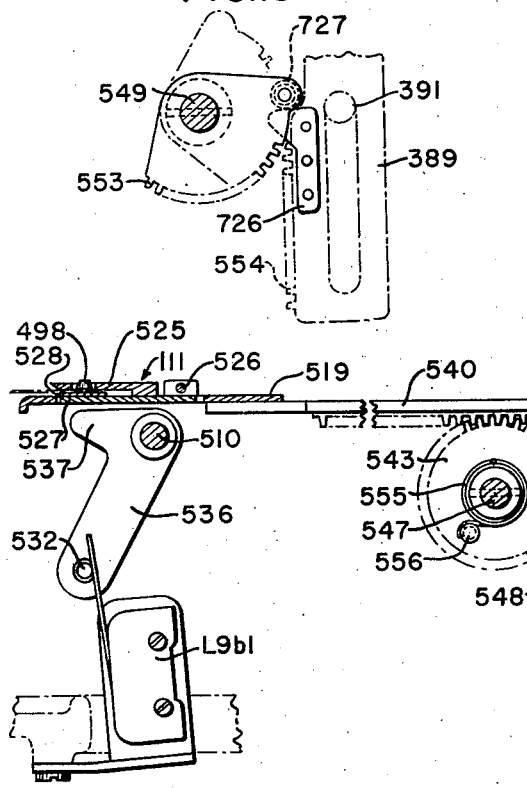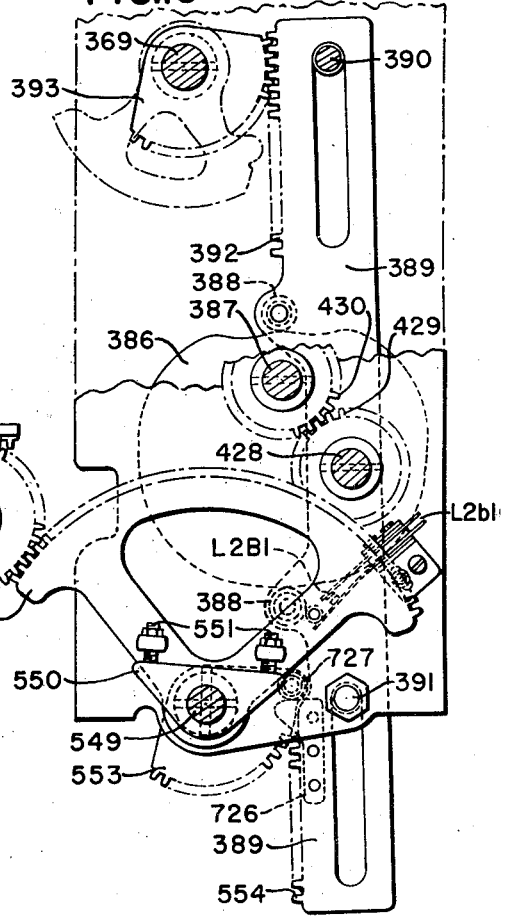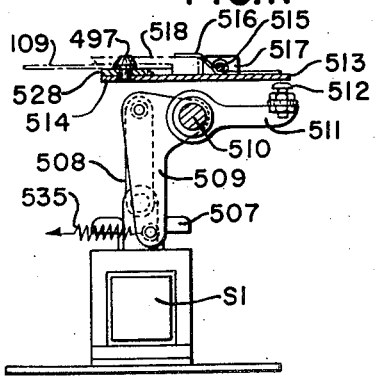

Aug. 2, 1960 K. RAUCH ET AL 2,947,475
ACCOUNTING MACHINES
Filed Sept. 19, 1956 40 Sheets-Sheet 12
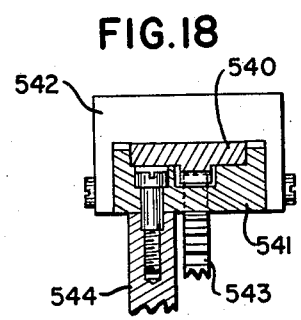
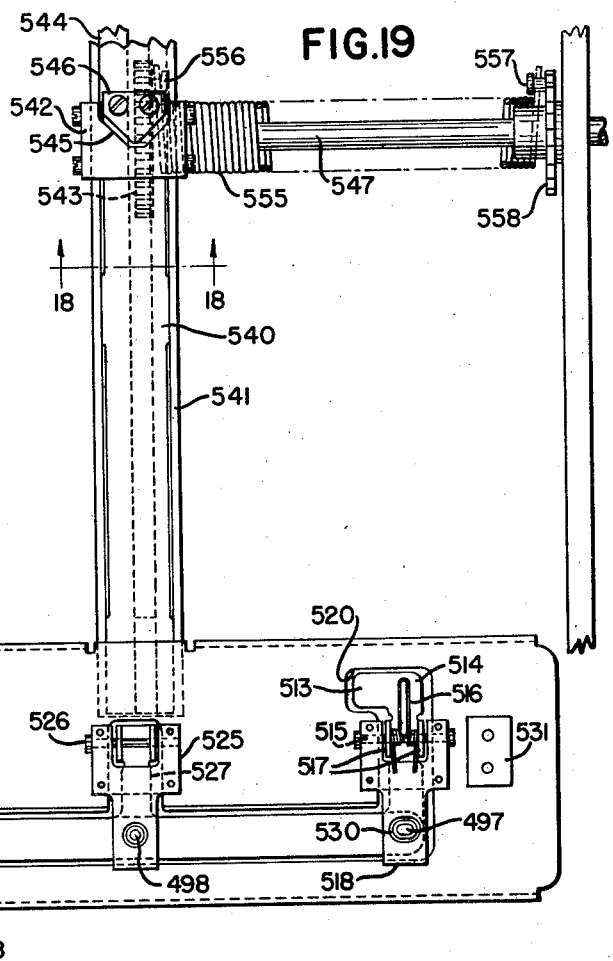
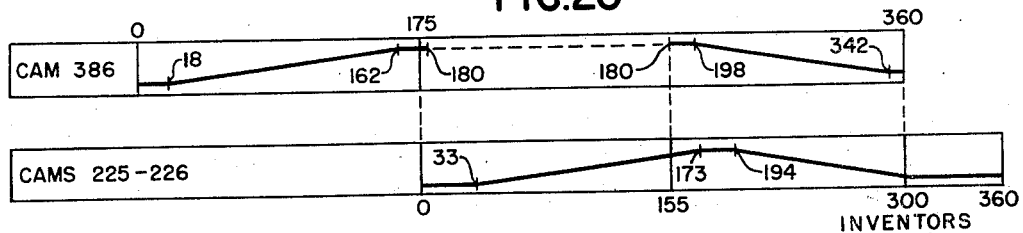
INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH
BY
THEIR ATTORNEYS

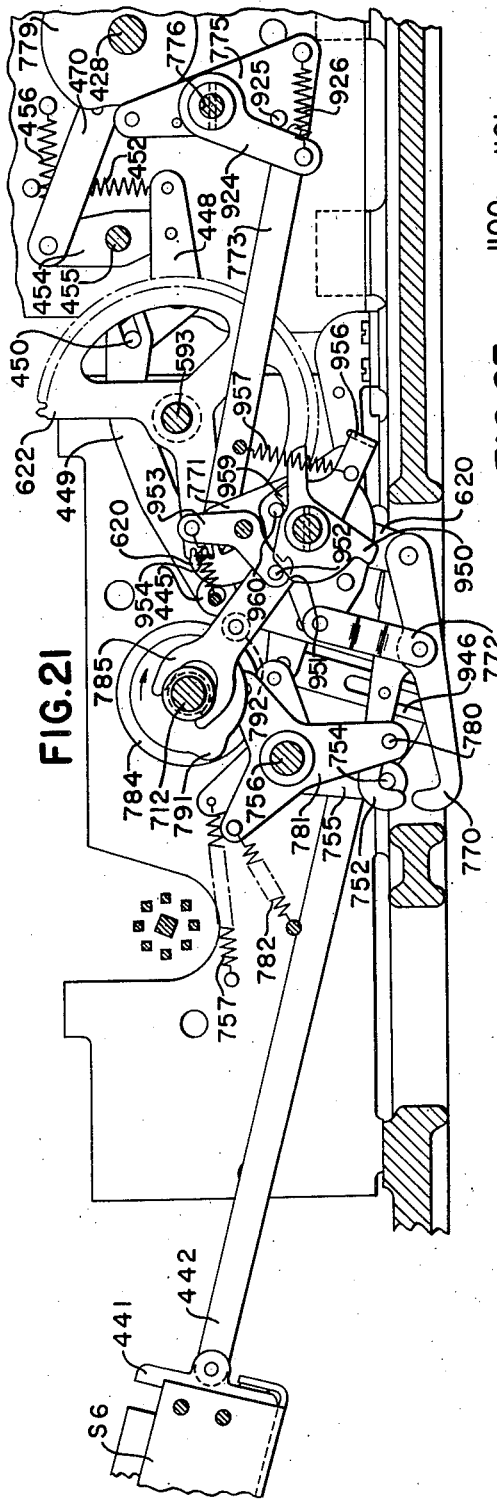
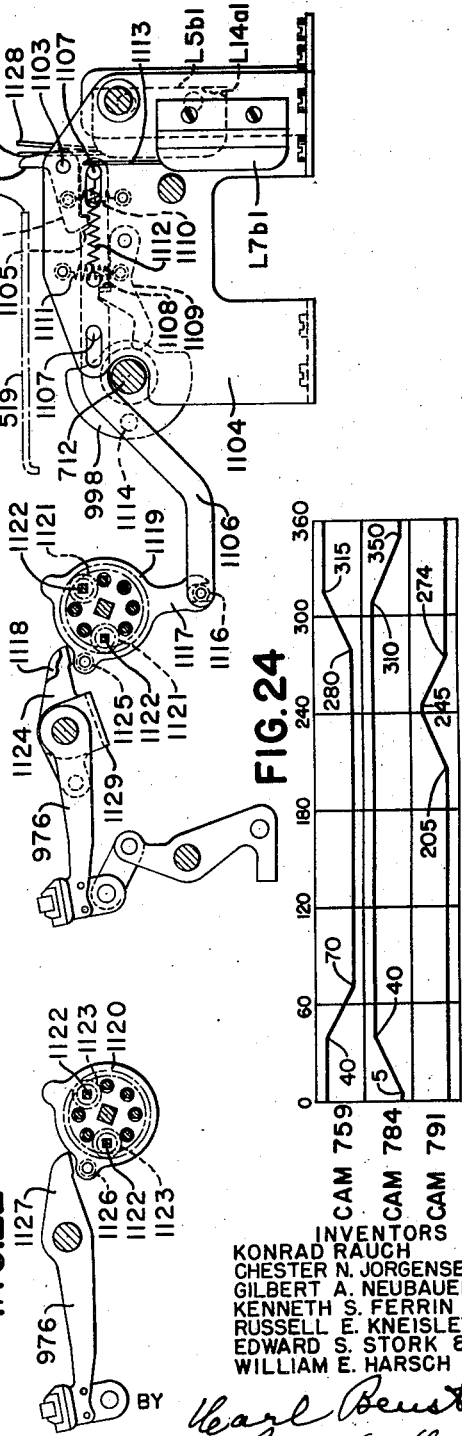

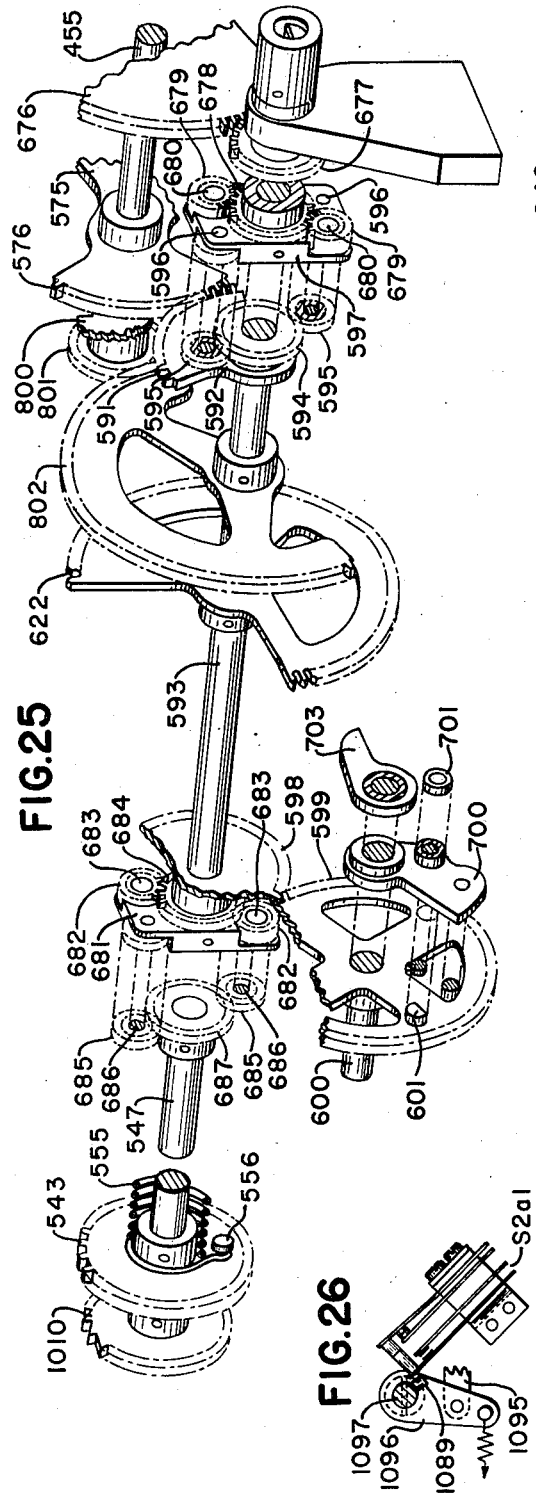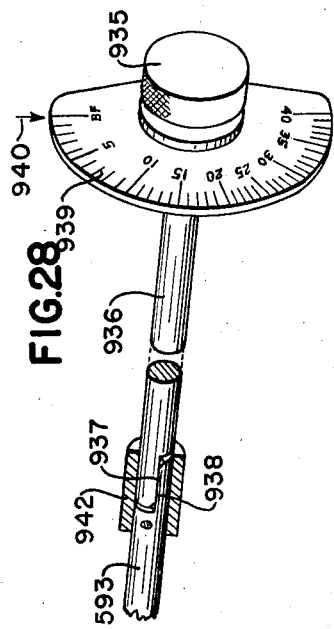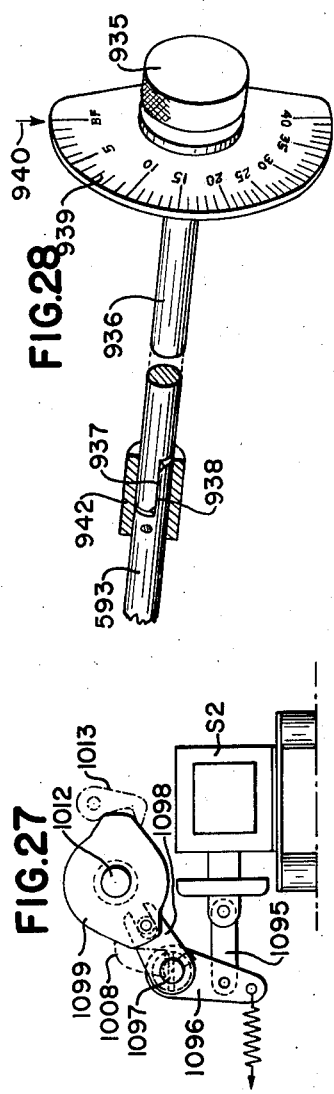

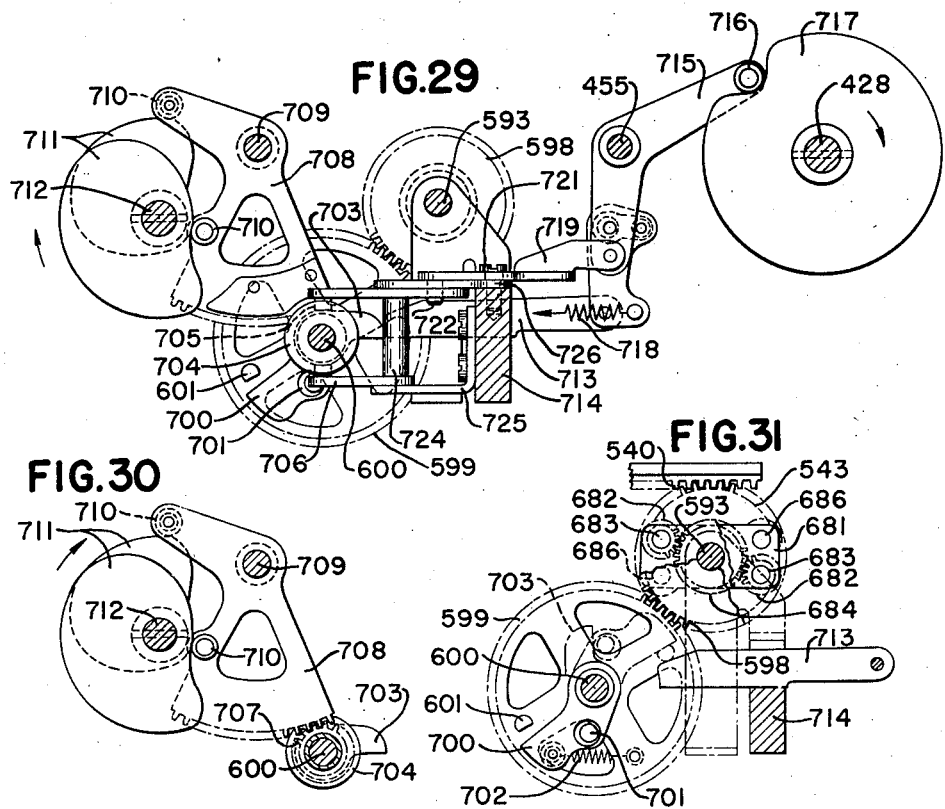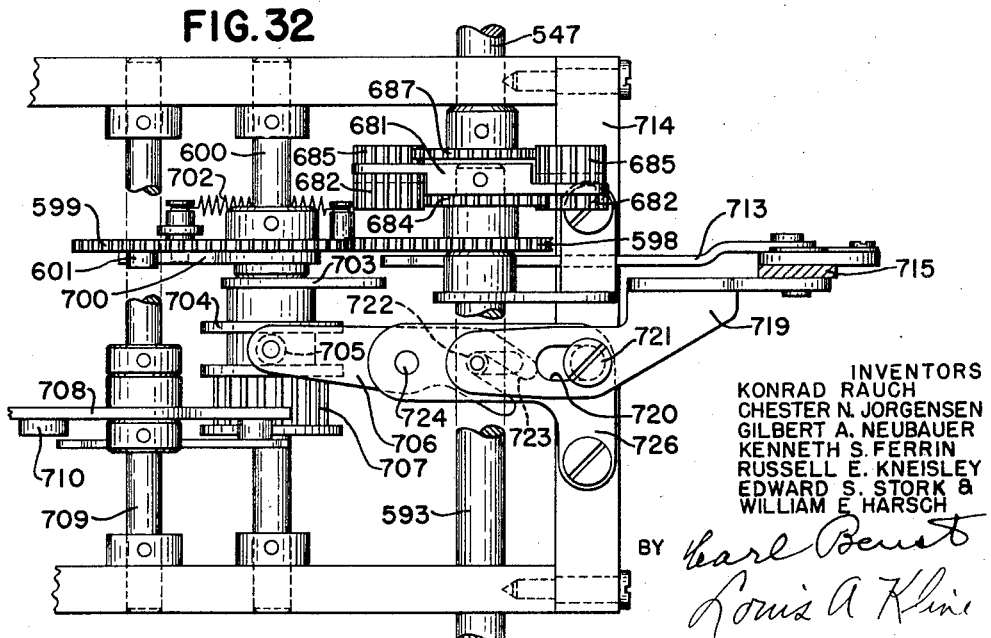

Aug. 2, 1960 K. RAUCH ET AL 2,947,475
ACCOUNTING MACHINES
Filed Sept. 19, 1956 40 Sheets-Sheet 16

INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH
BY Earl Beust
Louis A. Kline
THEIR ATTORNEYS Aug. 2, 1960 K. RAUCH ET AL 2,947,475
ACCOUNTING MACHINES
Filed Sept. 19, 1956 40 Sheets-Sheet 17

INVENTORS
KONRAD RAUCH
CHESTER N. JORGENSEN
GILBERT A. NEUBAUER
KENNETH S FERRIN
RUSSELL E KNEISLEY
EDWARD S. STORK &
WILLIAM E. HARSCH

BY Earl Beust
Louis A. Kline
THEIR ATTORNEYS

Aug. 2, 1960 K. RAUCH ET AL 2,947,475
ACCOUNTING MACHINES
Filed Sept. 19, 1956 40 Sheets-Sheet 18

INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH

BY
THEIR ATTORNEYS

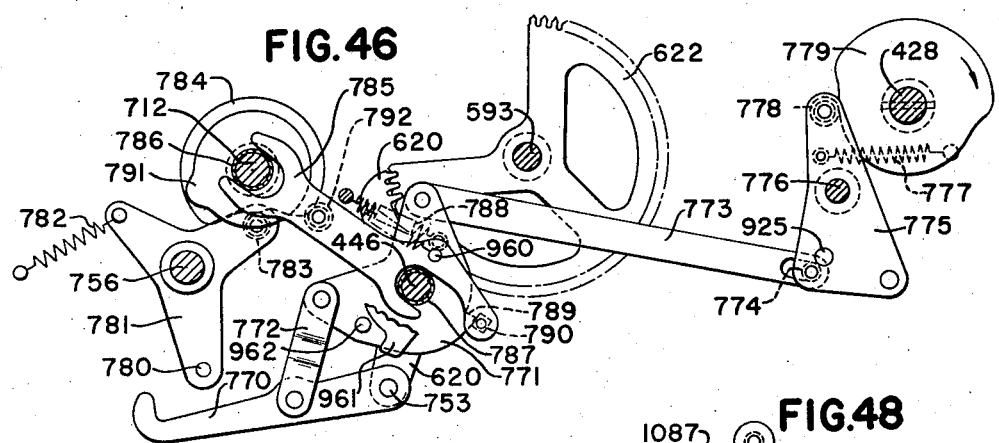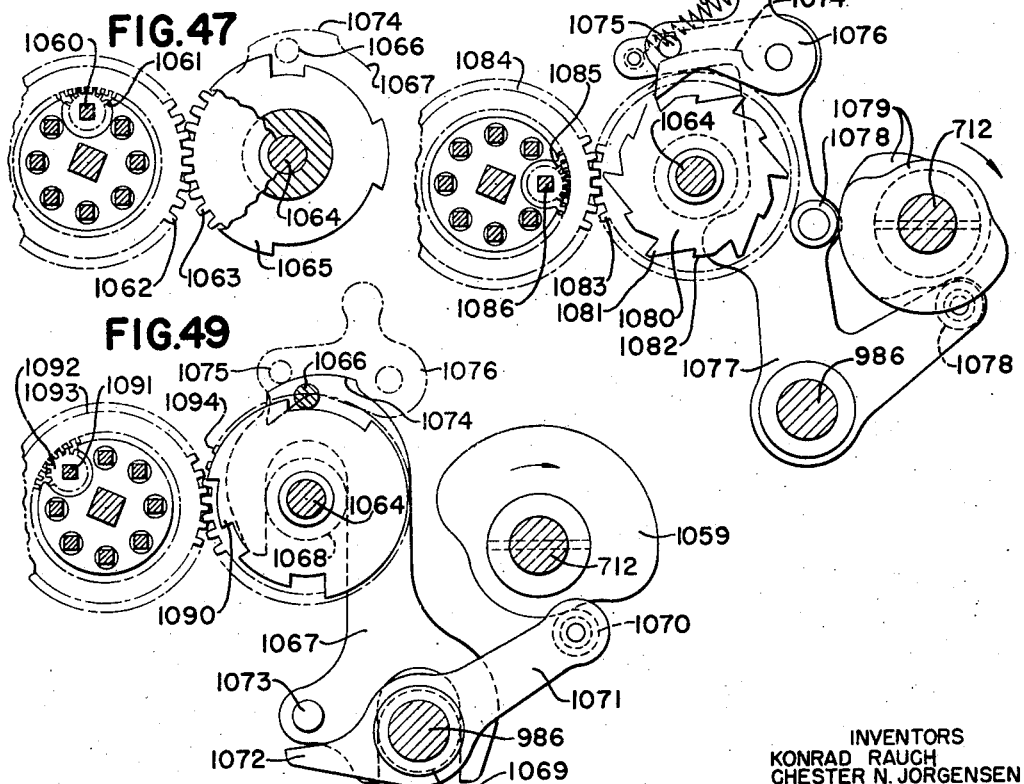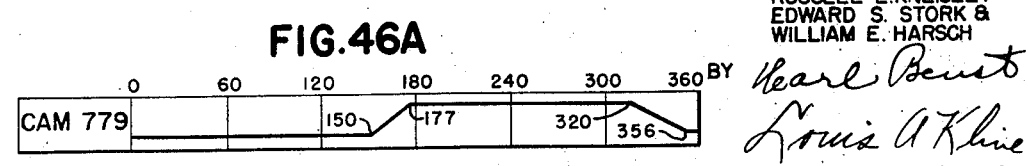

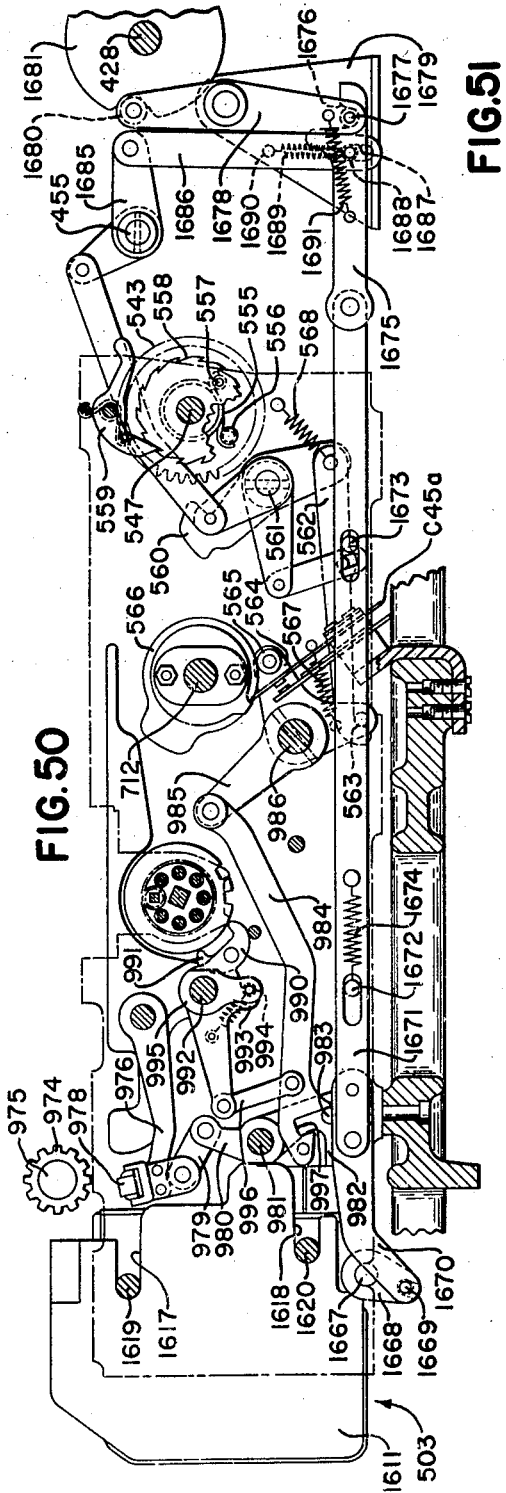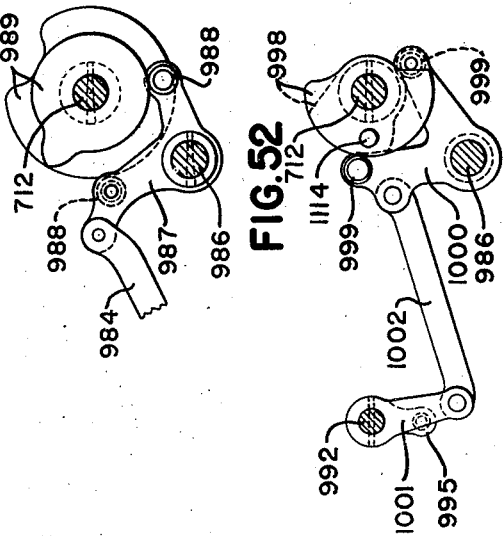

Aug. 2, 1960  K. RAUCH ET AL  2,947,475
ACCOUNTING MACHINES
Filed Sept. 19, 1956  40 Sheets-Sheet 21
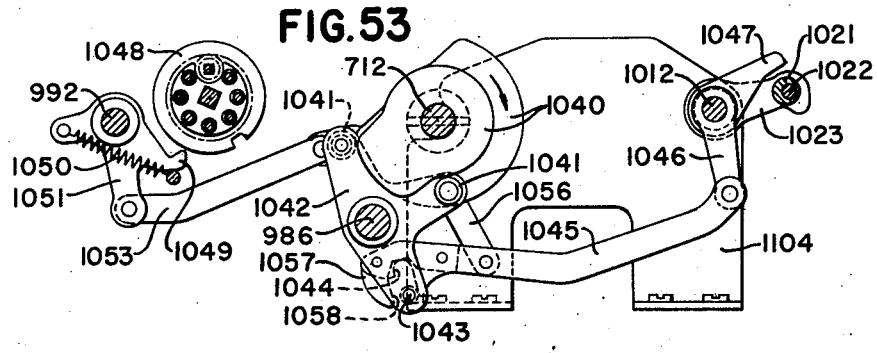
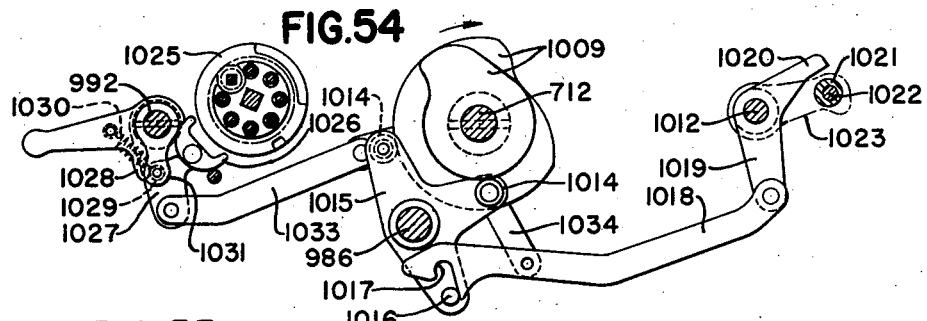
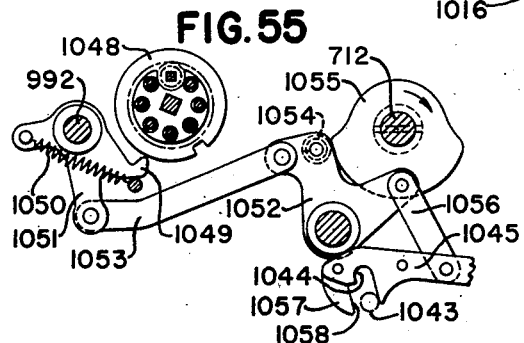
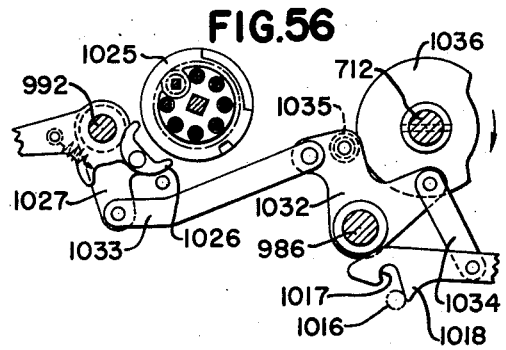
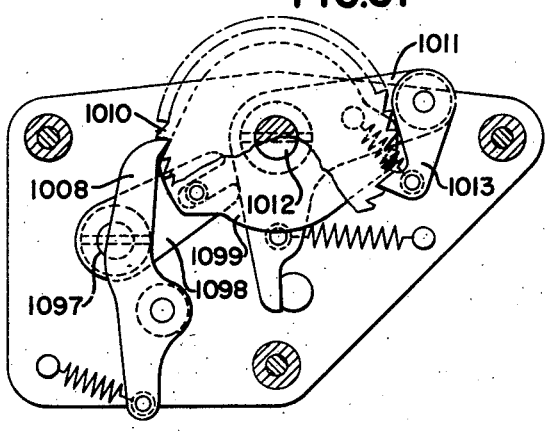
INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH
BY Carl Benet
Louis A Kline
THEIR ATTORNEYS

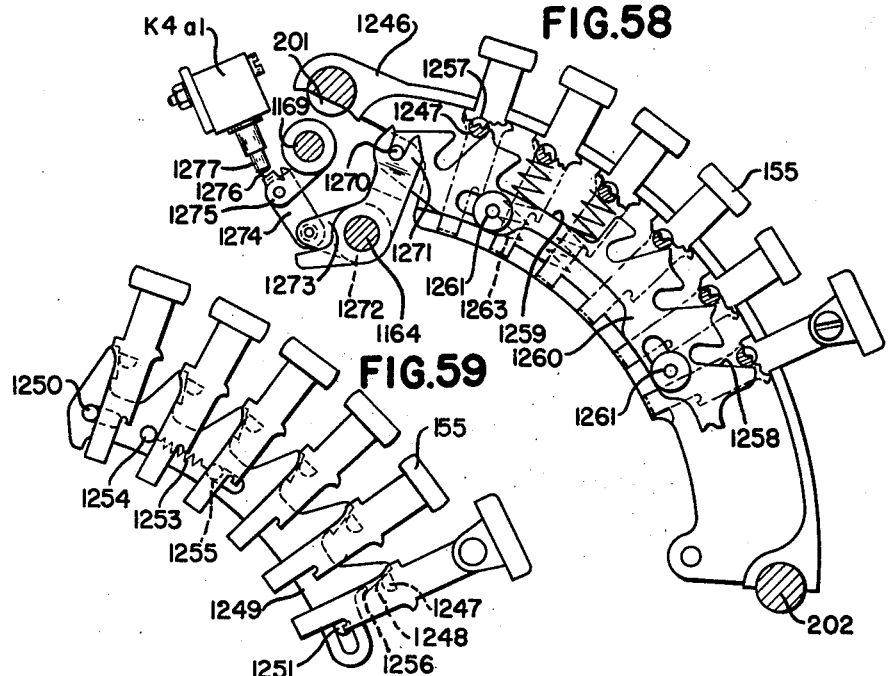
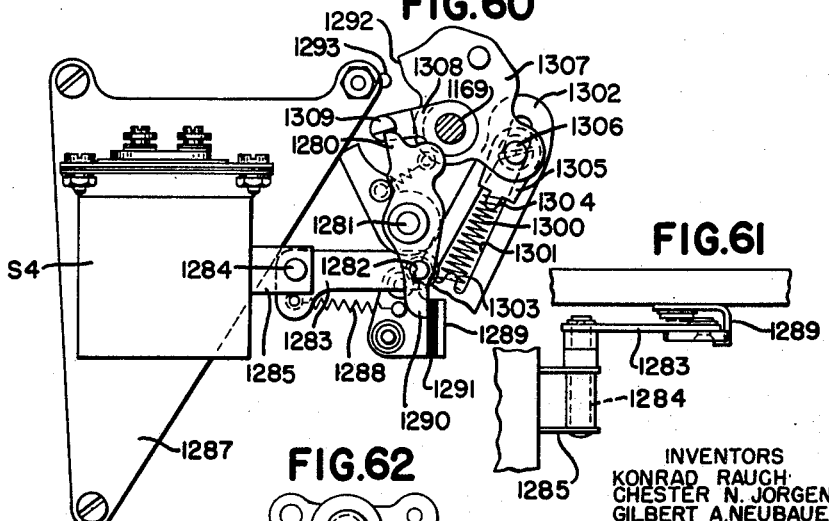

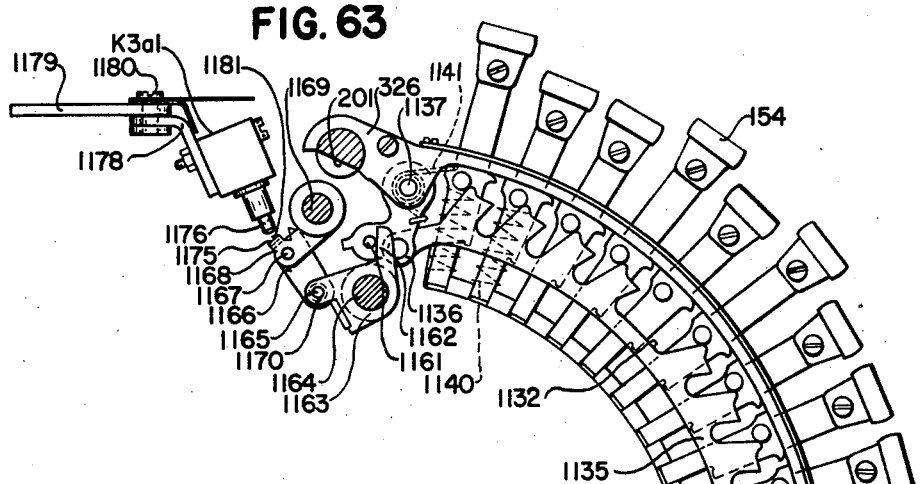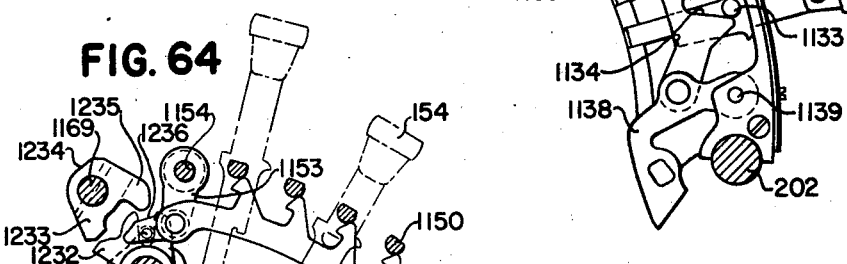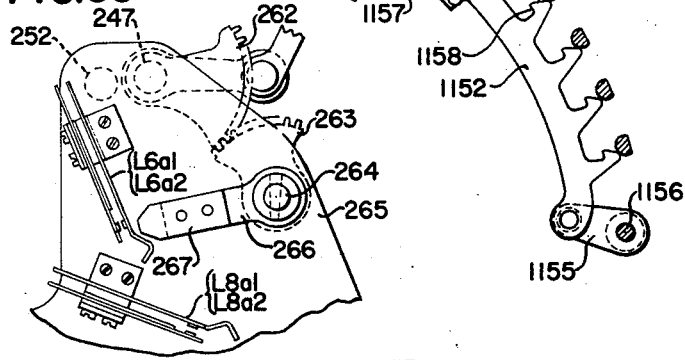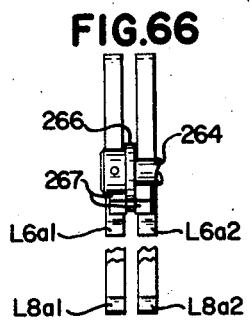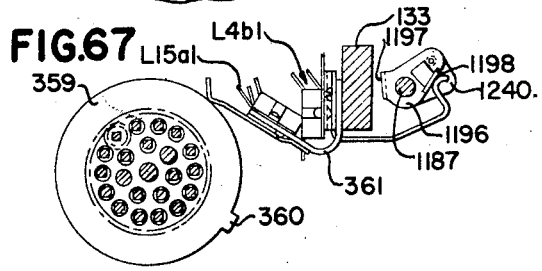

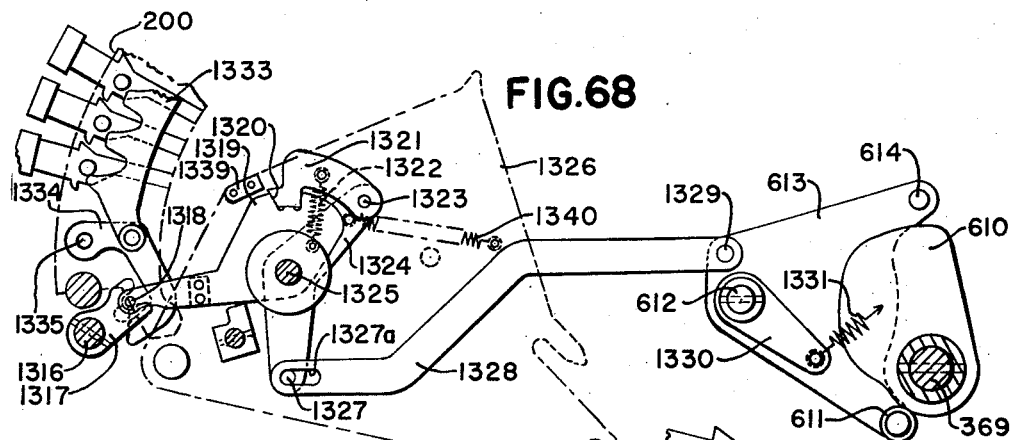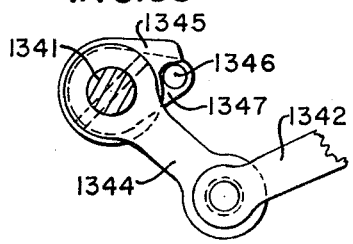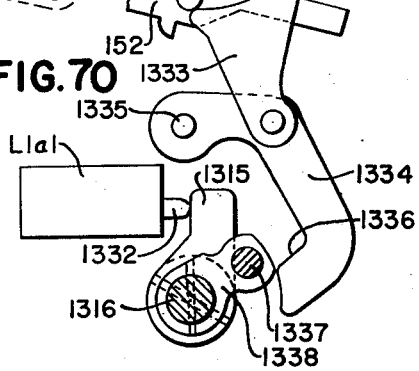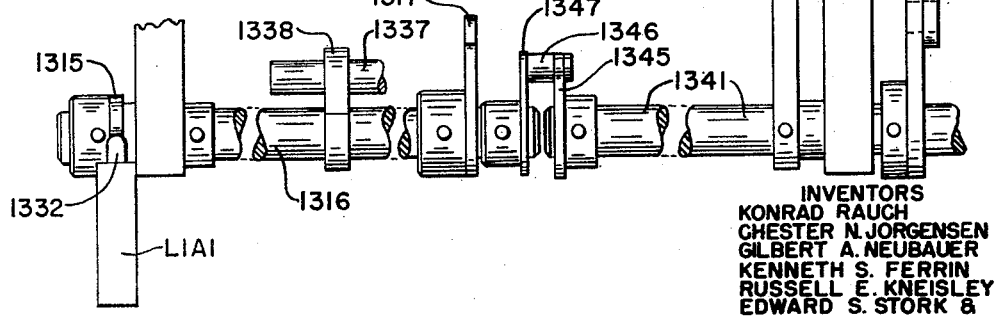

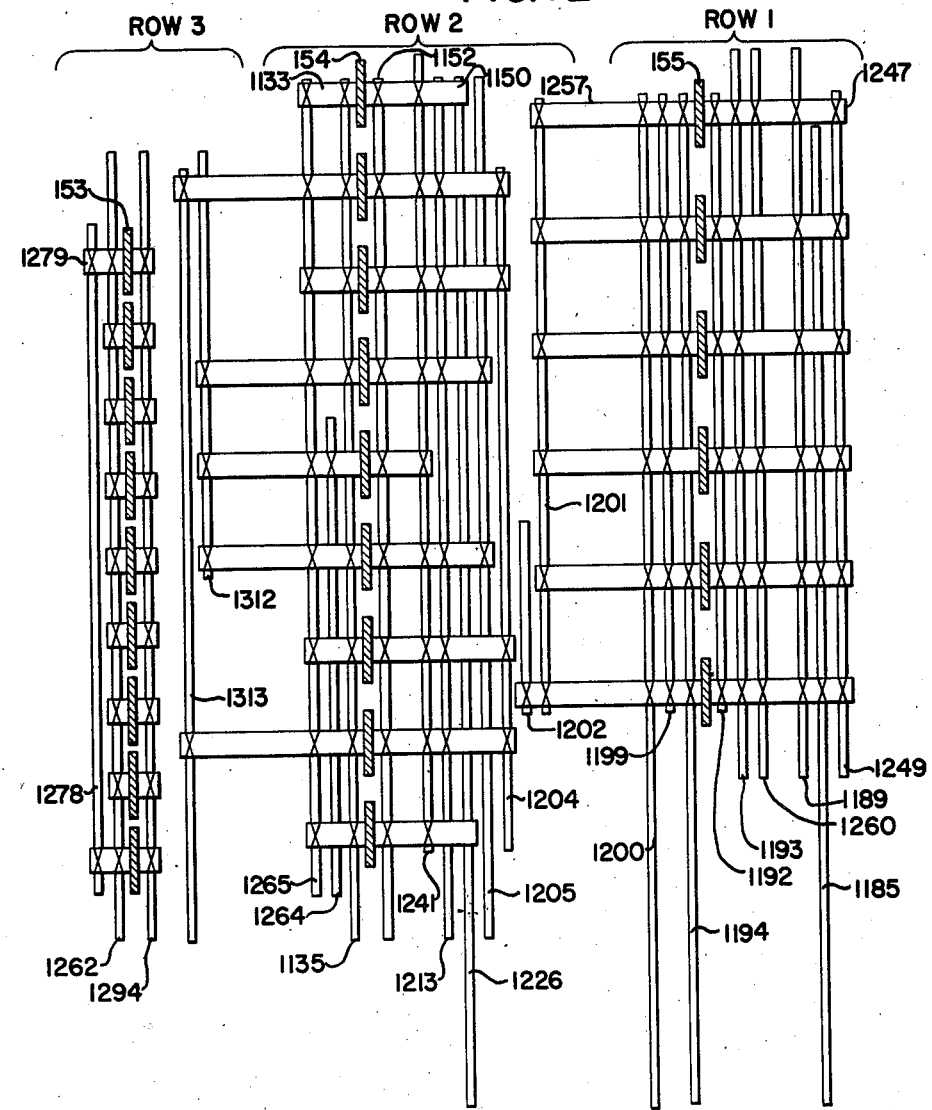

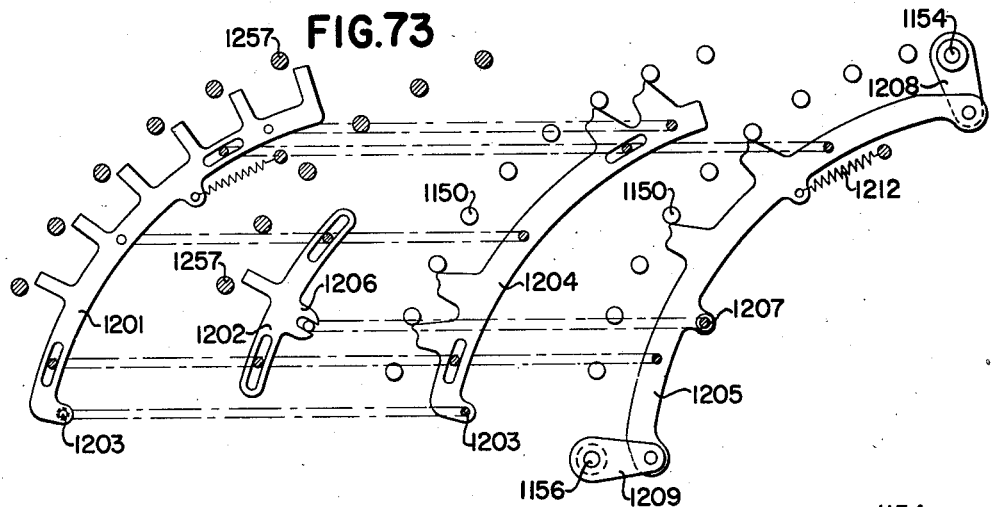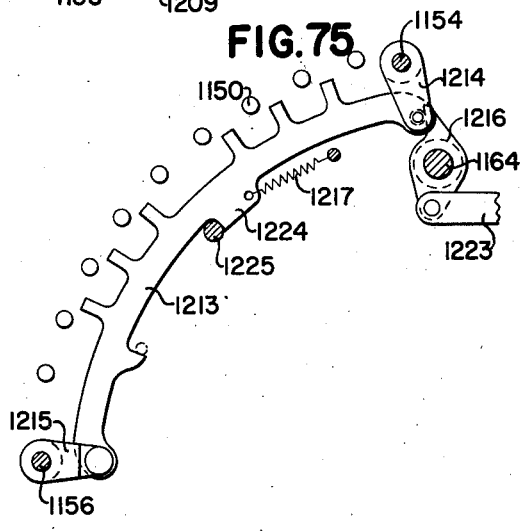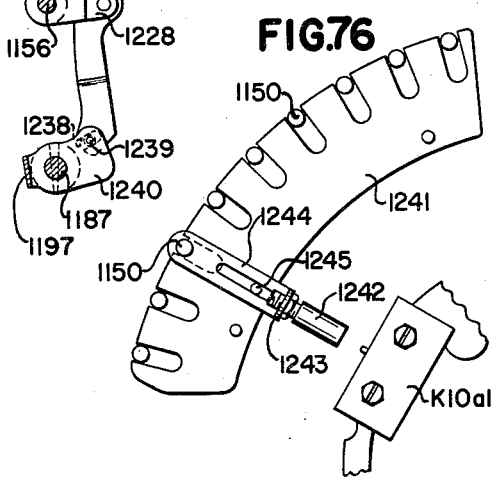

Aug. 2, 1960     K. RAUCH ET AL     2,947,475
ACCOUNTING MACHINES
Filed Sept. 19, 1956     40 Sheets-Sheet 27

INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH

BY *Carl Beust*
*Louis A Kline*

THEIR ATTORNEYS

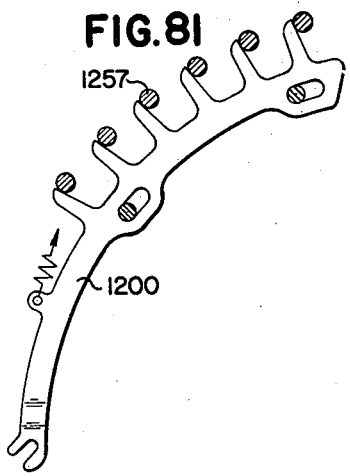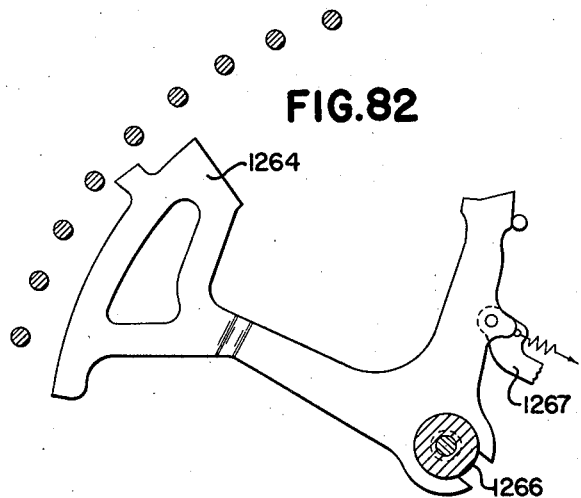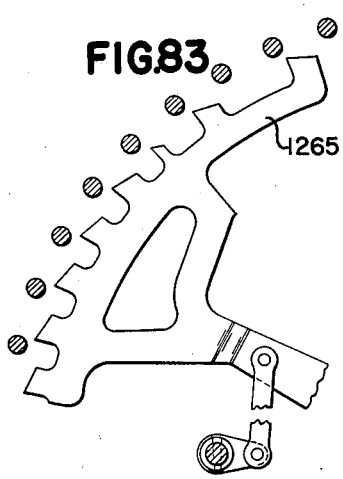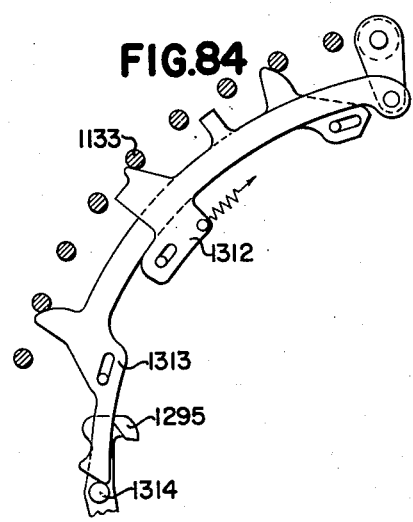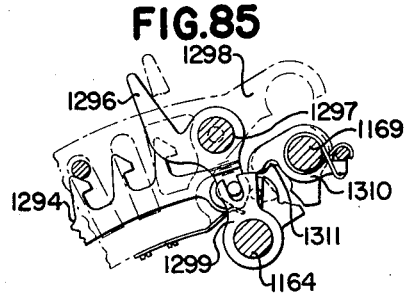

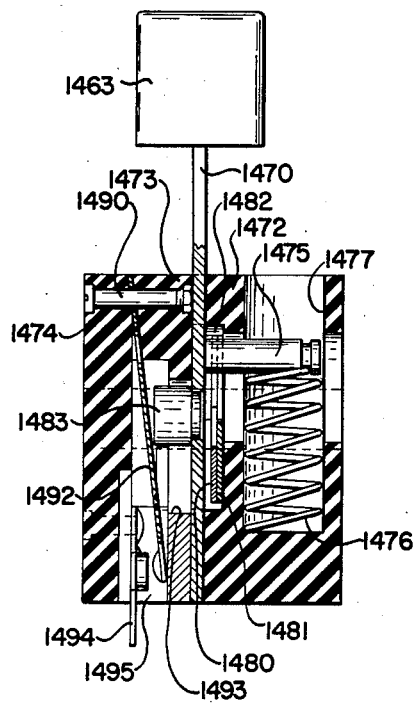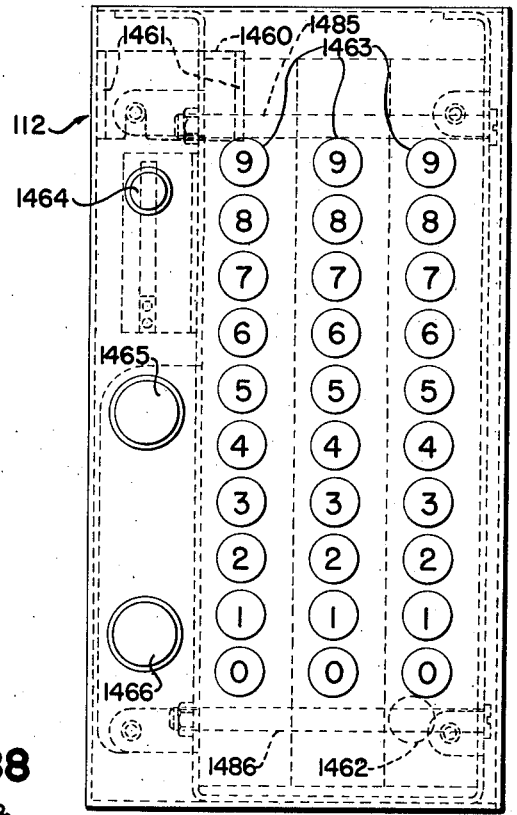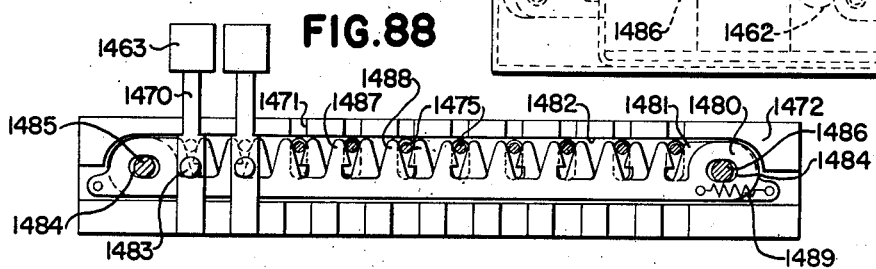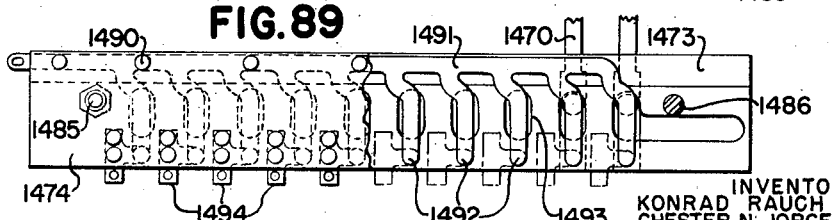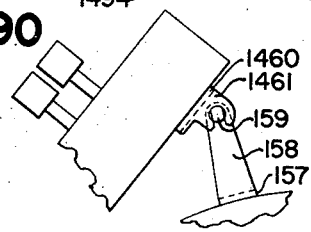

Aug. 2, 1960

K. RAUCH ET AL 2,947,475

ACCOUNTING MACHINES

Filed Sept. 19, 1956

INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH

BY Earl Beust
Louis A. Kline
THEIR ATTORNEYS

Aug. 2, 1960 K. RAUCH ET AL 2,947,475
ACCOUNTING MACHINES
Filed Sept. 19, 1956 40 Sheets-Sheet 31

INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH

BY *Karl Beust*
*Louis A Kline*
THEIR ATTORNEYS

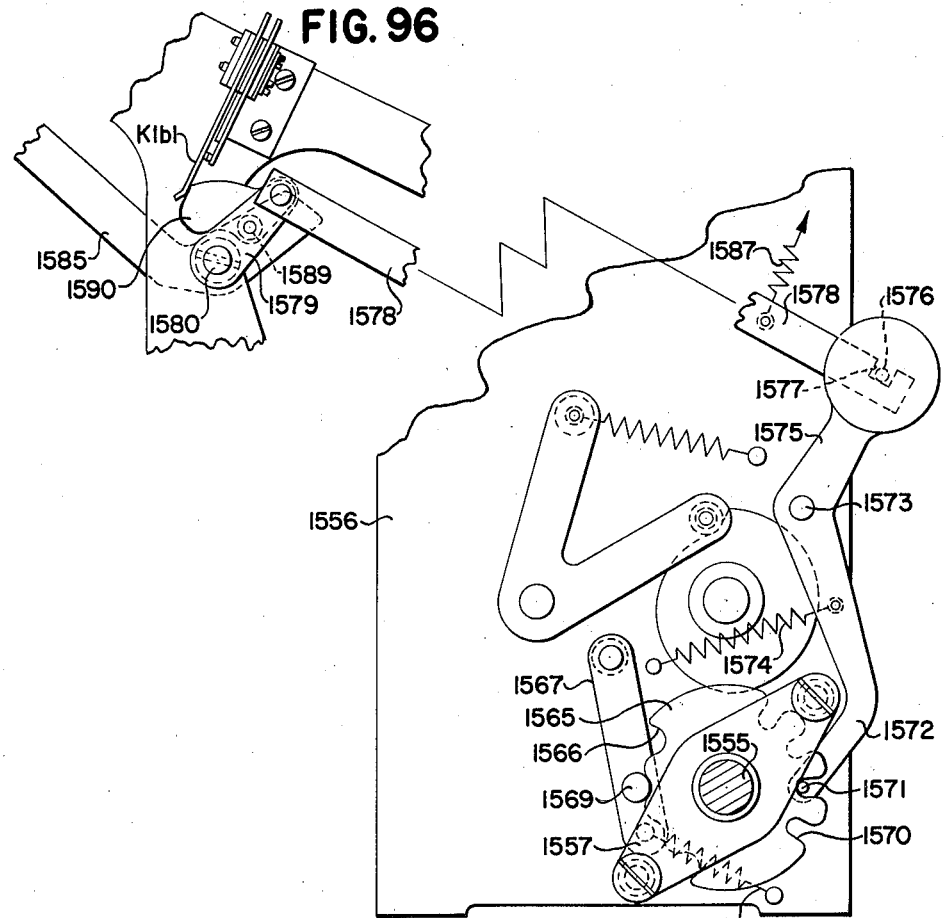
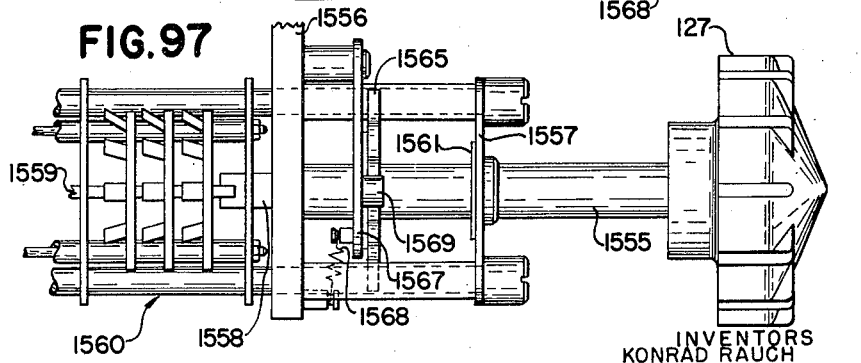

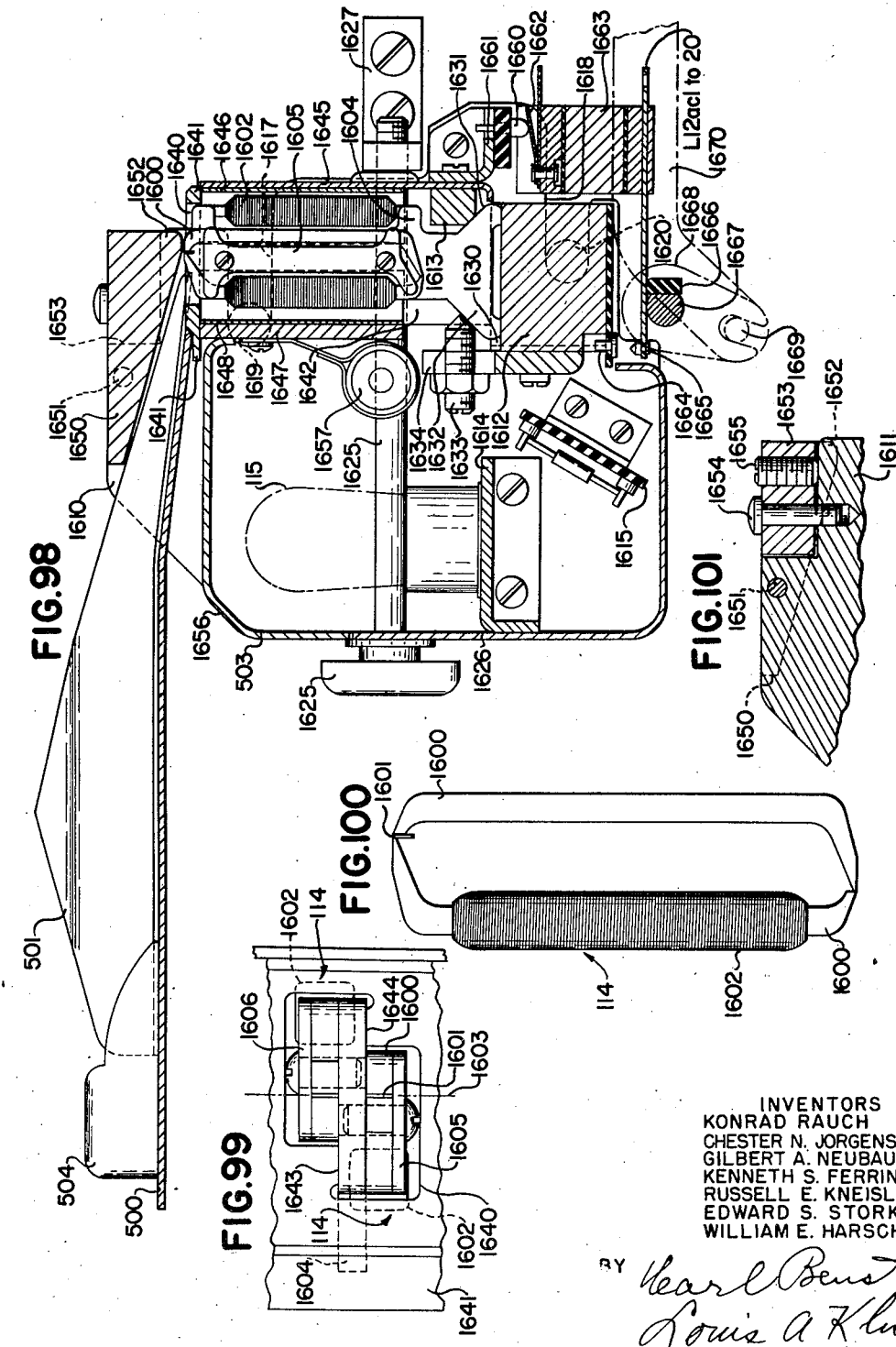

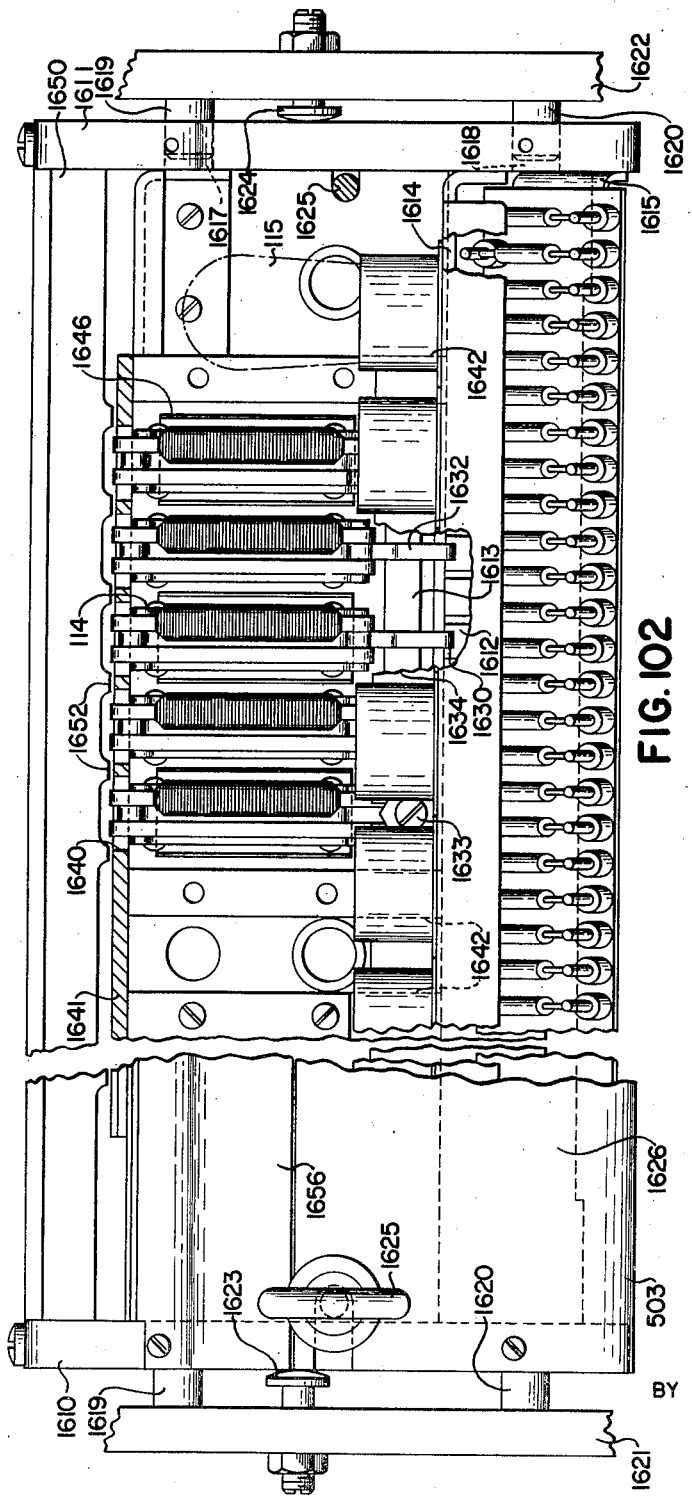

Aug. 2, 1960

K. RAUCH ET AL 2,947,475

ACCOUNTING MACHINES

Filed Sept. 19, 1956

INVENTORS
KONRAD RAUCH
CHESTER N. JORGENSEN
GILBERT A. NEUBAUER
KENNETH S. FERRIN
RUSSELL E. KNEISLEY
EDWARD S. STORK &
WILLIAM E. HARSCH

BY Earl Beust
Louis A. Kline

THEIR ATTORNEYS

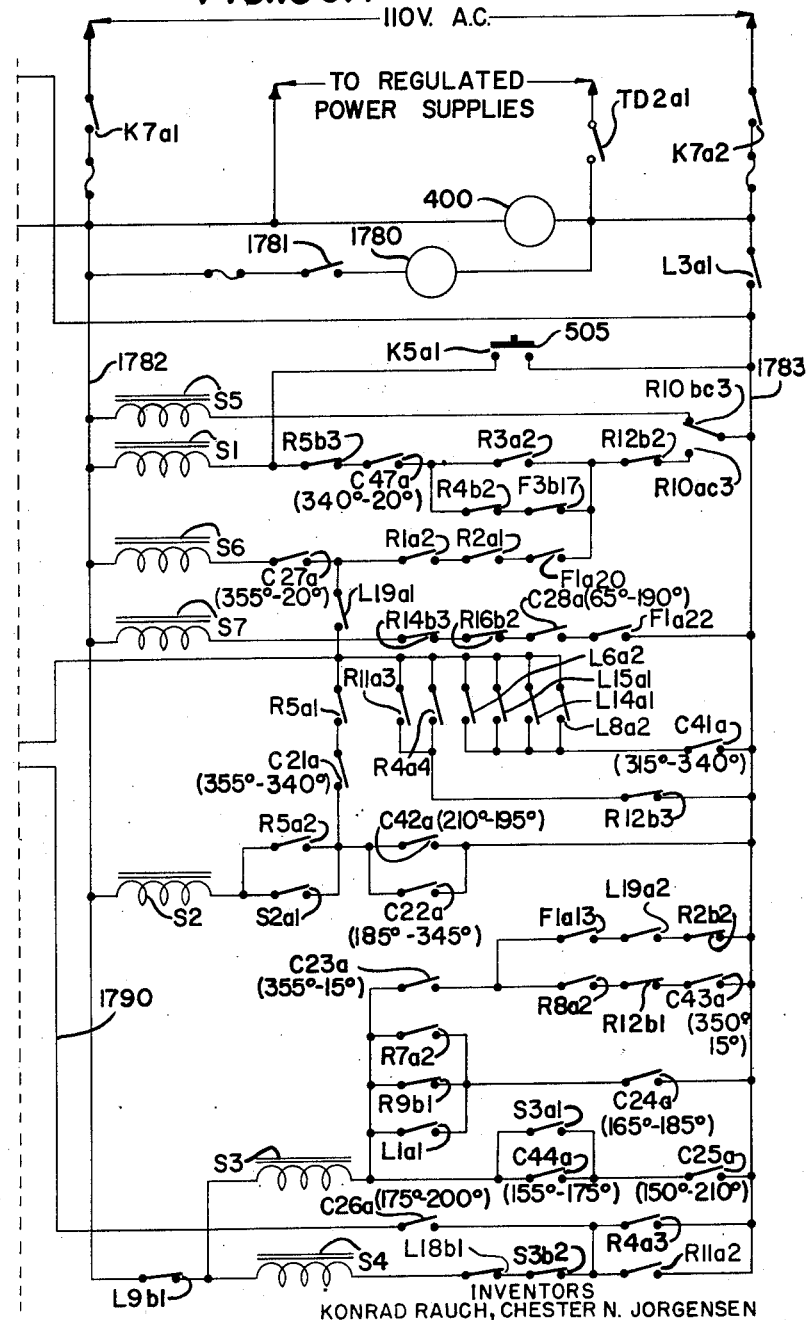

United States Patent Office 2,947,475
Patented Aug. 2, 1960

2,947,475
ACCOUNTING MACHINES

Konrad Rauch and Chester N. Jorgensen, Dayton, Gilbert A. Neubauer, Centerville, Kenneth S. Ferrin, Miamisburg, Russell E. Kneisley and Edward S. Stork, Dayton, all of Ohio, and William E. Harsch, Trumbull, Conn., assignors to The National Cash Register Company, Dayton, Ohio, a corporation of Maryland Filed Sept. 19, 1956, Ser. No. 610,754

32 Claims. (Cl. 235—61.6)

The invention relates generally to accounting machines which can automatically pick up an old balance and related data from a record or ledger card, can be operated further to add to or subtract amounts from the old balance to form a new balance, and can erase the old balance and its related data from the card and record thereon in place thereof the new balance and its related data. In particular, the invention relates to such a machine which can operate effectively to produce these results and which contains many checking arrangements to insure absolute accuracy, and to a machine which is flexible in its operation and can be adapted readily to perform various ones of a plurality of different related types of operations.

The embodiment which is described to illustrate the invention is a banking machine for use in checking-account bookkeeping; however, it will be obvious that the invention can also be applied to other accounting operations which deal with running accounts.

The novel machine is controlled from a ledger card on which are printed the usual amounts pertaining to the account, such as the checks and deposits, the balances after each transaction entry, the check count, the sign of the balance, the date, etc., and in addition has recorded thereon magnetically the last balance and related data, such as the account number, the sign of the balance, the check count, and the number of the line on which the next entry is to be printed on the ledger card. The machine is also controlled from a keyboard, on which data may be set to be printed on the card and be combined with data read from the card to form new balances. In a new-balance-recording operation, the data pertaining to the new balance is printed on the ledger card; the previous magnetically-stored data is erased; and the new balance and related data pertaining to the new balance are magnetically stored on the card in its place.

In addition to the usual interlocks which have previously been provided on bank posting machines, the novel machine is provided with further safeguards to insure correctness of the pick-up operation. One of these safeguards is a check to be sure that all the data has been read from the card. Failure to read any data will prevent the entry of the remaining data into the machine and will cause the card to be immediately fed from the machine.

Another of these safeguards is a check to be sure that the data which was read has been correctly entered into the machine by comparing the data actually set in the machine with the data actually recorded on the card. This is accomplished by first reading the ledger card and controlling the setting of the machine according to the data which was read and then reading the card the second time and comparing this second reading with the actual setting of the machine. If there is no agreement, the further normal operation of the machine is prevented, and only a corrective operation of the machine may take place.

A further safeguard cooperates with the above two to insure that over-printing on the ledger card will be avoided. This involves the automatic recording of the line number on the card corresponding to the line on which the next printing is to be made. Accordingly, if the number is read correctly and is correctly set in the machine, as indicated by the two safeguards previously mentioned, then the card will be positioned in the next operation with the proper line thereon in printing position.

The novel machine is provided with a further safeguard to insure correctness of entries. An account number keyboard is provided, on which the account number may be set, and the account number thus set up can be compared with the account number read from the ledger card to insure that the check or the deposit is being posted to the correct account. Failure of the account numbers to agree will cause the card to be fed from the machine immediately and will prevent the data from being entered into the machine.

These automatic safeguards and checking means, together with the usual interlocks and controls, insure virtually "error-proof" operations without the necessity of running proofs on work already performed.

The novel machine is provided with a data storage means, in which the balance and the check count are stored when they are read and are retained until it is determined that something has been read from each channel on the card and that there has been agreement between the account number read from the card and that set in the account number keyboard. If data was read from each channel on the card and if the account numbers agree, then the balance and the check count are entered into the totalizer and counter of the machine under control of the data storage means. If there is a failure to read data from any channel on the card, or if the account numbers do not agree, the card is immediately fed from the machine, as indicated above, and the balance and the check count are not entered into the totalizer and counter of the machine. By thus storing the balance and the check count until it is determined that data has been read from all the channels on the card and until it is determined that there is agreement between the account numbers, incorrect entries and corrective operations of the machine are minimized.

This storage of balance and check count until the account number agreement has been determined also enables a "stop payment" signal to be obtained to call the operator's attention to the fact that a "stop payment" order has been placed on the account and to enable the operator to examine the check, before the entries are made into the totalizer and counter, to see whether it is the one on which the "stop payment" was placed. This is accomplished by recording a "stop payment" number on the ledger card instead of its account number, so that the account-number-comparing mechanism will show a failure of comparison and prevent the entry of the balance whenever it is attempted to post to the account in the usual manner. Upon verification that the check is not the one against which the "stop payment" order has been placed, it may be posted by setting the "stop payment" number in the account number keyboard and operating the machine in the usual manner. In this manner, the posting of a check upon which a "stop payment" order has been placed is prevented.

The novel machine is also provided with extremely flexible controls which enable it to perform different types of operations involving reading and recording operations on the cards. For example, with one setting of the controls, the card-reading operation may be eliminated, and data may be set up on the keys of the machine and recorded magnetically on the card; with another setting of the controls, a normal posting operation may take place involving the reading of the card to pick up the old balance, the entering of checks and/or deposits by operating the machine under control of the keys, and the recording of the new balance on the card; with a further setting of the controls, the machine may be controlled to transfer certain stored data from one card to another, as at the end of the month or accounting period or when a ledger card has been filled, and in this operation data is read from a card and set up in the machine, the old card is removed from the machine and a new card put in the machine, and certain of the data which was read is recorded on the new card; and, with a still further setting, the controls will be effective to cause the machine to operate in a trial balance operation, in which the stored data is read, the old balance and the check count are entered into the machine, and the card is ejected without erasure of the stored data or the recording of any further data thereon.

It is an object of the invention, therefore, to provide a machine which can reliably pick up an old balance and related data from a card, compute a new balance, and record the new balance and related data on the card in place of the old balance and related data previously stored on the card.

A further object of the invention is to provide an accounting machine, capable of picking up old balances and recording new balances, with flexible controls to enable the machine to perform several different types of operations involving pick-up and/or recording operations.

A further object of the invention is to provide a machine, for reading data from a card, with checking means to insure that data will not be entered into the machine unless all the required data has been read from the card.

A further object of the invention is to provide a machine, for reading data from a card, with check-back controls which are effective, after the machine has been set under control of data read from the card, to compare the setting of the machine with the data on the card to insure the accuracy of the entry.

A further object of the invention is to provide account-number-comparing means for comparing an account number as read from the card with an account number set up on an account number keyboard and for preventing the entry of data into the machine under control of the ledger card unless these numbers agree.

A further object of the invention is to provide storage means for the balance and check count to store this data when read and subsequently control the entry of the balance and check count into the totalizers of the machine if the checking means and the account-number-comparing mechanism indicate that data has been read from all channels on the card and that the account numbers agree, whereby unwanted entries into the totalizer and counter and consequent corrective entries are minimized.

A further object of the invention is to provide a "stop payment" control to prevent normal posting operations in an account against which a "stop payment" order has been issued.

With these and other objects, which will become apparent from the following description, in view, the invention includes certain novel features of construction and combinations of parts, a preferred form or embodiment of which is hereinafter described with reference to the drawings which accompany and form a part of this specification.

Of said drawings:

Fig. 1 is a perspective view of the novel machine embodying the invention.

Fig. 2 is a diagrammatic view of the amount and control keyboard for the machine.

Figs. 3A and 3B show, respectively, facsimiles of the front and rear sides of a ledger card supplied with magnetizable areas for controlling the machine.

Fig. 4 is a diagrammatic view showing the location of various frames and shafts of the machine.

Fig. 6 is a cross sectional view showing one of the amount denominational order differential mechanisms with its related check-back and recording control plate and auxiliary differential mechanism, by which the setting of the differential mechanism can be effected under control of the ledger card.

Fig. 7 is a detail view of a part of the mechanism shown in Fig. 6 for controlling the positioning of the amount differential mechanism under control of the auxiliary differential mechanism.

Fig. 8 is a detail view of a part of the check-back and recording control mechanism shown in Fig. 6.

Fig. 10 is a detail view of the auxiliary driving means and the release mechanism therefor.

Fig. 11 is a detail view of certain switches for controlling the operation of the auxiliary driving means and the machine release means.

Fig. 12 is a detail view of part of the releasing mechanism for the auxiliary driving means.

Fig. 13 is a detail view of the clutch-releasing mechanism for the auxiliary driving means.

Fig. 14 is a detail view of certain switches controlled by auxiliary driving means release mechanism.

Fig. 15 is a detail view of a part of the ledger card carriage operating mechanism.

Fig. 16 is a detail view showing the ledger card carriage operating mechanism, together with the connection to the shafts which drive it from the auxiliary driving means.

Fig. 17 is a detail view of the ledger card holding means on the ledger card carriage.

Fig. 18 is a detail view taken on line 18—18 of Fig. 19 and shows the rack on the ledger card carriage, together with the gear for driving it.

Fig. 19 is a top plan view of the card carriage and a portion of the driving means therefor.

Fig. 20 is a time chart showing the time of operation of the drive shaft of the auxiliary driving means in relation to the main shaft of the machine.

Fig. 21 is a side elevational view showing the mechanism for controlling the line-feeding mechanism for the card carriage.

Fig. 22 is a detail view of the analysis printing hammer, together with the connections for operating the last line control mechanism.

Fig. 23 is a detail view showing the deposit column printing hammer, together with the connections from this hammer and the second check-printing hammer for operating the last line control mechanism.

Fig. 24 is a time chart showing the relative timing operations of certain cams which operate the mechanism for controlling the line-spacing mechanism.

Fig. 25 is a detail view, shown in exploded perspective, of the carriage-positioning means of the line-finding mechanism for the ledger card carriage.

Fig. 26 is a detail view of certain switches for controlling certain circuits when the card carriage feed throw-off cam is operated.

Fig. 27 is a detail view of the feed throw-off mechanism, which is actuated during balance pick-up operations and new balance recording operations.

Fig. 28 is a detail view of the manual line-setting mechanism.

Fig. 29 is a detail view of the mechanism for setting the carriage into a line selected by the automatic line-finding mechanism.

Fig. 30 is a detail view of a part of the mechanism shown in Fig. 29.

Fig. 31 is a detail view showing the connection between the mechanism shown in Fig. 29 and the card carriage rack.

Fig. 32 is a top plan view of the mechanism shown in Figs. 29, 30, and 31.

Fig. 46 is a detail view of additional mechanism for controlling the positioning of the card carriage.

Fig. 46A is a time chart showing the time of operations effected by the operating cam of Fig. 46.

Fig. 47 is a detail view showing the control cam for controlling the feeler mechanism of Fig. 49.

Fig. 48 shows the automatic feed for the control disk for the card carriage feeding mechanism in its normal position.

Fig. 49 shows the feeler mechanism to control the automatic feed of the ledger card carriage feed mechanism.

Fig. 50 is a detail view showing the printer hammer operating mechanism for one of the plurality of hammers of the machine, together with a tensioning mechanism for the ledger card carriage return spring.

Fig. 51 is a detail view of the printing hammer operating cam.

Fig. 52 is a detail view of the feeler operating cam for controlling the operation of the printing hammer.

Fig. 53 is a detail view of the mechanism for controlling the consecutive line feeding of the ledger card carriage and shows the cams for operating the feed after printing has taken place.

Fig. 54 is a detail view of the mechanism of Fig. 53 and illustrates the cams for operating the ledger card carriage feeding means before a printing operation.

Fig. 55 is a detail view showing the feeler mechanism controlled from the disk set by row 1 for connecting the carriage-feeding mechanism to the mechanism shown in Fig. 53.

Fig. 56 is a detail view of the feeler mechanism controlled by the control disk set by row 2 for connecting the carriage-feeding mechanism to be operated by the cams shown in Fig. 54.

Fig. 57 is a detail view showing the ratchet feed mechanism for the line-spacing mechanism for the ledger card carriage.

Fig. 58 is a side elevation of row 1 of the control keys, showing the switch mechanism associated therewith, which is operated upon depression of certain of the keys in this row, for releasing the machine for operation.

Fig. 59 is a detail view showing the detent for maintaining the keys of row 1 in depressed position.

Fig. 60 shows a portion of the machine-releasing mechanism, the tripping mechanism for the machine-releasing mechanism, and the key lock line solenoid which operates said tripping mechanism.

Fig. 61 is a top plan view showing the connections between the key lock line solenoid and the machine release shaft or key lock line tripping means.

Fig. 62 shows a cam-operated switch which is operable, when the machine release shaft has been tripped, to interrupt the circuit to the solenoid which operates the tripping mechanism.

Fig. 63 is a side elevation of row 2 of the control keys, showing the switch mechanism associated therewith closed upon depression of certain ones of the keys in row 2.

Fig. 64 is a detail view of the detent for locking the depressed key in its depressed position.

Fig. 65 is a detail view showing two sets of switches and means for operating them under control of the keys of row 1 of the control keys.

Fig. 66 is a rear view of the switches and the switch-operating fingers of Fig. 65.

Fig. 67 is a detail view of a switch which is operated under control of a key in row 3 of the control keys and a switch which is operated under control of two keys in row 1 of the control key.

Fig. 68 is a side elevational view showing the means to remove the zero stops in balance pick-up operations and also showing the interlocks for preventing a pick-up operation with an amount or check count key depressed.

Fig. 69 is a detail view showing the connection for allowing the mechanism of Fig. 68 to operate without affecting the setting of the total lever.

Fig. 70 is a detail view of the micro switch controlled by the amount keys to prevent a pick-up operation while an amount key is depressed and the interlock between the total lever and the amount key locks to prevent operation of both at the same time.

Fig. 71 is a plan view showing the side spacing of certain of the parts shown in Figs. 68, 69, and 70.

Fig. 72 is a diagrammatic view showing the relation between the detents and the keys in the control rows, rows 1, 2, and 3.

Fig. 73 shows detents for locking keys in row 1 when certain keys in row 2 are operated.

Fig. 74 shows a detent or member in row 2 which is used to cause the operation of a detent in row 1 if the data read from the card is not properly set up in the machine.

Fig. 75 shows a locking detent in row 2.

Fig. 76 shows the connections whereby the analysis key in row 2 can operate a switch.

Fig. 81 shows a detent cooperating with the keys in row 1 of the control keys for disabling the automatic check-counting mechanism when any key of this row is depressed.

Fig. 82 shows a detent and associated means which are operated by the keys in row 2 of the control keys for controlling the operation of the differential mechanism for that row.

Fig. 83 shows a control member controlled by the keys in row 2 of the control keys for controlling the operation of the automatic check-counting mechanism when certain keys are operated in row 2.

Fig. 84 shows two detents carried by row 3 but controlled by keys in row 2.

Fig. 85 shows a means for preventing the automatic release of keys in row 3.

Fig. 86 is a section through one of the banks of keys of the account number keyboard.

Fig. 87 is a top plan view of the account number keyboard.

Fig. 88 is a side elevation of one of the rows of keys of the account number keyboard, showing the latching detents for the keys.

Fig. 89 is a side elevation of one of the rows of keys of the account number keyboard, showing in particular the switches controlled by the keys.

Fig. 90 is a detail view showing the means for attaching the account number keyboard to the machine.

Fig. 96 is a detail view showing a portion of the usual key release lever and certain of the controls exerted thereby.

Fig. 97 is a detail view of the function control switching means.

Fig. 98 is a detail view of the unit which contains magnetic pick-up and recording mechanism.

Fig. 99 is a detail view, shown in plan view, of part of the mechanism shown in Fig. 98.

Fig. 100 is a detail view showing a part of the magnetic pick-up and recording mechanism shown in Fig. 98.

Fig. 101 is a section taken through a side wall of the unit containing the pick-up and recording mechanism, showing the means for adjusting the throat for guiding the ledger card into position to cooperate with the pick-up and recording mechanism.

Fig. 102 is a front elevation view of the unit shown in Fig. 98.

Fig. 103 is a circuit diagram showing a typical reading, check-back, erasing, and recording circuit associated with the pick-up and recording mechanism.

Figure 106:
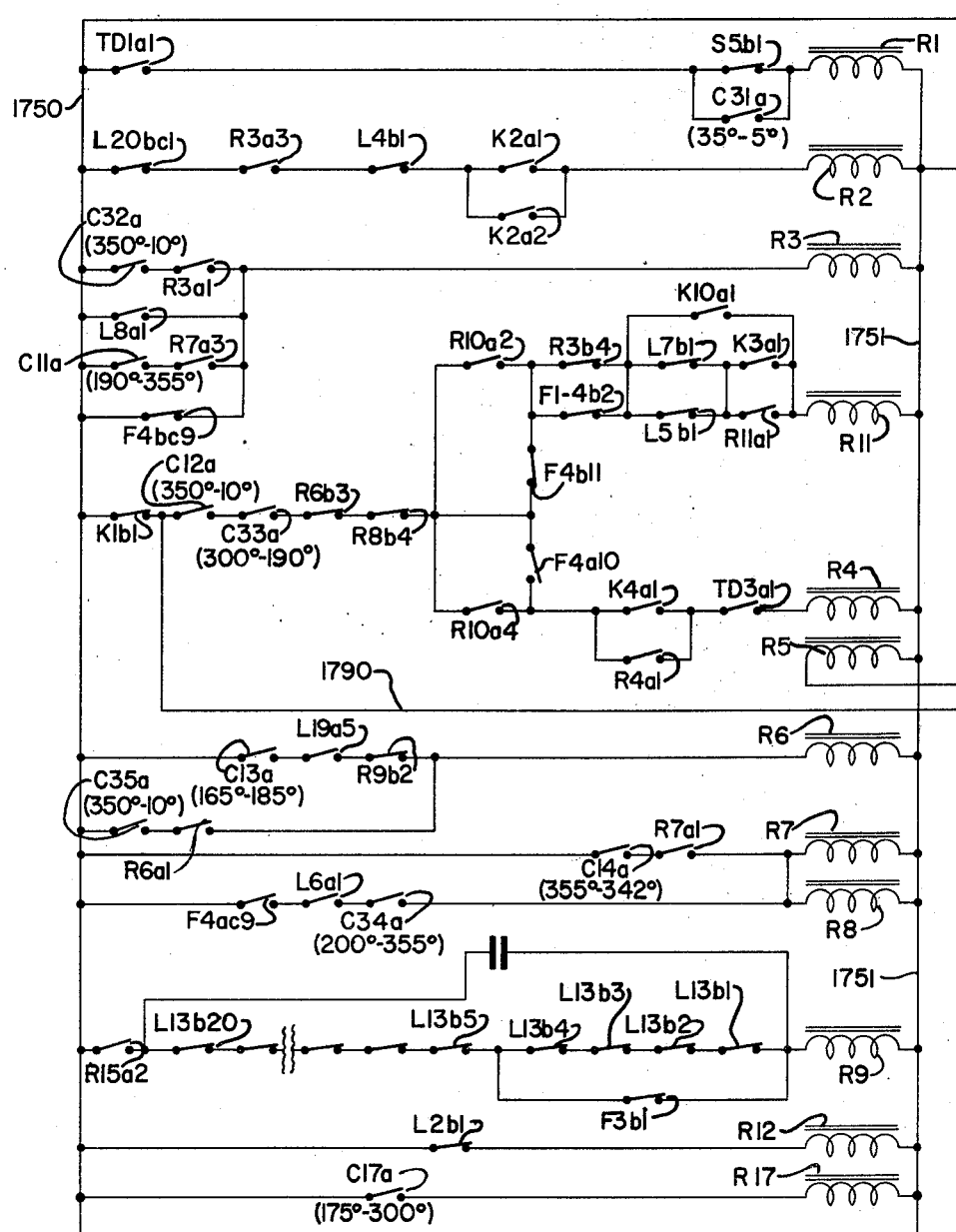
Figure 106B:
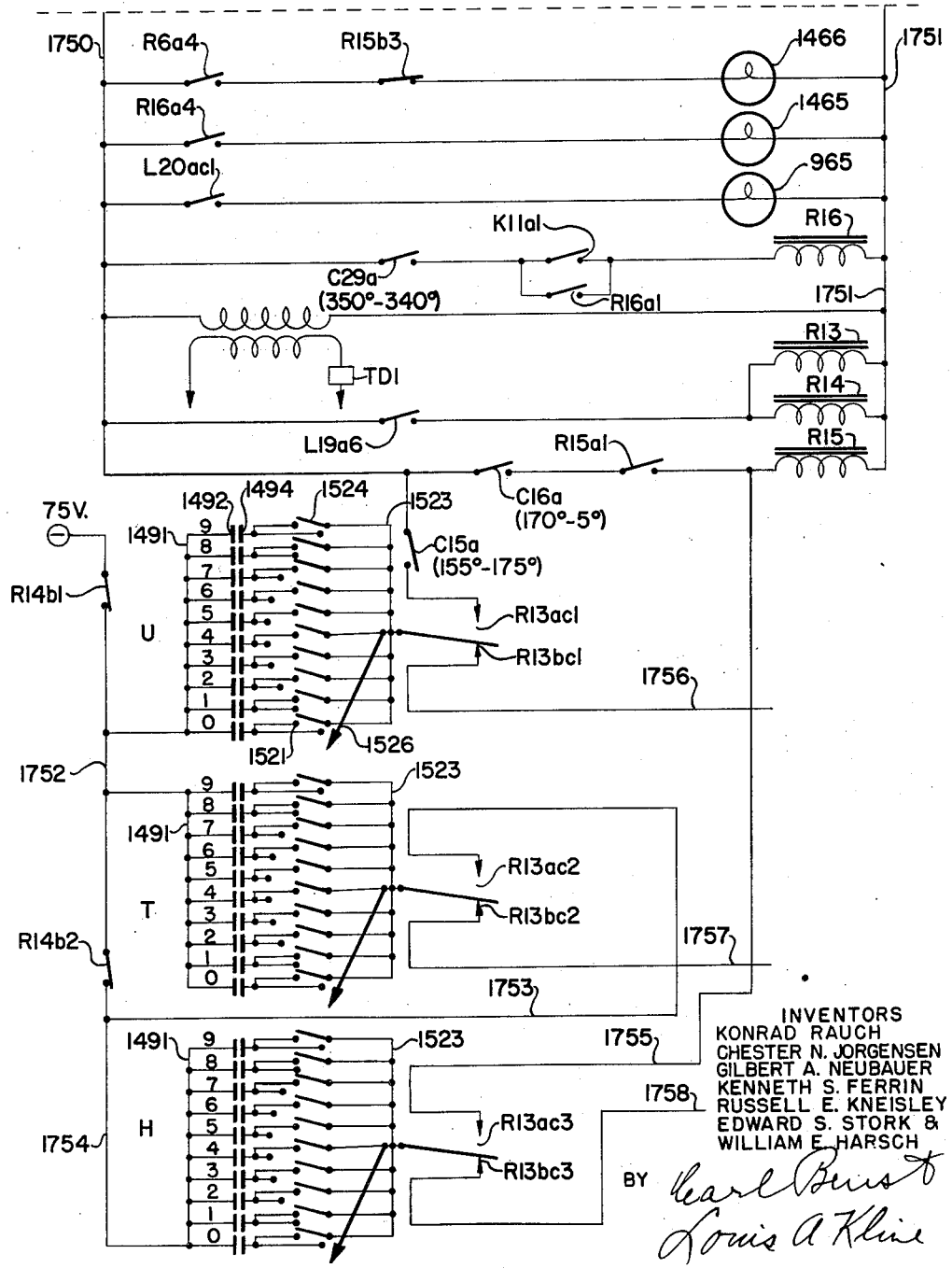

Figs. 106, 106A, and 106B, taken together, constitute a circuit diagram of the various circuits for controlling the operation of the machine.

GENERAL DESCRIPTION

The novel apparatus is generally of the type shown in the United States patent to Spurlino et al. No. 2,373,510, which was issued April 10, 1945, which apparatus is arranged to register and record data in various types of posting operations and other types of operations performed in connection with the banking business.

Figure 5:
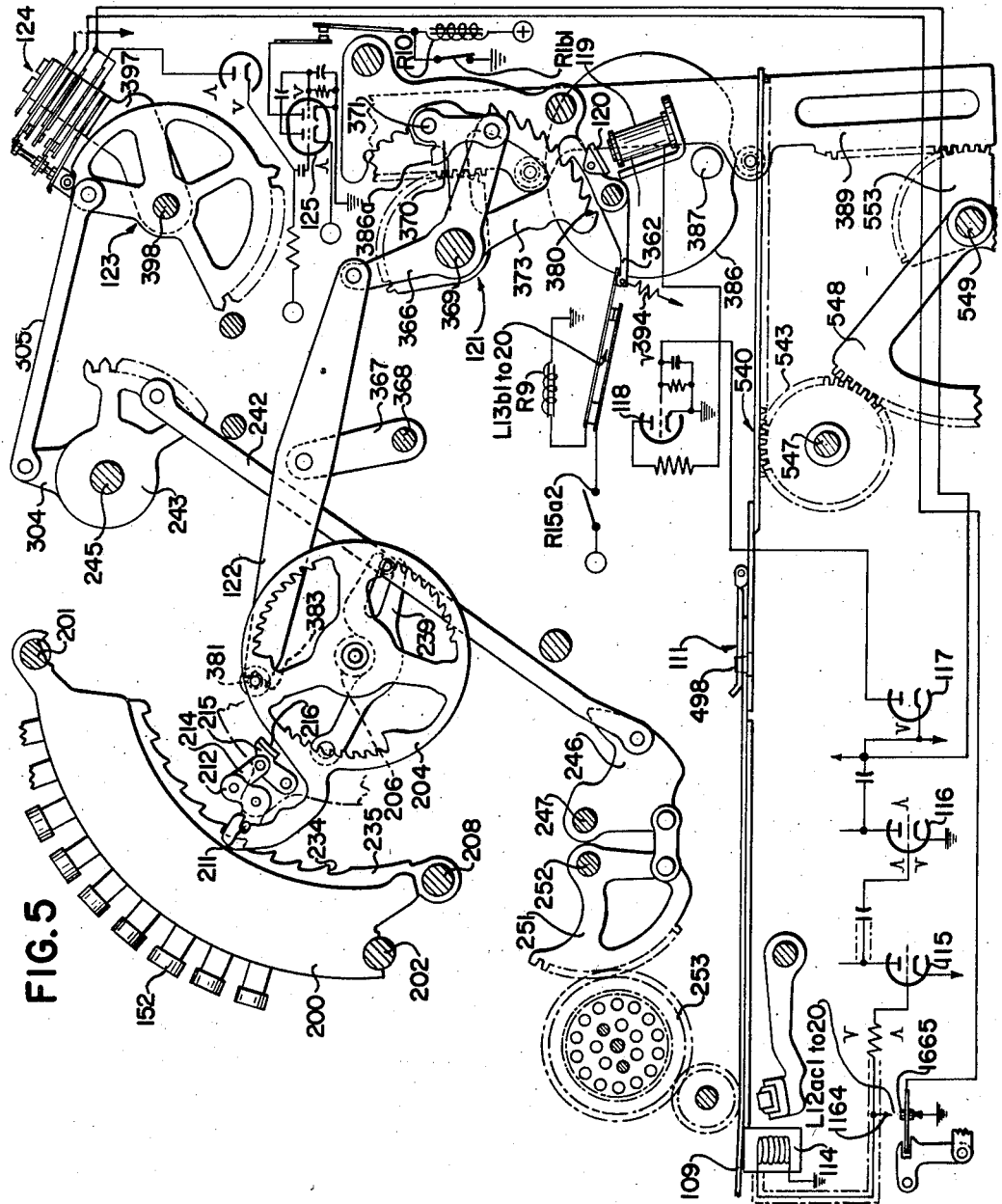
Fig. 5 is a schematic showing of the differential mechanism for one of the amount denominational orders with its related auxiliary differential mechanism, its check-back and recording control plates, and basic electrical circuits involved in reading and recording operations.

A general explanation will be given with reference to Figs. 1 and 3A and the schematic showing of Fig. 5.

In order to speed up operations and to eliminate a source of error when data is being picked up from a ledger card, the novel apparatus is adapted to be controlled by data magnetically recorded on a ledger card having means thereon to store this data.

The ledger card 109 (Fig. 3A) is provided on its rear surface with ten areas 110 of magnetizable material, which provide twenty channels in which data may be recorded by distinctive magnetization along the channels, the data in the disclosed embodiment consisting of the last balance and its sign, the check count, an account number, and the number of the line on the ledger card on which the next printing operation is to take place.

Electrical power is supplied to the machine by the closing of a main power switch MPS at the left front of the machine (Fig. 1). After a short time to allow for the tubes and other components to be in operating condition, the machine is ready for operation. In a typical posting operation, a ledger card 109 (Fig. 1) is inserted into the machine at the left front side thereof until the card engages stops on a card carriage 111 (Fig. 5). The account number of the account being posted is set up on an account number keyboard 112, and then the Balance Pick-Up motor bar 113 (Fig. 1) is operated to initiate a balance pick-up operation. In this operation, the card is gripped in position on the carriage, and the carriage is operated to sweep the card into the machine past the pick-up heads, one for each channel, indicated generally at 114. As is clearly shown in Fig. 5, which shows the position of the carriage and the card at the end of its movement into the machine, the heads 114 are located below the card and just in front of the printing mechanism, which arrangement enables both printing and magnetic recording of data on the card. As the card 109 moves past the heads 114 on the in-sweep of the card, negative signals will be generated in the various heads at different times according to the data recorded in the different channels. The negative signals are sent through a preamplifier tube 115, a further amplifier tube 116, and a gate diode 117 to a control tube 118 to cut off the control tube. In series with the anode of the control tube 118 is a solenoid 119, which is normally energized and retains a pawl 120 away from an auxiliary differential mechanism, generally indicated at 121, which operates in synchronism with the passage of the card past the heads 114. When the control tube 118 is cut off by the signal from its related channel on the card, it will deenergize its solenoid 119 to release its pawl 120, which arrests the auxiliary differential mechanism in a position corresponding to the data which was read. The auxiliary differential mechanism shown in Fig. 5 is representative of those for the balance and check count data and serves to store the data prior to its entry into the accounting machine. The auxiliary differential mechanisms for the sign of the balance, the account number, and line finding will be operated in a manner similar to the one shown in Fig. 5.

As each pawl 120 is released, it will allow its related one of the contacts L13b1 to 20 to close. The contacts L13b1 to 20 for the various pawls are connected in series and form a pawl-check circuit between a source of potential and a pawl-check relay R9. If any of the pawls is not released in response to a signal, its related contact will remain open.

Associated with the pawl-check contacts L13b1 to 20 are further contacts R15a2, which are controlled by an account-number-comparing means, which compares the account number read from the card with that set on the account number keyboard 112. If there is agreement between the account number as read and the one set on the keyboard 112, then contacts R15a2 will be closed.

Accordingly, if all the contacts L13b1 to 20 have closed to indicate that data was read from all channels on the card, and if contacts R15a2 have closed to indicate correspondence of account numbers, then relay R9 will be energized to control circuits to cause the card to be retained in its innermost position and to cause the accounting machine to be operated to enter the balance and the check count therein.

It is to be noted that the accounting machine does not receive entries unless the account numbers agree and unless data has been read from all the channels on the card.

The auxiliary differential mechanisms 121, which control the entry of amounts into the accounting machine, position stop members 122 according to the data which was read from the card. These stop members 122, in turn, control the extent of movement of the differential mechanisms of the accounting machine to enter the amounts into the machine. The differential mechanisms of the accounting machine position check-back and recording control plates 123 according to the amount entered into the machine.

In a similar manner, the auxiliary differential mechanisms which are settable under control of the ledger card, according to the number of the line on which printing is to take place, set up controls to determine the extent of carriage feed and also set check-back and recording control plates similar to the plates 123.

The account number differential mechanisms, which are similar to the auxiliary differential mechanisms, also set check-back and recording control plates.

After the check-back and recording control plates 123 have been set, groups of contacts 124 are moved over the edge of the plates to sense the position where the transition from the lower to higher surfaces is located. During this movement of the contacts past the plates, the card carriage moves the ledger card 109 to the left (Fig. 5) to its starting position, and, in this movement of the card, the data recorded thereon is sensed again. If the plates 123 have been positioned correctly, the contacts will be passing the rise on the plates at the time when the heads 114 are sensing the data on the card, and the signal produced by the head will be nullified, indicating that the amount has been correctly set up in the machine. If the signal is produced by the head at any time other than when the contacts 124 are passing the rising portion of the plates 123, then the signal will be effective to cut off a control tube 125, which deenergizes relay R10, which indicates that there is lack of agreement between the setting of the check-back and recording control plates by differential mechanisms and the data read from the card. Relay R10 sets up controls for causing interlocks to be operated to prevent further normal operation of the machine until a corrective New Balance Non-Transfer operation takes place.

The manner in which these controls are effected will be explained fully in the detailed description which follows.

It is to be noted that the novel apparatus not only checks to determine that something has been read from each of the channels on the card but also checks further to determine that the data which was read from the card was correctly entered into the machine. These two checking circuits, along with the account number comparison circuits, insure the correctness of the entry in the balance pick-up operation.

If the data has been correctly entered into the machine in the balance pick-up operation, then further normal steps in the posting operation, such as entering checks and/or deposits, can be made, the amount and control keyboard of the machine being used in the manner explained in the Spurlino et al. Patent No. 2,373,510. In the first of these operations, the card 109 will be positioned automatically to receive printing on the line read from the card.

When all the checks and/or deposits have been entered, the accounting machine is operated in a new balance operation to print the new balance, the check count, and other related data on the ledger card and to feed the card back to its starting position after printing has taken place, in a manner explained in said Spurlino et al. patent.

During the new balance operation of the accounting machine, the various check-back and recording control plates, as 123, will be set to positions corresponding to the new balance, its sign, the check count, the line number on which the next printing is to take place, and the account number, in order to control the recording of this data magnetically on the card.

As soon as the ledger card is returned to its starting position after the new balance and related data have been printed thereon, a further operation of the auxiliary differential drive mechanism takes place to cause the card to be swept inwardly past the heads. During the inward movement of the card, the heads 114 are connected to a recording circuit at contacts L12ac1 to 20 and are controlled to magnetize the channels in such a manner as to erase any previously stored data. While the previously stored data was being erased, the contacts 124 were rocked counter-clockwise past the plates 123 in preparation for the recording of the data.

When the ledger card has completed its insweep, and before it begins its return movement toward the front of the machine, the recording circuit is changed to enable the new data to be recorded under control of the plates 123. As the card is moved outwardly, the contacts 124 move past the plates 123 in timed relation with the movement of the card past the heads 114. As the contacts 124 pass over the plates 123, they will cause the data to be recorded by distinctive magnetization at various data-representing positions along the channels according to the positions of the rise portions of the plates, which have been differentially positioned according to the data to be recorded. At the end of the movement of the card toward the front of the machine, the new data will have been recorded on the card magnetically as well as by having been printed thereon, and the card can be removed from the machine. The details of the recording circuit for erasing data and storing new data will be explained fully hereinafter.

In addition to posting operations, the ledger card may be utilized in other operations which are necessary to and form essential parts of commercial-account bookkeeping. The novel machine is provided with flexible controls, which enable it not only to perform posting operations as outlined above but also to perform other types of operations which involve reading and/or recording of the data on the card. These controls include a switch which may be operated by a function control knob 127 (Fig. 1), which is located on the right side of the machine, near its rear.

In the instant embodiment, the knob 127 can be set in any of four positions to set the controls to enable any of four types of operations to be performed.

In "Posting" position, the novel apparatus is arranged to be operated as above to read data from the card and enter it into the machine, receive entries under control of the amount and control keyboard, and perform a new balance operation, in which the new balance and related data are printed and also stored magnetically on the card.

The knob 127 can be set to an "Install" position to control the apparatus to perform operations in which data is set up on the amount and control keyboard and the account number keyboard and is initially recorded on a ledger card. This control would be used in originally storing the data on the cards, as when the system is installed or when new accounts are being set up.

When it is desired to transfer balances from ledger card to ledger card, as at the end of the month, the knob 127 can be set to a "Transfer" position. In this position, circuits are controlled to enable the account number and the balance to be read from the old card and stored in the machine without carrying forward the check count or the line number. The old card is fed to a position where it can be removed from the machine and a new card inserted in its place. Thereafter, in a New Balance operation, the account number and the new balance can be recorded on the new card along with zeros for the check count and with the recording for line one for controlling the automatic line-finding mechanism. The new card is thus prepared to record the data for a new accounting period and can be removed from the machine.

In the fourth position of knob 127, the "Trial Balance" position, the apparatus is controlled to read the balances and the check counts from the cards and enter this data into the machine and immediately feed the card back to starting position without any erasing or recording operation, thereby enabling totals of the balances and check counts on the various cards to be obtained without affecting the data stored on the cards.

The circuits whereby the novel apparatus may be controlled to perform the various types of operation according to the position of the knob 27 will be explained fully in the detailed description which follows.

The novel apparatus is self-contained, in that the regulated power supplies which are required to supply the voltages used in erasing and recording operations, and the voltages necessary for the operation of the tubes, are located in the lower part of the apparatus. Also mounted in the lower part of the apparatus, on suitable chassis and plug-in units, are the control relays and the tubes other than the first, or preamplifier, tubes 115, which tubes 115 are mounted in a unit with the pick-up heads 114.

DETAILED DESCRIPTION

Ledger card

The ledger card 109 (Figs. 3A and 3B), which is used to control entries into the machine, is lined on its front side to provide a plurality of columns for receiving printed records of entries and is provided on its rear side with ten strips or areas 110, of magnetizable material, which can be distinctively magnetized to represent data. As shown in Fig. 3B, each area 110 serves to provide two channels in which data can be stored, which data can be used to control the machine to enter the data therein or to provide other related controls.

Figure 3A:
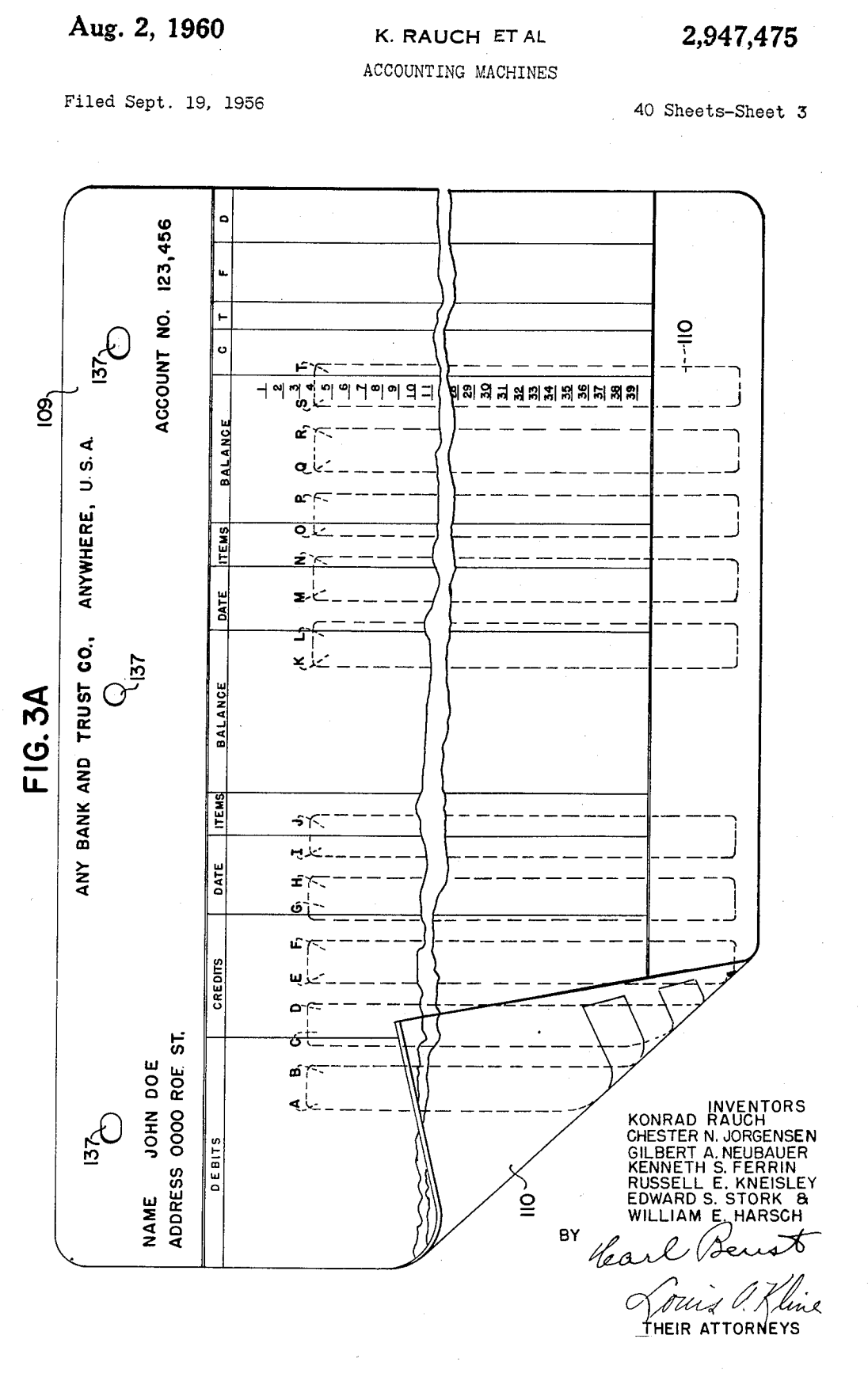

The twenty channels are designated "A" to "T" inclusive in Figs. 3A and 3B. Channels "A," "B," "C," and "D" are used to store four digits of the "Check Count." Channels "E," "F," "G," "H," "I," "J," "K," "L," "M," and "N" are used to store the ten digits of a balance amount, which is recorded as a new balance during a New Balance operation of the machine and is used to control the machine to enter the balance as an old balance in the next Old Balance pick-up operation. Channels "O" and "P" are used for storing line number signals, which are used to control line-finding mechanism in the machine, so that the data will be printed on the proper lines on the ledger card in the several operations of the machine. Channel "Q" is provided to store special "sign" signals according to whether the stored balance is positive or negative, which signals control the crossfooter totalizer in the machine according to the sign of the balance which is being picked up. Channels "R," "S," and "T" are used to store three digits of the account number of the account being recorded on the ledger card, which stored digits are used to control an account number mechanism, which compares an account number set up on an auxiliary keyboard, to identify the account in which an entry is to be made, with the account number stored on the ledger card, to insure that the proper ledger card is being used and to prevent the entry of data on the wrong ledger card.

The areas 110 have been marked off in Fig. 3B by dot-and-dash lines to indicate the division of the areas into channels and to indicate at which points in the channels the various data-representing positions occur. Because the auxiliary differential mechanisms which are controlled by the data read from the card exert their controls in different manners, the data-representing positions vary in the different channels, as will be clear from Fig. 3B. In channels "A" to "N," the "nine" data-representing position is near the top of the channels and will be sensed first in the in-sweep of the card, whereas, in channels "Q," "P," "R," "S," and "T," the "zero" data-representing position is near the top of the channels and will be sensed first. In the "Q" channel, the sign channel, the + position is near the top, opposite the "zero" position of channels "R," "S," and "T," and the − position is near the bottom of the channel, opposite the "eight" position of channels "R," "S," and "T." These locations of the + and − sign recordings in channel "Q" are such that the differential mechanism for control row 2 will be stopped in proper position to cause the balance to be properly entered as a positive or negative number, according to its sign.

The manner in which data is recorded magnetically in the channels will now be explained with reference to Fig. 3B, which shows a "2" recorded in channel "T."

Beginning at a point above the "zero" position, the channel is magnetized with one polarity continuously to the "2" position, as indicated by the sectioned area 134. At the "2" position, the polarity of the magnetization is reversed, and the channel is magnetized with the opposite polarity continuously to a point below the "9" position, as indicated by the sectioned area 135. In a similar manner, the other channels will be magnetized at their upper portions with a polarity similar to that of area 134, down to the desired data-representing positions, and will be magnetized from their data-representing positions downwardly to a point below the last data-representing position with a polarity similar to that of area 135.

In its use with the machine, the ledger card 109 is inserted into the machine, top edge first, with the print-receiving surface upward, until it engages and is arrested by the card carriage 111. In an Old Balance pick-up operation, the card 109 is first moved past the heads, so as to be read from top to bottom during the in-sweep of the card, to sense the data to be entered into the machine, and negative impulses will be generated in passing from areas magnetized according to the polarity of area 134 to areas magnetized according to the polarity of area 135. During the return movement of the card, positive impulses will be generated in the passage from the areas magnetized according to the polarity of area 135 to areas magnetized according to the polarity of area 134. The manner in which the impulses are used to control the entry of data into the machine and are used in the check-back controls will be explained fully hereinafter.

In a recording operation, in which data is recorded magnetically on the card, the card is given a full extent of movement into and out of the machine. During the in-sweep of the card past the heads 114, the heads are energized to magnetize the channels with a polarity of area 134. This will erase any previously recorded data. After the card has completed its movement into the machine, the heads will be energized to magnetize the channels with a polarity of area 135, and controls will be rendered effective to terminate the magnetizing action at the points corresponding to the data to be recorded. This will produce the pattern shown in channel "T" of Fig. 3B; that is, a magnetization of one polarity above the data-representing point, as 134, and a magnetization of the opposite polarity below the data-representing point, as 135. The circuits and controls for energizing the heads 114 to erase and store data will be explained fully hereinafter.

In order that the card may be clamped securely to the card carriage 111 and that the card may be aligned properly with the printing mechanism and with the heads 114, the carriage is provided with locating pins 497, 498, and 499 (Figs. 5, 16, 17, and 19), and the ledger card is provided with openings 137 near the top of the card, which cooperate with the pins to insure that the card will be fed into and out of the machine in proper alignment with the heads and the printing mechanism. The holes 137 not only insure that the ledger card 109 is positioned with respect to the heads 114 and the printing mechanism but also insure that the ledger card is positioned on the carriage right side up, the intermediate hole 137 being offset from the center of the card. This intermediate hole 137 acts as the main locating hole, and the two side holes 137 are elongated to allow for slight changes in the width of the ledger card due to temperature and humidity changes and to provide greater bearing area between the pins and the card.

*Keyboard*

The invention is shown embodied in a machine of the type illustrated in the Spurlino et al. United States Patent No. 2,373,510, which was issued on April 10, 1945, and the amount and control keyboard for the present machine is substantially like that shown in said patent. The keyboard is shown diagrammatically in Fig. 2.

The two left-hand banks of keys 150, marked "Date," are used for setting up the days of the month to be printed on the statement sheet. The year and the month are set up by two levers, 148 and 149, respectively, shown in Fig. 1. Since the year-setting device forms no part of the present invention, no further reference thereto will be made.

The next four rows of keys 151 (Fig. 2) are used for picking up the number of checks previously listed on the ledger card or setting up the number of checks in any given bundle. The differential mechanisms controlled by these keys are also automatically controlled to count the number of checks, when the checks are posted one at a time. The next ten rows of keys are amount keys 152, which are used for setting up amounts, such as old balances, the amount of checks and deposits, and any other desired information used in connection with the banking business, which information is represented by dollars and cents or any other numbers.

The rows of keys 153, 154, and 155 are control keys in control rows 3, 2, and 1, respectively, for controlling the various operations of the machine in the manner fully described in the above-mentioned patent.

A bracket 157 is secured at the upper left corner of the keyboard. This bracket has two upwardly-extending arms 158, each of which is provided with a stud 159. This bracket provides a means for securing the account number keyboard 112 in place on the machine.

*Amount banks and amount differentials*

The ten banks of amount keys and their associated differential mechanism are of a construction shown and described in the above-mentioned Spurlino et al. patent. Inasmuch as the amount banks are all alike, only one of said banks and the differential mechanism associated therewith will be described.

The amount differential mechanism is disclosed in Fig. 6, which is a transverse sectional view of the machine taken just to the right of one of the amount banks, showing the bank and its associated differential mechanism.

The amount keys 152 are mounted in a key bank frame 200, supported by rods 201 and 202, extending between the main side frames 131 of the machine. Depression of any one of the amount keys 152 rocks a zero stop pawl (not shown), associated with that particular denomination, counter-clockwise out of the path of a reset spider 204, in the manner well known in the art and fully described in the above-mentioned patent. The reset spider 204 is free on a hub of an amount differential actuator 205, rotatably supported on a bushing 206, extending between two similar support plates 207 (only one shown here), said plates being in turn supported by rods 208 and 209, extending between main side frames 131, only one of which is shown herein. There is a pair of supporting plates 207 for each amount differential, and a tie rod 210 extends through holes in the center of the bushings 206, to secure all of the amount differentials in a compact unit.

A notch in the forward end of the spider 204 engages a stud 211, in the forward extension of a bell crank 212, pivoted on an extension of the actuator 205. Carried by the vertical arm of the bell crank 212 is a stud 213, on which is pivoted a link 214. The link 214 is also pivoted to the upper end of a latch 215, pivotally mounted on the actuator 205. The latch 215 has a foot 216, normally held in contact with the periphery of a driving segment 217, just above a shoulder 218 thereon, by means of a spring (not shown). The driving segment 217 is rotatably supported on the hub of the actuator 205. A link 220 pivotally connects the driving segment 217 to a cam lever 221, pivoted on a stud 222, on the left-hand one of the plates 207, said lever 221 carrying rollers 223 and 224, which coact with the peripheries of cams 225 and 226, respectively, secured on a main shaft 140. Depression of any one of the amount keys 152 moves its lower end into the path of a rounded surface 227 of an extension of the forward arm of a bell crank 212.

In adding operations, the main shaft 140 and the cams 225 and 226 make one clockwise rotation, causing the lever 221 to rock the driving segment 217 first clockwise and then counter-clockwise, back to normal position. Clockwise movement of the segment 217 causes the shoulder 218 thereon, in cooperation with the foot 216 of the latch 215, to carry the latter and the amount actuator 205 clockwise in unison, until the rounded surface 227 contacts the stem of the depressed amount key 152. This rocks the bell crank 212 and, through the arm 214, the latch 215 counter-clockwise, to disengage the foot of the latch from the shoulder 218 to arrest clockwise movement of the actuator 205 and to position said actuator according to the value of the depressed amount key 152. This disengagement of the latch 215 moves a rounded extension 233 of the arm 214 into engagement with the corresponding one of a series of locating notches 234 in a plate 235, secured between the rod 208 and the upper extension of the left-hand support plate 207.

After the latch 215 is disengaged from the shoulder 218, an arcuate surface 236, on the segment 217, moves opposite the foot 216 to retain the latch disengaged in its set position.

When the lever 221 reaches the terminus of its clockwise movement, a roller 237, carried thereby, coacts with an arcuate surface 238 on a beam 239, pivoted on a stud 240, in the actuator 205, and forces a concave surface on the upper edge of said beam into contact with the hub of the actuator 205 to move the rear end of said beam into a position commensurate with the value of the depressed amount key.

The rear end of the beam 239 is bifurcated to engage a stud 241 on the link 242, the upper end of which link is pivoted to a segment 243, mounted on one of a set of nested sleeves supported by a shaft 245, journaled between the main side frames 131. The lower end of the link 242 is pivotally connected to a segment arm 246, pivoted on a shaft 247, journaled between the side frames 131. The segment arm 246 carries a stud 248, which engages a camming slot in a zero elimination cam plate 249, pivotally mounted on a stud 250 on a segmental gear 251. The segmental gear 251 is rotatably mounted on a shaft 252, journaled between the side frames 131.

The teeth of the segmental gear 251 mesh with external teeth of an external-internal ring gear 253, having internal teeth, which, in cooperation with the periphery of a disk 254, form a rotatable support for said gear 253. The disk 254 is fixed on a shaft 255, and the latter is supported by brackets 256 secured to a cross bar 133 and the main framework of the machine. The internal teeth of the ring gear 253 mesh with a pinion 258, rotatably supported in a boring in the disk 254. The pinion 258 is mounted on a square shaft 259, and the shaft 259 has mounted thereon pinions like the pinion 258, for each columnar position in which an entry is to be made.

The mode of driving the type wheels of the present column-printing mechanism is fully explained in the United States patent to Charles H. Arnold No. 2,141,332 and embodies an application of the well-known principle of driving mechanism as disclosed in the United States patent to Walter J. Kreider, No. 1,693,279.

To properly align the differential mechanism and the type wheels set thereby, there is provided on each of the segments 243 a series of notches 271, engaged by an aligner 272, secured to a shaft 273, journaled in the machine side frames.

The aligner 272 is disengaged from the notches 271 during the differential setting of the type wheels, and, after they have been set under control of the amount keys 152, in the manner just described, the aligner 272 is again moved into engagement with the notches 271 to hold the type wheels in set position during the return movement of the differential mechanism and to align the type wheels during the printing operation.

Indicators

The ring gears 253, driven from the main differentials, and other ring gears, set under control of the symbol rows of keys and the date keys, operate gears 297 in the manner set forth in said Kreider patent, to which gears 297 are secured indicators 298 (Fig. 1), so that each transaction, as it is entered into the machine, is visibly displayed to the operator.

Totalizers

The machine embodying this invention has two lines of totalizers, including an upper, or No. 1, totalizer line and a back, or No. 2, totalizer line. The No. 1 totalizer is a balance totalizer, often referred to as a "crossfooter," and comprises denominational sets of plus and minus wheels, said plus and minus wheels in each denominational order being reversely geared together, so that, when one wheel is turned one direction, the other turns in the opposite direction, and vice versa, as is well known in the art and fully described in the United States patent to Bernis M. Shipley No. 1,619,796. The totalizers on the No. 1 and the No. 2 totalizer lines are selectively engaged with the differential actuators 205 during counter-clockwise movement of the actuators in adding and subtracting operations and during the clockwise movement of the actuators in the second cycle of total and sub-total operations, as fully described in the Bernis M. Shipley Patent No. 1,619,796. The related differential mechanism is controlled during total-taking operations by the totalizer wheel when the wheel is turned to zero. In this position, a stop is moved into a notch 303 in the reset spider 204, to arrest the spider in a position commensurate with the value of the totalizer wheel which is being reset to zero. The reset spider 204, when thus arrested, is effective, through the notch engaging the stud 211, to disengage the latch 215 from the driving segment in the manner well known in the art and fully described in said Shipley patent.

Secured to each segment 243 is an arm 304 (Fig. 6), to which is connected a link 305, the other end of which is connected to the check-back and recording control plate 123 for controlling the operation of certain switches in check-back and recording operations in a manner described hereinafter. The control plate 123 is provided with aligning teeth 307, engaged by an aligner 308, secured to a shaft 309, to align the control plate 123 in set position after it is set under control of the differential mechanism. The shaft 309 is rocked at the proper time by means described hereinafter.

The control plate 123 is formed with a smaller diameter, as at 310, and a larger diameter, as at 311, which are interconnected by a rise. As the control plate 123 is set to different positions by the differential mechanism, the rise will be set to different positions to provide the required controls in check-back and recording operations. In order that the point of rise between the smaller diameter and the larger diameter can be accurately set, an auxiliary plate 312, having the smaller diameter, the larger diameter, and a similar rise, is mounted adjacent the control plate 123 for limited movement relative thereto and secured in adjusted position relative to the plate 123 by a clamping unit 313. Accordingly, each individual control plate can have its rise accurately adjusted in order that its control over the groups of contacts, as 124, can be precisely timed with relation to the movement of the ledger card past the head 114.

Transaction differential

The bank of keys 154 (Fig. 9) of control row 2 control the machine for various types of operations in the manner described in the above-mentioned Spurlino et al. patent, No. 2,373,510. The differential mechanism for this row includes a mechanism for shifting the crossfooter to select the adding or subtracting totalizer wheels for entering positive or negative amounts therein, or for reading positive or negative balances therefrom, as is well known in the art and fully described in said Spurlino et al. patent, No. 2,373,510.

As above described, the channel "Q" on the ledger card (Fig. 3) controls the selection of the proper side of the crossfooter, or add and subtract totalizer. The manner in which the channel "Q" controls this selection will be fully described hereinafter. However, inasmuch as this control of the totalizer is effected through the differential mechanism associated with the bank of keys 154, a brief description of this differential mechanism will be given.

The keys 154 (Fig. 9) are slidably mounted in a key frame 326, mounted on the beforementioned rods 201 and 202. Depression of any one of the keys 154 projects its lower end into the path of movement of the means associated with a differential latch 327, to disengage the latch in a position corresponding to the value of the key depressed.

The main shaft 140 carries a pair of cams 330, which coact with rollers carried by a Y-shaped lever 331, pivoted on a stud 332, mounted on the left-hand one of a pair of plates 333 (only one of which is shown), supported by the rods 208 and 209. The lever 331 is connected by a link 334 to a driving segment 335, carried on a sleeve mounted on the beforementioned tie rod 210. The forward end of an arm 328, mounted on the tie rod 210, has a slot 336, through which projects a stud 337 in the forward extension of a bell crank 338, pivoted on a differentially-adjustable arm 339, freely mounted to rotate on the rod 210. Pivotally mounted on the vertical arm of the bell crank 338 is an arm 340, which is also pivoted to the upper end of the latch 327, pivotally mounted on the differentially-adjustable arm 339. The latch 327 has a foot 342, normally held in contact with the periphery of the driving segment 335, just above a shoulder 343 thereon, by means of a spring (not shown).

In adding operations, the main shaft 140 and the cams 330 make one rotation, causing the lever 331 to rock the driving segment 335 first clockwise and then counter-clockwise (Fig. 9) back to normal position.

Clockwise movement of the segment 335 causes the shoulder 343 thereon, cooperating with the foot 342 of the latch 327, to carry the latter, together with the arms 339 and 328, clockwise in unison until a rounded surface on the bell crank 338 strikes the lower end of the depressed transaction key. This rocks the bell crank 338 and, through the arm 340, the latch 327 counter-clockwise to disengage the foot 342 from the shoulder 343 to arrest the clockwise movement of the arms 328 and 339 in positions corresponding to the depressed transaction key. This engagement of the latch 327 with the depressed key moves a rounded extension 346 of the arm 340 into engagement with the corresponding one of a series of locating notches 347 in a plate 299, secured between the rod 268 and an upward extension of the plate 333. This serves to maintain the differentially-adjustable arm 339 in its adjusted position.

After the foot 342 of the latch 327 is disengaged from the shoulder 343, an arcuate surface 348 on the driving segment 335 moves opposite the foot 342 to maintain the latch 327 in its set position.

When the lever 331 reaches the terminus of its clockwise movement, a roller 349, carried thereby, coacts with an arcuate surface formed on the under side of the usual minimum movement beam 350, pivoted at one end to the differentially-adjustable arm 339 and bifurcated at its other end to engage a stud 351 on a link 352 to force said beam upwardly to position the link 352 commensurate with the position of the transaction key depressed. The upper end of the link 352 is pivoted to a segment 353, secured to one tube of a nest of tubes on the shaft 245. The lower end of the link 352 is pivotally connected to a segment arm 354, free on the shaft 247. The segment arm 354 is connected by a link 355 to a segment 356, which meshes with a ring gear 357, rotatably mounted on a disk, which in turn is supported by the shaft 255. The ring gear 357 is connected to type wheels to set up data in the printing mechanism commensurate with the data of the key depressed, in the manner well known in the art.

The segment 353 is connected to a means for positioning shifting cams for shifting the totalizer lines axially, to position either the positive wheels or the negative wheels in alignment with the amount actuators 205, in the manner well known in the art, and as fully described in the above-mentioned Spurlino patent.

Also connected to the segment 353 is an arm, like the arm 304, in the amount transaction bank, connected by a link 305 to a check-back and recording control plate 123, for use in check-back and recording operations in the manner described hereinafter.

The differential mechanism for control row 3 operates through a segment, similar to 356 for row 2, to differentially position a cam 359 (Fig. 67), which has a projection 360 that cooperates with contacts L15a1 mounted on a bracket 361 on the cross bar 133, to close these contacts when the differential mechanism has been operated in row 3 with the Eject key depressed.

As is well known in the art and shown in the Spurlino et al. Patent No. 2,373,510, the shaft 247 is connected to the total plate of row 1 and is set to different positions depending upon the key 155 which was depressed in row 1. The shaft 247 (Fig. 65) is connected by segment gears 262 and 263 to a shaft 264, journaled in the right side frame and an auxiliary side frame 265. The shaft 264 (Figs. 65 and 66) has, secured to its right end, an arm 266, which carries a pair of contact-closing blocks 267 of non-conducting material, which cooperate with pairs of contacts L6a1 and L6a2 and L8a1 and L8a2, which are supported on the auxiliary side frame 265 in such positions that contacts L6a1 and L6a2 will be closed when the differential mechanism for row 1 is operated with the New Balance key depressed and contacts L8a1 and L8a2 will be closed when the differential mechanism for row 1 is operated with the New Balance Non-Transfer key depressed.

The control exerted by contacts L6a1, L6a2, L8a1, L8a2, and L15a1 will be explained fully when the control circuits are described.

*Auxiliary differential mechanisms*

As above mentioned, the amount and control bank mechanisms are controlled to be differentially set under control of data recorded magnetically on the channels "A" to "N" and "Q" inclusive, on the back of the ledger card. This control is effected by means of the auxiliary differential mechanism 121 for each of these channels on the card, which auxiliary differential mechanisms are differentially settable under control of the data recorded in these channels on the ledger card, as the ledger card is being fed into the machine in a balance pick-up operation, and temporarily store the data until it is entered into the machine. The electrical controls which are operable to control the setting of the auxiliary differential mechanisms under control of data on the card will be explained when the data-reading circuits are described hereinafter.

The auxiliary differential mechanisms are operable to differentially position stop members which cooperate with the usual reset spiders 204 of the amount differential mechanisms and with the arm 328 of the differential mechanism for control row 2, to control the setting of these differential mechanisms.

The stopping means for arresting each reset spider 204 (Figs. 5, 6, 7, and 9) comprises the differentially-settable stop member 122, pivoted on a differentially-positionable bell crank 366. The stop member 122 is also supported near its center by an arm 367, pivoted on a shaft 368. The bell crank 366 is mounted on a shaft 369, supported in the framework of the machine. The lower arm of the bell crank 366 supports a differential latch 370, having a stud 371, projecting into a cam slot 372, formed in a segment 373, also pivoted on the shaft 369. A spring 374, stretched between a stud on the segment 373 and the bell crank 366, normally maintains the stud 371 in the left-hand end of the cam slot 372.

Secured to the shaft 369 for each differential mechanism is a driving member 375, having a cam edge 376, against which the stud 371 on the latch 370 is normally engaged by the action of the spring 374. The shaft 369 is rocked first counter-clockwise (Figs. 5, 6, and 7) and then clockwise back to its normal position during certain operations of the machine. During the counter-clockwise movement of the shaft 369, the driving member 375, engaging the stud 371, carries the latch 370 and the bell crank 366 therewith, to thrust the stop member 122 leftwardly (Figs. 5, 6, and 7).

As explained earlier, during the time the ledger card is fed into the machine in a balance pick-up operation, the data represented by the respective channels on the ledger card controls the operation of solenoids 119 in such a manner that the solenoid is deenergized. The solenoid 119, as will become apparent in the consideration of the electrical controls, is normally energized and therefore normally holds a spring-urged pawl 120 in its downward position. The pawl 120, which is urged counter-clockwise (Fig. 6) by a spring 394, is pivoted on a stud 379, carried by the framework of the machine, and lies in the plane of notches 380 of the segment 373. A downward extension 362 of insulating material on the hook cooperates with related contacts L13b1 to 20 in the circuit to relay R9 to maintain the contacts open until the pawl is released by the deenergization of the solenoid.

When, during the operation of the machine, the solenoid 119 is deenergized to release the pawl 120, said pawl, which is biased to move counter-clockwise (Fig. 6), is released to engage the notch 380, which is in the path of the pawl 120 at the particular moment the solenoid is deenergized.

The operation of the segment 373 is synchronized with the movement of the ledger card into the machine, so that, when a control point representing a digit of a certain value reaches the head 114, the solenoid is deenergized as a result of a signal from the card at the moment the notch 380 of the commensurate value is in the path of the pawl 120. When the pawl 120 engages a notch 380, the segment 373 is stopped. However, the bell crank 366 is driven a short distance thereafter by the driving member 375, and during this movement the stud 371, riding in the cam slot 372, causes the latch 370 to be rocked clockwise on the bell crank 366, to disengage the stud 371 from the cam edge 376, thus permitting the driving member 375 to move its full excursion after the segment 373 has been arrested by the pawl 120. The clockwise rocking of the latch 370 causes the stud 371 to engage in one of the locking notches 363 in a locking plate 364.

Disengagement of the latch stud 371 from the driving member 375 causes the bell crank 366 and the stop arm 122 to be arrested in a position commensurate with the value of the digit picked up from the ledger card and positions an end 383 into the path of a stud 381, on the reset spider 204. Therefore, when the stud 381 is moved upon the rocking of the reset spider 204, the stud, engaging the end 383 of the stop arm 122, arrests the spider 204 in a position commensurate with the value picked up from the card. The arresting of the reset spider 204, through the stud 211, disengages the latch 215 from the driving segment 217 of the amount differential, thus setting the amount differential into a position commensurate with the value read off the card.

The amount differential thereby sets the printing and indicating mechanism in the manner well known in the art, through the beam 239, the link 242, the segment 243, and the segment arm 246.

A similar stop arm 122 (Fig. 9) is provided in the control differential. As heretofore described, the control differential automatically sets the totalizer-shifting mechanism to select the positive or the negative side of the add-subtract totalizer. When a "—" signal is read from channel "Q" of the ledger card, the auxiliary differential mechanism, including the bell crank 366, positions the end 383 of the stop arm 122 into the path of a stud 381 on the side of the arm 328, so that this arm will be arrested in a position corresponding to the position in which it would be arrested if the Overdraft Pick-Up key 154 of row 2 were operated, thereby causing the selection of the minus side of the totalizer to receive the entry. When the arm 328 is arrested, the latch 327 is withdrawn from the driving segment 335 by engagement of the slot 336 with the stud 337 on the latch 327, in the manner well known in the art. This positions the differentially-settable arm 339 and the beam 350, the link 352, and the segment 353 into a position for shifting the totalizer line into the proper minus position.

When the "+" sign is read in channel "Q," the stop arm 122 will cooperate with the stud 381 on the arm 328 to arrest the differential mechanism for row 2 in the same position in which it would be arrested if the Balance Pick-Up key 154 of row 2 had been operated, thereby selecting the plus side of the totalizer to receive the entry.

The bell crank 366 and the stop arm 122 are restored to their normal positions, after the proper entries have been made, by a stud 385 on the driving member 375. During the return stroke of the driving member 375, the stud 385 engages a surface 386a on the latch 370, thus carrying the latch and the bell crank 366 back to home positions. Near the beginning of the return stroke, the stud 371 is moved into its left-hand, or normal, position within the slot 372, which removes the stud 371 from the notch 363 and into the path of the cam edge 376.

The shaft 369 is rocked by a cam 386 (Fig. 16), secured to a cam shaft 387, which shaft receives one complete rotation for each operation of an auxiliary cam shaft 428. Coacting with the cam 386 are two rollers 388, on a vertically-movable rack 389, slotted to slide on rods 390 and 391. The rack 389 is provided near its upper end with teeth 392, engaging a segment 393, secured to the shaft 369.

Rotation of the cam 386 raises, through the rollers 388, the rack 389 to rock the segment 393 and the shaft 369 first counter-clockwise (Fig. 16) and then clockwise.

The shaft 369 (Fig. 8) has secured thereto a plurality of arms 395 (only one of which is shown), which are connected to a switch-supporting bracket 397 by links 396. The switch-supporting bracket 397 extends across the several plates 123, 591, 591b, 669, and 1530 and is rotatably mounted on the shaft 398, on which shaft the beforementioned check-back and recording control plates 123 are also mounted. The bracket 397 supports a plurality of groups of switches 124, which cooperate with the check-back and recording control plates 123, 591, 591b, 669, and 1530 to provide a means for comparing the setting of the differential mechanisms with the data recorded on the card in a check-back operation to check back the entry for accuracy. The plurality of switches control certain electrical circuits for arresting operation of the machine when the amount set up in the plates by the differential mechanism does not agree with the amount recorded on the ledger card. The switches 124 on the bracket 397 are also used in New Balance operations to control the recording of the balance and other related data on the ledger card. The electrical controls and the function of the switches 124 on the bracket 397 will be described hereinafter in the consideration of the various circuits which they control.

*Auxiliary motor-driving connections*

The main shaft 140, for actuating the amount and transaction differential mechanisms, is operated by the usual electric motor in the manner shown and described in the above-mentioned Spurlino et al. patent. The cam shaft 387 and the auxiliary cam shaft 428 are rotated by an auxiliary motor and are operated in a balance pick-up operation before the main shaft 140 is released for operation.

Suspended from a bracket 399 (Fig. 10), carried on the base of the machine, is an auxiliary motor 400, having a pulley 401. The pulley 401 drives a pulley 402 through a belt drive 403. The pulley 402 is secured to a short shaft 404, on which a pinion 405 is also secured. The pinion 405 meshes with a gear 406, secured to a shaft 407. Also secured on the shaft 407 is a pinion 408, meshing with the gear 409, on a clutch shaft 410 (Fig. 13).

The motor 400 is a continuously-running motor, and the gear 409 rotates as long as the motor 400 is rotating. A clutch, similar to the clutch shown in Fig. 123 of the United States patent to Raymond A. Christian et al. No. 2,626,749, is provided for clutching the shaft 428 to the motor drive mechanism. The means for connecting the gear 409 with the shaft 428 comprises a disk 415 (Fig. 13), having a hub 416, which is pinned to the clutch shaft 410. Loosely mounted on the hub 416 is a clutch control arm 417, which is urged counter-clockwise (Fig. 13) on the hub 416 by means of a spring 418, connected between the disk 415 and the arm 417. The arm 417 is normally prevented from rotating counter-clockwise (Fig. 13) under influence of the spring 418 by a tripping arm 419, the end of which engages an extension 421 of the arm 417. The tripping arm 419 is secured to a short shaft 420, which may be rotated to release the arm 417 to the action of the spring 418 under control of several means, described later.

The arm 417 is provided with teeth 422, which mesh with corresponding teeth formed on a clutch dog 423, journaled on the disk 415 near its periphery. The clutch dog 423 projects into the path of a series of notches 424 of a notched wheel 425, secured to the gear 409. The clutch dog 423 is so formed that it will clear the notches 424 when the parts are in the position shown in Fig. 13. However, when the tripping arm 419 is moved from the path of movement of the extension 421, the arm 417 is rotated under influence of the spring 418, and the clutch dog is rotated so as to cause it to engage one of the notches 424 of the constantly-rotating notched wheel 425, thereby causing the disk 415 to be rotated.

For further details of the construction and operation of the clutch mechanism, reference may be had to the Christian et al. patent above referred to.

Secured to the disk 415, so as to be rotated thereby, is a pinion 426 (Fig. 10), which meshes with a gear 427 on the auxiliary cam shaft 428, carried in the framework of the machine. Also secured to the auxiliary cam shaft 428 is a pinion 429 (Fig. 16), meshing with a pinion 430, secured to the beforementioned shaft 387.

Thus it is clear that, when the arm 419 is rocked in the manner described hereinafter, to release the clutch control arm 417, the constantly-rotating gear 409 is clutched to the pinion 426 and, through the gears 427, 429, and 430, will rotate the shafts 387 and 428.

Near the end of the cycle of operation of the clutch, the clutch arm 417 is again moved into its normal position, where it comes into the path of the extension 421. As the extension 421 comes into engagement with the end of the arm 419 and is arrested, the clutch dog 423 is withdrawn from engagement with the notches 424, thus arresting further rotation of the shafts 387 and 428.

The ratio between the gears 426, 427, 429, and 430 is such that the shafts 387 and 428 will operate through 180 degrees each time the clutch is tripped. Under these conditions, the clutch must be tripped twice to cause a complete rotation of the shafts 387 and 428. The first tripping of the clutch will cause the shaft 369 to be given its counter-clockwise movement (Figs. 5 to 8), during which time the auxiliary differential mechanism will be set in balance pick-up operations. The second tripping of the clutch will cause the shaft 369 to be returned clockwise, during which time the auxiliary differential mechanisms will be restored to their home positions.

*Motor clutch release control*

The Balance Pick-Up motor bar 113 is provided for initiating an automatic balance pick-up operation, in which the old balance and related data are automatically picked up from the ledger card. The motor bar closes contacts K2a1 and K2a2 in controlling circuits which will cause a Pick-Up Control solenoid S6 (Figs. 10 and 106A) to be energized. The circuit for energizing the solenoid S6 upon operation of the motor bar 113 will be explained fully when the circuit diagram for the control circuits, Figs. 106, 106A, and 106B, is described.

The Pick-Up Control solenoid S6 has its armature 441 connected to a link 442, having a slot 443 engaging a stud 444 on a bell crank 445, mounted on a stud 446. A spring 447 urges the bell crank 445 counter-clockwise (Fig. 10) to normally pull the link 442 rightwardly. The upper end of the bell crank 445 is connected to a bell crank 448 by a link 449, slotted to engage a stud 450 on the bell crank 448. The bell crank 448 is pivotally mounted on a stud 451 and is spring-urged counter-clockwise (Fig. 12) by a spring 452. The spring 452 normally maintains a stud 453, on the bell crank 448, in engagement with a notch of an arm 454, secured to a shaft 455. The arm 454 is urged into engagement with the stud 453 by a spring 456, connected to a stud 457, near its upper end.

Operation of the motor bar 113 causes the solenoid S6 to be energized, which moves the link 442 leftwardly (Fig. 10) to rock the bell crank 445 and shift the link 449 rightwardly, which movement, through the stud 450, rocks the bell crank 448 clockwise to withdraw the stud 453 from engagement with the notch on the lower end of the arm 454. Withdrawal of the stud 453 from the notch in the arm 454 permits the spring 456 to rock the arm 454 clockwise (Fig. 12). Also secured to the shaft 455 are three similar switch-operating members, as 458, only one of which is shown in Figs. 10 and 14.

As shown in Fig. 14, each switch-operating member 458 will be effective, when the shaft 455 is rocked clockwise, to shift a pair of contacts to open normally-closed contacts and close normally-open contacts as required. The contacts operated by the members are L19a1, L19a2, L19a5, and L19a6, which are closed, and L19b3 and L19b4, which are opened when the shaft 455 is released and rocks.

Contacts L19a2 are included in one of the energizing circuits for a clutch trip solenoid S3 (Figs. 10 and 106A), which can be energized when these contacts are closed and will bring about the connection of the auxiliary driving mechanism to the auxiliary motor 400. The energization of the solenoid S3 operates its armature 462 to pull counter-clockwise a link 463 (Figs. 10 and 13), connected thereto, and a two-armed member 464. The arm 464 is secured to the beforementioned shaft 420, on which the clutch tripping arm 419 is also secured. Therefore, counter-clockwise rotation of the shaft 420, upon the energization of the solenoid S3, withdraws the clutch tripping arm 419 from engagement with the extension 421 on the clutch control arm 417, thus connecting the auxiliary motor 400 to the auxiliary cam shaft 428 for operation thereby.

Also secured to the shaft 420 (Fig. 11) is a switch-operating disk 465, which actuates a pair of contacts S3a1 and S3b2 for a purpose to be described later.

After 15 degrees of rotation of the auxiliary cam shaft 428, cam contacts C23a open the energizing circuit for the solenoid S3 to allow the drive for the auxiliary cam shaft 428 to be interrupted when the shaft has made its initial 180 degrees of movement.

Connected to the stud 457 (Fig. 10) is a pitman 470, having a roller 471, coacting with a cam 472 on the auxiliary cam shaft 428. The cam 472 is connected to the gear 427, and therefore the cam 472 is given one complete rotation during each two operations of the auxiliary driving mechanism. When the arm 454 is rocked clockwise to initiate a balance pick-up operation, the pitman 470 is moved rightwardly to position the stud 471 against the small diameter of the cam 472. During the second operation of the auxiliary cam shaft 428 and near the very end of the cycle of operation of the cam 472, a lobe 473 on the cam 472 engages the roller 471 and thrusts the pitman 470 back to its home position, thus rocking the arm 454 (see also Fig. 12) back to its home position and permitting the spring 452 to again raise the bell crank 448 and the stud 453 thereon into the notch of the arm 454, thus maintaining the parts in their home position.

As the arm 454 is restored to its home position, the shaft 455 is also restored to its home position, returning the contacts L19a1, L19a2, L19a5, and L19a6 to their open condition and the contacts L19b3 and L19b4 to their closed condition.

*Ledger card carriage operating mechanism*

The ledger card carriage 111 (Figs. 5, 16, 17, 18, and 19) is operated in a plurality of different operations. One of the operations involves the shuttling of the carriage into the machine in an automatic balance pick-up operation initiated by the operation of the motor bar 113. During this operation, the magnetized channels are passed over the heads 114 and generate signals at different times according to the data being sensed, which signals cause the solenoids 119 to be deenergized to effect their controls, as previously explained. As a result of linefinding signals derived from the card, controls are set to determine the next line on the ledger card on which data is to be printed.

If data has been read from all channels and all the pawls 120 have been operated, and if the account number which was read agreed with the account number set on the keyboard 112, then the carriage remains in its innermost position while the accounting machine is operated and the data which was read is entered therein, after which the carriage is returned to its starting position, and, during this movement of the carriage, the data is read and compared with the data actually set up in the machine in a check-back operation.

If the data has been correctly picked up and entered into the machine, then, in the first operation of the machine to enter a check or a deposit under keyboard control, the carriage will be automatically fed into the machine and set by the line-finding controls to the line read from the card. In subsequent entering operations, the carriage will be line-spaced in the usual manner and will be returned to starting position in a New Balance operation after the data has been printed thereon.

As soon as the carriage is returned to its starting position after the printing of the new balance data thereon, it is immediately operated in a data-recording operation, in which it is moved its full extent into the machine and is immediately returned to its starting position. During the movement of the carriage into the machine at this time, the heads 114 are energized to erase previously-stored data, and during the return movement of the carriage the heads 114 are energized to record the new balance and related data magnetically in the various channels on the card.

The operation of the carriage in which the card is moved into the machine in a balance pick-up operation to cause the control of the solenoids 119 according to the old balance and related data will be described first.

The cabinet of the machine is provided with a horizontal shelf 500 (Figs. 1, 98, and 101), on which is formed a chute for receiving the ledger card 109. The chute comprises two side pieces 501, held in position on the shelf 500 by angle irons 502, which side pieces extend into a throat in a head-supporting unit 503, through which throat the ledger card is guided past the heads. A guide block 504, secured to the shelf 500, provides a guide for positioning the top edge of the ledger card within the chute.

In the normal sequennce of operations, a gripper release solenoid S1 (Fig. 17) will be energized whenever it is necessary to insert a ledger card into or remove a ledger card from the machine. The circuits for controlling the energization and deenergization of the solenoid S1 at different times in the normal sequence of operations will be explained when the control circuits are described.

When the solenoid S1 is energized, its armature 507 is operated to lower a link 508, pivoted thereon. The link 508 is connected to an arm 509, secured to a shaft 510, to which is also secured an arm 511. The free end of the arm 511 is provided with an adjustable button 512, which, when the carriage is in home position, engages an offset section 513 (Figs. 17 and 19) of a pivoted arm 514. The arm 514 is pivoted on a rod 515 and is urged clockwise in Fig. 17 by a spring 516 to normally occupy the position shown therein. The spring-actuated member 514 is provided with two flanges 517, through which the rod 515 projects. The rod 515 is carried by a guide block 518, mounted on a carriage table 519. The carriage table 519 is provided with an opening 520, through which the arm 514 can move.

Near the left-hand side of the carriage table 519 there is provided a second guide block 521, similar to the guide block 518. The block 521 supports a rod 522, carrying a second spring-actuated arm 523, like the arm 514 except that the arm 523 does not have the offset section 513. A spring 524 maintains the member 523 in its normal position, shown.

Near the center of the table 519, but slightly offset to the right, is a third guide block, 525 (see also Fig. 16), supporting a rod 526. Pivoted on the rod 526 is an arm 527, similar to the arms 514 and 523, except that it does not have a rearwardly-extending arm and is not provided with a spring for activating it. The three arms, 514, 523, and 527, are connected by a cross-bar to form a unitary pivoted member. Secured to the cross bar is a bar 528, which extends into a recess 529 in the table 519 and carries three studs, 497, 498, and 499. The central stud, 498, is round and extends through a round opening in the block 525, and the outer studs, 497 and 499, are oval in shape and project through oval-shaped openings 530 in the guide blocks 518 and 521. The ends of the studs 497, 498 and 499 are tapered, so as to guide the ledger card into proper position should it be slightly out of line when inserted into the machine.

The front edge of each guide block 518, 521, and 525 is tapered inwardly to provide a guide for guiding the ledger card 109 beneath the respective blocks, so that, when the ledger card 109 is inserted through the chute, the leading end of the ledger card is guided into the space beneath the guide blocks to properly position the holes 137 of the ledger card in a position wherein the studs 497, 498, and 499 can enter the holes in the ledger card upon the deenergization of the solenoid S1. When the solenoid is deenergized, a spring 535 restores the armature of the solenoid S1 to its original position, thus lowering the arm 511 and permitting the springs 516 and 524 to restore the arms 514, 523, and 527 into their normal position, wherein the studs 497, 498, and 499 enter the holes 137 of the ledger card to properly locate the ledger card relative to the card table 579 and clamp the card to the card carriage 111 for movement therewith.

Secured to the shaft 510 is a contact-operating lever 536 (Fig. 16), having a stud 532 to actuate contacts L9b1 and having a forwardly-extending arm 537, which is engaged by the arm 527 to rock the lever 536 when the arm 527 is lowered by the energization of the solenoid S1. These contacts, as will be described hereinafter, are in a control circuit for the auxiliary clutch solenoid S3, so that the clutch cannot operate until the lever 536 is again restored to its normal position, thus causing the contacts L9b1 to be restored to their closed position.

If for any reason the card is inserted into the machine with the openings 137 therein out of position to receive the studs 497, 498, and 499, the studs cannot pass through the openings, and the arm 527 cannot be restored to its clamping position so that the switch L9b1 will be held open. It will be noted that the center hole 137 and the stud 498 are not located in a position central between the outer holes 137 and the studs 497 and 499; therefore, if a ledger card should be placed in the chute in upside-down position, the center hole 137 will not be aligned with the stud 498, and the switch-operating arm 536 cannot be restored to its home position upon release of the solenoid S1. Under these conditions, as will be apparent when the circuits are considered, the machine cannot be released for operating the ledger card carriage. This will insure that the magnetic control channels will be in proper position in relation to the pick-up heads, to be fully described hereinafter.

If it is desired to release the card when the carriage is in home position at other than normal times in the sequence, a push button 505 (Fig. 1) may be operated to close contacts K5a1 (Fig. 106A) in a direct energizing circuit for the solenoid S1, which by-passes the normal control contacts. Energization of the solenoid S1 under control of the push button 505 will withdraw the studs 514, 527, and 523 from the holes 137 in the card, as explained above, and will maintain the studs in withdrawn position so long as the push button 505 is depressed.

The carriage table 519 (Fig. 19) also has secured thereto a pair of laterally-spaced guide members 531, to provide abutments so spaced on the carriage as to cooperate with corresponding guides secured to the frame of the machine to prevent upward movement of the carriage during its movement into the machine and back to home position.

The ledger card carriage table 519 is secured to a rack 540 (Figs. 16, 18, and 19), supported in a bar 541, suitably notched and formed to receive the rack 540. Also supported on the bar 541 is an inverted U-shaped guide member 542, which maintains the rack 540 in engagement with a driving gear 543. The member 541 is supported on a frame 544, supported on the base of the machine.

The guide member 542 is notched, as at 545, to receive a bumper 546, secured to the rack 540, which bumper arrests the carriage in its home position.

The gear 543 is secured to a shaft 547 (see also Fig. 25), supported in the frames of the machine. The gear 543 meshes with a segment 548 (Fig. 16), mounted on a shaft 549. A triangularly-shaped arm 550 is secured to the shaft 549 and is engaged by a pair of set screws 551, carried by the segment 548. The set screws 551 are provided to adjust the clearance between the roll 727 and the block 726 when the carriage is in home position and the bumper 546 is seated in the U-shaped guide member 542.

The shaft 549, on which the triangularly-shaped member 550 is secured, also has secured thereto a segment 553, movable to mesh with teeth 554 on the beforementioned rack 389. The segment 553 is normally not in mesh with the teeth 554, but, when the rack begins to move, a block 726 thereon engages a roller 727 on the segment to rotate the segment far enough to mesh the teeth on the segment 553 with the teeth 554. The purpose of this correction will be understood when the linefinding mechanism, described hereinafter, is considered.

When the cam 386 raises the rack 389, the teeth 554 thereon, coacting with the teeth on the segment 553, rotate the segment 553 and the segment 548, which drives the gear 543 to move the rack 540 and shift the ledger card carriage 111 inwardly to provide the in-sweep of the card past the heads 114.

When, during the proper time in the machine cycle, the rack 389 is restored to its home position by the cam 386, the teeth 554 thereon, coacting with the teeth on the segment 553, rotate the segment 553 and the segment 548, which drives the gear 543 to move the rack 540 and shift the carriage 111 outwardly to provide the out-sweep of the card past the heads 114.

The carriage can also be returned forwardly after a new balance operation in the usual manner by a spring 555 (Figs. 16, 19, 25, and 50).

One end of the spring 555 (Figs. 19 and 50) is connected to a stud 556 on the gear 543, and the other end is connected to a stud 557 on a tensioning wheel 558, supported on the shaft 547. A pawl 559, engaging teeth on the tensioning wheel 558, maintains the spring 555 under the desired tension.

When the carriage is moved inwardly, the gear winds the spring 555, and, when the rack 389 starts home, the spring 555 returns the carriage toward its outer, or home, position.

The tension of the spring 555 can be varied by disengagement of the pawl 559 from the tensioning wheel 558 and either winding or unwinding the spring as desired. The beforementioned bumper 546 prevents shock to the carriage as the spring 555 returns the carriage to home position.

The carriage is aligned and locked in selected position during entry operations, later described, by an aligning pawl 560 (Fig. 50), loosely mounted on a shaft 561. The pawl 560, which cooperates with the gear 543, has its lower end connected to a link 562, the free end of which link is normally hooked over a stud 563 on a cam follower arm 564. The cam follower arm has a roller 565 mounted thereon, which is constantly maintained in engagement with a cam 566 on a printer cam shaft 712, described later, by a spring 567.

During the printing operation, the cam 566 rocks the arm 564 just before printing takes place, which, through the link 562, rocks the aligner 560 into engagement with the teeth of the gear 543. After the printing has taken place, the cam 566 causes the aligner to be withdrawn from engagement with the teeth of the gear 543 by a spring 568, connected to the pawl 560.

During the inward movement of the ledger card in a balance pick-up operation, the data magnetically recorded on the under side of the ledger card is read therefrom and is used to control the entry of the data into the accounting machine. While the carriage is being moved into its extreme inner position, the clutch arm 419 (Fig. 13) is moved into position to disengage the clutch for driving the shaft 428. This disengagement takes place when the shaft 428 has rotated 180 degrees (see the time chart, Fig. 20).

When the ledger card is moved into the machine, past the pick-up heads 114, the balance and other data recorded on the card are set up in the auxiliary differential mechanisms in the manner described hereinbefore.

Certain controls are provided to prevent the release of the accounting machine if conditions exist which would cause incorrect or undesirable entries to be made in the machine. One of these conditions is that, if an amount key should be depressed at the beginning of the inward movement of the carriage, incorrect results would be obtained because then the differential mechanism could possibly be controlled by the key instead of being controlled by the stop member 122, set by the auxiliary differential mechanism, as is necessary to set up the proper amounts. A second condition is that it is necessary that all the pawls 120 have operated as a result of the reading operation. If for any reason any one of the pawls 120 has not operated, data from that channel on the card has not been read, and an incorrect result will be obtained. A third condition is that it is desired that there be agreement between the account number read from the card and the account number set on the account number keyboard. If the setting of the account number auxiliary differential mechanisms which have been set according to the account number read from the card does not agree with the setting of the account number on the keyboard, then this indicates that these numbers are not in agreement and indicates either that the number is incorrectly set on the keyboard 112 or an incorrect ledger card is being used or that a "stop payment" control is being applied to the account and the accounting machine should not be released.

If any of these conditions exist, the clutch arm 419 will be withdrawn and the shaft 428 operated to return the carriage immediately to its starting position, and the accounting machine will not be released to receive the entries which were read from the card. This immediate return of the card carriage to its starting position without an intervening operation of the accounting machine produces a "short cycle" in a balance pick-up operation and serves to signal the operator of the machine that one of these three conditions existed.

If none of these conditions exist, then, at about 175 degrees in the rotation of the shaft 428, the accounting machine is automatically released for operation in a manner to be explained hereinafter. In this operation of the accounting machine, certain of the read data will be entered under control of the auxiliary differential mechanisms, which have positioned the bell cranks 366 and the stop arms 122 to control the differential mechanisms of the accounting machine.

The differential mechanism of the accounting machine will have been set at about 155 degrees of operation of the accounting machine. At about this time, the clutch arm 419 is again withdrawn, and the auxiliary cam shaft 428 is given its final 180 degrees of rotation. This operation of the shaft 428 causes the carriage to be restored to its home position and to reach home position just prior to the time the accounting machine has completed its cycle of operation. During this return movement of the carriage, the check-back controls become effective to compare the setting of the differential mechanisms with the data on the card to determine whether the data has been correctly entered into the accounting machine and to prevent further operation of the accounting machine if the entries by the differential mechanism of the accounting machine do not correspond to the data recorded on the card.

In new balance recording operations, the clutch is controlled to cause the card carriage 111 to be driven by the segment 548 and the gear 543 to its full extent into the machine and to immediately be fed outwardly to its outer or starting position to enable the old data to be erased and the new balance and related data to be recorded.

All of these controls will be described when the interlocking mechanisms and the various circuits are considered.

Line-finding mechanism

As illustrated in Fig. 3B, the channels "O" and "P" have recorded thereon data to identify the next line on which data is to be printed on the ledger card. In the ledger card illustrated in Fig. 3A, thirty-nine lines for receiving data are illustrated. The channels "O" and "P" will have the line number on which the next data is to be printed magnetically recorded thereon, so that, when the ledger card is moved into the machine to pick up the various data on the card, mechanism is set to control the table-positioning means to automatically feed the ledger card into the machine to receive an entry on the next line. The mechanism for controlling the automatic line-finding is set during a pick-up operation.

Figure 38:
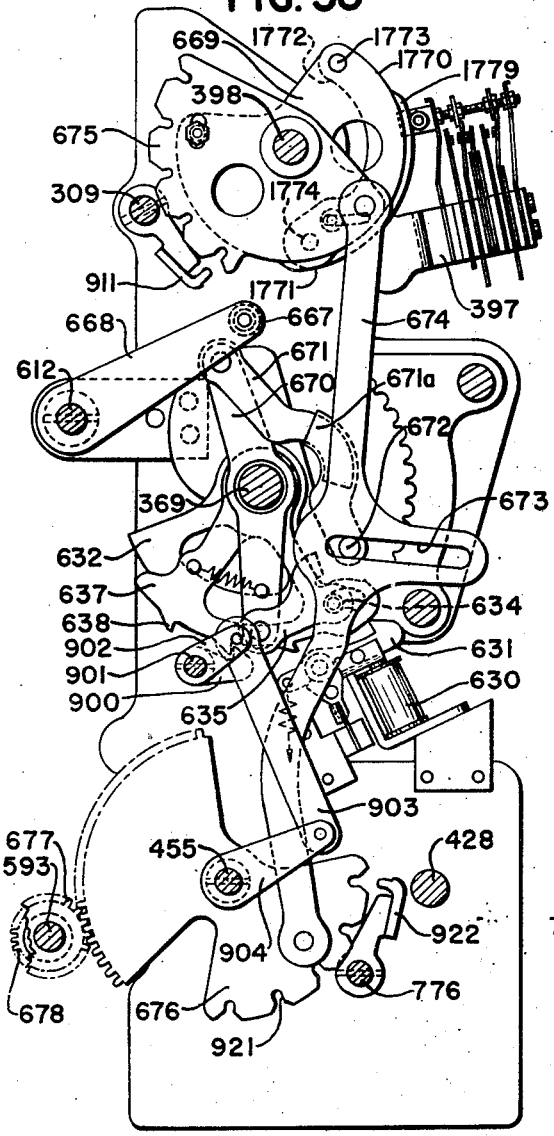
Fig. 38 is a detail view of the auxiliary differential mechanism for automatic setting of the line-finding mechanism according to the tens order digit of the line number read from the card.

Since two orders of digits are used to identify the lines, two auxiliary differential mechanisms are provided, one controlled by the data for the units order digit (Fig. 33) and one controlled by the data for the tens digit order (Fig. 38).

Associated with the auxliary differential mechanism for the units channel "O" is a solenoid 577 (Fig. 33), similar to the solenoid 119, which is normally energized to hold a spring-urged pawl 578, similar to the pawls 120, in retracted position. As the ledger card is being fed past the head 114 and the control point representing the data thereon passes the head, a circuit is controlled to deenergize the solenoid 577, whereupon the pawl 578 is actuated by its spring to move a hooked end into the path of a notch 579 on the lower edge of a segment 580, pivoted on the beforementioned shaft 369. The segment 580 is moved in synchronism with the movement of the ledger card past the pick-up device. Hence the notch 579 representing the digit of the units order of the number of the line is passing when the pawl 578 when the signal on the card causes the deenergization of the magnet 577; thus the pawl 578 moves to arrest the segment 580 in a position corresponding to the digit represented by the units order of the number of the next line on which data is to be printed on the ledger card. The segment 580 is provided with a cam slot 581 (Figs. 33 and 34), into which projects a stud 582 on a differential latch 583. A differential-driving segment 584, secured to the shaft 369, is provided with a cam edge 585, normally engaging the stud 582 on the latch 583. The latch 583 is pivotally mounted on a two-armed lever 586 (Figs. 33 and 42), to which is pivoted a beam 587. The beam 587 is provided with a stud 588, projecting into a slot 589 of a link 590. The upper end of the link 590 is pivoted to a control plate 591, rotatable on the shaft 398, and is connected by a sleeve 591a (Fig. 36) to a second control plate 591b. The plates 591 and 591b are settable as a unit and form a part of a check-back and recording control mechanism, to be described hereinafter when the electrical controls of the machine are considered.

After the two-armed member 586 is positioned under control of the pawl 578 and the differential latch 583, a cam 610 (Fig. 42), coacting with a roller 611, on a plate 613, pinned to a shaft 612, rocks the plate 613 clockwise, thus bringing a roller 614 on the plate 613 into engagement with the beam 587, and rocks the beam 587 around its pivot on the two-armed member 586. This positions the stud 588 commensurate with the position of the differential setting of the arm 586 and lowers the link 590.

Figure 33:
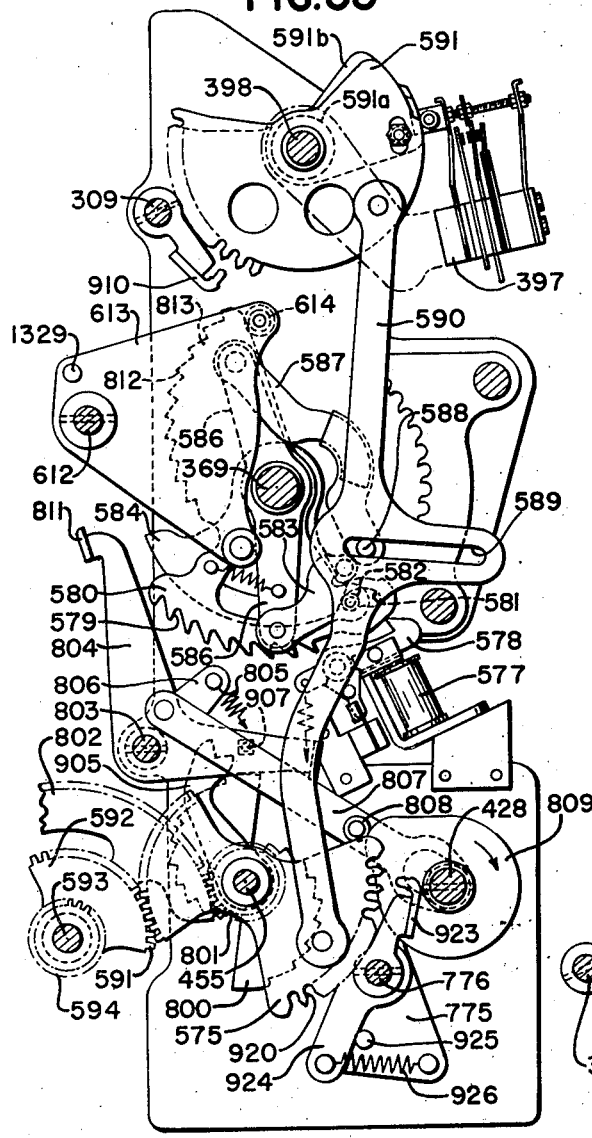
Fig. 33 is a detail view of the auxiliary differential mechanism controlled by the units order line number data read from the ledger card for controlling the positioning of the card carriage.
Figure 34:
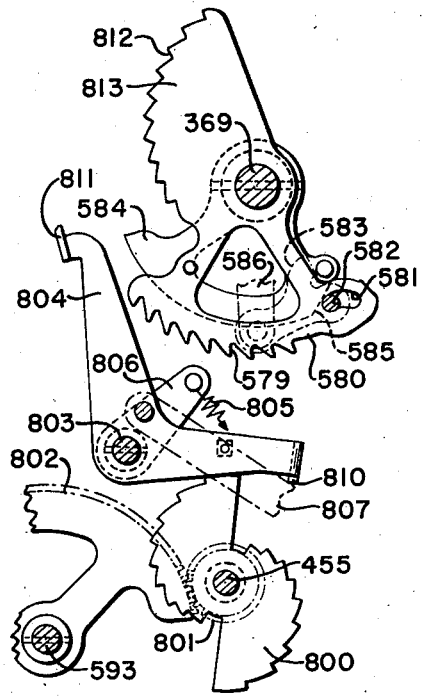
Fig. 34 is a detail view of a part of the mechanism shown in Fig. 33.
Figure 42:
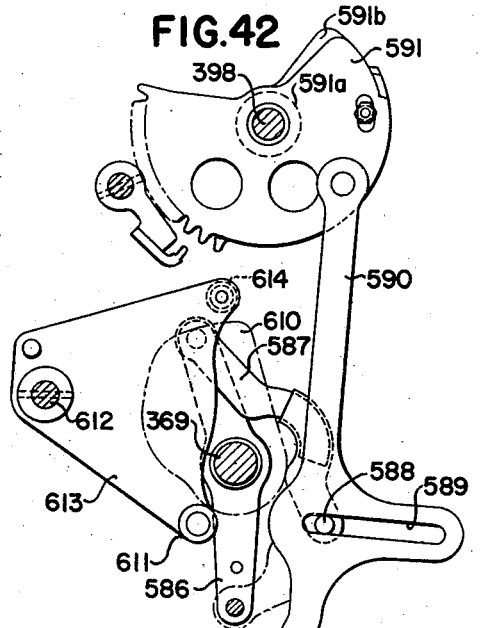
Fig. 42 is a detail view of a part of the mechanism shown in Fig. 33.

The lower end of the link 590 is pivoted to a segment 575 (see also Fig. 25), loose on the beforementioned shaft 455. The segment 575 is provided with teeth 576, meshing with the teeth 591 of a segment 592, freely mounted on a shaft 593. Hubbed to the segment 592 is a pinion 594 (Figs. 25, 33, and 42). The pinion 594 meshes with a pair of pinions 595, rotatably mounted on studs 596, carried by an arm 597, secured to the shaft 593. The lowering of the link 590 is effective through the segment 575 to drive the pinions 594 and 595 an extent commensurate with the units digit of the line number.

A solenoid 630 (Fig. 38), similar to the solenoid 119, is provided for controlling the tens digit auxiliary differential mechanism for the automatic line-finding mechanism. The solenoid 630 is normally energized to attract a spring-urged pawl 631, similar to the pawls 120, and the solenoid is deenergized as the control point on channel "P" passes the head 114, thus releasing the pawl 631 to the action of its spring.

Figure 40:
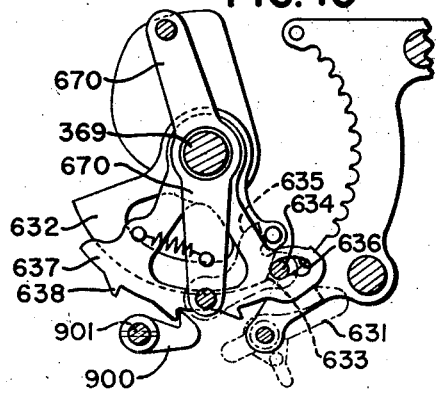
Fig. 40 is a detail view of a part of the mechanism shown in Fig. 38.

The tens digit auxiliary differential mechanism is actuated by a driver 632 (see also Fig. 40), secured to the shaft 369. The driver 632 is provided with a cam edge 633, which normally engages a stud 634 on a latch 635. The stud 634 projects through a cam slot 636 in a segment 637, having three shoulders 638 on its lower edge. The segment 637 is loosely pivoted on the shaft 369. When the shaft 369 is rocked in the manner hereinbefore described, the driver 632, by its cam edge 633 engaging the stud 634, carries the latch 635 therewith until the pawl 631 is released to engage whichever one of the shoulders 638 is in its path at the time of its release. This arrests movement of the segment 637, and further movement of the driver 632, through its cam edge 633, drives the stud 634 along the cam slot 636, thus disengaging the stud 634 from the driver 632. The latch 635 is pivoted on the lower end of a two-armed member 670, which at its upper end has pivoted thereto a beam 671. The lower end of the beam 671 is provided with a stud 672, projecting into a slot 673 on a link 674, the upper end of which is pivoted to a plate 675 on the shaft 398, which plate 675 is adjustably connected to a check-back and recording control plate 669, to be described in connection with the consideration of the data-recording circuits. The lower end of the link 674 is pivoted to a segment 676 (see also Fig. 25), freely mounted on the beforementioned shaft 455.

After the two-armed lever 670 (Fig. 38) has been positioned in accordance with the positioning of the differential latch 635, under control of the pawl 631, a roller 667 on a rock arm 668, pinned to the shaft 612, carried by brackets on the framework of the machine, is rocked to cause the roller 667 to wipe against the beam 671, which, through the stud 672 in the slot 673, lowers the link 674 and rotates the segment 676 into a position corresponding to a position in which the upper end of the two-armed member 670 has been positioned under control of the pawl 631. The segment 676 meshes with a pinion 677, loosely rotatable on the beforementioned shaft 593 and hubbed to a pinion 678. Meshing with the pinion 678 are two pinions 679, rotatable on studs 680, carried by the beforementioned arm 597, pinned to the shaft 593.

Rocking of the segment 676 rotates the pinions 677, 678, and 679 an extent commensurate with the tens amount of the line number. It is clear from Fig. 25 that the pinions 595 and 679, which are carried by the arm 597, also mesh with each other, so that, when the respective pinions 594 and 678 are driven by the segments 576 and 676 according to the units and tens digits of the line number, the drives will be additive in the proper proportions and will cause the arm 597 and the shaft 593 to be displaced a number of increments corresponding to the line number.

Also secured to the shaft 593 is an arm 681 (see also Fig. 32), supporting a pair of pinions 682, carried by studs 683 thereon. The pinions 682 mesh with a gear 684, loose on the shaft 593 and hubbed to a gear 598, meshing with a gear 599, rotatably mounted on a shaft 600. The pinions 682 also mesh with pinions 685, rotatable on studs 686 on the arm 681, which pinions 685 mesh with a gear 687, secured to the shaft 547. In the balance pick-up operation, the gear 687 will be driven counter-clockwise when the carriage is in-swept past the heads 114 and the units and tens denominational order auxiliary differential mechanisms are being set according to data read from the card, and will be returned clockwise to its initial position as the carriage is returned to starting position during the latter part of the pick-up operation.

These movements of the arm 681 and the gear 687 will be effective to drive the gear 599, but the movement given to the gear 599 by the operation of the gear 687 during the in-sweep will be cancelled out by the return movement of the gear 687 during the out-sweep of the carriage, and the final position of the gear 599 will be that as determined by the positioning of the arm 681.

Accordingly, when the segments 575 and 676 operate, through the pinions 594—595 and 678—679, to drive the arm 597, the shaft 593, and the arm 681 an extent corresponding to the line number, this movement will be transmitted to the gear 599, and at the end of the pick-up operation this gear will have been adjusted to a position corresponding to the line number which was read from the card. A stud 601, flat on one side, is mounted on the gear 599 and is positioned with respect to a driving mechanism, described hereinafter, for determining the extent of movement to be given to the carriage 111 during the first entry operation following the balance pick-up operation.

Figure 45:
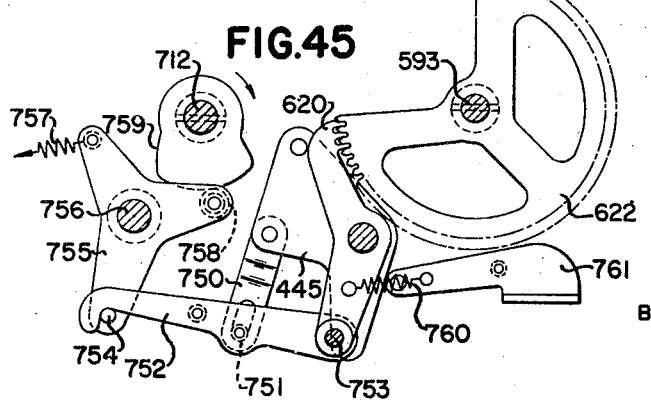
Fig. 45 is a detail view of further mechanism for controlling the positioning of the card carriage.
Figure 77:
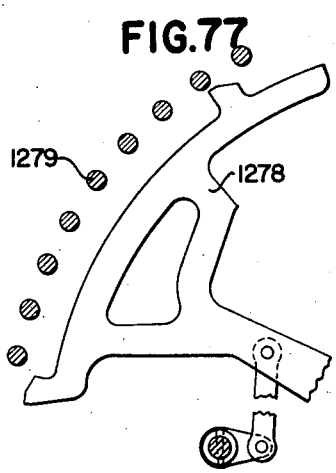
Fig. 77 shows a control member in row 3 of the control keys for disabling the check count mechanism when certain keys of row 3 are depressed.
Figure 78:
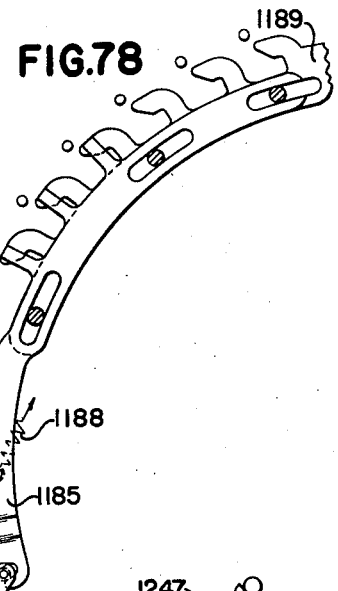
Fig. 78 shows the locking detent in row 1 of the control keys which is operated by the member shown in Fig. 74, and also shows the detent for locking keys of row 1 in depressed or undepressed positions during a machine operation.
Figure 79:
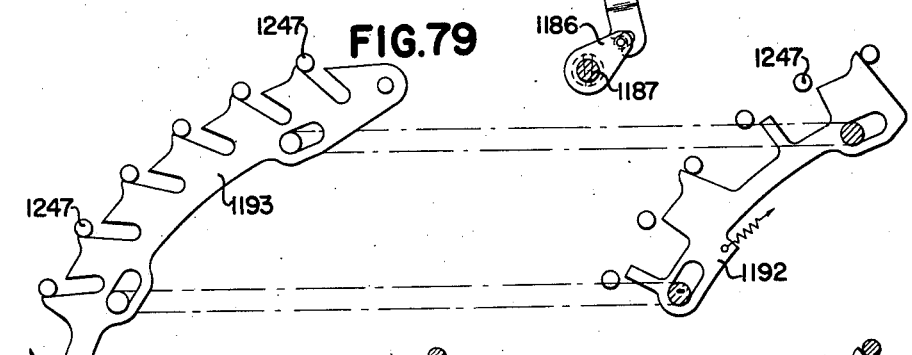
Figs. 79 and 80 show four of the detents which cooperate with the keys in row 1 of the control keys.
Figure 80:
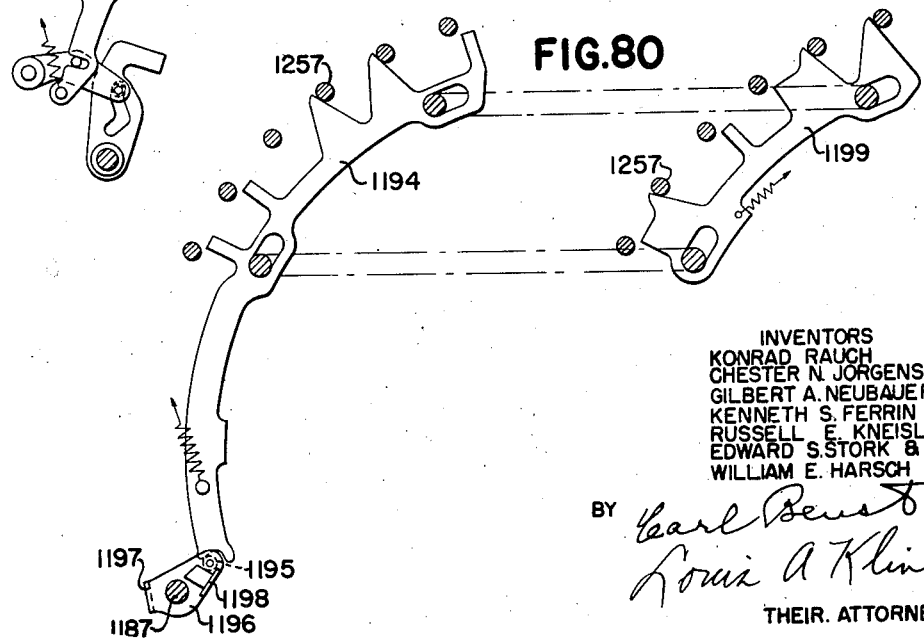
Figure 91:
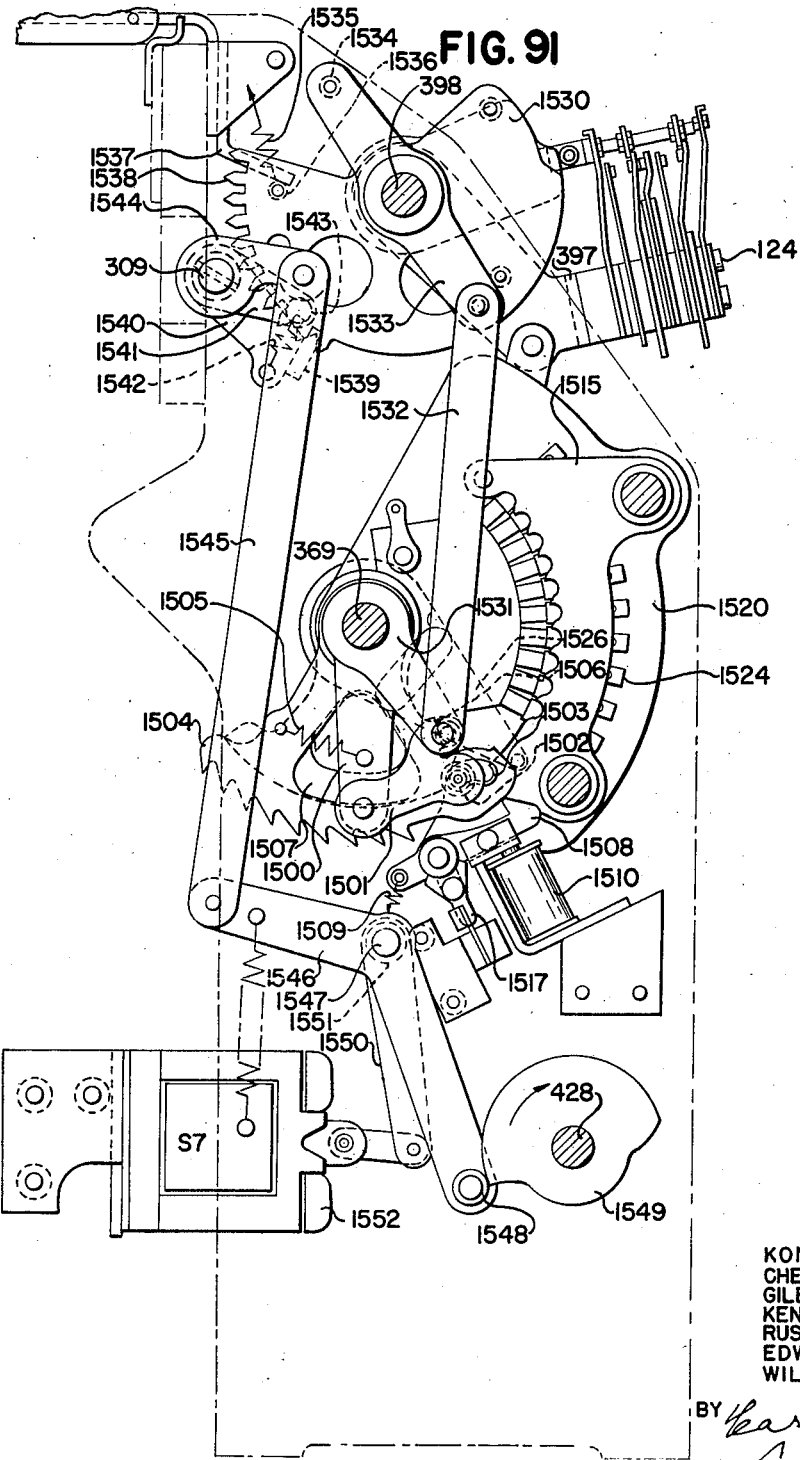
Fig. 91 is a side elevation of the differential mechanism used in the account number comparison.
Figure 92:
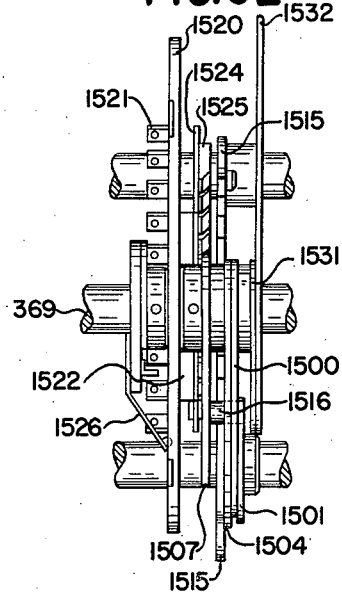
Fig. 92 is a front elevation of part of the differential mechanism of Fig. 91.

The shaft 593 is normally locked against movement by an aligner 620 (Figs. 21, 45, and 46) engaging an aligner segment 622. The aligner 620 is withdrawn from engaging the aligner segment 622 as an incident to clutching the auxiliary cam shaft 428 to the auxiliary motor 400, by means described hereinafter.

After the gear 599 (Fig. 25) has been positioned under the joint control of the units and tens line-finding auxiliary differential mechanism, in the manner just described, the aligner 620 is again moved into engagement with the segment 622, to lock the shaft 593 against rotation in the manner described hereinafter.

The positioning of the gear 599 under joint control of the units and tens auxiliary differential mechanisms has spaced the stud 601 (Figs. 25, 29, 31) from a stop slide 713 a distance commensurate with the line-printing position into which the carriage is to be fed to receive the next printed item. An arm 700, loosely mounted on the shaft 600 adjacent the gear 599, is connected to the gear by a spring 702. The arm 700 lies in such a position as to engage the stud 601 on the gear 599 and is provided with a stud 701, eccentrically mounted thereon for fine adjustment. The stud 701 normally lies in the path of movement of an arm 703, also loosely mounted on the shaft 600. Connected to the arm 703 is an annularly-formed shifting collar 704 (see also Fig. 32), which studs 705 on a shifting yoke 706 are mounted. Also secured to the arm 703 and the shifting collar 704 is a pinion 707 (see also Fig. 30), normally engaged by an operating segment 708, pivoted on a shift 709. The segment 708 is provided with a pair of anti-friction rollers 710, engaging a two-plate cam 711 on the usual printer cam shaft 712.

The cam shaft 712 is given one clockwise rotation during each amount-entering operation of the accounting machine and is given an initial 45 degrees of clockwise rotation in the first cycle and the remaining 315 degrees of clockwise rotation in the second cycle of a total or a sub-total operation, in the manner well known in the art and fully described in the above-mentioned patents. Rotation of the cam shafts 712 and the cam plate 711 rocks the segment 708 counter-clockwise (Fig. 30) to rotate the pinion 707 and the arm 703 clockwise. During the clockwise movement of the arm 703, the arm picks up the stud 701 on the arm 700, and the latter engages the stud 601 to rotate the gear 599 clockwise from the position in which it was set under control of the two auxiliary differential mechanisms until the stud 601 engages the stop slide 713. The position of the parts when the gear 599 is arrested by the slide is shown in chain lines in Fig. 31. The stop slide 713 is mounted to move in a groove cut in a frame 714. The stop slide 713 is pivotally mounted on a cam follower arm 715 (Fig. 29), pivotally mounted on the beforementioned shaft 455. The follower arm 715 is provided with a roller 716, held in engagement with a cam 717 by a spring 718. The cam 717 is secured to the auxiliary cam shaft 428, which is rotated when the auxiliary motor 400 is clutched thereto in the manner hereinbefore described.

When the shaft 428 is clutched to the auxiliary motor 400, the cam 717 rocks the cam follower arm 715 to withdraw the stop arm 713, so that the gear 599 will be free to be rotated by the gear 687 and the arms 681 when the carriage is moved into the machine during the first in-sweep operation, in which the balances and other data are picked up from the magnetic channels on the back of the ledger card. The cam 717 is so timed that it restores the stop arm 713 into the path of the stud 601 before the arms 700 and 703 are rotated to position the carriage into its print-receiving position, as determined by the line numbers picked up from the channels "O" and "P" and controlled by the auxiliary differential mechanisms.

Also pivoted to the cam arm 715 is a slide 719 (Figs. 29 and 32), having a slot 720, through which a stud 721 passes to guide the slide in its backward and forward movement. Also secured to the slide 719 is a stud 722, engaging a bifurcated cam slot 723 in one end of the shifting yoke 706. The yoke 706 is pivoted on a stud 724, carried between a bracket 725 and a plate 726, mounted on the frame 714.

When the cam follower arm 715 is rocked by the cam 717, the slide 719 is moved rightwardly (Fig. 29), whereupon the stud 722, moving in the cam slot 723, rocks the yoke 706 counter-clockwise (Fig. 32) to shift the arm 703 out of the path of movement of the stud 701, thus permitting free rotation of the gear 599 during its setting operation.

When the arm 700 (Fig. 31) picks up the stud 601 and rotates the gear 599 in the manner described above, the gear 599 rotates the gear 598 and the pinion 684. At this time, the aligning segment 622 (Fig. 45) and therefore the shaft 593 are held against rotation by the aligner 620; hence the arm 681 of the planetary gear mechanism will be held stationary. Meshing with the planetary pinions 682 are planetary pinions 685 (Figs. 25 and 32), mounted on suds 686. The planetary pinions 685 mesh with a pinion 687, secured to the shaft 547, on which the gear 543 is secured. Therefore, when the pinion 684 rotates the planetary pinions 682, the planetary pinions 685 rotate the pinion 687, the shaft 547, and the gear 543. As beforementioned, the gear 543 meshes with the rack 540 on the carriage (Fig. 16).

Thus the carriage is shifted an extent commensurate with the data picked up from channels "O" and "P" of the ledger card, which is accomplished by first setting the stud 601 into a position representing the line position, and thereafter the arm 700, upon being rotated by the arm 703, picks up the stud 601, rotates the gear 599, the gear 598, and the pinion 684, and, through the planetary pinions 682 and 685, rotates the gear 687 and the shaft 547 an extent representing the line into which the carriage is to be positioned.

Rotation of the year 543, when the gear 599 is thus driven, also rotates the segment 548 (Fig. 16). At this time, however, the rack 389 is not operating, and, in order to permit movement of the segment 548 when the gear 543 is rotated by the arm 703, the rack 389 is mutilated, so that no teeth on the rack are normally in mesh with the teeth on the segment 553, thus permitting free counter-clockwise rotation of the segments 553 and 548 (Fig. 16).

When the rack 389 is to position the carriage in pick-up and recording operations, means is provided for bringing the segment 553 into mesh with the teeth 554. This means comprises the block 726, secured to the rack 389 and having a toe which normally engages a roller 727 on the segment 553. Thus, upon initial movement of the rack 389, to the toe of the block 726 engages the roller 727 and rocks the segment 553 until its teeth can engage with the teeth 554 of the rack 389, whereupon the rack 389 continues the rotation of the gear 553 to drive the carriage into its fully-moved position, in the manner hereinbefore described in the consideration of the pick-up operation.

*Line-finding aligner—Balance pick-up operation*

The line-finding aligner 620 (Figs. 21, 44, 45, and 46) is normally engaged with the aligner segment 622, and the aligner must be disengaged at the beginning of a balance pick-up operation, so as to free the shaft 593 for operation.

As before described, a balance pick-up operation is initiated by depression of the release bar 113 (Fig. 1), and the release bar 113 closes contacts K2a1 and K2a2 in a circuit which causes the solenoid S6 (Figs. 10 and 21) to be energized. The solenoid S6, operating through its armature 441 and the link 442, rocks the arm 445 to cause the auxiliary motor 400 to be clutched to the auxiliary cam shaft 428 to drive the shaft 180 degrees to cause the various mechanisms to be operated during the reading of the card.

The aligner 620 is withdrawn from engagement with the aligner segment 622 when the solenoid S6 is energized, and the arm 445 is rocked thereby. A link 750 (Figs. 10, 44, and 45), pivoted to the arm 445 (Fig. 45), is slotted at its lower end to engage a pin 751 on a pawl 752. The pawl 752 is pivoted to the aligner 620 by a stud 753. The free end of the pawl 752 normally engages a stud 754 on a cam follower arm 755, pivoted on a stud 755. A spring 757 urges the arm 755 in a direction to maintain a roller 758 thereon in engagement with a cam 759 on the printer cam shaft 712. A spring 760, connected to a stud on the aligner 620 and a stud on a bracket 761, carried by the framework of the machine, urges the aligner out of engagement with the segment 622 but is normally prevented from doing so by the pawl 752 engaging the stud 754. When the solenoid S6 is energized to rock the arm 445 clockwise, the link 750 lifts the pawl 752 off the stud 754 to permit the spring 760 to rock the aligner out of engagement with the segment 622, thus permitting the shaft 593 to operate in the manner hereinbefore described, to permit the carriage 111 to move the ledger card into the machine and sweep past the pick-up heads, to read the data from the ledger card, as is to be described hereinafter. During this insweep movement, the solenoids 577 and 630 are de-energized to control the line-finding auxiliary differential mechanisms according to the data in channels "O" and "P."

The aligner 620 is moved into position to engage the aligner segment 622 at the beginning of the operation of the printer cam shaft 712, which shaft operates during the operation of the accounting machine and begins to rotate after the shaft 428 has been rotated 180 degrees, as above mentioned.

Pivoted on the stud 753 (Fig. 46) of the aligner is a second pawl 770, which is connected to a plate 771 by a link 772. Also pivoted to the plate 771 is a link 773, slotted to engage a stud 774 on a cam follower arm 775, pivoted on a shaft 776. A spring 777 urges a roller 778 against a cam 779, secured to the auxiliary cam shaft 428.

When the aligner 620 is rocked into disengaging position, upon the operation of the solenoid S6, the pawl 770 is moved into a position opposite a stud 780 on a cam follower arm 781, pivoted on the stud 756. A spring 782 holds a roller 783 in engagement with a cam 784 on the printer cam shaft 712.

Between 150 degrees and 179 degrees of operation of the auxiliary cam shaft 428 (see the time chart, Fig. 46A), the cam 779 rocks the cam follower arm 775 counter-clockwise (Fig. 46), which, through the link 773, rocks the plate 771 clockwise to lift the link 772 and the pawl 770 upwardly to engage the stud 780. Shortly after this time, the cam shaft 712 begins to rotate, and, in doing so, the cam 784 rocks the cam follower arm 781 clockwise (Fig. 46). Since, at this time, the pawl 770 is in engagement with the stud 780, the cam 784 and the follower arm 781 move the pawl 770 leftwardly to rock the aligner pawl 620 clockwise into engagement with the aligner segment 622, thus locking the shaft 593 against movement during the remainder of the machine operation.

The pawl 770, when moved by the cam 779, is latched in moved position by a pitman 785 (Fig. 46), bifurcated at each end to slide on a sleeve 786 on the shaft 712, and a sleeve 787 on the shaft 446, respectively. A spring 788 normally holds a square stud 790 on the pitman 785 in engagement with the periphery of the plate 771. When the plate 771 is rocked by the cam 779 to raise the pawl 770 into engagement with the stud 780, a shoulder 789 on the periphery of the plate 771 moves beyond the square stud 790, whereupon the spring 788 moves the square stud 790 behind the shoulder 789 to maintain the plate 771 and the pawl 770 in moved position. Later, when the printer cam shaft 712 rotates, a cam 791 thereon, engaging a roller 792, restores the pitman 785 to normal position, but the plate 771 is still held by the cam 779. At about 245 to 270 degrees of movement (see Fig. 24), the pitman 785 is released again to move the square stud 790 into engagement with the shoulder 789 to hold the plate 771 in moved position.

As above mentioned, when the auxiliary shaft 428 has rotated 180 degrees, it is stopped, and then the printer cam shaft 712 begins to rotate. Between 5 degrees and 40 degrees of rotation of the shaft 712, the cam 784 rocks the arm 781 to move into engaging position in the manner heretofore described.

At 155 degrees of movement of the shaft 712, the auxiliary cam shaft 428 begins to move again, and then both the shafts 712 and 428 rotate. At 205 to 240 degrees of movement (see Fig. 24) of the printer cam shaft 712, the cam 791 shifts the pitman 785, but at this time the cam 779 still holds the plate 771, and, at 245 to 270 degrees of movement, the pitman 785 is moved back into latching position to hold the plate 771 in its moved position. At 20 degrees of movement of the shaft 428, the solenoid S6 is deenergized, thus permitting the plate 445 to restore to home position and allow the pawl 752 to return and rest on top of the stud 754. At 280 to 315 degrees of movement of the shaft 712, the cam 759 restores the cam follower arm 755 to home position to hold the aligner pawl 620 in engaged position. At 310 to 350 degrees of movement of the cam shaft 712, the cam 784 restores the arm 781 to home position. This movement is idle, since at this time the arm 755, engaging the pawl 752, holds the aligner 620 in engaged position. At 320 degrees of movement of the auxiliary cam shaft 428, the arm 775 is restored to home position, the stud 774 merely moving idly in the slot of the link 773, which remains in its operated position at this time. At 355 degrees of movement of the auxiliary cam shaft 428, the cam 472 (Fig. 10) shifts the pitman 470 to rock the arm 454 to restore the shaft 455 to home position. This permits the arm 448 to restore to home position under action of the spring 452 (Fig. 12).

Line-finding aligner—Posting operation

At the end of the balance pick-up operation and at the beginning of a posting operation, the plate 771 is held in moved position by the pitman 785 having been moved into such position during the pick-up operation above described. Therefore, the pawl 770 is in its upper position in the path of movement of the stud 780. At this time, the pawl 752 is in engagement with the stud 754; therefore the aligner 620 is held in engaged position with the segment 622, and the shaft 593 is locked against rotation.

During the posting operation, the auxiliary cam shaft 428 remains stationary, and only the printer cam shaft 712 rotates. Thus the movement of the aligner 620 during posting operations is under influence of the cams 759, 784, and 791 only. Between 5 and 40 degrees of rotation of the cam 784, the arm 781 is rocked clockwise (Fig. 46) to engage and hold the pawl 770, and through it the aligner 620 is held engaged. At this time, both pawls 770 and 752 are held by their respective cam-controlled arms 781 and 755.

Between 40 and 70 degrees of rotation of the cam 759, the arm 755 is rocked counter-clockwise (Fig. 45) to withdraw the stud 754 from engagement with the pawl 752, but at this time the arm 781, engaging the pawl 770, maintains the aligner 620 in engaged position.

Between 205 and 240 degrees of movement of the cam 791, the pitman 785 is shifted to remove the square stud 790 out of the path of movement of the shoulder 789, thus permitting the plate 771 to rock counter-clockwise (Fig. 46) under influence of the spring 777 and, through the link 772, lower the pawl 770 out of engagement with the stud 780. Since at this time both pawls 752 and 770 are free to move under influence of the spring 760, the aligner 620 is disengaged from the segment 622, thus freeing the shaft 593 for rotation.

Between 280 and 315 degrees of movement of the cam 759, the arm 755 is restored to its normal position, and, since the pawl 752 is engaged with the stud 754, at this time the aligner 620 is again moved into engaging position with the segment 622. Thereafter, the cam 784 restores the arm 781 to its home position, and the parts are again home, ready for another operation.

Line-finding aligner—Normal posting operation

During a normal posting operation—that is, a posting operation following a previous posting operation—the aligner 620 (Fig. 45) is controlled solely by the cam 759, the arm 755, and the pawl 752. During such operation, the pawl 770 remains in its lower position during the entire operation.

Line-finding aligner—New balance operation

After all the entries of a transaction are made, the accounting machine is operated in a new balance operation, which is a two-cycle operation, during which the new balance and the check count are printed on the ledger card, and the carriage is released to return to home position in the usual manner, as described in the above-mentioned Spurlino et al. Patent No. 2,373,510. As soon as the carriage reaches home position, it is given a further operation to feed the card the full extent into the machine, at which time the previously-stored magnetic data is erased, after which the card is immediately returned to home position, during which time data pertaining to the account, such as line number, check count, new balance, its sign, and the account number, is recorded in channels "A" to "T," as will be described hereinafter.

During these several operations, the aligner 620 is controlled as follows. In the first cycle of the two-cycle operation, the printer cam shaft 712 is only given its initial operation, and the aligner 620 is held in engagement with the segment 622 by the cooperation of the pawl 752 with the stud 754 on the arm 755. In the second cycle of the new balance operation, the shaft 712 is operated further, and the cam 759 is effective through the arm 755 to permit the pawl 752 to move and allow the aligner to move out of engagement with the segment 622, as in normal posting operations, and to be restored before the carriage is released for movement to home position. This re-engagement of the aligner 620 with the segment prior to the release of the carriage for movement to its home position causes the segment 622 and the shaft 593 to be held in a position corresponding to the number of the line on which the last printing took place, which position is used to control the positioning of the check-back and recording control plates 591b and 675 according to the units and tens digits of the number of the line to which the table is to be positioned in the next pick-up operation.

New balance operation

As explained earlier, after all the entries of a transaction have been made, the machine is operated in a plural-cycle operation, in which the new balance and related data are printed on the ledger card. Thereafter, data previously magnetically stored on the card is erased, and data pertaining to the new balance is stored magnetically on the card in its stead.

A new balance operation is initiated by depression of the New Balance key 155 of row 1 of the keyboard. In this new balance operation, the machine is controlled to perform two cycles of operation to print the new balance and the check count on the ledger card and to release the card carriage to feed the card from the machine, all in the manner fully described in the above-mentioned patent to Spurlino et al. Immediately following the two cycles of operation of the machine, the card carriage is operated to feed the ledger card into the machine and out of the machine to enable previously magnetically recorded data to be erased and data pertaining to the new balance to be magnetically recorded on the card.

During the two-cycle operation of the accounting machine, the differential actuators 205 are controlled in their setting by the balance totalizer and the check count totalizer, according to the values set therein, and position the type wheels to print these amounts on the card. Coincidentally with the positioning of the type wheels, the differential mechanisms position the check-back and recording control plates 123 to represent these amounts, which plates are used to control the recording of these amounts magnetically in channels "A" to "N," as will be described hereinafter.

While the accounting machine is operating in the two-cycle operation, the auxiliary cam shaft 428 is not operated; however, when the card is fed from the machine after the data has been printed thereon, the return of the carriage to its home position closes contacts L2b1, which energize the solenoid S3 to cause the trip arm 419 to operate and allow the clutch to connect the motor 400 to drive the shaft 428.

The first 180 degrees of operation of the shaft 428 not only drives the carriage to sweep the card past the pick-up heads to erase the stored data therefrom but also is utilized to set the check-back and recording control plates 591 and 591b and 669 according to the units and tens digits of the line number to be recorded magnetically on the card in channels "O" and "P."

In this operation, the solenoids 577 and 630 remain energized to retain their pawls 578 and 631 in their withdrawn, or ineffective, position, and other means is utilized to control the positioning of the check-back and recording control plates 591, 591b, and 669.

The setting of the control plates 591, 591b, and 669 is effected as follows. It will be recalled that the setting of the shaft 593 is effected from the auxiliary differential mechanisms for the units and tens digits of the number of the line through the planetary gearing including the arm 597 and from the table-positioning means through the planetary gearing including the arm 681. It will also be recalled that, at the end of an entry operation, the shaft 593 is held in its adjusted position. In the new balance operation, the balance and other related data are printed on the same line as the last entry.

Secured to the shaft 593 is a segment 802 (Figs. 25 and 33), which meshes with a gear 801, rotatable on the shaft 455. Secured to the gear 801 is a stepped cam plate 800, formed with two stepped portions having steps representing the digits 0 to 9, which can be read by a feeler on a stop arm 804. Since the cam plate 800 is connected through the gear 801 and the segment 802 to the shaft 593, its position will correspond to the number of the line at which the carriage is positioned at the end of each entry operation, and the steps on the cam plate 800 will be positioned relatively to the feeler on the stop arm 804 according to the units digit of the line number.

The cam plate 800 and the related stop arm 804 are associated with the auxiliary differential mechanism related to the units digit of the line number. The stop arm 804 is secured to a shaft 803, which is urged clockwise by a spring 805, connected to an arm 806, also secured to the shaft 803. The stop arm 804 is held restrained in its normal position by a pitman 807, pivoted to the stop arm 804, and having a roller 808, engaging a cam 809 on the auxiliary cam shaft 428.

Figure 37:
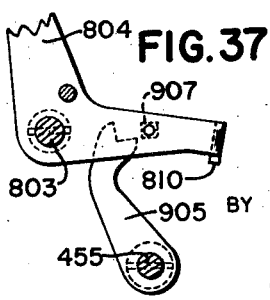
Fig. 37 is a detail view of a part of the mechanism shown in Fig. 33.

As explained earlier, the shaft 455 is rocked clockwise (Figs. 10 and 33) in pick-up operations when the solenod S6 operates through the link 442, the bell crank 445, and the link 449 to remove the stud 453 from blocking relation with the arm 454. When the shaft 455 is thus rocked, a notched arm 905 (Fig. 37), secured to the shaft 455, is moved under a square stud 907 on the stop arm 804 to hold the stop arm in its home, or normal, position to prevent it from exerting a control in pick-up operations. In the new balance operation, however, the shaft 455 is not rocked, and the arm 905 is not moved to blocking position, allowing the stop arm 804 to operate. Shortly after the auxiliary cam shaft 428 begins to rotate, the cam 809 releases the pitman 807 to the action of the spring 805, permitting the stop arm 804 to rock clockwise until arrested by engagement of a flange 810 thereon with whichever step on the cam plate 800 is in the path thereof. The step in the path of the flange 810 represents the units digit of the line number to which the carriage was positioned. This positioning of the arm 804 locates a stop flange 811 on the stop arm 804 in the path of a shoulder 812, formed on a plate 813, which is a part of the units order differential segment 580, heretofore described. When arrested by the respective stop on the cam plate 800, the stop arm 804 is positioned to locate the flange 811 in the path of the shoulder 812, representing the same units digit represented by the position of the cam plate 800.

As before described, when the auxiliary cam shaft 428 rotates, the shaft 369 is rocked by the rack 389 (Fig. 16) and the segment 393. This rocks the drive segment 584 (Fig. 34) and, through the latch 583, rocks the segment 580 and the stepped plate 813 counter-clockwise (Fig. 34) until the appropriate step 812 is brought into engagement with the flange 811. The flange 811 thus arrests further movement of the segment 580. Continued movement of the driver 584 cams the stud 582 outwardly to disengage the latch 583 from the driver 584 to position the lever 586 (Fig. 33) according to the setting of the segment 580. Thereafter, the shaft 612 rocks the arm 613 of the units auxiliary differential mechanism to cause the roller 614 thereon to engage the beam 587 and position the stud 588 into a position corresponding to the setting of the segment 580. The link 590 is positioned by the stud 588 to adjust the check-back and recording plates 591 and 591b of the units order for controlling the recording of the proper units digit of the line number in channel "O" on the ledger card. As is clear in Fig. 33, the recording control plate 591b is displaced one space with respect to the check-back control plate 591, so that, while the check-back control plate 591 is set to the same position as the setting of the auxiliary differential mechanism, the recording control plate 591b will have a setting which will cause a digit to be recorded which is one greater than the units digit of the last line upon which printing has taken place. This will insure that on the next balance pick-up operation the printing will take place on the next line on the card.

The check-back and recording control plate 669 for the tens digit line number entry in channel "P" is set under control of the planetary gear mechanism, and no stepped cam like the cam plate 800 of the units order is provided for cooperation with the tens order differential mechanism.

As before mentioned, the arm 597 of the planetary gear mechanism is positioned to represent a line number from zero to 39 at the end of each entry operation, in which position the arm 597 and the shaft 593 are held stationary by the aligner 620. Therefore, the gears 594 and 678 rotate on the shaft 593, and the pinions 595 and 679 rotate on their respective studs, carried by the arm 597. When the units order link 590 (Fig. 33) is positioned under control of the cam plate 800, the segment 575 is positioned commensurate therewith. The movement of the segment 575 is transmitted to the segment 676 through the segment 592 (Fig. 42), the gear 594, the pinions 595 and 679, and the gears 678 and 677, to rock the segment 676 counter-clockwise (Fig. 38). This movement raises the link 674 to position the plate 675 a like extent. The total steps of movement of the segments 575 and 676 equal the line number represented by the setting of the arm 597. For example, if the arm 597 is setting to represent line 35, the units auxiliary differential mechanism is moved five steps under control of the cam plate 800, and the segment 676 is moved three steps to position the cam plate 675 into a position representing "3." During the setting of the plates in this operation, it is necessary to prevent movement of the tens auxiliary differential segment 637, so that the beam 671 and the link 674 can be adjusted under control of the planetary gear mechanism in the manner just described. To prevent such movement, a pawl 900 (Fig. 38) is provided, which pawl normally engages the central step 638 of the tens differential segment 637. The pawl 900 is secured to a shaft 901, to which an arm 902 is also secured. A link 903 connects the arm 902 to an arm 904, secured to the shaft 455. During recording operations, the shaft 455 is not rocked, and therefore the pawl 900 remains in engaged position to arrest movement of the segment 637. However, during recording operations, the shaft 612 is rocked, and therefore the arm 668 is operated to move toward the beam 671. It is necessary to prevent any movement of the beam 671 by the arm 668 during recording operations. To prevent such operation, the beam 671 is constructed of two offset parts, 671 and 671A. When the differential mechanism is thus arrested and the beam 671 is moved by the link 674, the part 671A on the beam is out of the path of movement of the roller 667. During those operations in which the roller 667 actuates the beam 671, the beam lies in the path of movement of the roller 667. In such operations, the rollers engages the beam to set the link 674 in the manner hereinbefore described, in the consideration of the pick-up operation.

During pick-up operations, it is necessary to withdraw the pawl 900, so that the different segment 637 is free to operate. As hereinbefore described, when the solenoid S6 is actuated to release the machine for a pick-up operation, the shaft 455 is rocked, which, through the arm 904, the link 903, the shaft 901, and the arm 902, withdraws the pawl 900 from engagement with the tooth 638 on the member 637.

It will be recalled that aligners 308 (Fig. 6) are secured to the aligner shaft 309 to align the check-back and recording control plates 123, which are set by the accounting machine differential mechanisms.

Figure 43:
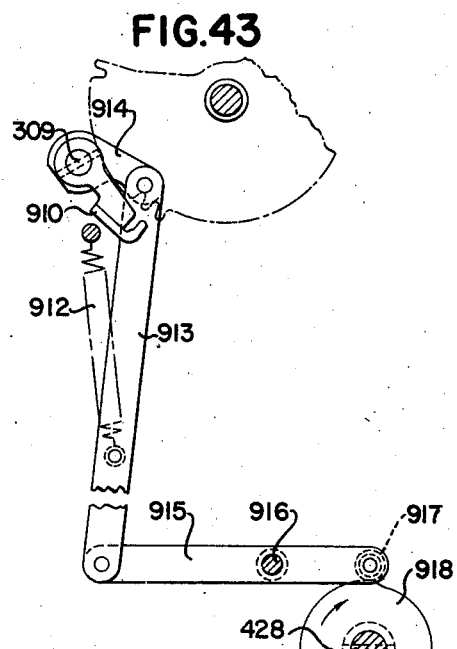
Fig. 43 is a detail view showing the mechanism for operating the aliner for certain ones of the check-back and recording control plates.
Figure 44:
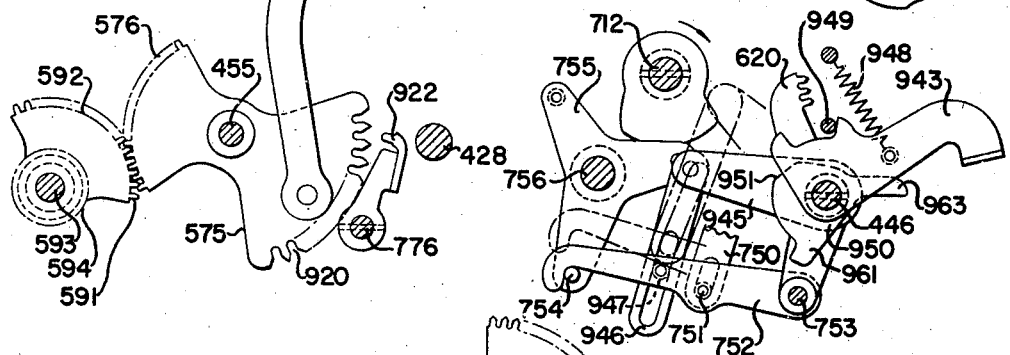
Fig. 44 is a detail view of a part of the mechanism for controlling the positioning of the card carriage for line spacing.

Secured to the aligner shaft 309, adjacent to the check-back and recording control plates 591, 591b, and 669, are aligners 910 and 911 (Figs. 33 and 38, respectively), which are rocked into engagement with the aligning teeth to hold the plates 591, 591b, and 675 in alignment after they are differentially positioned. The shaft 309 (Fig. 43) is spring-actuated by a spring 912, attached to a link 913. The link 913 is pivoted to an arm 914, secured to the shaft 309. The lower end of the link 913 is pivoted to a lever 915, pivoted on a stud 916, and the lever carries a roller 917, which is held in engagement with a cam 918 on the auxiliary cam shaft 428. After the various check-back and recording control plates are differentially positioned, the cam 918 releases the lever 915 to the action of the spring 912, whereupon the aligners are rocked into engagement with the teeth of the check-back and recording control plates 123, 591, 591b, and 675. Near the end of rotation of the auxiliary cam shaft 428, the cam 918 withdraws the aligners 308, 910, and 911 to their disengaged positions.

The segments 575 (Figs. 33 and 42) and 676 (Fig. 38) are also aligned, and for this purpose they are provided with aligning notches 920 and 921, respectively. An aligner 922 is secured to the shaft 776, adjacent to the units and tens digit segments 575 and 676. An arm 924 (Figs. 21 and 33) is secured to the shaft 776, adjacent to the before mentioned lever 775 (Fig. 46), and is held in engagement with a stud 925, carried by the arm 775, and by a spring 926 (Fig. 33).

When the cam 779 rocks the lever 775 in the manner hereinbefore described, the spring 926 rocks the arm 924, the shaft 776, and the aligners 922 into engagement with the respective aligner notches 921 and 920, until the cam 779 again withdraws the aligners near the end of operation of the auxiliary cam shaft 428.

*Manual line-setting mechanism*

If for any reason the magnetic records on the back of the ledger card are accidentally erased or a new ledger card is used to start a new account, thus making the automatic line-finding mechanism inoperative, or if for any other reason it may be desired to start entries on any given line, a manual device is provided for setting the carriage to the proper line for receiving entries.

To provide for manual line setting, an insertable key 935 (Fig. 28) is provided. This key is formed with a shank 936, having a flat side 937, which can engage a flat side 938 on the end of the shaft 593 when the key is inserted into the machine. The insertable key 935 is provided with a dial 939, having thereon characters for guiding the setting of the key either to Balance Forward, or to line 1 to 40, in relation to an indicator 940 on the side of the machine cabinet. An opening 941 (Fig. 1) is provided in the cabinet, through which the shank 936 is inserted and is guided into a collar 942 at the point where the two flat surfaces 937 and 938 come into engagement. The collar 942 also provides a means to support the left-hand end of the shank 936.

After the key 935 is inserted through the openingg 941, the key is turned until the desired line indication on the dial comes into registry with the indicator 940, which operation of the key rotates the shaft 593 into position to move the carriage into the line position indicated by the dial 939.

However, before the shaft 593 can be rotated, the aligner 620 must be withdrawn from engagement with the aligner segment 622.

To permit the aligner 620 to be withdrawn from engagement with the segment 622, the pawl 752 (Figs. 44 and 45) must be raised out of engagement with the stud 754 on the arm 755. To raise said pawl 752, a manually-operable lever 943 is pinned on the before-mentioned shaft 446, the lever 943 having a fingerpiece projecting through a slot 944 in the side of the cabinet (Fig. 1). Also secured to the shaft 446 is an arm 945, having a link 946 pivoted thereto. The link 946 is slotted to engage a stud 947 on the pawl 752. A spring 948, connected to the manually-operable lever 943, normally holds a shoulder thereon in engagement with a stud 949, the latter being mounted on the side frame of the machine.

Before rotating the dial 939, the operator grasps the fingerpiece on the lever 943 and rocks the lever 943 clockwise (Fig. 44) until a second shoulder thereon engages the stud 949 and arrests further movement thereof. Clockwise rotation of the lever 943 rocks the arm 945 clockwise (Fig. 44) to raise the link 946, and the slot in the link 946, engaging the stud 947, lifts the pawl 752 from the full-line position in Fig. 44 to the chain-line position. The lifting of the pawl 752 off of the stud 754 permits the spring 760 to rock the aligner 620 out of engagement with the aligner segment 622, thus releasing the shaft 593 for rotation.

Figure 41:
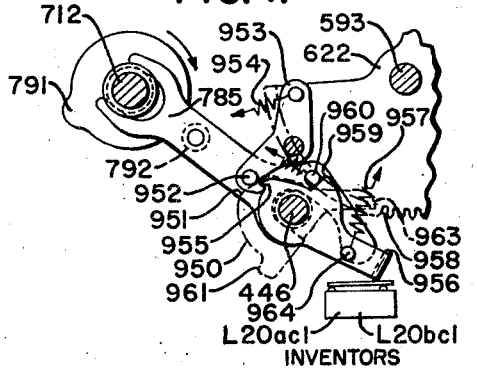
Fig. 41 is a detail view of a part of the mechanism for controlling the selection of a line on the ledger card from the manually-operated means.

When the aligner 620 is rocked by the spring 760, the pawl 752 is moved toward the right and out of the path of movement of the stud 754. If the lever 943 would be released immediately, the pawl 752 would drop behind the stud 754, thus causing misoperation during the next machine operation. To prevent this misoperation, the aligner 620 is latched in its disengaged position by the following mechanism:

Also secured to the shaft 446 (Fig. 44) is a cam plate 950, having a cam surface 951, normally engaged by a stud 952 (Fig. 41) on a latch pawl 953, which is spring-urged by a spring 954 into engagement with a shoulder 955 on one arm of an aligner 956. The aligner 956 is urged counter-clockwise (Fig. 41) by a spring 957, which normally tends to rock the aligner into engagement with the aligning teeth 958 on the aligner segment 622. The aligner 956 is also provided with a shoulder 959, held in engagement with a stud 960 (Fig. 46) on the before-mentioned pitman 785. As hereinbefore described, the pitman 785 is held in its home position by the square stud 790 (Fig. 46) engaging the periphery of the plate 771. The cam plate 950 is provided with a finger 961 (Fig. 41), which, when the cam plate 950 is rocked by manipulation of the manually-operable lever 943, engages a stud 962 (Fig. 46) on the plate 771 to rock the plate 771 clockwise until the shoulder 789 clears the square stud 790 on the pitman 785, thus releasing the pitman 785 to the action of its spring 788. The plate 950 is rotated clockwise, and the surface 951 raises the pawl 953 out of engagement with the aligner 956, permitting the aligner 956 to move into engagement with the teeth 958 in the segment 622. When the pitman 785 is thus released, the spring 957 tends to rock the aligner 956 into engagement with the teeth 958. However, it is desired to keep the aligner 956 out of engagement with the teeth 958 until after the segment 622 and the shaft 593 have been adjusted to select a new line. To obtain this result, the cam plate 950 is provided with a finger 963, which, when the cam plate 950 is manually rocked clockwise, engages a stud 964 in the aligner 956, to which the spring 957 is fastened. Thus, as long as the manually operable lever 943 is held in its rocked position, the aligner 956 is prevented from engaging the aligning teeth 958. After the dial 939 has been adjusted to select the proper line and the segment 622 has been adjusted in accordance therewith, the manually-operable lever 943 is released to the action of the spring 948, and therefore the cam plate 950 is restored to its home position by the spring 948. At this time, the pitman 785 is in its moved position, and therefore the stud 960 is so located that the aligner 956 can move its fullest extent to engage the aligning teeth 958 to maintain the segment 622 locked.

The machine is thereafter released for an entry operation from the accounting machine keyboard, and in this operation the printing cam line 712 receives one rotation. During this rotation of the printer cam line, the cam 791 (Fig. 46) restores the pitman 785 to its home position, thus causing the stud 960 to engage the shoulder 959 of the aligner and withdraw the aligner 956 from engagement with the teeth 958. At the same time, the stud 960 rotates the aligner 956 a sufficient extent to permit the latch pawl 953 to again engage the shoulder 955 of the aligner 956 to maintain the aligner in its disengaged position.

During the operation of the printer cam shaft 712, the cam follower arm 755 is rocked counter-clockwise (Fig. 45) to position the stud 754 beneath the pawl 752, and therefore, after the cam plate 950 is released in the manner just described, and the link 946 (Fig. 44) is lowered to engage the pawl 752 with the stud 754, the cam 759 again restores the cam follower arm 755 to its normal position, thus pulling the aligner 620 into engagement with the aligning segment 622. Therefore, at the end of the entry operation, the parts are again in the position shown, with the aligner 620 in engagement with the aligner segment 622.

The aligner 956 also cooperates with an operating member of a micro-switch containing contacts L20ac1 and L20bc1. When the aligner 956 is out of engagement with the segment 622, contacts L20bc1 are closed in the pick-up initiating control circuit (Fig. 106), and contacts L20ac1 are open in a circuit (Fig. 106A) to a manual line-finding indicator light 965 on the table 500. However, when the aligner is in engagement with the segment 622, the contacts L20bc1 will be open to prevent an automatic pick-up operation from being initiated, and contacts L20ac1 will be closed to light the indicator light 965.

Printer

The printing mechanism is operated by cams on the printer cam shaft 712, which cam shaft is driven from the main cam shaft 140 of the machine. However, the main cam shaft 140 receives one complete rotation during entry operations, and during totalizing or sub-totalizing operations it receives two cycles of rotation. It is, therefore, necessary that the drive for the printer cam shaft 712 be disabled during the first cycle of the two-cycle operations, and, therefore, the drive from the main cam shaft 140 to the printer cam shaft 712 is effected through a clutch device, which is old and well known in the art and is fully described in the United States patent to Everett H. Placke No. 2,351,541, which was issued on June 13, 1944. As is fully described in said Placke patent, the main shaft 140 (Fig. 6) has a gear 970, meshing with a gear 971, rotatably mounted on a stud 972, and the gear 971 meshes with a gear 973, secured to the printer cam shaft 712.

In machines to which the present invention is shown applied, type wheels 974 (Fig. 50) are mounted on a shaft 975 in groups, one group being provided for each column in which a record is to be recorded on the ledger card or on the audit strip (the latter is not shown and described herein, but it is well known in the art, as illustrated in the above-mentioned patents).

An individual hammer 976 is provided for taking impressions in each column, and the hammers are selected for operation by means to be described presently.

The printing wheels in each group are positioned from the various differential mechanisms through internal gear drives, such as that shown and described in the United States patent to Walter J. Kreider, No. 1,693,275. The selection and operation of a particular hammer 976 are under control of notched control plates, hereinafter referred to as a control unit, which includes a group of square shafts, each having thereon a pinion driven by internal teeth of an internal-external gear. These gears and the driving mechanism therefor form an internal gear drive substantially like that shown in the above-mentioned Kreider patent.

These internal-external gears are distributed at various points along the group of shafts, and also carried by the various square shafts are pinions, which mesh with internal gear teeth of selecting and control disks to drive the disks to select various printing hammers and to control the operations of those various units, such as the card carriage feeding mechanism, which carriage supports the ledger card or statement sheet; the statement sheet hammers, which include two check hammers, the date and deposit hammer, and the balance hammer; and the control of the feeding of the journal sheet and the various other mechanisms within the printing mechanism, certain of which will be fully described later in this application. For a more complete description of these mechanisms and controls, reference may be had to the patent to Spurlino et al., No. 2,373,510.

Each printing hammer is provided with a platen 978 and has connected thereto a link 979, which in turn is connected to an arm 980, forming a toggle connection. The arm 980 is pivoted on a shaft 981. Also connected to the arm 980 is an arm 982, carrying a stud 983. Associated with each stud 983 is a link 984, pivoted to an arm 985, secured to a rock shaft 986. Also secured to the shaft 986 is a cam follower arm 987 (Fig. 51), having a pair of rollers 988, coacting with a pair of cam plates 989 on the printer cam shaft 712.

The cam follower arm 987 also has pivoted thereto a link 984, associated with one of the arms 982.

The hammer 976 which is to be operated is selected under control of means comprising notched disks set under control of the transaction banks, as fully described in the above-mentioned Spurlino et al. patent. Coacting with the respective notch plates is a feeler arm 990, on which is supported a two-fingered pawl 991. The arms 990 are pivoted on a shaft 992, and each arm 990 is provided with a finger 993, held in engagement with a stud 994, on an arm 995, secured to the shaft 992. The free end of the feeler arm 990 is provided with a link 996, pivoted to the beforementioned link 984. The forward end of the link 984 is provided with a notch 997, which may be lowered into engagement with its associated stud 983.

During the operation of the machine, when the printer cam shaft 712 is operated, the arm 995 is rocked, in a manner described hereinafter, to move the feeler arm 990 and the feeler pawls 991 toward their associated notched plate or plates. If the feeler arm 990 and the feeler pawls 991 are permitted to drop into notches, the arm 990 is rocked counter-clockwise (Fig. 50), thus lowering the link 996 and engaging the notch 997 of the link 984 over the stud 983 of its associated printing hammer mechanism. Thereafter, during the machine operation, the cams 989 rock the cam follower arm 987 and rock the shaft 986 clockwise. Clockwise movement of the shaft 986 and the arm 985, secured thereto, moves the link 984 rightwardly (Fig. 50) and, through the stud 983, rocks the arm 982 counter-clockwise. Rocking of the arm 982 straightens the toggle consisting of the arm 980 and the link 979, thus raising the hammer 976 to make an impression on the ledger card.

The feeler-operating shaft 992 (Fig. 52) is rocked by a pair of cams 998, secured to the printer cam shaft 712. Coacting with the cams 998 are a pair of rollers 999. These rollers are carried on the cam follower arm 1000, pivotally mounted on the shaft 986. The cam follower arm 1000 is connected to an arm 1001 by a link 1002. The arm 1001 is secured to the shaft 992, to which the arms 995, one for each printing hammer feeling mechanism, are also secured.

When the printer cam shaft 712 is actuated during an operation in which a print is to be obtained, the cams 998 rocks the cam follower arm 1000 clockwise, thus pulling the link 1002 rightwardly and rocking the arm 1001 and the shaft 992 counter-clockwise. Counter-clockwise movement of the shaft 992 rocks all the arms 995 counter-clockwise, thus moving the feeler arms 990 and the feeler pawls 991 into engagement with their control plates to determine which of the printing hammers is to be operated during the ensuing operation of the machine.

*Line-feeding the carriage*

As fully illustrated and described in the above-mentioned Spurlino et al. Patent No. 2,373,510, debits are listed in two columns, whereas the credits and balances are listed in single columns, respectively. This requires a special control over the feeding of the card carriage 111. During certain operations, the feed of the carriage must be disabled, as when printing takes place in the second column, and the line-feeding must be disabled when printing in the first column of the debits takes place. When the Balance Forward is printed, the line-spacing must take place after the printing operation. The timing of the feed of the carriage is under control of a group of notched control plates, which are fully illustrated in the above-mentioned Spurlino et al. patent.

To line-space the carriage, the beforementioned shaft 547 has secured thereto a ratchet wheel 1010 (Figs. 25 and 57). A bell crank 1011 (Fig. 57) is secured to a shaft 1012 in axial alignment with the shaft 547, and the ends of the shafts 547 and 1012 lie adjacent each other. A feed pawl 1013 is carried by the bell crank 1011 and engages the ratchet wheel 1010. During each operation of the machine, the shaft 1012 is rocked, thus carrying the feed pawl 1013 far enough in a clockwise direction to feed the carriage one line-space through the shaft 547 and the gear 543, in the manner described hereinafter, which gear meshes with the rack 540 on the ledger card carriage. A spring-actuated non-retrograde pawl 1008 coacts with the ratchet wheel 1010 to prevent reverse movement of the shaft 547 during line-spacing operation.

As mentioned above, the line-spacing must be obtained at different times during a machine operation; that is, either before or after the printing operation. In those operations where the carriage is fed before the printing operation, the shaft 1012 is rocked by a pair of cams 1009 (Fig. 54), secured to the printer cam shaft 712. Coacting with the cams 1009 are two rollers 1014, mounted on a cam follower arm 1015, pivotally mounted on shaft 986. The lower end of the cam follower arm 1015 is provided with a stud 1016, which may be engaged by a notch 1017 of a link 1018. The link 1018 is pivoted to an arm 1019, pivoted on the shaft 1012. The arm 1019 is provided with a finger 1020, lying adjacent to an eccentric 1021, mounted on a rod 1022, carried by a pair of arms 1023.

If the link 1018 has been lowered, in the manner presently described, to engage the notch 1017 over the stud 1016, the leftward movement of the link 1018, when the cams 1009 rock the follower arm 1015 clockwise (Fig. 54), rocks the arm 1019 clockwise, thereby causing the finger 1020 to engage the eccentric 1021 and rock the pair of arms 1023 clockwise. The arms 1023 are pinned to the shaft 1012, and therefore, when the arms 1023 are rocked clockwise by the arms 1020, the shaft 1012 is rocked clockwise to enable the pawl 1013 to line-space the carriage one step in the manner hereinbefore described.

The engagement of the notch 1017 with the stud 1016 is controlled by a plurality of notched plates 1025, which are like those described in the above-mentioned Spurlino et al. patent. The notched plates are adjusted to present high and low spots to a feeler 1026, pivotally mounted on an arm 1027, loosely mounted on the shaft 992. A finger 1028 of the arm 1027 is held in engagement with a stud 1029 on an arm 1031 by a spring 1030. The arm 1031 is pinned to the shaft 992 and is rocked counter-clockwise with the shaft 992 to free the arm 1027 for sensing movement and to additionally tension the spring 1030 at the proper time in the cycle. The movement of the arm 1027 is also controlled by a cam 1036 (Fig. 56) as follows. The arm 1027 is also connected by a link 1033 to a cam follower arm 1032 (Fig. 56), which is connected to the beforementioned link 1018 by a link 1034. A roller 1035, carried on the arm 1032, coacts with a cam plate 1036 on the printer cam shaft 712 to additionally control when the feeler 1026 can sense the notched plates 1025.

After the arm 1031 has been rocked with the shaft 992, the cam arm 1032 can be rocked clockwise (Fig. 56) when the low portion of the cam 1036 is opposite the roller 1035 and can pull the link 1033 rightwardly to rock the arm 1027 counter-clockwise, thus moving the feeler 1026 to feel for the high and low spots on the control plates 1025. If the feeler 1026 enters a notch in the control plate, the arm 1027 will move far enough to allow the link 1033 to shift rightwardly and permit the arm 1032 to rock clockwise sufficiently to lower the links 1034 and 1018 to engage the notch 1017 with the stud 1016. Thereafter, the cams 1009 (Fig. 54) actuate the shaft 1012 in the manner just described.

In those operations during which the line-spacing of the carriage is to be effected after the printing operation, a pair of cam plates 1040 (Fig. 53) are effective to rock the shaft 1012. Coacting with the cam plates 1040 are a pair of rollers 1041, carried by a cam follower arm 1042, pivotally mounted on the shaft 986. The lower end of the cam follower arm 1042 is provided with a stud 1043, which may be engaged by a notch 1044 in a link 1045, connected to an arm 1046, loosely mounted on the shaft 1012. Secured to the arm 1046 is an arm 1047, which is rockable to engage the eccentric 1021, to rock the arms 1023 and the shaft 1012, to rock the feed arm 1011 (Fig. 57) and the pawl 1013 to line-space the carriage.

A notched plate 1048 (Fig. 55) controls the operation of a feeler 1049 by presenting notches into the path thereof. The feeler 1049 is loosely pivoted on the shaft 992 and is urged counter-clockwise (Fig. 53) by a spring 1050. The feeler 1049 is provided with an arm 1051, connected to a cam follower arm 1052 by a link 1053. The cam follower arm 1052 is connected to the beforementioned link 1045 by a link 1056. The arm 1052 is provided with a roller 1054, held in engagement with a cam plate 1055 by the beforementioned spring 1050. During the operation of the cam shaft 712, when the cam 1055 is rotated, the arm 1052 will follow the contour of the cam 1055 and, through the link 1053, move the feeler 1049 into engagement with the control plate 1048. If the feeler enters a notch in the control plate 1048, the link 1045 is lowered to engage the notch 1044 with the stud 1043, thus permitting the cams 1040 (Fig. 53) to actuate the link 1045 to advance the carriage one line after the printing has taken place.

When the carriage is positioned by the arm 700 driving the stud 601 into engagement with the stop slide 713, according to the line number read from the card, it is possible that the pawl 1008 may rest on the edge of a tooth in the ratchet 1010 and not drop in behind it, as required to maintain the carriage in proper line-space position. Accordingly, means are provided to give the carriage a slight additional movement to insure that the pawl 1008 is properly seated. The link 1045 is utilized to supply this additional movement to the carriage. An extension 1057 is secured to the end of the link 1045, which extension has a surface 1058, which can be engaged by the stud 1043 in each operation of the cam follower arm 1042 when the link 1045 is in its upper position. The surface 1058 is so spaced from the stud 1043 that it will enable the link 1045 to give the pawl 1013 a slight additional movement to momentarily move the carriage an extent to insure that the pawl 1008 is seated.

The feed pawl 1013 and the non-retrograde pawl 1008 (Fig. 57) are normally engaged with the ratchet wheel 1010. During the feeding of the carriage into the machine and back to home position in automatic old balance pick-up operations and in operations in which the new balance is recorded magnetically on the card, the ratchet must be free to rotate. To free the carriage during these operations, means are provided to remove the pawls 1008 and 1013 from engagement with the ratchet. A carriage pawl solenoid S2 (Fig. 27), which is energized at the proper times by a circuit which will be explained hereinafter, has its armature connected by a link 1095 to a spring-actuated arm 1096 (see also Fig. 26), secured to a shaft 1097. Also secured to the shaft 1097 is a bifurcated arm 1098, engaging a stud on a cam plate 1099, loose on the shaft 1012. The cam plate 1099 is provided with two lobes engaging the pawls 1008 and 1013. When the solenoid S2 is energized, the cam plate 1099 is then rocked to shift the pawls 1008 and 1013 away from the ratchet 1010 to permit its free rotation and free the carriage for movement.

The shaft 1097 is provided with a stud 1089 to close contacts S2a1 when the shaft is rocked by the solenoid. The purpose of these contacts will be clear when the control circuits are described.

*Automatic control of the printing hammers and carriage feed from the first and second transaction rows of keys*

Since there are two columns on the statement sheet to receive printed entries of debits, it is necessary to control the operation of the printing hammers for the various columns, to cause alternating printing and to coordinate the feeding of the ledger card with the printing operations while such debits are being entered.

In order to control such feeding of the carriage and also to control the alternate operation of the hammers, there is provided an automatic mechanism, shown in Figs. 47 to 49 inclusive, to drive the selecting disks of the selecting and control units, as determined by the keys of the first transaction bank or control row 2, and also certain keys in the control row 1.

To effect this control, there is provided a notched disk for each of the hammers, for printing in the various columns, and also a notched disk in conjunction with the carriage feed control, which notched disk lies adjacent the beforementioned disk 1048, to control the operation of the feeler 1049, and adjacent to the notched disk 1025 for controlling the feelers 1026. The disk 1025 comprises alternating high and low spots, as fully shown and described in the above-mentioned Spurlino et al. Patent No. 2,373,510. For a more detailed illustration and description of these control plates, reference may be had thereto.

The means for controlling the operation of the automatic means, described above, by the row 1 keys 155 is through a shaft 1060. The shaft 1060 is operated from the row 1 differential mechanism in the manner fully described in the above-mentioned Spurlino et al. patent. The shaft 1060 has mounted thereon a pinion 1061, which drives a ring gear 1062, meshing with a gear 1063, mounted on a stud 1064. Secured to the gear 1063 is a feed pawl control disk 1065, which coacts with a pin 1066 on a slide 1067 (Fig. 49). The slide 1067 is mounted to slide freely on a hub or collar 1068 on the stud 1064, and also on a collar 1069 on the beforementioned shaft 986. Force of gravity maintains the slide 1067 in its lower position, with the stud 1066 in engagement with the control disk 1065.

The control disk 1065 has feed notches in the first, second, fourth, fifth, and sixth positions, which positions correspond to the positions in which the control disk 1065 is positioned in relation to the stud 1066 by the New Balance, Sub-Balance, Sub-Total, Clear Total, and New Balance keys 155.

A camming device is operable at the proper time to raise the slide 1067, so that the disk 1065 may be differentially positioned. The camming device includes a cam 1059, secured to the printer cam shaft 712. The cam 1059 cooperates with a roller 1070 on a lever 1071, having a finger 1072 to engage a pin 1073 on the slide 1067. Immediately at the beginning of the operation of the machine, the cam 1059, through the lever 1071, raises the slide 1067 and holds it in its raised position until 210 degrees of operation of the cam shaft 712 have been completed, at which time the cam 1059 releases the lever 1071 to permit the slide 1067 to fall by gravity, so that the pin 1066 can feel for the particular surface of the disk 1065, which has been set opposite it by the rollers on the differentials.

The slide 1067 has a control surface 1074, coacting with a pin 1075 on a feed pawl 1076, pivoted on a lever 1077, carrying rollers 1078, which cooperate with and are operated by a pair of cams 1079, secured to the printer cam shaft 712. The lever 1077 is pivoted on the shaft 986, and the pin 1075 is held in contact with the surface 1074 by a spring 1087.

The feed pawl 1076 cooperates with a ratchet 1080, having alternate high teeth 1081 and low teeth 1082, for a purpose to be described hereinafter.

The ratchet 1080 is secured to a gear 1083, which drives a ring gear 1084, which, through its internal teeth, drives a pinion 1085 and a square shaft 1086.

The cams 1079 rock the lever 1077 clockwise and consequently retract the pawl 1076 at 150 degrees of rotation of the printer cam shaft 712. This retracting motion is completed at 210 degrees. Then, at 290 degrees, the cams 1079 rock the lever 1077 counter-clockwise, at which time the adjustment of the notched disk 1065 has been completed, and the pawl 1076 is moved leftwardly. At this time, the pawl will have been lowered into contact with either one of the high teeth 1081 or one of the low teeth 1082, to operate the ratchet wheel 1080, which in turn operates the gears 1083 and 1084 and the square shaft 1086. The pawl 1076 will engage one of the high teeth 1081 or one of the low teeth 1082, or it may be held above all the teeth 1081 and 1082, depending upon the position of the disk 1065 set under control of the row 1 bank of keys in all operations. There is also a disk controlled by the keys of control row 2, through a square shaft 1091, having a pinion 1092, engaging the internal teeth of a ring gear 1093, meshing with a gear 1094, secured to a notched disk 1090. The disk 1090 is provided with shallow notches in the positions corresponding to the 0, 1, 7, and 9 positions of the disk, and with deeper notches in the positions corresponding to 6 and 8. If the pin 1066 engages the medium-depth notches in the first, seventh, and ninth positions, then the pawl 1076 will not engage the short teeth 1082 but will engage the long teeth 1081, to restore the ratchet 1080 into a position to effect an automatic feed the next time the automatic feed becomes necessary through the entry of a series of debits.

When the disk 1090 is set to the second, third, fourth, or fifth positions, into which positions the disks are adjusted under control of the Deposit Correction, Analysis, Deposit, or Overdraft keys, respectively, the pin 1066 will be held sufficiently high to cause the surface 1074 to hold the pawl 1076 high enough so that the pawl 1076, during its reciprocating motion by the lever 1077, will miss the high teeth 1081.

The intermediate positions 1, 7, and 9 of the control disk 1090 always insure that the ratchet 1080 is brought back into the position shown, if not already there. In other words, when the pin 1066 is in intermediate position, the pawl 1067 is lowered sufficient to catch one of the high teeth 1081 and move the ratchet one step, which will restore it to the position shown, if it had been left in another position at the end of a listing of a series of checks.

*Last line lockout controls*

A control is provided to prevent release of the machine after either the second check or a deposit has been printed on the last line of the ledger card. To effect such a control, two micro-switches, L5b1 and L7b1, are provided to interrupt the circuit to prevent the accounting machine from being released for operation by the keys of row 2 other than the Analysis key.

When the carriage 111 (Fig. 23) reaches the last line position, the rear end 1100 of the carriage plate 519 engages a finger 1101 of a pawl 1102, pivoted on a stud 1103, carried by a frame 1104, supported on the base of the machine. The pawl 1102 normally engages in a notch 1105 of a link 1106. The link 1106 is slidably mounted on two studs 1107, carried by the link 1106 and operating in slots in the frame 1104. The lower edge of the link 1106 is provided with a notch 1108, normally engaged by a pawl 1109, pivoted on the frame 1104. A spring 1110 normally urges the pawl 1102 into engagement with the notch 1105, and a spring 1111 normally urges the pawl 1109 into engagement with the notch 1108. Also, a spring 1112 urges the link leftwardly (Fig. 23) until arrested by the studs 1107 thereon cooperating with the slots in the plate 1104.

Also, when the carriage plate 519 reaches its last line position, the rear end 1100 of the table engages a switch blade 1115 of a normally-closed micro-switch L5b1 to open it. The stud 1107 near the right-hand end of the link 1106 normally engages a blade 1113 of a micro-switch to hold the contacts L7b1 in open position.

A cam plate 998 on the printer cam shaft 712 has thereon a stud which engages an extension of the pawl 1109 to withdraw the pawl from the notch 1108 in the link 1106 on each rotation of the printer cam shaft. Even though the pawl 1109 is withdrawn from the notch 1108, the link cannot move to the left under the action of the spring 1112 so long as the pawl 1102 remains in the notch.

When the carriage has reached its last line position and has removed the pawl 1102 from the notch 1105, the rotation of the cam shaft 712 in the operation of printing data on the last line will cause the stud 1114 to remove the pawl 1109 from the notch 1108 and free the link 1106 for movement to the left (Fig. 23) by the spring 1112. This movement of the link 1106 will allow the micro-switch contacts L7b1 to close.

The left-hand end of the link 1106 is provided with a stud 1116, which projects into a notch of an arm 1117, formed on a ring gear 1119. The internal teeth of the ring gear 1119 are in mesh with two pinions 1121, mounted on square shafts 1122. Also mounted on the square shafts 1122 are pinions 1123, meshing with internal teeth of a ring gear 1120, to couple the ring gears 1119 and 1120 for joint movement. The ring gear 1119 lies adjacent to a finger 1124, formed on the back end of a second check printing hammer 976 and adjacent to a finger 1118, formed on a yoke 1129, secured to a deposit hammer 976. A stud 1125 lies in the path of movement of the fingers 1124 and 1118 of the second check and deposit printing hammer, respectively. The ring gear 1120 is provided with a stud 1126, lying in the path of a finger 1127, formed on the back end of the analysis printing hammer 976.

In the operation in which the carriage 111 reaches the line 39 position and opens the contacts L5b1, the electrical circuit through the relay R11 for row 2 is interrupted, thus preventing the relay from being energized to initiate a subsequent operation of the machine as a result of the depression of a key in control row 2, as will be explained hereinafter. However, during the operation of the machine in which the first debit is entered, the stud 1114, engaging the pawl 1109, withdraws the pawl 1109 from the notch 1108 and releases the link 1106 to the action of its spring 1112 to allow the micro-switch to close contacts L7b1. The contacts L7b1 are in parallel with contacts L5b1 and, when closed, will prepare the circuit to the relay R11, so that the machine can be released for operation by the operation of keys in row 2, for entering a second check in the second column of the ledger card, or to enter a deposit in the third column of the ledger card on the same line as the first check was printed; that is to say, on the last line of the ledger card. However, when the Analysis hammer 976, the Check or Debit hammer 976, or the Deposit hammer 976 is operated, the fingers 1127, 1124, or 1118 on the respective hammers engage the stud 1126 or 1125 and rotate the ring gears 1120 and 1119, to restore the link 1106 to its home position, where it is latched by the pawl 1109 and again opens the contacts L7b1. At the end of either of these two operations, both the contacts L5b1 and L7b1 are held open, and therefore no operation of the machine to enter debits and credits is possible until the carriage is again moved into its outer position.

With the card carriage in line 39 position and with the contacts L5b1 and L7b1 open, the machine may be operated in an analysis operation under control of the Analysis key in row 2. This key closes contacts K10a1 (Fig. 76), which, as will be explained more fully hereinafter, by-pass contacts L5b1 and L7b1 in the circuit to relay R11 and enables the machine to be operated in an analysis operation. If a sub-balance operation follows the analysis operation, the carriage is line-spaced to line 40 position, in which the carriage plate 519 engages a blade 1128 to close contacts L14a1 in a micro-switch which is located adjacent to the micro-switch which contains contacts L5b1. As will be explained more fully later, contacts L14a1 prepare a circuit for causing the solenoid S2 to release the carriage pawl 1008 and 1013 to allow the carriage to move its full extent to home or starting position.

The above circuits for controlling the release of the machine after printing has taken place on the last line of the ledger card will be described when the electrical circuits of the machine are considered.

*Machine release means from the keyboard*

The machine may be released for operation by depression of certain ones of the keys 154 of row 2 (Figs. 1, 2, 63, 64, and 72). The keys 154 are mounted in the key frame 326, mounted on the rods 201 and 202, carried by the machine side frames. Each key 154 carries a pin 1133, adapted to cooperate with an associated slot 1134 of a releasing bar 1135 (Figs. 63 and 72), pivoted at its upper end to an arm 1136, pivoted at 1137 on the key frame 326. The releasing bar 1135 is notched at 1132 to eliminate the slot for the "Overdraft" key to prevent this key from being able to release the machine. Associated with each of the keys 154 is a coil spring 1140, which is adapted to hold the keys in their normal, undepressed, positions in a manner which is well known in the art. The releasing bar 1135 is also pivoted to an arm 1138, pivoted at 1139 to the key frame 326.

The releasing bar 1135 is normally held in its upper position, as shown, by means of a torsion spring 1141, which engages the arm 1136 and urges the arm clockwise about its pivot 1137.

Each of the keys 154 carries on its opposite side—that is, on the side opposite from the pin 1133—a pin 1150 (Fig. 64), which has a flattened portion, which cooperates with an angular nose 1151 of a retaining detent 1152 (Figs. 64 and 72), pivoted at its upper end to an arm 1153, which in turn is pivoted at 1154 to the key frame 326. The lower end of the retaining detent 1152 is pivoted to an arm 1155, in turn pivoted at 1156 to the key frame 326. A spring 1157 normally retains the angular sides of the noses against the pins 1150.

When one of the keys 154 is moved into its depressed position, the pin 1150 moves the detent 1152 downwardly until said pin passes a shoulder 1158 on the bottom of the nose 1151, whereupon the spring 1157 immediately moves the detent 1152 upwardly, thus latching the key in the depressed position.

When the key 154 is moved into depressed position and latched in that position, the arm 1136, by means of a pin 1161, carried thereby, contacting a finger 1162 on an arm 1163 pivoted on a rod 1164, rocks said arm 1163 clockwise, as viewed in Fig. 63. The arm 1163 also carries another arm 1170, having a pin 1165, which is connected to a link 1166, pivoted at 1167 in an arm 1168, pivoted on the usual machine release shaft on key lock line 1169, carried by the machine side frames.

The arm 1168 has a bent-over lip 1175, adapted to cooperate with a switch plunger 1176, which operates micro-switch contacts K3a1, supported on a bracket 1178. The bracket 1178 is carried by a machine frame brace 1179 and is supported by means of screws 1180.

When the keys 154 are in their normal, undepressed positions, there is a clearance between the lip 1175 and the end of the switch-operating plunger 1176. Upon depression of any one of the keys 154, which are to release the machine, its pin 1133, operating in the slot 1134, moves the bar 1135 downwardly, whereupon the arm 1136 is rocked counter-clockwise (Fig. 63), and the pin 1161 rocks the arm 1163 clockwise. This causes the link 1166 to raise and rock the arm 1168 clockwise. While this is occurring the pin 1150 is moving the retaining detent 1152 downwardly against the tension of its spring 1157, and, just as soon as the flattened part of the pin 1150 passes beneath the nose 1151 and gets beneath the shoulder 1158, the spring 1157 moves the detent 1152 upwardly, thus retaining the key 154 in its depressed position.

The relation of the parts—that is, the shoulder 1158—to the clearance 1181 is such that the detent 1152 latches the key 154 in its depressed position, just as the lip 1175 touches the end of the switch-actuating plunger 1176. At this time, the key is fully depressed, whereupon the arm 1168 is rocked still farther clockwise to move the switch plunger upwardly a distance sufficient to close the contacts K3a1, which are normally in open condition. The spring 1140 returns the key 154 slightly upwardly until the flattened portion of the pin 1150 contacts the shoulder 1158, which retains the key in this depressed condition.

When the contacts K3a1 are closed, a circuit is completed to relay R11, which in turn closes contacts in a circuit through a solenoid S4, to be described hereinafter, which has for its purpose the function of operating the machine release tripping mechanism, so that, just as soon as any one of the keys 154 operates the bar 1135 to close contacts K3a1, the machine-releasing mechanism is released and can function to cause the machine to go through a normal cycle of operation.

An interlock is provided to prevent release of the machine if any of the control keys 154 are only partially depressed, or to prevent depression of any of the control keys 154 after the machine has been released.

The arm 1153 (Fig. 64), which supports the upper end of the detent 1152, carries a pin 1230, which projects into a forked arm 1231, loose on the rod 1164. The arm 1231 has a finger 1232, which, when a key 154 is partially depressed and the detent 1152 is moved downwardly thereby, will be raised into the path of a finger 1233 of an arm 1234, which is secured to the machine release shaft 1169. It can be seen that, when one of the keys 154 is only partially depressed, the arm 1231 will be rocked clockwise (Fig. 64) by the pin 1230 to a position in which the finger 1232 will obstruct movement of the arm 1234, which therefore prevents movement of the release shaft 1169.

When the machine release shaft 1169 is rocked to release the machine, the finger 1233 is rocked into the path of the finger 1232 of the arm 1231, and therefore it will be impossible to depress any of the control keys 154 until such time as the release shaft 1169 is restored to its normal position.

Near the end of the operation of the machine, the release shaft 1169 is rocked clockwise, whereupon a finger 1235 on the arm 1234 engages the horizontal portion 1236 of the arm 1153 to lower the detent 1152 and release the depressed keys.

The keys 155 of row 1 (Figs. 1, 2, 58, 59, and 72) are slidably mounted in a key frame 1246, in turn supported by the previously-described rods 201 and 202. Each of the keys 155 has a pin 1247 extending from one side thereof and a pin 1257 extending from its other side (Fig. 72), the pins cooperating with the various interlocking detents and control slides for this control row. The pin 1247 has a flattened portion cooperating with the angular face of a nose 1248 on a retaining detent 1249, which is slidably mounted on pins 1250 and 1251 carried by the key frame 1246. The angular faces of the noses 1248 are normally held in contact with the pins 1247 by a spring 1253, connected to a pin 1254, carried on the detent 1249, and a pin 1255, mounted in the frame 1246. Whenever any one of the keys 155 is depressed, its pin 1247 moves the detent until the flattened portion of the pin is below a surface 1256 of the nose 1248, and the spring 1253 again moves the detent downwardly, thus retaining the depressed key in depressed position.

The pins 1247 of the first, second, third, and sixth key from the bottom (Fig. 58) cooperate with angular slots 1258 in an operating bar 1260 (Figs. 58 and 72), which is cut away at 1259 opposite the pins 1247 of the keys in the fourth and fifth positions. The operating bar 1260 is slidably mounted on pins 1261, supported in the key frame 1246, and is normally urged upwardly by a spring (not shown) to maintain one edge of the slots 1258 against the pins 1247 of the keys 155. All of the keys 155 are maintained in normal, undepressed position by means of compression springs 1263, one of which is associated with each of the keys. These springs function in a manner well known in the art.

The operating bar 1260 carries a pin 1270, which is engaged by a forked arm 1271, pivoted on the rod 1164. Connected to the arm 1271 by means of a hub 1272 is an arm 1273, which is connected by a link 1274 to an arm 1275, pivoted on the release shaft 1169. The arm 1275 has a formed-over lip 1276, adapted to cooperate with a plunger 1277, which operates to close the micro-switch contacts K4a1. Whenever one of the keys 155 which has a pin engaging a cam slot 1258 is depressed, it causes the operating bar 1260 to move downwardly, thus rocking the arm 1271, and also the arm 1273, clockwise (Fig. 58), whereupon the link 1274 rocks the arm 1275 clockwise and causes the lip 1276 to engage and move the plunger 1277 upwardly to close the micro-switch contacts K4a1 in a circuit to relay R4, which in turn controls a circuit to machine release solenoid S4 to cause release of the machine in the manner described hereinafter.

Inasmuch as pins 1247 on the keys in the fourth and fifth positions are opposite the notch 1259 in the operating bar 1260, these keys do not actuate the operating bar 1260 and therefore do not close the micro-switch contacts K4a1.

The means for rocking the release shaft 1169 and restoring the shaft to its home position is identical to that mechanism which is fully illustrated and described in the United States patent to Bernis M. Shipley No. 1,619,796, and a detailed description thereof may be had by reference to said patent. A brief description of the release of the shaft 1169 will now be given.

The machine release shaft 1169 is adapted to be moved counter-clockwise (Fig. 60) by a strong spring 1300, mounted in a slot 1301 of the link 1302 in exactly the same manner as fully illustrated and described in the above-mentioned Shipley Patent No. 1,619,796. The spring 1300 sits on fingers 1303 of the link 1302 and also engages fingers 1304 of arms 1305, only one arm being shown, which arms are mounted on each side of the link 1302. A stud 1306, carried by the arms 1305, projects into an arm 1307, which is secured to the machine release shaft 1169. Also secured on the machine release shaft 1169 is an arm 1308, carrying a flat-sided pin 1309.

The shaft 1169 is held in its normal position by the upper end of a trip lever 1280, which is engaged by the flattened pin 1309 and held in engagement by the spring 1300. This tripping lever 1280 is pivoted on a stud 1281, carried by the left side frame.

It may be stated here that the link 1302 and the arm 1307 are mounted adjacent the right side frame of the machine in their normal positions.

The tripping lever 1280 carries a stud 1282, by means of which said tripping lever 1280 is connected to a link 1283. The link 1283 is connected by means of a long stud 1284 to a solenoid core 1285 of the solenoid S4, mounted on a bracket 1287, secured to the left side frame of the machine. A spring 1288, connected to the link 1283 and to a bracket 1289, secured to the left side frame, normally maintains the parts in the position shown, whereupon the upper end of the tripping lever 1280 is beneath the flat stud 1309 on the arm 1308, which, it will be remembered, is secured to the machine release shaft 1169. A finger 1290 on the lower end of the tripping lever 1280 is normally held, by the spring 1288, in contact with a resilient sound-deadening material 1291, secured to a bracket 1289. By means of a circuit, to be described hereinafter, the solenoid S4 is energized to move its core 1285 to the left, as viewed in Fig. 60, thus pulling the link 1283 in the same direction, which rocks the tripping lever 1280 clockwise, removing its upper end from beneath the flattened pin 1309, whereupon the spring 1300, through the medium of the stud 1306 and the arm 1307, rocks the machine release shaft 1169 counter-clockwise until a surface 1292 of the arm 1307 contacts a limiting pin 1293, carried by the machine's right side frame.

Such movement of the machine release shaft 1169, as has been clearly illustrated and described in the above-mentioned Shipley Patent No. 1,619,796, closes the operating circuit to the machine-operating motor, thus driving the machine through its normal operating cycle.

The rocking of the shaft 1169 is used to open contacts L18b1 (Fig. 62) in the circuit to solenoid S4 to insure that the solenoid will be deenergized after it has tripped the shaft 1169. Secured to the left end of the shaft 1169 is a cam 1171, of non-conducting material, which cooperates with the contacts L18b1, mounted on a bracket 1172, secured to the machine frame. The upper blade 1173 of the contacts L18b1 is normally urged to open position but is held in closed position by the cam 1171 as long as the shaft 1169 remains in its untripped position. When the shaft 1169 is rocked counter-clockwise upon being released, the cam 1171 releases the blade 1173 for upward movement to open contacts L18b1, which contacts remain open until the shaft 1169 is restored to its untripped position.

The various circuits for controlling the energization of the solenoid S4 to trip the machine will be explained fully when the circuit diagram is described.

*Interlocks and controls from rows 1, 2, and 3*

As is well known in machines of the type embodying the invention, the control rows of keys, keys 153, 154, and 155 for rows 3, 2, and 1, respectively, are provided with suitable interlocks and control slides for controlling the proper sequence of depression of control keys and for causing the automatic operation of various mechanisms.

In addition to those shown in Figs. 58, 59, 63, and 64, these banks are provided with further detents, interlocks, and control slides or members, shown in Figs. 72 to 86.

Fig. 72 shows diagrammatically the arrangement of the detents, interlocks, and control slides for the rows 1, 2, and 3. The interlocks, detents, and control slides which are carried by the key frame 1246 for row 1 will be considered first. In addition to the retaining or latching detent 1249 and the operating bar 1260, there is a locking slide 1185 (Fig. 78), which is connected by a pin-and-slot connection to an arm 1186, secured to a shaft 1187. The slide 1185 is normally urged upwardly by a spring 1188 but can be moved downwardly by the shaft 1187 whenever solenoid S5 is energized by the incorrect entry of data from the ledger card, to shift blocking lugs under the New Balance, Sub-Balance, and Indicate Balance keys of row 1. This insures that a corrective new balance non-transfer operation will take place. The usual locking detent 1189 (Fig. 78) co-operates with the pins 1247 to prevent the depression of or release of any key in the row during machine operations. An interlocking detent 1192 (Fig. 79) co-operates with the pins 1247 on the keys to prevent the depression of New Balance, Sub-Balance, Sub-Total, and Clear Total keys when either the Indicate Balance key or the New Balance Non-Transfer key is depressed. A control slide 1193 (Fig. 79) is operated by the pin 1247 of any key in the row to remove the zero stop for the row and allow the total controls to become effective. A locking and control slide 1194 (Fig. 80) is shifted downwardly by the Sub-Total and Clear Total keys to lock the New Balance, Sub-Balance, and New Balance Non-Transfer keys. The lower end of the slide 1194 also engages a stud 1195 in an arm 1196 of a yoke 1197, secured to the shaft 1187, and rocks the yoke 1197 and the shaft 1187 clockwise (Fig. 80) when either the Sub-Total key or the Clear Total key is operated. The rocking of the yoke 1197 will cause the contact-operating lug 1198 on the arm 1196 to open contacts L4b1 (Figs. 67 and 106) in the Balance Pick-Up operation initiating circuit and will also cause the locking slide 1185 to be moved to blocking position. Also associated with row 1 is an interlocking slide 1199 (Fig. 80), which cooperates with the pins 1257 on the keys to lock out the New Balance, Indicate Balance, and Sub-Total keys whenever one of the Sub-Balance, Clear Total, or New Balance Non-Transfer keys is depressed. A control detent 1200 (Fig. 81) cooperates with pins 1257 to prevent the operation of the automatic check count controls when any key of row 1 is operated. This control is fully disclosed in the United States patent to Spurlino et al. No. 2,375,594.

Two further locking slides, 1201 and 1202 (Fig. 73), which are carried by the key frame 326 for row 2, co-operate with the pins 1257 of the keys of row 1. The locking slide 1201 is connected by a pin 1203 to a control slide 1204 of row 2 and locks all the keys of row 1 against depression when any one of the Deposit Correction, Analysis, Space, or Check Correction keys of row 2 is depressed. In a like manner, the locking slide 1202 is controlled by a control member 1205 being connected thereto by a bifurcated extension 1206, which straddles a pin 1207 on the member 1205. The control member 1205 is supported by arms 1208 and 1209, carried by pivot pins 1154 and 1156 on the key frame 326, and is urged upwardly by a spring 1212. Depression of either a Deposit or a Check key in row 2 will move the control member 1205 and the slide 1202 downwardly to cause a blocking projection on slide 1202 to move into blocking relation with the New Balance key of row 1.

Also carried by the pivot pins 1154 and 1156 on the key frame 326 for row 2 is a locking detent 1213 (Fig. 75), which is supported thereon by arms 1214 and 1215 and is formed with a series of blocking projections that cooperate with the Deposit Correction, Analysis, Deposit, Check, Space, and Check Correction keys to block their operation when the detent 1213 is moved downwardly by the lever 1216 (Figs. 9 and 75), pivoted on the rod 1164, when the check-back solenoid S5 is energized upon the failure of agreement between the setting of the machine and the data read from the ledger card. The solenoid S5, when energized, will attract its armature 1220 (Fig. 9), which is connected to a lever 1221. The lever 1221 is secured to a rod 1229, by which it is pivoted on a bracket 1222, and will rock counter-clockwise when operated by the armature 1220. A lever 1218 is connected to the rod 1229 and is connected by a link 1223 to the lever 1216 and rocks the lever 1216 counter-clockwise to shift the locking detent 1213 downwardly against the action of a spring 1217. Secured to the upper end of the lever 1218 is a contact-operating member 1219, which opens contacts S5b1 when the lever 1218 is operated by the energization of the solenoid S5. The control which is effected by these contacts will be explained when the circuit diagram is described.

The locking detent 1213 is formed with a shoulder 1224, which engages a stud 1225 in a further control member 1226 (Fig. 74), which is carried by arms 1227 and 1228 on the pivot pins 1154 and 1156 on the key frame 326. The control member 1226 has, in its lower end, a slot 1238, which engages a stud 1239 in an arm 1240 of the yoke 1197, so that, when the control member is moved downwardly, it will rock the yoke 1197 and the shaft 1187 clockwise, causing contacts L4b1 to be opened and the locking slide 1185 (Fig. 78) in row 1 to be moved downwardly into blocking position.

A key pin guide segment 1241 (Fig. 76) is secured to the key frame 326 and guides the pins 1150 of the keys of row 2. A contact-operating plunger 1242 is secured to a bent-over ear 1243 of a slide 1244, guided by a stud 1245 on the segment 1241. The slide 1244 fits over the pin 1150 for the Analysis key and is forced inwardly by the depression of this key to close contacts K10a1. The control exerted by the contacts K10a1 will be explained when the control circuit diagram is described.

Also associated with and controlled by the keys of row 2 are two segments 1264 and 1265 (Figs. 82 and 83), which are mounted on a hub 1266 in the differential mechanism for row 2. The segment 1264 (Fig. 82) is controlled by the Overdraft key of row 2 and operates through a link 1267 (Figs. 9 and 82) to position a stop arm 1268 in the path of a stop 1269 on the arm 328 of the differential mechanism for row 2 (Fig. 9) to cause the row 2 differential mechanism to be stopped automatically in its #1 or Overdraft Pick-Up position whenever the Overdraft key is depressed. The other segment, segment 1265 (Fig. 83), is also mounted on the hub 1266 and is controlled by the Check key to cause "one" to be added to the check count, is controlled by the Check Correction key to cause "one" to be subtracted from the check count, and is controlled by the remaining keys of row 2 to disable check counting. The manner in which the segment 1265 exerts its control over the check-counting mechanism is fully explained in the Spurlino et al. Patent No. 2,375,594.

A segment 1278 (Fig. 77), mounted on the hub of the differential mechanism for row 3, cooperates with pins 1279 on the first and ninth keys of this row to disable check counting when either of these keys is depressed. The manner in which this segment exerts its control over the check-counting mechanism is fully explained in the Spurlino et al. Patent No. 2,375,594.

Fig. 3 is also provided with the usual key latch slide 1294 (Fig. 85) and the usual zero stop throwout detent 1262 (Fig. 72), which is operated by the depression of any key in the row to remove the zero stop 1295 (Fig. 84) from the path of the differential mechanism. The usual lever 1296 is mounted adjacent the row 3 key bank for disabling the automatic key-releasing action for this row to enable the keys to remain in their depressed position at the end of a machine operation. The lever 1296 is pivoted on a stud 1297 on the key frame 1298 and is connected by a pin-and-slot connection to a blocking arm 1299, mounted on the rod 1164. In the position shown in Fig. 85, the lever 1296 has moved the blocking arm 1299 into blocking relation with a control arm 1310, connected to a key release arm 1311, yieldably mounted on the machine release shaft 1169 to prevent the key release arm from shifting the key latch slide 1294 when the shaft 1169 is restored near the end of a machine operation.

The key frame 1298 for row 3 also carries locking and control slides 1312 and 1313 (Fig. 84), which cooperate with the pins 1133 on the keys of row 2. The locking slide 1312 is operated by the depression of the Overdraft key in row 2 and, when so operated, will move locking portions under the pins 1133 for the Check and Deposit keys. The control slide 1313 is cammed downwardly by the Deposit Correction and Check Correction keys of row 2 and has a downward extension, which cooperates with a stud 1314 on the zero stop 1295 for row 3 to remove this stop and free the differential mechanism for row 3 to allow it to make its full excursion of movement.

*Interlock for preventing balance pick-up operation with an amount or check count key depressed*

An interlock is provided which prevents the machine release shaft 1169 from tripping to release the machine for operation if any amount or check count key is depressed during a balance pick-up cycle. For this purpose, a micro-switch containing contacts L1a1 (Figs. 70 and 71) is provided, which contacts are normally closed, and, if they remain closed, a "short cycle" will occur, during which the carriage will be moved in and then returned immediately to its home position without entering any data into the machine.

The micro-switch contacts L1a1 are normally held in closed position by an arm 1315, secured to a shaft 1316 (Figs. 70 and 71), which is the usual zero stop throwout shaft, carried by the frames of the machine. Also secured on the shaft 1316 is a bifurcated arm 1317, notched to cooperate with a stud 1318 (Fig. 68) on a driving arm 1319. The driving arm 1319 is provided with a cam edge 1320, which is engaged by a pivoted pawl 1321, which pawl is held in engagement with the cam edge 1320 by a spring 1322. The pawl 1321 is pivoted on a stud 1323 of an arm 1324, pivoted on a stud 1325, carried by an auxiliary frame 1326. The lower end of the arm 1324 is provided with a stud 1327, which engages in a slot 1327a in the left-hand end of a link 1328, the right-hand end of which is pivoted to the before mentioned cam follower arm 613 by a stud 1329. As before mentioned, the cam follower arm 613 is pinned on the shaft 612 and is rocked by a cam plate 610 on the shaft 369, which in turn is driven by the auxiliary cam shaft 428.

An arm 1330, secured to the shaft 612, is actuated in a direction to maintain the cam roller 611 against the cam plate 610 by a spring 1331.

When no amount key or check count key is depressed, and the Balance Pick-Up operation is started by depression of the Balance Pick-Up motor bar 113, the auxiliary cam shaft 428 rotates the shaft 369 to operate the cam 610, which rocks the cam follower arm 613 and, through the stud 1329, forces the link 1328 rightwardly (Fig. 68) to rock the arm 1324 counter-clockwise. Counter-clockwise movement of the arm 1324 carries with it the pawl 1321, and the pawl, by its engagement with the cam edge 1329, rocks the arm 1319 and, through the stud 1318, rocks the usual zero stop throwout shaft 1316 clockwise (Fig. 68) to remove the zero stops and free the differential mechanism to the control of the stops 122 of the auxiliary differential mechanisms. Clockwise movement of the shaft 1316 also rocks the arm 1315 from engagement with the switch plunger 1332, thus permitting the micro-switch contacts L1a1 to open. In order to insure that the pawl 1321 will rock the arm 1319, the initial movement of the pawl 1321 and the arm 1319 will move the end of the pawl under a block 1339 on the frame 1326, which block prevents the pawl from being cammed outwardly by the cam edge 1320 if too much resistance is encountered during the rocking of the shaft 1316.

As will become apparent in the consideration of the circuit diagram, when the micro-switch contacts L1a1 open, the card carriage will not be returned immediately to its starting position, and the machine will operate through a complete balance pick-up operation.

If an amount key 152 or a check count key 151 should be depressed when the balance pick-up operation is started upon operation of the motor bar 113, the micro-switch contacts L1a1 are prevented in the following manner from opening. As fully disclosed in the above-mentioned patents, each amount bank and each check-count bank of keys is provided with a control plate 1333 (Fig. 68), the lower end of which is pivoted on an arm 1334, pivoted on a stud 1335, carried by the key bank frame 200. When an amount key 152 or a check count key 151 is moved into depressed position, the arm 1334 is rocked by the control plate 1333 to present a blocking surface 1336 (Fig. 70) into the path of movement of a rod 1337. The rod 1337 is carried by a plurality of arms 1338, also secured to the shaft 1316. The rod 1337 is of sufficient length to span all of the arms 1334, one of which is provided for each bank of keys. The arm 1334, when moved into the path of movement of the rod 1337, prevents rocking movement of the shaft 1316 and therefore prevents rocking movement of the bifurcated arm 1317 and the driving arm 1324. Therefore, upon the rotation of the cam 610 and the rocking of the cam follower arm 613 thereby, the link 1328 rocks the arm 1324, but the pawl 1321 cannot carry the arm 1319 therewith, whereupon a cam edge on the free end of the pawl 1321 is cammed against the cam edge 1320, thus causing the pawl 1321 to rock out of the notch against the tension of its spring 1322. As the pawl 1321 is rocked out of engagement with the arm 1319, its cam edge moves into contact with the block 1339, carried by the auxiliary frame 1326. Since the arm 1324 cannot be rocked, the shaft 1316 cannot be rocked, and therefore the arm 1315 cannot release the switch-operating plunger 1332, with the result that the micro-switch contacts L1a1 are held in their closed position.

When the micro-switch contacts L1a1 remain in closed position during a balance pick-up operation, the machine release shaft 1169 for the machine will not be tripped, and a further cycling of the auxiliary cam shaft 428 will occur, during which operation of the cam shaft 428 the carriage is immediately brought back to its home position without any data from the ledger card having been entered into the accounting machine. When the cam follower arm 613 is restored to its home position, the link 1328 is rocked leftwardly (Fig. 68) to permit a spring 1340 to restore the arm 1324 to its home position, during which movement the pawl 1321 again drops into the notch of the member 1319 and in contact with the cam edge 1320.

It is well known, in machines of the type to which the present invention is shown applied, that the shaft 1316 is normally rocked by a total control plate to provide an interlock to prevent depression of amount keys when the total plate is in a total-taking position.

To provide for the control over the micro-switch contacts L1a1 independently of any movement of the total lever, the shaft 1316 does not extend the full width of the machine, as is the case in the machines of the prior art. In the present embodiment, a second shaft 1341 is provided, which is in axial alignment with the shaft 1316. The shaft 1341 is rocked by the usual total lever through a link 1342 in a manner well known in the art. The link 1342 is connected to an arm 1344, secured to the shaft 1341. Also secured to the shaft 1341 is an arm 1345 (Figs. 69 and 71), normally held in engagement with a stud 1346 of an arm 1347, secured to the shaft 1316.

When the total lever shifts the link 1342 and rocks the arm 1344, the shaft 1341 is rocked, and the arm 1345, engaging the stud 1346, rocks the arm 1347 to rock the shaft 1316 and move the rod 1337 into the path of the tails on the arms 1334. Therefore, when the total lever is in total-taking position, no amount key can be depressed. For a more detailed description of the interlock between the total key and the amount keys, reference may be had to the above-mentioned Spurlino et al. patent.

It is to be noted that the connection using the pin 1327 and the slot 1327a enables the arm 1319, the pawl 1321, and the arm 1324 to be rocked counter-clockwise when the shaft 1316 is rocked by the total lever, even though the link 1328 is held against movement at this time.

*Account number mechanism*

As mentioned earlier, mechanism is provided to enable account numbers to be recorded on the ledger cards and to enable the account number on a ledger card to be compared with an account number set up on the account number keyboard 112 to insure that the correct ledger card is being used when items are being posted to an account. This mechanism is shown in Figs. 1 and 86 to 95.

The account number keyboard 112, upon which a three-digit account number may be set, is shown in Figs. 1 and 87. This keyboard is mounted on the machine at the left of the amount and control keyboard by means of a bracket 1460 (Figs. 87 and 90), secured to a base plate of the account number keyboard and having a pair of downwardly-extending slotted ears 1461, which cooperate with studs 159 (Figs. 2 and 90) in a pair of upstanding arms 158 of a bracket 157, secured to the amount and control keyboard of the machine. An extension 1462, secured to the account number keyboard base plate, near its lower right-hand corner, supports the lower portion of this keyboard when the account number keyboard is in operating position, as shown in Fig. 1. The keys of the account number keyboard effect their control by the selective closing of circuits, and, accordingly, the account number keyboard is connected by a cable to the various parts of the machine which are controlled thereby.

The keyboard contains three rows of keys 1463, upon which an account number may be set for controlling the recording of the account number on the ledger card or for use in comparing the number of the account to which the entry pertains with the account number recorded on the ledger card; contains a push button 1464 for closing contacts K11a1, which cause the necessary controls to be set up to effect the recording of the account number on the ledger card; contains a signal light 1465, which is lighted when the push button 1464 has been operated, to indicate that the account number keyboard is being used to control the recording of an account number on a ledger card; and contains a further signal light, 1466, which is lighted to indicate that there is lack of agreement between the number set up on the account number keys and the account number read from the ledger card.

The keys of each row are provided with stems 1470 (Figs. 86, 88, and 89), which slide in grooves 1471 in a key-supporting block 1472, of insulating material, and are held in place in the grooves by a plate 1473 of a pair of cooperating contact-supporting plates 1473 and 1474.

Extending from one side of each key stem 1470 is a stud 1475, which cooperates with a spring 1476 in a socket 1477 in the block 1472 to urge the key to undepressed position and also cooperates with a pair of latching slides 1480 and 1481, which are slidably mounted in a recess 1482 in the block 1472 and are effective to latch a key depressed position and to release any previously-depressed key upon depression of another key in the row. Extending from the other side of the key stem is a contact-closing button 1483, of insulating material.

As shown in Fig. 88, the slides 1480 and 1481 are of the same shape, having slots 1484 at each end to receive the tie rods 1485 and 1486 and having alternating latching projections 1487 and camming projections 1488, but are reversed end for end when installed in the block 1472, so that one of the slides has its latching projections 1487 cooperating with the studs 1475 on odd-numbered keys, and has its camming projections 1488 cooperating with the studs 1475 on even-numbered keys, and the other of the slides has its latching projections 1487 cooperating with the studs 1475 on the even-numbered keys and has its camming projections 1488 cooperating with the studs 1475 on the odd-numbered keys. A spring 1489, connected between studs on the slides 1481 and 1482, urges the slides in opposite directions to maintain the latching and camming projections in engagement with the studs 1475 on the keys. Upon depression of a key (an odd-numbered key, for example), its stud 1475, engaging the latching projection 1487 of its related slide, will shift the slide and release any odd-numbered key which may have been latched in depressed position, and, at the same time, its stud 1475 will engage the camming projection 1488 on the other slide to release any even-numbered key which might have been latched in depressed position. Similarly, depression of any even-numbered key will cause any depressed key of the bank to be released. Simultaneous depression of both an odd-numbered key and an even-numbered key will release any previously depressed key and will prevent either of the keys from being latched, thereby clearing the bank of any setting of the keys.

The keys are held in the grooves 1471 in the block 1472 by the plate 1473 of a contact-supporting assembly consisting of the two plates 1473 and 1474 (Figs. 86, 88, and 89), of non-conducting material, which are bolted together by bolts as 1490, and held against the block 1472 by the tie rods 1485 and 1486.

Clamped between the plates 1473 and 1474 by the bolts 1490 is a common contact member 1491, formed with a finger 1492 opposite each of the key positions in the bank. The common contact member 1491 is clamped between the plates 1473 and 1474 at such an angle that the fingers 1492 (Fig. 86) lie in the path of movement of the contact-closing buttons 1483 on the keys, which buttons 1483 extend through slots 1493 in the plate 1473.

The plate 1474 has a plurality of individual contacts 1494 secured thereto at points opposite the fingers 1492 of the common contact member 1491, which individual contacts are separated by spacer projections 1495, which isolate the individual contacts and also support the lower edge of the plate when the contact-supporting assembly and the block 1472 are drawn together by the tie rods. The common contact member 1491 and the individual contacts 1494 are provided with connector lugs, to which connections can be made by wires in the cable which connects the account number keyboard to the apparatus which it controls.

As is most clearly shown in Fig. 86, depression of a key will cause the contact-closing button 1483 to move the finger 1492 down to shift the lower end of the finger to the left into engagement with its related contact 1494, which engagement will be maintained as long as the key remains latched in depressed position.

The tie rods 1485 and 1486 serve to clamp the blocks and contact-supporting assemblies for the three rows of keys together as a unit and also serve to secure them to supporting frames within the keyboard, as shown most clearly in Fig. 87.

The account number mechanism also includes three differential mechanisms, which are utilized to enable account numbers to be recorded on the ledger cards under control of the account number keyboard, and also to set switching means to enable account numbers which are read from the card to be compared with account numbers set on the account number keyboard. These differential mechanisms are similar, and, accordingly, the functioning of the three differential mechanisms will be clear from a description of one of them.

The account number differential mechanism, shown in Figs. 91 to 95 inclusive, is generally similar in operation to the auxiliary differential mechanisms, previously described, for controlling the amount, the check count, and the control row 2 differential mechanisms and is also similar to the line-finding auxiliary differential mechanisms, previously described, which are used to control the positioning of the ledger card carriage according to the number of the line recorded on the card.

An arm 1500 is pivoted on the shaft 369 and has a differential latch 1501 pivoted at its lower end. The latch 1501 has a stud 1502 (Figs. 91 and 95), which extends through a cam slot 1503, formed in a toothed segment 1504, also pivoted on the shaft 369. A spring 1505, connected between the arm 1500 and the segment 1504, normally causes the stud 1502 to occupy the left end of the cam slot 1503, in which position the stud 1502 is located in the path of movement of a driving surface 1506 on a driving member 1507, secured to the shaft 369. Counter-clockwise movement of the shaft 369 will impart similar movement to the driving member 1507, which will in turn drive the arm 1500 and the segment 1504 with it as long as the stud 1502 is opposite the driving surface 1506.

As in the case of the auxiliary differential mechanisms previously described, the differential setting of the differential mechanism is controlled by a pawl 1508, which is similar to the pawls 120 and which has a hooked end, is pivoted on a stud in the frame, lies in the same plane as the segment 1504, and is urged counter-clockwise by a spring 1509. Normally, the hooked end of the pawl 1508 will be retained out of engaging relation with the teeth on the segment 1504 by a solenoid 1510, which will thus retain the pawl until the solenoid is deenergized. When it is desired to arrest the differential mechanism, the solenoid will be deenergized in response to a signal from the ledger card or from the account number keyboard 112, allowing the pawl 1508 to rock counter-clockwise, causing the hook on the pawl 1508 to engage the appropriate tooth on the segment 1504 and thereby prevent further counter-clockwise movement of the segment. Continued movement of the differential latch 1501 at this time causes the stud 1502 to be moved to the right-hand end of the cam slot 1503. The cam slot 1503 is so shaped that, as the stud 1502 moves to the right in the slot, the stud will be cammed outwardly, out of engagement with the driving surface 1506 on the driving member 1507 and into one of the locking notches on a locking plate 1515. Continued movement of the driving member 1507 will move a locking surface above the stud 1502 to maintain the stud 1502 in the notch in the plate 1515 to lock the differential latch 1501 and the arm 1500 in set position. The differential mechanism may be thus set in any of the positions 0, 1, 2, 3, 4, 5, 6, 7, 8, and 9, in that order, in its counter-clockwise movement. In the return movement of the driving member 1507, a stud 1516 (Fig. 92) thereon will engage a surface on the differential latch 1501 to return the latch clockwise, initial movement of the latch 1501 causing the stud 1502 to be cammed out of engagement with the notches in the plate 1515. The camming of the stud 1502 out of the notches in the plate 1515 will move the stud inwardly and allow the spring 1505 to move the segment 1504 and the arm 1500 until the stud 1502 again is in the left end of the slot 1503. Continued clockwise movement of the latch 1501 will shift the arm 1500 and the segment 1504 to their home positions. Return movement of the segment 1504 will cause the hooked end of the pawl to be cammed away from the segment far enough to be attracted by the solenoid 1510, which will have been energized at this time.

The pawls 1508 associated with the account number differential mechanisms have extensions 1517, of insulating material, which engage related ones of the contacts L13b1 to 20 in the pawl-checking circuit to hold these contacts open as long as the pawl 1508 is held by the solenoid 1510 but allow them to close when the pawl has been released and is in engagement with one of the teeth on the segment.

Figure 93:
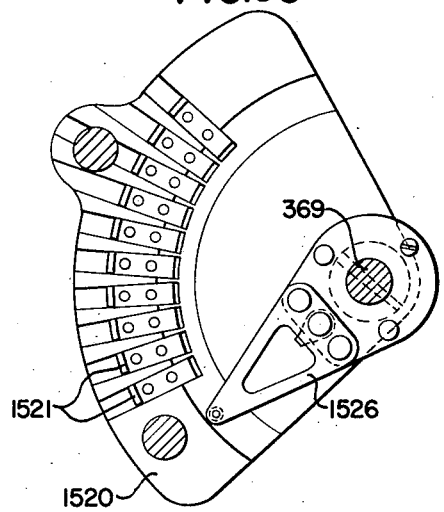
Fig. 93 is a view of the switching means associated with this differential mechanism as seen from the left of Fig. 92.
Figure 94:
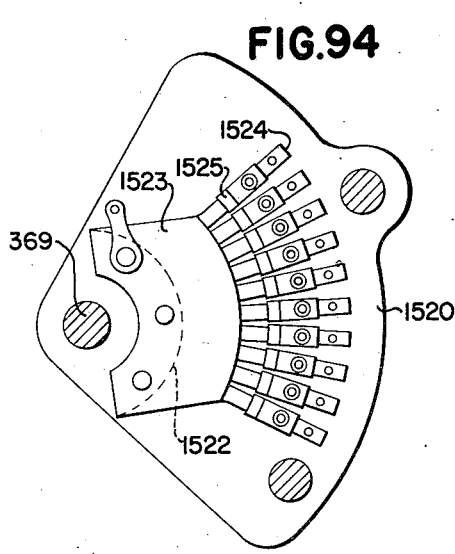
Fig. 94 is a view of further switching means associated with the differential mechanism as seen from the right of Fig. 92.
Figure 95:
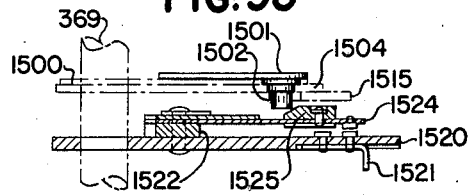
Fig. 95 is a section through a portion of the differential mechanism of Figs. 91 and 92, showing the relation between the switching means of Figs. 93 and 94.

Associated with each account number differential mechanism is a contact plate 1520, which has secured thereon ten contacts 1521, equally spaced to correspond to the ten digit positions of the differential mechanism. These contacts are connected to corresponding contacts 1494 in one of the banks of keys in the account number keyboard. As shown in Figs. 93, 94, and 95, the contacts 1521 extend through the plate 1520, so that they may be engaged by other contacting members on opposite sides of the plate 1520. Mounted on one side of the plate 1520 (Figs. 92, 94, and 95), and spaced therefrom by a spacer 1522, is a contact comb 1523, having ten fingers 1524 positioned opposite the contacts 1521. Each finger 1524 carries a cam member 1525, which is so located on the finger 1524 and with relation to the stud 1502 on the differential latch 1501 that the stud 1502, upon being shifted into engagement with the locking notches in the plate 1515, will cam the finger 1524 into engagement with its corresponding contact on the contact plate 1520 to set up a circuit for comparing an account number which is read from the card with an account number set up on the account number keyboard. Mounted on the other side of the contact plate 1520 is a wiper 1526, which is electrically connected to the contact comb 1523 and is arranged to wipe over the contacts 1521 on the plate as the differential mechanism is operated. This wiper 1526 is pinned to the shaft 369 in such a relation to the driving member 1507 that, as the wiper 1526 engages the contacts 1521 on the plate 1520 one after another, a circuit completed over any contact 1521 will cause the differential mechanism to be arrested in the position corresponding to that contact. This control is used to set the account number differential mechanisms according to numbers set up on the account number keyboard 112. The manner in which the account number comparison and the setting of the differential mechanism under control of the keyboard are effected will be explained more fully when the circuit diagrams are described.

In addition to controlling the closure of contacts to enable account number comparison to be effected, each account number differential mechanism also controls the setting of a check-back and recording control plate 1530 (Fig. 91), which is used to control the check-back circuit for checking the correctness of the setting of the differential mechanism with the account number recorded on the ledger card and also is used to control the recording of the account number on the ledger card in a data-recording operation. Connected to the arm 1500 by a sleeve is an arm 1531, which has its free end pivotally connected to the lower end of a link 1532. The upper end of the link 1532 is connected to one end of a lever 1533, pivoted on the shaft 398, the other end of which lever carries a stud 1534, which can cooperate with the plate 1530. As the differential mechanism is operated, the stud 1534 will be moved counter-clockwise from the position shown in Fig. 91 and will be stopped in a position corresponding to the setting of the differential mechanism.

The control plate 1530 is pivotally mounted on the shaft 398 and is urged clockwise about the shaft 398 by a spring 1535 until a stud 1536, on the plate 1530, engages the under side of a comb plate 1537 to locate the plate in its zero position. As the stud 1534 on the lever 1533 is moved counter-clockwise, it will pick up the control plate 1530 and move the plate to a position corresponding to the setting of the differential mechanism.

The control plate 1530 is provided with a control surface similar to the control surface for the plates 123 for controlling the contact assembly 124, which is used in check-back and recording controls, and also is provided with a series of locking and aligning teeth 1538, which cooperate with an aligner bar 1539. The aligner bar 1539 extends across the three account number differential mechanisms and is supported by arms 1540 (only one of which is shown) connected by a sleeve and loose on the shaft 309, to which the aligners 308 for the other control plates are secured. Yieldable operating means for the aligner includes an arm 1541, which is yieldably connected to the arm 1540 by a spring 1542, which urges the arm 1540 into engagement with a stud 1543 on the arm 1541, said arm 1541 being connected by a sleeve to a driving arm 1544, which is connected by a link 1545 to one arm of a bell crank 1546, pivoted on a stud 1547 in the framework and having a cam follower 1548 on its other arm cooperating with a cam 1549 on the auxiliary cam shaft 428. The cam 1549 is so shaped that the aligner 1539 will be disengaged from the teeth in the control plates 1530 after about fifteen degrees of rotation of the cam shaft 428, to enable the control plates to be set by the operation of the differential mechanism, and will be returned to locking and aligning position at about 180 degrees to lock the control plates in position to control the check-back and recording circuits.

In recording operations, it is desired that the control plates 1530 which have been set in a previous operation be retained in position and not be released, as in balance pick-up or setting operations. An arm 1550, connected by a sleeve 1551 to the bell crank 1546, is connected to the armature 1552 of an aligner control solenoid S7. When the solenoid S7 is energized, it will hold the bell crank 1546 against movement and will not allow the cam follower 1548 to follow the cam 1549, thereby preventing the aligner from being withdrawn to release the control plates 1530 and maintaining the setting so that it can be used to control the recording of the account number on the ledger card. The circuit for energizing the solenoid S7 and the circumstances under which it is used will be explained more full when the circuit diagram is explained.

The account-number-comparing mechanism can be used to provide a stop-payment control feature. Whenever it is desired to place a stop-payment control on an account, a special control number, such as 000 or some other number which is never used as an account number, is recorded on the ledger card 115 under control of the keys 1463 of the account number keyboard 112. Then, in subsequent operations of posting to the account, when the account number is set up on the keyboard and compared with the number on the ledger card, there will be a lack of agreement, since the number on the card is the control number and not the true account number. This will prevent any data from being entered into the machine and will immediately cause the card to be fed from the machine, and also the lamp 1466 (Fig. 87) will be lighted, thereby signaling to the operator that either an error in account number comparison or a stop-payment condition is present. The operator can then check to determine whether a stop-payment order has been placed against the account.

*Function control means*

As indicated previously, means are provided to control the various control circuits of the machine to enable the machine to perform different types of operations involving the reading of data from the ledger card and the magnetic recording of data on the card.

This means is shown in Figs. 1, 96, and 97 and includes the rotatable setting knob 127, which is located on the right side of the machine near its rear. The knob 127 is secured to a short shaft 1555, journaled for rotation in a side frame 1556 and a plate 1557, secured in spaced relation to the frame 1556. The reduced inner end 1558 of the shaft 1555 is slotted to engage the rotor shaft 1559 of a multi-level wafer switch 1560, only three levels of which are shown in Fig. 97. The shaft 1555 has a retaining clip 1561 mounted thereon, which cooperates with the plate 1557 to maintain the shaft in engagement with the rotor shaft 1559. The levels of the wafer switch are so wired that the necessary contacts will be opened and closed in the control circuits in different positions of the knob 127 to enable the required controls to be obtained, as will be explained more fully when the circuits are described.

In the instant embodiment, the knob 127 is arranged to be settable to any of four positions to control the machine to perform the following types of operations: "Install," "Posting," "Transfer," and "Trial Balance."

When the knob is in "Install" position, the machine is controlled to magnetically record data on the ledger card under control of the keyboard. In this type of operation, the reading and certain of the checking circuits are disabled.

With the knob 127 set in "Posting" position, the position shown in Fig. 96, the machine is controlled to pick up the old balance and related data from the ledger card and to record the new balance thereon magnetically in a new balance operation after checks or deposits have been entered into the machine via the keyboard.

When it is desired to transfer the data for an account from one ledger card to another, as when carrying forward balances or preparing new ledger cards at the end of the month, the knob 127 can be set to its "Transfer" position to control the circuits so that the account number and the balance can be read from the old card and stored in the machine, without carrying forward the check count and the line number, the old card can then be removed from the machine and a new card placed in the machine, and thereafter, in a New Balance operation, the account number and the balance can be recorded on the new card along with zeros for the check count and line "one" for controlling the automatic line-finding mechanism.

Finally, with the knob 127 in its "Trial Balance" position, the machine can be controlled to read cards and enter the balance and the check count in the machine and immediately feed the card back to starting position without any erasing or recording operation, whereby to enable a total of the balances to be obtained without affecting the data stored on the cards.

The shaft 1555 has mounted thereon a plate 1565, which is formed with a series of shallow detent notches 1566. A lever 1567 is pivoted on the frame 1556 and is urged by a spring 1568 to maintain a stud 1569 on the lever 1567 in cooperation with the detent notches 1566 to locate the knob in any of its several control positions.

The plate 1565 is also provided with a series of deeper notches 1570, into which a stud 1571 on a lever 1572 may enter to lock the shaft 1555 against accidental movement. The lever 1572 is pivoted on a stud 1573 on the frame 1556 and is urged clockwise by a spring 1574 to maintain the stud 1571 in the locking notches 1570 in the plate. The lever 1572 can be rocked counter-clockwise to move the stud 1571 out of the notches 1570 when it is desired to change the setting of the function control means. In order to accomplish this, the lever 1572 is provided with an upwardly-extending arm 1575 (Fig. 96), having therein a stud 1576, which lies in a notch 1577 near the rear end of a link 1578. The forward end of the link 1578 is pivotally connected to an arm 1579, secured to a stub shaft 1580, journaled in a supporting frame member. Also secured to the stub shaft 1580 is the usual key release lever 1585, which carries the usual key release knob 1586 (Fig. 1) at its outer end. When the lever 1585 is rocked counter-clockwise in the usual manner to release any keys which may be depressed, it will rock the shaft 1580 and the arm 1579 to move the link 1578 to the left. The leftward movement of the link 1578 rocks the lever 1572 to release the shaft 1555 for movement to change the setting of the function control means. A spring 1587 normally urges the rear end of the link upwardly to maintain the notch 1577 in engagement with the stud 1576.

Secured to the arm 1579 by spacing studs 1589 (only one of which is shown) is a cam 1590, of insulating material, which cooperates with contacts K1b1, mounted on the frame member, to open the contacts each time the key release lever 1585 is rocked counter-clockwise. The manner in which contacts K1b1 effect this control will be explained when the control circuit is described.

*Reading erasing and recording means*

In the instant embodiment, twenty magnetic heads 114 are provided, one for each channel on the ledger card, and each of these heads is controlled to operate as a reading head, an erasing head, or a recording head, as required in the pick-up and recording operations of the machine.

As shown in Figs. 98, 99, 100, and 102, each head 114 has a magnetic path, which is made up of two similar legs 1600, of mu-metal. These legs 1600 make contact at a point remote from the card and are separated by a thin shim 1601, of non-magnetic material, to form an air-gap at a point adjacent the card. A coil 1602, for generating a signal when data is read or for magnetizing the head in erasing and recording operations, is wound on one of the legs 1600. As is clear from Figs. 98, 99, and 100, the legs 1600 are so shaped that the air-gap is offset, front to rear, of the head, and this enables the heads to be arranged with their air-gaps aligned as along the line 1603 of Fig. 99 but with their coils 1602 on opposite sides of the aligned gaps, so that the heads may be positioned close together.

The heads 114 are mounted in pairs on a common non-magnetic supporting member 1604, being clamped thereto by plates 1605 and 1606 (Fig. 99), which are secured to the supporting member 1604 by screws.

The ten pairs of heads are mounted in proper spaced relation in two groups in the unit 503 (Figs. 4, 50, 98, and 102), which may be readily inserted into and removed from the machine.

The unit 503 includes two side frames, 1610 and 1611, which are connected together by a head-supporting bar 1612, a head-clamping bar 1613, and various cross brackets or plates, as 1614 and 1615, which support the first stage or pre-amplifier tubes 115 and circuit components, respectively. The side frames 1610 and 1611 are formed with upper and lower guide slots 1617 and 1618 (see also Fig. 50), which cooperate with studs 1619 and 1620 in printer side frames 1621 and 1622 to enable the unit 503 to be mounted in the machine just in front of the ledger card printing means, as is most clearly shown in Figs. 4 and 50. Adjustable guides 1623 and 1624 in the printer side frames 1621 and 1622, respectively, enable the unit 503 to be accurately aligned, so that the heads will be opposite their respective channels on the ledger card. The unit is held in place on the studs 1619 and 1620 by means of a pair of clamping bolts 1625, which extend through a lower front cover or shield 1626 and screw into brackets 1627, secured to the side frames 1621 and 1622.

The heads are secured in place in the unit by having the lower portions of their supporting members 1604 clamped against the head-supporting bar 1612. The lower portions of the supporting member fit into slots 1630 in the supporting bar 1612 and have slanting surfaces 1631 and 1632, which cooperate, respectively, with corresponding surfaces on the clamping bar 1613 and clamping screws 1633, which work in threaded openings in a plate 1634, secured to the supporting bar 1612. There is one of the clamping screws 1633 for each supporting member 1604, and, as the screw 1633 is tightened, its bevelled end cooperates with the surface 1632 on the supporting member 1604 to force the member against the supporting bar 1612 and the clamping bar 1613 and clamp the member in position in the unit.

The upper ends of the heads extend through openings, as 1640 (Fig. 99), in a plate 1641, of non-magnetic material, which is secured to four upright blocks 1642, three of which are shown in Fig. 102, which blocks are secured to the bar 1612. The plate 1641 is formed with two guiding surfaces 1643 and 1644 at each opening to engage opposite sides of the supporting member 1604 and provide lateral support therefor.

A back cover plate 1645 for the unit is secured to the bar 1613 and carries a series of U-shaped shielding members 1646, of magnetic material. A front plate 1647 for each group of heads is secured to a pair of the upright blocks 1642 and carries a corresponding series of U-shaped shielding members 1648, of magnetic material. The U-shaped shielding members 1646 and 1648 cooperate to provide magnetic shielding between adjacent pairs of heads.

The ledger card 109 is forced to pass over the reading gaps of the heads 114 by means of a guide bar 1650 (Figs. 98 and 101), which is pivotally supported on studs 1651 in the side frames 1610 and 1611. The under surface of the guide bar 1650 slopes downwardly toward the magnetic heads to form a throat for guiding the ledger cards to the magnetic heads and at its lower rear portion is cut away to provide a series of downward projections 1652 (Fig. 102) between the pairs of heads to force the card into very close proximity to the heads.

The side frames 1610 and 1611 are notched at their rear upper edges to receive extensions 1653 of the guide bar 1650. A pair of adjusting screws 1654 and 1655 cooperate with the notched portion of the side frames to control the pivotal movement of the guide bar about its pivots to enable the opening in the throat at the reading point to be accurately adjusted.

It is to be noted from Fig. 98 that the table 500, the plate 1641, and the side guide pieces 501 and the guide bar 1650 cooperate to support and guide the ledger cards in their movement past the heads in reading, erasing, and recording operations.

An upper cover plate 1656 is removably secured to the side frames 1610 and 1611 of the unit to permit access to the tubes if desired.

The plate 1647 also serves as a support for a capacitor 1657, which is carried by the unit.

The unit is provided with a series of contacts 1660 (Fig. 98), which are mounted in a plate 1661, secured to the clamping bar 1613. These contacts 1660, which extend across the back of the unit, make sliding contact with a corresponding series of contacts 1662, carried by a cross bar 1663 in the printer section of the machine, and enable circuit connections to be established between the various means in the unit and other parts of the machine when the unit has been inserted into the machine.

The unit 503 is provided with a further series of contact elements 1664, one for each head, which will be opposite contact blades 1665, carried by the machine, when the unit is in place. The contact elements 1664 and the contact blades 1665 cooperate to form sets of contacts L12ac1 to 20. These sets of contacts are normally in their open condition but can be closed when the blades 1665 are moved into engagement with contact elements 1664 by a non-conducting block 1666 (Figs. 50 and 98) on the shaft 1667 when the shaft 1667 is rocked counter-clockwise. The shaft 1667 is rocked counter-clockwise in recording operations by means of an arm 1668 on the shaft 1667. The arm 1668 is bifurcated to receive a stud 1669 in an extension 1670, secured to the front end of a link 1671 (Fig. 50), slidably mounted on studs 1672 and 1673 and normally urged toward the left, as viewed in Fig. 50, by a spring 1674. A coupling latch 1675, pivoted on the rear end of the link 1671, has a notch 1676, which normally engages a stud 1677 near the lower end of a lever 1678, pivoted at an intermediate point on a plate 1679 and having a cam follower 1680 near its upper end, which cooperates with a cam 1681 on the auxiliary cam shaft 428. While the coupling latch 1675 engages the stud 1677, the spring 1674 will maintain the cam follower in engagement with the cam 1681. The cam 1681 is so shaped that it will rock the lever 1678 at about ten degrees of the rotation of the shaft 428 and will cause the link to be shifted to the right to rock the shaft 1667 counter-clockwise to cause the sets of contacts L12ac1 to 20 to close and will maintain the contacts in closed condition until about 350 degrees of rotation of the shaft 428.

It will be recalled that, in balance pick-up operations, the shaft 455 will be rocked clockwise (Fig. 50) as an incident to the initiation of the balance pick-up operation. Pinned to the shaft 455 in an arm 1685, to which is pivoted the upper end of a link 1686, the lower end of which is slotted at 1687 to receive a stud 1688 on the coupling latch 1675. A spring 1689, connected to the stud 1688 on the latch and to a stud 1690 on the link 1686, normally urges the stud 1688 to the upper end of the slot 1687 and urges the notch 1676 in the latch 1675 into engagement with the stud 1677 on the lever 1678 to normally connect the link 1671 to the lever 1678 for operation thereby. As the shaft 455 rocks clockwise, it will cause the link 1686 to be lowered to rock the coupling latch 1675 to move the notch 1676 away from the stud 1677 and thereby uncouple the link 1671 from the lever 1678 and prevent the operation of the link 1671 from rocking the shaft 1667 in balance pick-up operations. When the coupling latch 1675 has been shifted to uncouple the link 1671 from its driving means, a light spring 1691, connected between the lever 1678 and the latch 1675, will urge the lever 1678 clockwise to maintain the cam follower 1680 in engagement with the cam 1681.

The manner in which the contacts effect their control over the heads in reading, erasing, and recording operations will be explained hereinafter.

*Card-reading circuit*

Figure 104:
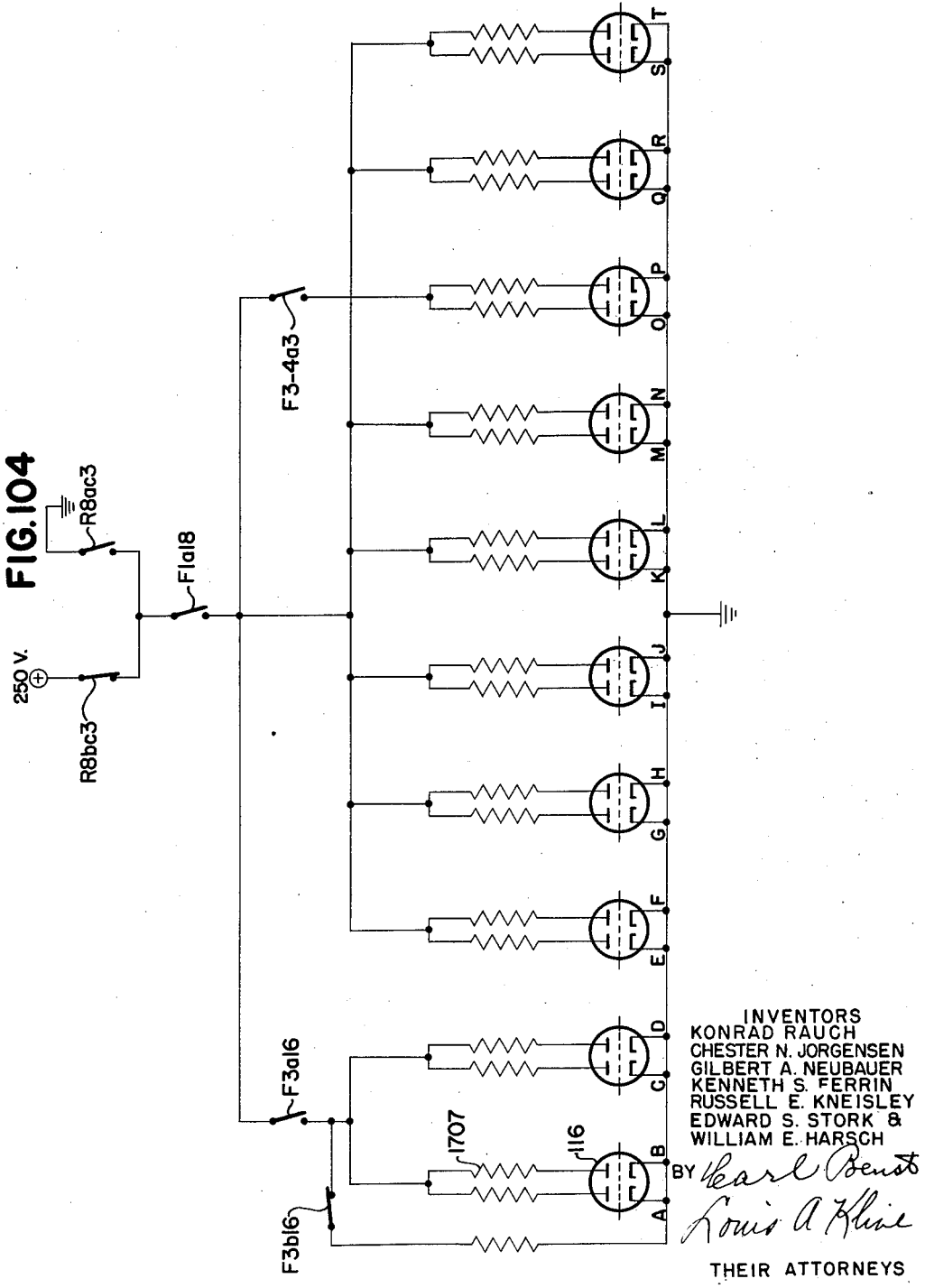
Fig. 104 is a circuit diagram showing the anode potential supply circuits for the second amplifier tubes of Fig. 103.
Figure 105:
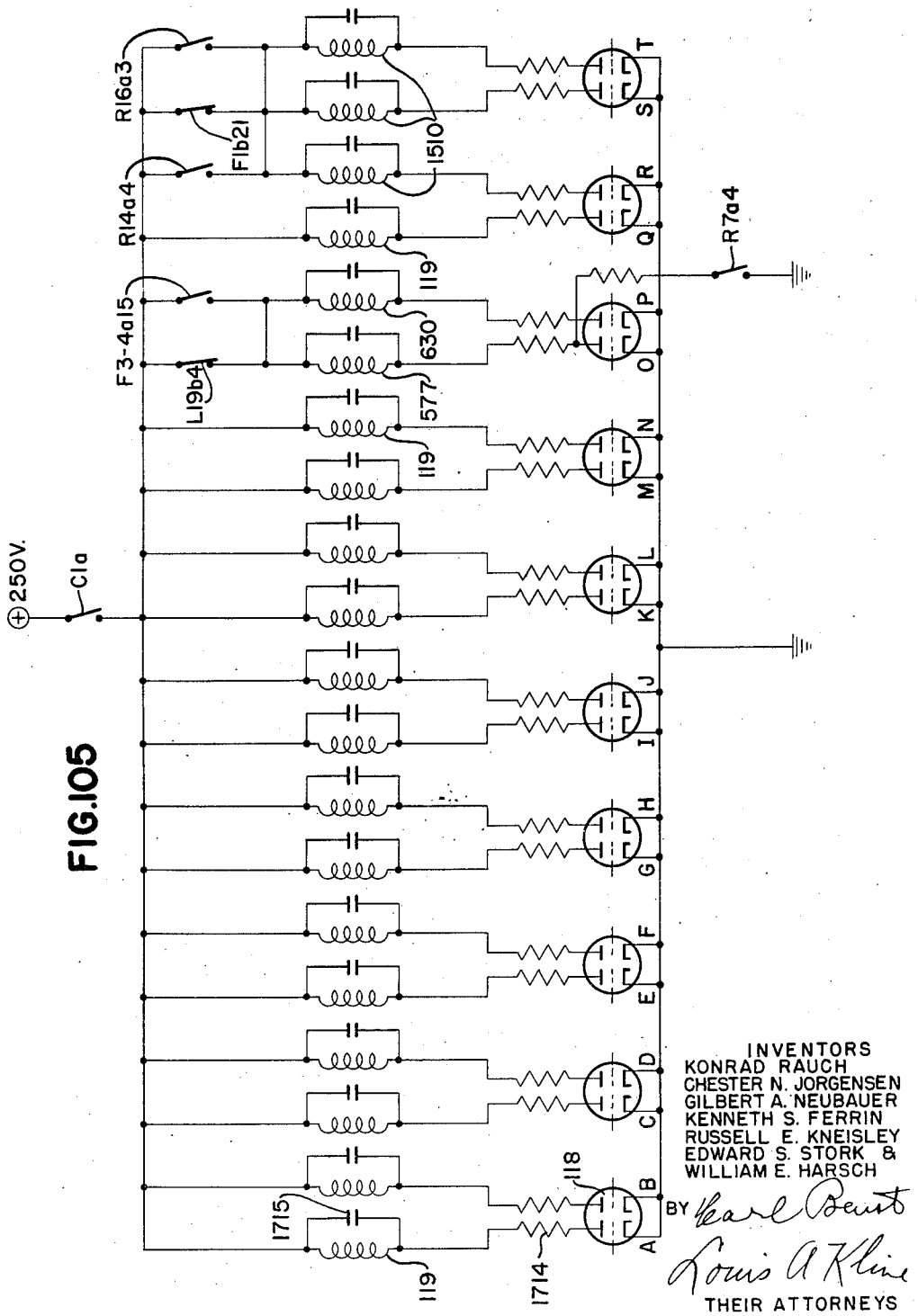
Fig. 105 is a circuit diagram showing the anode potential supply circuits for the auxiliary differential control tubes.

Since the card-reading circuits for reading the various ones of the twenty channels on the ledger card and controlling the solenoids 119, 577, 630, and 1510 to release the pawls of the related auxiliary differential mechanisms are substantially the same, it is believed that their operation will be clear from a description of a representative circuit; for example, a circuit for reading one of the amount or check count columns on the card, as shown in Figs. 103, 104, and 105.

The reading circuit has two modes of operation, one when reading the card during an in-sweep of the carriage 111 to control the setting of the auxiliary differential mechanisms, and the other when reading the card during the return movement of the card to starting position, to control the check-back circuit. The operation of the circuit as it reads data on the in-sweep of the card will be considered first.

The polarity of the magnetization of the channel and the winding of the coil 1602 are such that a negative pulse of about .07 volt is generated in the coil 1602 at the data-representing point when passing from the polarity indicated by the area 134 (Fig. 3B) to the polarity indicated by the area 135 during the in-sweep of the card past the heads.

The reading head 114 has one side of its coil 1602 connected to ground and has the other side of its coil connected over point 1700 and resistor 1701, of 100,000 ohms, to the grid of the pre-amplifier or first amplifier tube 115, which is half of a 12AX7 type of tube and which is located within the unit 503. The tube has its cathode connected to a source of +1.2 volts and has its anode connected over point 1702 and 470,000-ohm resistor 1703 to a +250-volt anode potential supply. This tube is normally conducting to such an extent that it can be controlled by both negative and positive signals from the head 114 to amplify these signals.

Point 1702 in the anode circuit of tube 115 is coupled over a .03-microfarad capacitor 1704 to the grid of the second amplifier tube 116, which is half of a 6SL7 type of tube. The grid of tube 116 is supplied with a −3-volt bias by being connected over a one-megohm resistor 1705 and contacts R17bc2, which are closed during the in-sweep of the card, to a −3-volt bias potential supply. The cathode of tube 116 is grounded, and the anode of tube 116 is connected over point 1706 and 270,000-ohm resistor 1707 to a +250-volt anode potential supply, which is shown fully in Fig. 104 and will be explained hereinafter. With this bias, tube 116 will be cut off.

Point 1706 in the anode circuit of tube 116 is coupled over a .03-microfarad capacitor 1708 and point 1709 to the cathode of the diode 117, which is half of a 6H6 type of tube. The cathode is also connected over a one-megohm resistor 1710 to a +34-volt source of potential. The anode of the diode 117 is connected over a 4.7-megohm resistor 1711 and .005-microfarad capacitor 1712, in parallel to ground. With these potentials applied to the anode and cathode of the diode, the diode will be normally non-conducting.

Point 1713 in the anode circuit for the diode 117 is connected over to the grid of the control tube 118, which is half of a 6SN7 type of tube and applies ground potential to the grid. Tube 118 has its cathode grounded and has its anode connected over a 4,700-ohm resistor 1714 and the solenoid 119 to a source of +250-volt anode supply. This anode supply circuit, which is shown in Fig. 105, varies for the different control tubes for the various channels in different types of operations and will be explained more fully hereinafter. A .002-microfarad capacitor 1715 is connected across the solenoid 119 to prevent a high voltage surge when the solenoid is deenergized.

The tube 118 is normally conducting and will maintain the solenoid 119 energized to hold the pawl 120 out of engagement with the teeth in the segment 373 of the auxiliary differential mechanism.

The operation of the circuit is as follows:

As the card is being fed past the head 114 during the in-sweep of the card, a negative pulse of about .07 volt will be generated in the head when the polarity of the magnetization in the channel changes. This pulse will be amplified and inverted by tube 115 to produce a +3-volt pulse at point 1702 in its anode circuit. The +3-volt pulse at point 1702 is applied over capacitor 1704 to the grid of the tube 116, causing the tube 116 to conduct heavily and produce a −100-volt pulse at point 1706 in the anode circuit of the tube 116.

The −100-volt pulse at point 1706 is applied over the capacitor 1708 and point 1709 to the cathode of the diode 117, which cathode is at +34 volts. As long as the cathode of the diode 117 is at +34 volts and the anode is at ground potential, there will be no conduction in the diode, and the grid of the control tube 118 will remain at substantially ground potential, allowing tube 118 to conduct. When the −100-volt pulse is applied to the cathode of diode 117, it will cause the diode to conduct and apply a negative impulse to the grid of control tube 118, causing the control tube 118 to be cut off and thereby deenergize the solenoid 119. The combination of the resistor 1711 and the capacitor 1712 allows the negative pulse to be applied quickly to the control tube and enable its effect to be maintained for a sufficient time to insure that the solenoid 119 is deenergized and the pawl 120 is completely released before the tube 118 resumes conduction.

The operation of the circuit as it reads the data on the card during the return sweep of the card will now be explained.

Near the end of the in-sweep movement of the card, and after the data has been read therefrom, the relay R17 will be energized and will remain energized until near the end of the return movement of the card. The energization of relay R17 will open contacts R17bc2 to remove the −3-volt bias from the grid of the second amplifier tube 116 and will close contacts R17ac2 to connect the grid to ground, thereby making tube 116 normally conducting.

During the return movement of the card 109 past the heads 114, at the data-representing point, where the polarity of magnetization is reversed and changes from that represented by the area 135 (Fig. 3B) to that represented by the area 134, a positive pulse of about .07 volt will be generated in the winding 1602 and will be applied to the grid of the pre-amplifier or first amplifier tube 115, which will amplify and invert the impulse and produce a −3-volt impulse at point 1702. The negative pulse at point 1702 is applied to the grid of the second amplifier tube 116, which is conducting, and will reduce conduction in the tube to produce a +100-volt impulse at point 1706. This positive impulse is applied over the capacitor to point 1709 and the cathode of the diode 117, which is at +34 volts. Since the anode of the diode is at ground potential and the cathode is already at +34 volts, the positive impulse will not cause conduction in the diode and consequently will have no effect on control tube 118 or the solenoids 119, controlled thereby.

The positive impulse which is applied to point 1709 is used in the check-back operation, which will be described hereinafter.

The anode potential supply for the second amplifier tubes 116 is shown in Fig. 104, in which figure the letters below the right and left portions of the tubes indicate the channels on the record card with which they are associated.

The +250-volt anode potential is supplied over contacts R8bc3 and contacts F1a18, F3a16, and F3–4a3 to the various tubes. Contacts R8bc3 in this circuit are normally closed but are opened, when relay R8 is energized in data-recording operations, to prevent any operation of tubes 116 and thereby prevent any signals from the heads 114 from affecting the control tubes 118 or the check-back circuit. In order to insure that the tubes 116 do not operate at this time, contacts R8ac3 are closed by relay R8 to connect the anodes to ground when contacts R18bc3 open to remove +250-volt anode potential from the tubes.

Contacts F1a18 are controlled by the function control mechanism and are open in the "Install" position of knob 127 and closed in all other positions of the knob. These contacts interrupt the anode potential supply for tubes 116 in Install operations to prevent any signals which are generated in the heads from affecting the control tubes 118 or the check-back circuit.

Contacts F3a16 and F3b16 are associated with the anode potential supply for the amplifier tubes related to the check count channels on the card. Contacts F3a16 are opened in the "Transfer" position of the knob and are closed in all other positions of the knob. This means that the anode potential supply for the amplifiers 116 related to the check count will be interrupted to prevent the reading of the check count from the card in "Transfer" operations, thereby to prevent the carrying forward of the check count when the balance is transferred to the new ledger card. The contacts F3a16 are closed in other positions of the knob to allow the check count to be read in "Posting" and "Trial Balance" operations. In order to insure that the check count tubes 116 are disabled, contacts F3b16, which are opened in all types of operations except "Transfer," are closed to connect the anodes of these tubes to ground in Transfer operations when contacts F3a16 have been opened.

Contacts F3–4a3 are in the anode circuit for the amplifier tubes 116 related to channels "O" and "P," in which the two digits of the line number are recorded. Contacts F3–4a3 are opened in "Transfer" and "Trial Balance" operations to prevent the check-back circuit from being effective in these operations. These contacts will be closed in the other positions of the knob 127 and will enable the line number data to be utilized in "Posting" operations.

The anode potential supply for the control tubes 118 will now be explained with reference to Fig. 105.

An anode potential of +250 volts is supplied to the tubes over a cam-controlled contact C1a, which is controlled by a cam on the auxiliary cam shaft 428 and is closed from 5 degrees through 355 degrees of operation of the shaft. This contact insures that current will pass through the solenoids 119, 577, 630, and 1510 only during the time they may be called upon to exert their control, thereby prolonging the life of the tubes and reduce power consumption.

The anode potential supply for tubes 118 related to the line number channels "O" and "P" is further controlled by contacts L19b4, which are opened when the shaft 455 is rocked in the initiation of a balance pick-up operation, as previously explained, and by contacts F3–4a15, which are closed in "Install" and "Posting" operations and are opened in "Transfer" and "Trial Balance" operations to prevent line number data, as read from the card, from being entered into the machine. Tube 118 related to the units order line number, channel "O," also has a connection from its anode to ground over contacts R7a4, which are closed in new balance operations. This insures that the solenoid 577 will be kept energized, so that its related auxiliary differential mechanism can be set under control of the stop arm 304 according to the units digit of the line number on which the balance was printed in the new balance operation.

The anode potential supply for the tubes 118 related to the account number differential mechanisms is further controlled by contacts R14a4, F1b21, and R16a3. Contacts R14a4 are closed in balance pick-up operations and enable the account number differential mechanisms to be set according to the account number on the card, so that the account number on the card can be compared with the account number keyboard 112. Contacts R16a3 are closed in response to an operation of the push button 1464 when it is desired to record an account number on a card 109 under control of the keyboard 112. Contacts F1b21 are controlled by the function control mechanism and are closed in "Install" position of the knob 127 and open in "Posting," "Transfer," and "Trial Balance" operations.

Thus, by controlling the anode potential supply for the second amplifier tubes 116 and the control tubes 118, the effectiveness of the reading circuits can be controlled as required in the different types of operations.

*Pawl check circuit*

As explained earlier herein, a pawl check circuit is provided to be controlled by the pawls 120 (Fig. 6), 578 (Fig. 33), 631 (Fig. 38), and 1508 (Fig. 91) to signal if any pawl has not been released by its related solenoid in a data-reading operation, thereby indicating that data has not been picked up from that channel. The pawls have extensions, as 362 (Fig. 6), of nonconducting material, which engage their related ones of twenty contacts L13b1 to 20 and hold the contacts open as long as the pawls are held by the solenoids. As shown in Fig. 106, the contacts L13b1 to L13b20 are connected in series in an energizing circuit for relay R9, which circuit also includes contacts R15a2, which are closed by the energization of relay R15 of the account number comparing circuit when the read number agrees with that set up on the account number keyboard 112. Accordingly, if the account numbers do not agree, or if any pawl has not been released from its solenoid, the energizing circuit to relay R9 will not be completed, and relay R9 will not be energized. As will be explained fully when the control circuits are described, the de-energized condition of relay R9 sets up controls for causing a "short cycle" operation of the card carriage to feed the card back to starting position immediately without entering any data into the machine.

It will be recalled that in "Transfer" operations the contacts F3a16 and F3b16 render the second amplifier tubes in the check count reading circuits inoperative, so that the machine will not be controlled to enter the read data therein, thereby to control the machine to enter zeros in the check count portion of the machine, so that the check count will not be carried forward to the new ledger card. If these amplifiers are inoperative, then the pawls 120 for the check count auxiliary differential mechanisms will not be released to close their contacts L13b1 to L13b4. In order to prevent the pawl check circuit from causing a "short cycle" due to the failure of the pawls 120 for the check count auxiliary differential mechanisms to close their contacts L13b1 to L13b4, a by-pass circuit is closed by contacts F3b1 in "Transfer" operations to shunt out these contacts. This allows the remaining contacts L13b5 to L13b20 and R15a2 to control the pawl check circuit in the usual manner in "Transfer" operations. Contacts F3b1 are closed by the function control mechanism to by-pass contacts L13b1 to L13b4 only when the knob 127 is in "Transfer" position; in "Install," "Posting," and "Trial Balance" positions of the knob 127, the contacts F3b1 are open, and contacts L13b1 to L13b4 can exert their normal control in the pawl check circuit.

*Check-back circuit*

It will be recalled that check-back means is provided to check the entries made into the machine under control of the ledger card against the actual data which is recorded on the card. This will check the operation of the machine and also will check to be sure that only one data-representing condition exists in each channel.

As explained earlier, the differential mechanism of the accounting machine set check-back and recording control plates 123 according to the entries made into the machine, the auxiliary differential mechanisms for controlling the line-finding means set the plates 591 and 669 according to the line number read from the card, and the account number differential mechanisms set the plates 1530 according to the account number read from the ledger card. The setting of these plates involves the positioning of the plates about the shaft 398, so that the rise portion between the small diameter, as at 310 (Fig. 6), and the larger diameter, as at 311 of each plate, occupies a position about the shaft 398 corresponding to the digit setting of the plate.

As explained earlier, the groups of contacts 124, one group for each plate, are mounted on a bracket 397 (Fig. 8), which is pivoted on the shaft 398 and is connected by links 396 to arms 395, secured to the drive shaft 369, which drives the auxiliary differential mechanisms in synchronism with the carriage movement. The bracket 397, which normally occupies the position shown in Figs. 6 and 8, is moved counter-clockwise about the shaft 398 to the position shown in Fig. 5 during the counter-clockwise operation of the shaft 369 in the first 180 degrees of operation of the auxiliary cam shaft 428, and is returned clockwise to home position when the shaft 369 is rocked clockwise as the auxiliary cam shaft 428 completes its second 180 degrees of operation, from 180 degrees to 360 degrees.

It will be recalled that the movement of the card carriage is synchronized with the movement of the shaft 369, being driven into the machine during the counter-clockwise movement of the shaft 369 and returned to home position during the clockwise movement of the shaft. The bracket 397, which is also operated by the shaft 369, will move the groups of contacts 124 past their releated plates 123, 591, 669, and 1530 in synchronism with the movement of the carriage 111.

The clockwise movement of the bracket 397 during the return movement of the carriage 111 after the read data has been entered into the machine is used to control the check-back circuit in the following manner.

As shown in Figs. 5, 6, 8, 33, 35, 38, and 91, the groups of contacts 124 contain two sets of contacts, as best shown in Fig. 6. An inner set of contacts contains three contact blades, which control the check-back circuit, and an outer set contains two blades, which control recording.

The set of contacts for controlling the check-back circuit will now be considered.

The center blade 1720 is connected by an adjusting screw 1721 to a roller 1722, which rides on the periphery of the control plate, as 123, and is so located with respect to the roller 1722 that, when the roller is traversing the larger-diameter portion of the plate 123, the center blade 1720 engages the outer blade 1723, and, when the roller is traversing the smaller-diameter portion of the plate, the center blade 1720 engages the inner blade 1724. However, when the roller 1722 is traversing the rise between the two different-diameter portions of the plate 123, which rise is positioned about the shaft 398 according to the digit setting of the plate, the center blade 1720 is shifting from one of the blades 1723 and 1724 to the other and will engage neither.

Since this shift will occur at a time corresponding to the digit set in the plate 123, it should occur at the same time that the impulse is generated in the head 114, which is reading the same digit representation during the return movement of the carriage.

The check-back circuit, which is controlled by the set of contacts on the bracket 397 and by the reading circuit, is shown in Fig. 103.

The center contact blade 1720 is connected to point 1709, which, as explained earlier, has a positive pulse of about 100 volts impressed thereon when the data-representing position in the channel is sensed during the return movement of the carriage. The outer and inner blades 1723 and 1724 are connected together and to the anode of a diode 1725, which is half of a 6H6 type of tube. The cathode of the diode 1725 is connected over point 1726 and resistor 1727, of 2.7 megohms, to a +75-volt source of potential. With the cathode at +75 volts and the anode at +34 volts, the diode 1725 will normally be non-conducting and will conduct only when the +100-volt impulse is impressed on its anode as the digit-representing condition in the channel is being read during the return movement of the carriage 111.

It will be clear that, since the center blades 1720 shift from contact with their inner blades 1724 to contact with their outer blades 1723 at the digit-representing positions of the plates, this shift occurs when the +100-volt pulse is impressed on the center blade 1720 by the reading circuit, and the impulse does not get through to the diode 1725. If a pulse is impressed on the center blade 1720 while this blade is in contact with either the inner or outer blades 1724 or 1723, it will indicate that the setting of the control plates does not agree with the data being read from the card.

The cathodes of all the diodes, as 1725, related to the twenty channels are connected to point 1726, so that conduction in any one of the diodes will control the control tube 125 to bring about the controls which indicate the lack of agreement between the data set up in the machine and the data read from the card.

Point 1726 is coupled over a .03-microfarad capacitor 1730 to the grid of the left section of the control tube 125, which is a twin triode of the 6SN7 type. The anode of the left section is connected to ground over a one-megohm resistor 1731 and a .01-microfarad capacitor 1732 in parallel. The cathode of the left section is connected to a —48-volt potential source, and the grid of this section is supplied with a bias by being connected over a one-megohm resistor 1733 to a —75-volt source of potential. The left section is normally non-conducting.

Point 1734 in the anode circuit for the left section is connected to the grid of the right section of tube 125 and supplies the grid with ground potential as long as the left section is non-conducting. The cathode of the right section is connected to ground, and the anode is connected over point 1735 and a 4,700-ohm resister 1736 to the contact R10a1 of the check-back control relay and over this contact, point 1737, and the winding of a check-back control relay R10 to a source of +250-volt anode potential.

The check-back control relay R10 is normally energized and will indicate a check-back failure whenever it is deenergized. Initial energization of the relay is effected by relay contact R1b1, which connect point 1737 to ground over a 15,000-ohm resistor 1738. The contacts R1b1 open a short time after power is supplied to the machine and close momentarily in a corrective operation following a check-back failure, to reenergize relay R10. Energization of relay R10 closes contacts R10a1 to complete the anode circuit for the right section of the control tube 125, which section will conduct and provide a holding circuit for relay R10.

If the positive pulse from the card-reading circuit occurs when the center blade 1720 is contacting either blade 1723 or 1724, indicating a check-back failure, diode 1725 will conduct and cause a positive pulse at point 1726. The positive pulse at 1726 will be effective to cause the left section of the control tube 125 to conduct and supply a negative pulse to the grid of the right section to cut off the right section and thereby deenergize relay R10, which in turn opens contacts R10a1 to interrupt the anode circuit for the right section of the control tube 125. Once relay R10 is deenergized, it will remain deenergized until contacts R1b1 reclose when relay R1 is deenergized in the corrective operation of the machine which follows the operation in which the check-back failure occurred. The controls exerted by relay R10 and the manner in which relay R1 is controlled will be explained more fully when the control circuit is described.

In order to disable the check-back control circuit in those operation in which the check-back control is not desired, the right section of the control tube 125 is shorted out and thereby rendered ineffective to control the relay R10 regardless of any signal which may be applied to its grid. This is accomplished by connecting point 1735 to ground over a 15,000-ohm resistor 1739 and three contacts, L19b3, C2a, and R6a2, in parallel.

Contacts L19b3, which are normally closed but are opened when shaft 455 is rocked in the initiation of a balance pick-up operation, complete a holding circuit for relay R10 to by-pass the control tube 125 in all but balance pick-up operations. Contacts C2a are cam-controlled contacts, which are closed by a cam on the auxiliary cam shaft 428 at 315 degrees of one operation of the shaft and remain closed until 225 degrees of the next operation of the shaft. The contacts C2a insure that, even though contacts L19b3 open in a balance pick-up operation, the check-back circuit will not be effective during the in-sweep of the card but will only be effective during the return movement of the card carriage 111 when it is desired to check the setting of the control plates with the data read from the card.

The contacts R6a2 are closed when relay R6 is energized under control of relay R9 upon a pawl check or account number comparison failure. These contacts R6a2 by-pass the control tube 125 to render the check-back circuit ineffective during the return movement of the carriage in a "short cycle" in which none of the data was entered into the machine.

The check-back circuit, therefore, re-reads the card and compares this reading with the setting of the cam plates to insure that the data which was read from the card has been properly entered into the machine.

As an incident to the operation of checking the correctness of the setting of the machine, the check-back circuit will also verify the fact that no more than one digit-representing condition is present in a channel. This stems from the fact that the channels are read from the top to the bottom of the card during the in-sweep of the card and the first digit-representing condition which is sensed in the channel will control the setting of the control plates; whereas the channels are read from the bottom toward the top of the card in the return sweep of the card when the check-back circuit is effective, and any additional digit representation will be sensed first and will occur at a point different from the one which caused the setting of the control plates and will cause the control tube 125 to be cut off and deenergize relay R10, thereby giving a signal that a check-back failure has occurred.

*Account number circuits*

The various circuits which are associated with the account number mechanism for enabling an account number, which is read from a ledger card, to be compared with an account number which is set up on the account number keyboard 112, and the circuits for enabling the account number set on the keyboard 112 to be set up in the account number differential mechanisms, will now be described with reference to Figs. 86 to 89, 91 to 95, and 106B.

It will be recalled that the account number keyboard 112 contains three rows of keys 1463 (Figs. 86, 87, 88, and 89) and that a common contact member 1491, associated with each row of keys, is provided with a plurality of fingers 1492, which may be cammed to engage individual contacts 1494 by the depression of any one of the several keys of a row. The fingers 1492 and the individual contacts 1494 for the three rows are shown diagrammatically in Fig. 106B.

As explained previously, each account number differential mechanism (Figs. 91 to 95) has associated therewith a contact-bearing plate 1520, which has ten equally-spaced contacts 1521 thereon, which are connected to the corresponding individual contacts 1494 of the related row of keys in the keyboard 112. Also mounted on the plate 1520 is a contact comb 1523 having ten fingers 1524, adapted to engage contacts 1521 to complete circuits corresponding to the setting of the differential mechanism under control of the data read from the card.

Also associated with each differential mechanism is a wiper 1526, which moves over the contacts 1521 in synchronism with the movement of the account number differential mechanism.

These various contacts and the circuits interconnecting them are shown diagrammatically in Fig. 106B. The circuit for comparing the account number as read from the card in a balance pick-up operation with the account number set up on the keyboard 112 will be considered first.

The keys corresponding to a three-digit account number are depressed to move corresponding fingers 1492 into engagement with their related individual contacts 1494.

When the shaft 455 is operated in the initiation of the pick-up operation, it will close contacts L19a6 to energize relays R13 and R14. Relay R13 opens contacts R13bc1, R13bc2, and R13bc3 and closes contacts R13ac1, R13ac2, and R13ac3, and relay R14 opens contacts R14b1 and R14b2 and closes contacts R14a4 (Fig. 105) in the anode supply for the control tubes 118 for the account number differential mechanism.

During the insweep of the card, the account number differential mechanisms are set according to the account number read from the card. These differential mechanisms will cause fingers 1524, on the various contact combs 1523, to close contacts with the contacts 1521 corresponding to the account number as read from the card.

An examination of Fig. 106B will show that the common contact member 1491 for any denominational order of the account number will be connected to its related contact comb 1523 only if the key-controlled contacts 1492—1494 and the differential-mechanism-controlled contacts 1524—1521 of the same digit value have been closed.

At 155 degrees in the operation of the auxiliary cam shaft 428, after the account number differential mechanisms have been set, a cam will close contacts C15a and will maintain them closed until 175 degrees in the operation of the cam shaft 428.

Contacts C15a close in a series comparing circuit which starts at an A.C. power supply conductor 1750 and continues over contacts C15a and R13ac1 to the contact comb 1523 for the units order of the account number, over the two sets of digit contacts to the common contact member 1491 in the key bank for the units order of the account number, over conductor 1752 to the common contact member 1491 in the key bank for the tens order of the account number, over the two sets of digit contacts to the contact comb 1523 for the tens order of the account number, over contacts R13ac2 and conductor 1753 to conductor 1754, which is connected to the common contact member 1491 in the key bank for the hundreds order of the account number, over the two sets of digit contacts to the contact comb 1523 for the hundreds order of the account number, over contacts R13ac3 and conductor 1755 to one side of relay R15, the other side of relay R15 being connected to the other A.C. power supply conductor 1751. If corresponding digit contacts set by the keys and the differential mechanisms agree in the different orders of the account number, the above series circuit will be completed, and relay R15 will be energized to close its contacts R15a2 (Fig. 106) in the circuit with the pawl-check contacts to allow a normal operation to take place.

Relay R15 also closes contacts R15a1 (Fig. 106B) in a holding circuit, which extends from conductor 1750 over cam-controlled contacts C16a, which are closed from 170 degrees in one operation of the auxiliary cam shaft 428 to five degrees in the next operation of the cam shaft.

If there has been no agreement between the number entered into the machine and the number read from the card, and relay R15 has not been energized, then contacts R15b3 in the circuit to the comparison failure indicator lamp 1466 on the keyboard 112 will be closed, and the lamp will be lighted over contacts R6a4.

It should be noted that, when the above circuit is effective to compare account numbers, contacts R14b1 disconnect conductor 1752, and the common contact members 1491 for the units and tens orders from a −75-volt potential supply and contacts R14b2 disconnect conductors 1752 and 1754 to enable the tens and hundreds digit contacts to be properly connected in the series comparing circuit.

The circuit for controlling the setting of the account number differential mechanism under control of the account number keyboard 112 to enable account numbers to be recorded on the ledger card will now be described. This control will be utilized in a recording operation following a new balance operation of the machine and can be effective either to control the initial recording of an account number on the card or to change an account number previously recorded on the card.

In this operation, the push button 1464 on the keyboard 112 will be depressed to close contacts K11a1 (Fig. 106B) to energize relay R16, which will close contacts R16a1 to provide a holding circuit for itself over cam-controlled contacts C29a, which are closed at 350 degrees in one operation of the auxiliary cam shaft 428 and are opened at 340 degrees in the next operation of the cam shaft. Also in this operation, relays R13 and R14 will not be energized; hence contacts R14b1 and R14b2 will remain closed to connect −75 volts to the common contact members 1491 for the three orders of the account number, and contacts R13bc1, R13bc2, and R13bc3 will connect the wipers 1526 for the three orders to separate conductors 1756, 1757, and 1758, which extend to points 1709 in their respective card-reading circuits (see Fig. 103).

The keys corresponding to the several digits of the account number are depressed in the key banks of the keyboard 112 and will close their related contacts 1492—1494. The closure of the contacts by the keys will apply −75 volts to the contacts 1521 corresponding to the keys which were depressed in the three banks.

As the account number differential mechanisms are driven by the driving members 1507 (Fig. 91), the wiper arms 1526 will move over the contacts 1521 in synchronism, and, when a wiper engages a contact 1521 which is at −75 volts due to the closure of contacts 1492 and 1494 by a key, the −75 volts will be applied over the conductor, as 1756, 1757, or 1758 to the point 1709 in its related reading circuit of Fig. 103. This application of −75 volts to point 1709 and the cathode of diode 117, which is connected thereto, causes the diode 117 to conduct and apply a negative potential to the control tube 118, which is cut off and deenergizes the solenoid 1510 to release the related pawl to arrest further movement of the differential mechanism. In this manner, the differential mechanisms are set according to the digits set up on the keyboard 112. As explained earlier, the setting of the account number differential mechanisms positions the check-back and recording control plates 1530 associated with these differential mechanisms, and these plates are used to control the recording of the account number on the card in a manner to be explained hereinafter.

Relay R16, when energized, closes contacts R16a4 to complete a circuit to a lamp 1465 on the keyboard 112 to indicate that the account number differential mechanisms are being set under control of the account number keyboard. The relay also closes contacts R16a3 in the anode supply circuit for the control tubes 118 for the account number differential mechanism and opens contacts R16b2 in the circuit to the solenoid S7 (Figs. 91 and 106A), which controls the operation of the aligner for the check-back and recording control cam plates 1530.

Recording circuits

The recording circuits, which are used to erase previously-recorded data from the ledger card and to record new data in its place, will now be considered with reference to Fig. 103.

Immediately following a new balance operation, the auxiliary cam shaft 428 is driven through a complete rotation to cause the carriage 111 to be swept into the machine and back to its starting position. The recording circuits become effective during the in-sweep of the carriage to energize the heads 114 to magnetize the channels with a polarity of area 134 (Fig. 3B) throughout the length of the channels to thereby obliterate any data previously recorded thereon. During the return movement of the carriage 111, the heads 114 are energized to magnetize the channels with the opposite polarity until the desired digit-representing position is reached, thereby producing the areas 134 and 135 of different polarities with the point of reversal of polarity at the digit-representing position, as shown in Fig. 3B.

The controls and the circuits for effecting this erasing operation will now be explained.

In the new balance operation, record relays R7 and R8 (Fig. 106) are energized and will close contacts R7a2 and R8a2 (Fig. 106A) to prepare for the cycling of the auxiliary driving mechanism to sweep the card into the machine and return it to starting position. After the new balance has been printed on the card in the new balance operation, the card carriage is released to return to its starting position in the usual manner. When the carriage reaches its starting, or home, position, a further contact L2b1 (Figs. 16 and 106) opens and deenergizes relay R12, which allows contacts R12b1 to reclose and energize solenoid S3 to couple the auxiliary motor to the auxiliary cam shaft 428 for the first 180 degrees of operation.

It will be recalled that, in new balance operations, the coupling latch 1675 (Fig. 50) remains in position with its notch 1676 engaging the stud 1677, and that at about ten degrees of rotation of the shaft 428 the cam 1681 will rock the lever 1678 to shift the link 1671 to the right to rock the shaft 1667 (Fig. 98) counter-clockwise to shift the contact blades 1665 from engagement with the shaft 1667 into engagement with their related contact elements 1664 of the sets of contacts L12ac1 to 20.

It will also be recalled that the anode supply for the second amplifier tubes 116 (Fig. 104) is opened by contacts R8bc3, and the anodes are grounded over contacts R8ac3 in recording operations to disable the reading circuit.

An erasing and recording potential supply is provided to supply +12 volts for erasing operations and to supply −12 volts for recording operations. During the in-sweep of the ledger card, the +12 volts is available over contacts R17bc1, and, during the return movement of the card, the −12 volts is available over contacts R17ac1, since relay R17 is energized during the return movement of the card, as previously explained.

Relay R8 also closes contacts R8a1 (Fig. 103) to connect the erasing and recording power supplies at contacts R17bc1 and R17ac1 to the recording circuit over cam-controlled contacts C3a, which are closed by a cam on the auxiliary cam shaft 428 at 18 degrees in its operation and are opened at 342 degrees in its operation.

Accordingly, with the contacts L12ac1 to 20 closed, the heads 114 will be connected to the recording circuits to be energized first to erase any previously-recorded data and thereafter to be energized to record new data. The energization of the heads 114 will be clear from an explanation of a typical circuit, as shown in Fig. 103.

During the in-sweep of the card, the head 114 will have one side of its winding connected to ground and the other side of its winding connected over point 1700 and one of the contacts L12ac1 to 20 to a conductor 1760, which extends to point 1761, where the circuit branches, one branch extending over a diode 1762 to a point 1763 and the other branch extending over a 150-ohm resistor 1764, the blades 1765 and 1766 of the recording control contacts in the set 124, the point 1763, and from this point over the contacts C3a, R8a1, and R17bc1 to the +12-volt supply. The diode 1762 is so oriented that, when the +12 volts is supplied thereto, it will have a low impedance and will allow an erasing current to flow through the head 114 during the entire in-sweep, regardless of whether or not the recording control contacts in the set 124 are open or closed.

When the carriage has finished its in-sweep, relay R17 is energized to open contacts R17bc1 and close contacts R17ac1, and contacts R7a2 become effective to cause the solenoid S3 to be energized to connect the auxiliary motor to the shaft 428 to cause the card carriage 111 to immediately be returned to its home, or starting, position. This operation of the contacts R17bc1 and R17ac1 removes +12 volts from the recording circuit and substitutes —12 volts therefor. With —12 volts applied to the circuit, the diode 1762 has a high impedance, and the head 114 will be energized over the recording control contacts in the contact sets 124 according to the data set therein.

The control exerted by the check-back and recording control plates 123 for the balance, check count, and sign of the balance and by the control plates 1530 for the account number is substantially the same.

It will be recalled that the check-back and recording control plates 123 (Figs. 5, 6, and 8) are so positioned about the shaft 398 that the rise between the smaller diameter 310 and the larger diameter 311 is located at a position corresponding to the data to be recorded. The outer set of contact blades 1765 and 1766 of the group 124 have the blade 1765 connected by the adjusting screw 1721 to the roller 1722, which rides on the periphery of the control plate. The blade 1765 is so positioned with respect to the roller 1722 and the blade 1766 that it will contact the blade 1766 when the roller 1722 engages the smaller diameter 310 but will not contact the blade 1766 when the roller 1722 engages the larger diameter 311 of the plate.

It will be recalled that the bracket 397 is rocked counter-clockwise during the in-sweep of the carriage, so that the beginning of the return movement of the carriage will find the rollers 1722 all engaging the smaller-diameter portions of the plates, and the blades 1765 and 1766 will be in contacting relation to supply a current path from the —12-volt supply to the head to energize the head to record in the channel with a polarity of area 135.

As the carriage returns to its home position, the sets of contacts 124 will move in synchronism past their related control plates. The roller 1722 will pass from the smaller diameter 310 to the larger diameter at the same time that the carriage is in the same digit-representing position as that represented by the setting of the plate and will shift the blade 1765 out of engagement with the blade 1766 to interrupt the energizing circuit for the head 114. This will cause the energization of the channel according to the polarity of area 135 to be terminated at the digit-representing position and will produce the magnetic pattern of areas 134 and 135, as shown in Fig. 3B, by which data is represented on the card.

The 150-ohm resistors 1764 reduce the data-recording current to insure that a larger erasing current is used, thereby insuring that any previously-recorded data will be erased during the in-sweep of the card.

While, in general, the recording of the digits of the line number on the card is effected in the same manner as explained above, the control of the recording by the control plates 591b and 675 is slightly modified to enable the proper line number to be recorded.

Figure 35:
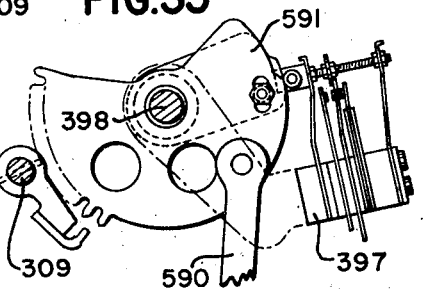
Fig. 35 is a detail view of certain check-back contacts for the units order auxiliary differential mechanism shown in Fig. 33.
Figure 36:
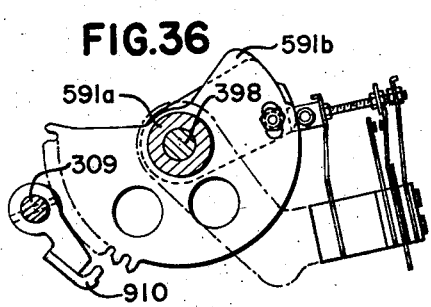
Fig. 36 is a detail view of certain recording control contacts for the units order auxiliary differential mechanism shown in Fig. 33.

Referring to Figs. 33, 35, and 36, it will be seen that two control plates, 591 and 591b, are provided for the units digit of the line number. Plate 591 is set according to the units digit of the line to which the carriage 111 was actually positioned and on which line the last printing, that of the new balance, took place. However, it is desired to record not the number of the line on which the new balance was printed but rather the number of the next line, so that the next entry will be properly spaced on the ledger card. Accordingly, the plate 591b is provided and is connected to plate 591 by the sleeve 591a in such a displaced relation to the plate 591 as to enable a value to be recorded that is greater by "one" than the value set in the plate 591. For example, if plate 591 was set to indicate the units digit of line 24, the line on which the new balance was printed, then the plate 591b would be set to cause the recording of a five instead of four as the units digit of the line number. The group of contacts 124 associated with this differential mechanism is split, as shown in Figs. 35 and 36, so that the check-back contacts cooperate with the plate 591 to enable the correctness of the setting of the auxiliary differential mechanism under control of the data read from the card to be checked, and the recording control contacts cooperate with the plate 591b to record the number of the next line on which data is to be recorded.

Figure 39:
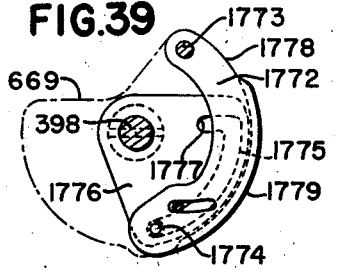
Fig. 39 is a detail view of the control cam for the check-back and data-recording mechanism for the tens auxiliary differential shown in Fig. 38.

The check-back and recording control plate 669 (Figs. 38 and 39) for the tens digit of the line-finding mechanism is connected to the plate 675 by a set screw to enable a fine adjustment of the plate 669 relative to the differential mechanism to be obtained. The plate is formed with a smaller diameter, as 1770, for most of its periphery and also with a larger diameter at 1771 and has an auxiliary control plate 1772 pivotally connected thereto by a pin 1773. The auxiliary control plate 1772 has, in its free end, a stud 1774, which rides in a slot 1775 in a plate 1776 secured to the shaft 398. The slot 1775 is concentric with the shaft 398 and at its upper end is provided with a horizontal offset 1777. The auxiliary control plate 1772 has a control surface 1778, which, when the stud 1774 rides in the slot 1775, conforms with the smaller diameter 1770 of the plate 669, and a control surface 1779, which conforms with the larger diameter 1771, and has a rise portion, which is so located with respect to the plate 669 that the auxiliary control plate 1772 will control the check-back circuit in the same manner as explained above and will also control opening of the recording control contacts to cause the tens digit of the line number to be recorded.

When the carriage is in line 39 position and the control plates are set during the in-sweep of the carriage in the recording operation, the control plate 669 will be rocked far enough counter-clockwise to move the stud 1774 opposite the horizontal offset 1777. This will allow the stud 1774 to move into the offset and will allow the auxiliary control plate 1772 to rock clockwise on the plate 669 to move its periphery within the periphery of the control plate 669, thereby rendering the rise on the auxiliary control plate 1772 ineffective and enabling the rise between the surfaces 1770 and 1771 to control the recording of a zero instead of a four.

It is clear from the above that the old data is erased from the ledger card during the in-sweep of the carriage following a new balance operation and that a new balance and related data are recorded on the card by distinctive magnetization patterns in the twenty channels.

*Control circuit*

In addition to the circuits which have been previously described, further control circuits are provided for controlling the energization of the several solenoids and for controlling the operating sequences of the machine, which circuits are shown in Figs. 106, 106A, and 106B.

The machine is arranged to be operated from the usual 110-volt A.C. potential supply and is provided with the necessary regulated power supplies (not shown) for providing the various positive and negative potentials indicated at different points in the circuits.

Operation of the Main Power Switch MPS (Fig. 1), at the front of the machine, closes contacts K7a1 and K7a2 (Fig. 106A) to supply 110 volts A.C. to the machine. This application of voltage causes the auxiliary drive motor 400 (Figs. 10 and 106A) to begin running and also supplies operating potential to the accounting machine drive motor 1780 to prepare this motor for operation when its switch 1781 is closed in the usual manner by the release of the machine release shaft 1169.

In order to prevent overloading the circuits when power is first applied to the machine, a delay switch TD2a1 is controlled by the motor 400 and is closed when the motor has come up to speed and is requiring less current. The switch TD2a1, when closed, applies the 110-volt A.C. to the several regulated power supplies, which then operate to supply the required voltage to different parts of the circuit.

Further contacts L3a1 (Fig. 106A) are provided to prevent the operation of the control circuits in the event the usual audit strip carriage is not in place in the machine. The insertion of the audit strip carriage into the machine in the usual manner will close contacts L3a1 to complete the operating potential supply to the conductors 1782 and 1783 (Fig. 106A) associated with the solenoid-operating circuits. The conductors 1782 and 1783 are connected to the conductors 1751 and 1750, respectively, which are associated with relay operating and account number comparison circuits (Figs. 106 and 106B).

The control circuits for controlling the energization of the control relays will be considered first.

The energizing circuit for relay R1 (Fig. 106) extends from conductor 1750 over contacts TD1a1, then over contacts S5b1 (see also Fig. 9) and cam-controlled contacts C31a, which are controlled by a cam on the printer cam shaft 712 and are closed at 35 degrees in one operation of the printer cam shaft 712 and open at 5 degrees in the next operation of the shaft. Contacts TD1a1 are safety contacts and are controlled by a safety device TD1 (Fig. 106B) in the filament supply 1784 for the diodes 1725 to prevent relay R1 from being energized when the filament circuit is open and the diodes are not operable and until the power supplies have had time to become operable. This insures that relay contacts R1b1 will remain closed until the +250 volts has been applied to the relay R10 to cause its initial energization. Relay R1 will remain energized until contacts S5b1 are opened due to a check-back failure and contacts C31a are opened in a corrective operation of the machine following a check-back failure. The deenergization of relay R1 under these conditions allows contacts R1b1 to reclose to reenergize relay R10, which had been deenergized by the check-back failure, as explained earlier. The reenergization of relay R10 will deenergize solenoid S5 in a manner to be explained hereinafter and will allow contacts S5b1 to reclose to reenergize relay R1.

Relay R1 also closes contacts R1a2, which contacts prevent the energization of solenoid S6 (Fig. 10) to initiate a balance pick-up operation until the power supplies are operating to supply potentials to the various circuits.

The energizing circuit for the balance pick-up control relay R2 extends from conductor 1750 over contacts L20bc1, R3a3, L4b1, K2a1, and K2a2 in parallel, and the relay to the conductor 1751. This circuit will be completed when the Balance Pick-Up motor bar 113 is operated and closes contacts K2a1 and K2a2, provided the contacts L20bc1, R3a3, and L4b1 are closed to indicate that a balance pick-up operation may properly be made at this time. The circuit will remain closed as long as the motor bar 113 maintains either contacts K2a1 or K2a2 closed. As explained earlier, contacts L20bc1 (see also Fig. 41) will normally be closed but will be opened when the aligner 956 is in engagement with the segment 622 following a setting of the carriage to a desired line by the manual line-finding means, which engagement of the aligner 956 with the segment would interfere with the automatic picking up of the line from the ledger card.

Contacts R3a3 will be closed when the posting lock relay R3 is energized under conditions to be explained hereinafter, to indicate that a previous operation of the machine was one which might properly be followed by a balance pick-up operation.

Contacts L4b1 (see also Figs. 67, 74, 75, and 80) will be opened by the depression of the Sub-Total and Clear Total keys of control row 1 to prevent a balance pick-up operation when either of these keys is depressed.

Relay R2 closes contacts R2a1 (Fig. 106A) in the circuit to the balance pick-up control solenoid S6 (see also Fig. 10) to enable this solenoid to be energized and initiate a balance pick-up operation if all other conditions, as controlled by other contacts in the solenoid circuit, are in order. This relay also opens contacts R2b2 in the circuit to the clutch trip solenoid S3 (see also Fig. 10) to delay the tripping of the clutch to connect the auxiliary driving mechanism to the auxiliary motor 400 until the Balance Pick-Up motor bar 113 is released, at which time the various balance pick-up controls will have been effected.

The posting lock relay R3 may be energized over any one of three paths; that is, over contacts L8a1 (see also Figs. 65 and 66), which are closed when the machine operates in a new balance non-transfer operation; over contacts R7a3, which are closed in a recording operation following a new balance operation, and cam-controlled contacts C11a, which are controlled by a cam on the auxiliary cam shaft 428 and which are closed at 190 degrees in the operation of auxiliary cam shaft 428 and open at 355 degrees in the operation of the cam shaft; or over contacts F4bc9, which are closed by the function control mechanism only in Trial Balance operation, in which the cards are read one after another in succession.

The relay R3 closes contacts R3a1 in a holding circuit for itself over cam-controlled contacts C32a, which are controlled by a cam on the printer cam shaft 712 and are closed at 350 degrees in one operation of the printer cam shaft 712 and are opened at 10 degrees in the next operation of the shaft 712. Accordingly, when relay R3 has been energized in a new balance non-transfer or in a new balance operation, it will remain energized until 10 degrees in the operation of shaft 712 in the next operation of the machine. If this next operation is a balance pick-up operation, relay R3 will be deenergized when the machine is operated to enter therein the data which was read from the card. If there has been a "short cycle" and the carriage has been returned to home position without any entry having been made in the machine, then contacts C32a remain closed, relay R3 remains energized, and its control is maintained.

In addition to contacts R3a3 in the circuit to relay R2, relay R3 opens contacts R3b4 in the energizing circuit to relay R11 and closes contacts R3a2 (Fig. 106A) in the circuit to the gripper release solenoid S1 (see also Fig. 17) to energize the solenoid and remove the studs from the openings in the card after the magnetic recording of new balances on the card and after each operation in a Trial Balance.

Relay R11 is energized by the closure of contacts K3a1 (see Fig. 63) upon the depression of certain keys in control row 2, providing that other contacts in the energizing circuit are closed. The energizing circuit for relay R11 extends from conductor 1750, over contacts K1b1, C12a, C33a, R6b3, R8b4, then over contacts R10a2 and F4b11 in parallel, over contacts R3b4 and F1–4b2 in parallel, over contacts L7b1 and L5b1 in parallel, contacts K3a1, and relay R11 to conductor 1751.

Contacts K1b1 (see also Fig. 96) are normally closed but are opened when the usual key release lever is operated and are effective to interrupt the holding circuit for relay R11. Contacts C12a are cam-controlled contacts and are controlled by a cam on the auxiliary cam shaft 428 and are closed at 350 degrees of one operation of the auxiliary cam shaft 428 and opened at 10 degrees in the next operation of the shaft; consequently they will be closed in the home position of the shaft. Contacts C33a are cam-controlled contacts and are controlled by a cam on the printer cam shaft 712 and are closed at 300 degrees in one operation of the printer cam shaft 712 ande are opened at 190 degrees in the next operation of the shaft; consequently they will be closed in the home position of the shaft. Contacts R6b3 will be opened by relay R6 if a pawl-check failure occurs and a "short cycle" is called for, and contacts R8b4 open in new balance recording operations to prevent relay R11 from being energized while the auxiliary drive mechanism is operating, particularly during the first ten degrees of its operation. Of the parallel contacts R10a2 and F4b11, contacts F4b11, which are controlled by the function control mechanism, will be closed only in Trial Balance operations and will be open in Install, Posting, and Transfer operations. In these three types of operation, the circuit will be controlled over contacts R10a2, which are normally closed and will be opened only when relay R10 (Fig. 103) is deenergized upon the occurrence of a check-back failure. The parallel contacts R3b4 and F1–4b2 control the circuit in the following manner. Contacts F1–4b2 are controlled by the function control mechanism and are closed in Install and Trial balance operations to by-pass the contacts R3b4 but are opened in Posting and Transfer operations to allow the circuit to be controlled by contacts R3b4. It is to be noted that, when contacts R3a3 have been closed to prepare the machine for a balance pick-up operation under control of the motor bar 113, the contacts R3b4 will be open to prevent an operation from being initiated by the operation of a key in control row 2. The parallel contacts L7b1 and L5b1 (see also Fig. 23) are controlled by the card carriage when it reaches line 39 position and, as explained earlier herein, will both be opened when the card is full, to prevent further entries from being made. A circuit including contacts K10a1 (see also Fig. 76), which are closed by the Analysis key, by-passes contacts L7b1, L5b1, and K3a1 to enable relay R11 to be energized to release the machine for an analysis operation, even though contacts L7b1 and L5b1 have opened to indicate that the card is full.

These various controls insure that machine operations may be initiated under the control of keys in control row 2 only when circumstances are present which will enable correct results to be obtained.

Relay R11, when energized, will close contacts R11a1, which by-pass contacts K3a1 in the energizing circuit for relay R11 and maintain the relay energized until contacts C33a open at 190 degrees in the operation of the shaft 712 or until contacts K1b1 are opened.

In addition to the closing of contacts R11a1, relay R11 also closes contacts R11a2 (Fig. 106A) in the circuit to the machine release solenoid S4 (Fig. 60) and closes contacts R11a3 (Fig. 106A) in the circuit to relay R5. The effect of these contacts will be explained hereinafter.

Relay R4, which is the relay for releasing the machine under control of the keys in control row 1, has an energizing circuit which extends from conductor 1750 over contacts K1b1, C12a, C33a, R6b3, and R8b4 and then over contacts R10a4 and F4a10 in parallel, contacts K4a1 and TD3a1 and relay R4 to conductor 1751. Contacts K1b1, C12a, C33a, R6b3, and R8b4 are common with the circuit to relay R11 and exert the controls as explained above. Of the parallel contacts F4a10 and R10a4, contacts F4a10 are closed in Install, Posting, and Transfer operations, and by-pass contacts R10a4, which remain closed until relay R10 is deenergized due to a check-back failure, as explained above. In Trial Balance operations, when contacts F4a10 are opened, the circuit will be controlled over contacts R10a4 according to whether or not there has been a check-back failure. Contacts K4a1 (see also Fig. 58) are closed when certain keys of control row 1 are depressed, as explained earlier herein. Contacts TD3a1 are included in this circuit as a safety device to insure that potential for recording data magnetically on the card is available before relay R4 can be energized. As shown in Fig. 103, a control device TD3 is connected across the recording potential supplies and will close contacts TD3a1 so long as the potential is available. Failure of the potential supply for any reason will cause contacts TD3a1 to open and disable the relay R4.

Relay R4 will close contacts R4a1, which by-pass contacts K4a1 and provide a holding circuit to maintain relay R4 energized until the circuit is opened at contacts C33a or K1b1, as was the case with relay R11.

In addition to the closing of contacts R4a1, relay R4 will close contacts R4a3 in the circuit to machine release solenoid S4, and contacts R4a4 in an energizing circuit to relay R5, and will open contacts R4b2 in a circuit to the gripper release solenoid S1.

Relay R5 provides controls for operating the solenoids S1 and S2 at proper times in the various operations of the machine. In balance pick-up operations, relay R5 is energized when contacts L19a1 are closed by the release of the shaft 455 in the initiation of the pick-up operation, the circuit extending from conductor 1783 over contacts R10ac3, R12b2, F1a20, R2a1, R1a2, and L19a1 and thence over relay R5 to conductor 1751. In this circuit, contacts R10ac3 will be closed unless a check-back failure has occurred; contacts F1a20 will be closed in Posting, Transfer, and Trial Balance operations; contacts R1a2 will be closed if operating potentials have been applied and relay R1 has been energized as explained earlier; and contacts R2a1 will be closed by the balance pick-up relay R2 when the motor bar 113 is operated.

Relay R5 will also be energized over contacts R4a4 or R11a3 and contacts R12b3 if the card carriage is in home position.

Relay R5 will also be energized over cam-controlled contacts C41a, which are controlled by a cam on the printer cam shaft and opened at 340 degrees of the operation of the printer cam shaft 712, if any one of the contacts L6a2 or L8a2 (see Figs. 65 and 66) or L15a1 (see Fig. 67) or L14a1 (see Fig. 23) are closed, respectively, in New Balance, New Balance Non-Transfer, or Eject operations or when the carriage moves to line 40.

Relay R5 closes contacts R5a1 to establish a holding circuit for itself over contacts C21a and over contacts C42a and C22a in parallel. Contacts C21a are cam-controlled contacts, which are controlled by a cam on the auxiliary cam shaft 428 and are closed at 355 degrees in one operation of the auxiliary cam shaft 428 and are opened at 340 degrees in the next operation of the cam shaft; consequently the contacts will be closed in the home position of the shaft and will interrupt the holding circuit at 340 degrees of operation of the shaft 428 in Balance Pick-Up and Recording operations in which the shaft 428 is cycled. Contacts C22a are controlled by a cam on the auxiliary cam shaft 428 and are closed at 185 degrees and opened at 345 degrees in the operation of the cam shaft 428, and contacts C42a are controlled by a cam on the printer cam shaft 712 and are closed at 210 degrees in one operation of the printer cam shaft 712 and opened at 195 degrees in the next operation of the cam shaft. Contacts C42a will interrupt the holding circuit to relay R5 at 195 degrees in the operation of the shaft 712 in those operations of the machine which do not involve the operation of the auxiliary driving means to drive the shaft 428.

In addition to contacts R5a1, relay R5 closes contacts R5a2 in the energizing circuit to solenoid S2, and opens contacts R5b3 to deenergize the gripper solenoid S1 and allow the studs to pass through the card to lock the card to the carriage.

As explained earlier, the pawl-heck relay R9 is controlled by the pawl-check and account number comparing circuit, including contacts R15a2 and L13b1 to 20, and will be energized if account numbers agree and if all the pawls have been released. Failure of relay R9 to be energized, therefore, indicates that there has been a pawl-check failure or a failure of account number comparison.

If relay R9 is not energized, contacts R9b1 will prepare the circuit to the clutch solenoid S3 to cause a "short cycle," and contacts R9b2 will remain closed to cause relay R6 to be energized.

If relay R9 is energized in an operation of the machine, it will be deenergized when any pawl is reset during the return movement of the auxiliary differential mechanism.

Pawl-check failure relay R6 will be energized to provide proper lock-outs whenever there is a pawl-check failure or a failure in the comparison of account numbers. The energizing circuit for relay R6 extends from conductor 1750 over contacts C13a, L19a5, and R9b2 and then over the relay R6 to conductor 1751. This relay is used only in Balance Pick-Up operations, and, if there has been a pawl-check failure or an account number comparison failure and R9 has not been energized, contacts R9b2 will be closed, and contacts L19a5 will have been closed by the shaft 455 in the initiation of the Balance Pick-Up operation, and the relay will be energized when contacts C13a close. Contacts C13a are cam-controlled contacts and are controlled by a cam on the auxiliary cam shaft 428 to close at 165 degrees and open at 185 degrees in the operation of the cam shaft 428.

Relay R6 will close contacts R6a1 to provide a holding circuit for itself over contacts C35a. Contacts C35a are cam-controlled contacts and are controlled by a cam on the printer cam shaft 712 and are closed at 350 degrees in one operation of the printer cam shaft 712 and opened at 10 degrees in the next operation of the cam shaft and, accordingly, are closed in home position. These contacts will be opened in the operation of entering data into the machine in the next balance pick-up operation in which there is no pawl-check failre or account number comparison failure.

In addition to contacts R6a1, relay R6 also closes contacts R6a2 (Fig. 103) to disable the check-back controls and opens contacts R6b3 to prevent relays R11 and R4 from being energized under control of the keys of rows 1 and 2 of the keyboard, as previously explained.

Recording control relays R7 and R8 are connected in parallel and are energized over the same energizing circuit to provide necessary controls in recording operations which follow New Balance operations. The energizing circuit for these relays extends from conductor 1750 over contacts F4ac9, L6a1, and C34a and then over the windings of relays R7 and R8 to conductor 1751. Contacts F4ac9 are controlled by the function control mechanism and will be closed in Install, Posting, and Transfer operations but will be open in Trial Balance operations. Contacts L6a1 (see also Figs. 65 and 66) will be closed in a New Balance operation. Contacts C34a are controlled by a cam on the printer cam shaft 712 and will be closed at 200 degrees and opened at 355 degrees in the operation of the shaft 712. Accordingly, the relays R7 and R8 will be energized when the shaft 712 has operated 200 degrees in a New Balance operation.

Relay R7 will close contacts R7a1 in a holding circuit for relays R7 and R8, which extends over contacts C14a. Contacts C14a are cam-controlled contacts which are controlled by a cam on the auxiliary cam shaft 428 and are closed at 355 degrees in one operation of the auxiliary cam shaft 428 and are opened at 342 degrees in the next operation of the shaft. Accordingly, contacts C14a will be closed in the home position of the shaft 428 and will remain closed to keep relays R7 and R8 energized until 342 degrees in the operation of the shaft 428 following the New Balance operation, during which time the data is recorded magnetically on the card.

In addition to contacts R7a1, relay R7 closes contacts R7a2 in a circuit to the clutch trip solenoid S3 to cause the carriage to be returned to starting position immediately following the in-sweep of the carriage in a data-recording operation. Relay R7 also closes contacts R7a3, which, as explained previously, cause relay R3 to be energized when contacts C11a close. Contacts R7a4 (Fig. 105) are also closed by relay R7 to ground the solenoid 577 for the units line-finding differential mechanism to prevent the release of the pawl during recording operations.

Relay R8 closes contacts R8a1 (Fig. 103) to connect the erasing and recording power supply to the recording circuit, as previously explained, and also closes contacts R8a2 (Fig. 106A) in the circuit to the clutch trip solenoid S3 to cause the card carriage to be swept into the machine after the New Balance operation to enable the erasure of data to take place, as previously described.

Relay R8 opens contacts R8bc3 (Fig. 104) and closes contacts R8ac3 in the anode supply circuits for the second amplifier tubes 116 of the reading circuit to disable the reading circuits during erasing and recording operations.

Relay R8 also opens contacts R8b4 in the circuit to relays R4 and R11 to prevent the release of the machine from the keys of rows 1 and 2 between the New Balance operation and the New Balance Recording operation which follows.

As explained earlier, relay R10 (Fig. 103) is normally energized and is deenergized upon the occurrence of a check-back failure.

In addition to closing contacts R10a1, relay R10 also closes contacts R10a2 in the energizing circuit for relay R11 to enable the relay R11 to be operated under control of the keys of row 2 to release the machine, which contacts open upon a check-back failure and prevent the machine release from the keys of row 2 in Install, Posting, and Transfer operations.

Similarly, relay R10 closes contacts R10a4 in the energizing circuit to relay R4, which contacts are opened upon a check-back failure to prevent the release of the machine by the keys of row 1 following a check-back failure in Trial Balance operations.

Figure 9:
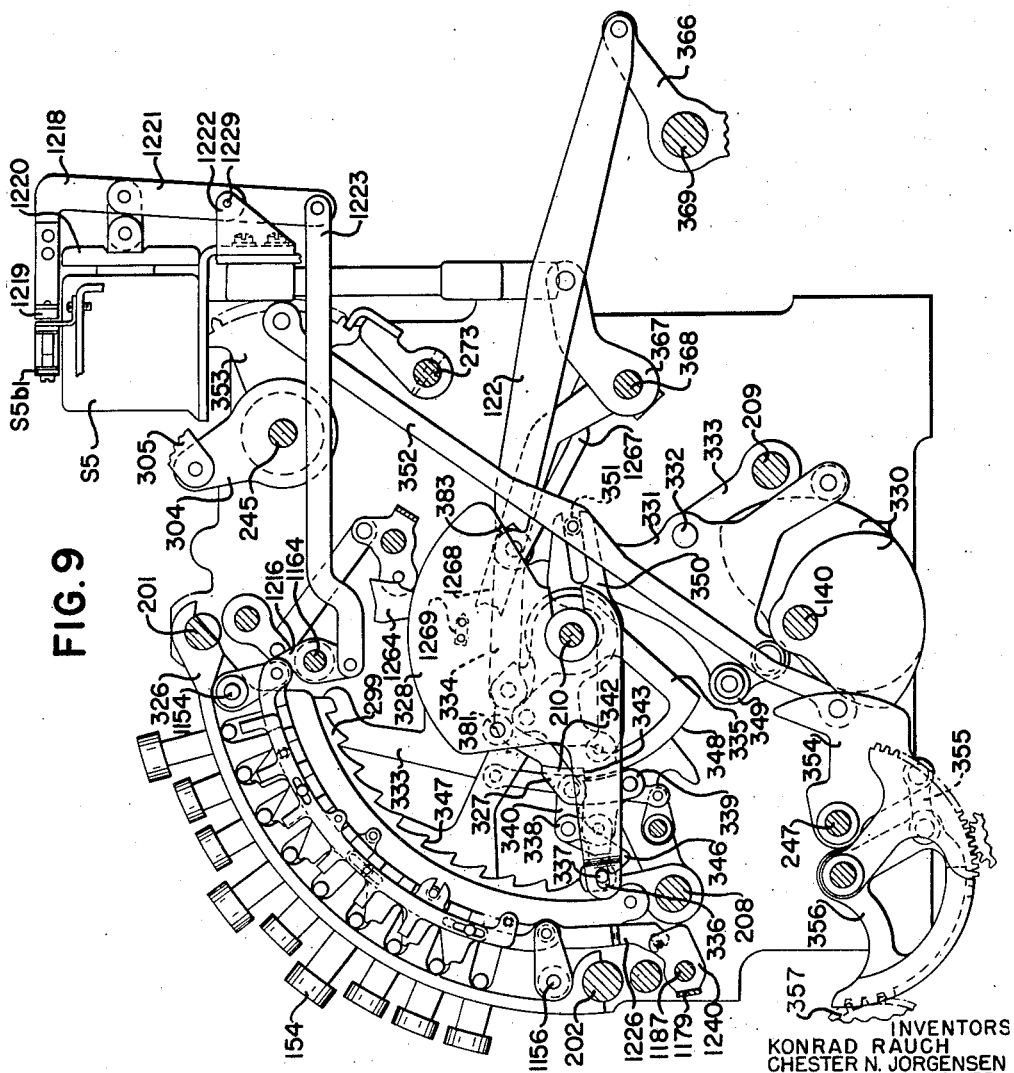
Fig. 9 is a sectional view showing the row 2 control bank of the machine and its related differential mechanism and controls.

Relay R10 in its normal, energized, condition opens contacts R10bc3 and closes contacts R10ac3. Contacts R10ac3 close in the energizing circuit for the gripper solenoid S1, the balance pick-up control solenoid S6, and the carriage control relay R5 and enable these solenoids and this relay to be energized, providing that there has been no check-back failure. Contacts R10bc3 will close when relay R10 is deenergized upon a check-back failure and will complete the energizing circuit to the solenoid S5 (Figs. 9 and 106A).

Relay R12 provides controls to indicate when the card carriage is out of home position. This relay is energized whenever contacts L2b1 (Fig. 16) are allowed to close by the movement of the carriage out of home position. Relay R12, when energized, opens contacts R12b1, R12b2, and R12b3. Contacts R12b1, which will close when the card carriage is returned to home position following the printing of the new balance and related data, are in the circuit to the clutch solenoid S3 and will cause the solenoid to be energized to start the in-sweep of the card in the recording operation. Contacts R12b2, which are in the energizing circuit for the gripper solenoid S1 and the balance pick-up control solenoid S6, are effective to prevent a balance pick-up operation from being initiated unless the carriage is in home position. Contacts R12b3 are in the circuit with contacts R4a4 and R11a3 and prevent the energization of the relay R5 and the solenoid S2 if the table is not in home position. This means that the solenoid S2 will be energized to hold out the pawls 1008 and 1013 if the card carriage is in home position but will not be energized in a line-feeding operation of the carriage when the carriage has been moved from home position.

Relay 17 is a bias-changing and current-reversing relay. It controls the reading and recording circuits to enable them to function differently during the in-sweep and return movements of the carriage. During the in-sweep of the card when data is being read therefrom, contacts R17bc2 are closed to apply a −3-volt bias to the second amplifier tubes 116 (Fig. 103) to enable these tubes to properly amplify the negative pulses resulting from the reading of data representations on the card. After the reading of the card on the in-sweep has been finished, relay R17 is energized and remains energized during the portion of the return movement of the card when the data is re-read to control the check-back circuit. The energization of relay R17 opens contacts R17bc2 and closes contacts R17ac2. This removes the −3-volt bias from tube 116 and connects its grid circuit to ground to enable the tube to properly amplify the positive pulses resulting from the reading of the data representations on the card during its return movement.

In a similar manner, relay R17 controls the recording circuit (Fig. 103) to supply erasing current to the heads over contacts R17bc1 during the in-sweep of the card and to supply the recording current of opposite sign to the heads during the return movement of the carriage.

The manner in which relays R13, R14, R15, and R16 (Fig. 106B), related to the account-number-comparing mechanism, are controlled and effect their control has been previously explained when the account number mechanism was described.

The energizing circuits for the various solenoids will now be considered with reference to Fig. 106A.

Solenoid S1 (see also Fig. 17), which, as explained earlier, removes the studs 497, 498, and 499 from the holes 137 in a card to allow cards to be inserted into the machine and removed therefrom, may be energized over several circuits. The circuit which controls the energization in posting operations extends from conductor 1783 over contacts R10ac3, R12b2, R3a2, C47a, and R5b3 and over the winding of the solenoid S1 to conductor 1782. Contacts C47a are cam-controlled contacts, which are controlled by a cam on the printer cam shaft 712 and are closed at 340 degrees in one operation of shaft 712 and open at 20 degrees in the next operation of the shaft; consequently they are closed in the home position of the shaft. Accordingly, solenoid S1 will be energized to shift the studs and allow the card to be inserted or removed if the next operation in the sequence can be a Balance Pick-Up operation and contacts R3a2 are closed; if the carriage is in home position and contacts R12b2 are closed; if there has been no check-back failure and contacts R10ac3 are closed; and if relay R5 has not been energized in the initiation of a Balance Pick-Up operation.

A further energizing circuit is similar to the one described above but includes contacts R4b2 and F3b17, which by-pass contacts R3a2. This circuit is effective to control the energization in Transfer operations when contacts R3a2 are not closed. Contacts F3b17 are controlled by the function control mechanism and will be open in Install, Posting, and Trial Balance operations and will be closed in Transfer operations. Contacts R4b2, which will be closed except when the machine is operated under control of a row 1 key, will enable the circuit to normally energize the solenoid in the home position of the carriage to facilitate the insertion and removal of the cards in Transfer operations.

A further energizing circuit for the solenoid S1 by-passes the other two energizing circuits described above and provides a direct energizing circuit over contacts K5a1 when the push button 505 (Fig. 1) is operated. This circuit is used to release the card when the carriage is in home position but when the card is not released by the normal sequence controls.

The carriage pawl release solenoid S2 (see also Fig. 27) is operable, when energized, to remove the pawls 1008 and 1013 to allow the carriage to be moved freely in various operations of the machine. It is energized whenever relay R5 is energized and closes contacts R5a2, the energizing circuit extending over the paralleled cam-controlled contacts C42a and C22a, previously described in connection with the holding circuit for relay R5. Solenoid S2 closes contacts S2a1, which parallel contacts R5a2 and enable the solenoid to be held over contacts C42a and C22a even after relay R5 has been deenergized.

The clutch trip solenoid S3 (see also Fig. 10), which trips the clutch to connect the auxiliary driving motor to the auxiliary cam shaft 428 and the parts operated thereby, is controlled by four circuits for tripping the clutch to cause (1) the initial in-sweep of the card in a Balance Pick-Up operation; (2) the initial in-sweep of the card in recording operations; (3) the return movement of the carriage in recording operations and in "short cycles"; and (4) the return movement of the card in Balance Pick-Up operations.

All of these energizing circuits extend over interlocking contacts L9b1 (see also Fig. 16), which will be opened, as previously explained, to prevent the cycling of the auxiliary driving mechanism in Balance Pick-Up and Recording operations if a card is not properly positioned in the carriage.

The first of these energizing circuits extends from conductor 1783 over contacts R2b2, L19a2, F1a13, and C23a, then over the winding of the solenoid S3 and contacts L9b1 to conductor 1782. Contacts C23a are cam-controlled contacts, which are controlled by a cam on the auxiliary cam shaft 428 and are closed at 355 degrees in one operation of the auxiliary cam shaft 428 and are opened at 15 degrees in the next operation of the shaft and consequently are closed in the home position of the shaft. Contacts F1a13 are controlled by the function control mechanism and are opened in Install operations and are closed in Posting, Transfer, and Trial Balance operations, which involve the picking up of the balance from the card. Contacts L19a2 are closed by the tripping of shaft 455 as an incident to initiation of a Balance Pick-Up operation from the motor bar 113. Contacts R2b2 are opened as long as the motor bar 113 is depressed and energizes relay R2. As soon as the motor bar is released, relay R2 will be deenergized and contacts R2b2 reclose, and the energizing circuit will be completed to cycle the auxiliary driving mechanism. This energizing circuit will be broken at contacts C23a after the auxiliary cam shaft has operated 15 degrees, thereby allowing the clutch-tripping means to be restored to arrest the drive at 180 degrees, if required.

The second energizing circuit also extends over contacts C23a and includes contacts R8a2, R12b1, and C43a, which cooperate to cause the solenoid S3 to be energized to cause the in-sweep of the carriage after a New Balance operation. In this circuit, the contacts R8a2 will be closed by relay R8 when a recording operation is to take place, and contacts C43a, which are controlled by a cam on the printer cam shaft 712, will be closed at 350 degrees in one operation of the printer cam shaft 712 and will open at 15 degrees in the next operation of the cam shaft. This circuit will be completed at contacts R12b1 as soon as the carriage returns to its home position after the new balance and related data have been printed thereon and will immediately start the in-sweep of the card in the recording operation to record the new balance and related data magnetically on the card.

The third circuit—that which trips the drive to return the card in a "short cycle" or in the recording operation—extends over contacts C24a and then over the contacts R7a2, R9b1, and L1a1 in parallel. Contacts C24a are cam-controlled contacts, which are controlled by a cam on the auxiliary cam shaft 428 and are closed at 165 degrees and opened at 185 degrees in the operation of the auxiliary cam shaft 428 and accordingly will be closed at the end of the in-sweep of the card. Contacts R9b1 are controlled by the pawl-check relay R9 and will remain closed if there is a pawl-check failure or an account number comparison failure and relay R9 is not energized, thereby causing the solenoid S3 to be energized and cause a "short cycle" operation to feed the carriage immediately back to home position. In a similar manner, contacts L1a1 (see also Figs. 70 and 71) will be closed if a pick-up operation is attempted with an amount key depressed and will complete the energizing circuit to the solenoid S3 to cause a "short cycle." Contacts R7a2 are closed by the energization of relay R7, which, as explained earlier, is energized when the magnetic recording of data is to take place, and these contacts will cause the solenoid S3 to be energized to return the carriage immediately following the in-sweep of the carriage in a recording operation. Regardless of whether this energizing circuit is completed by the closing of contacts R7a2, R9b1, or L1a1, it will be interrupted at contacts C24a at 185 degrees in the operation of the shaft 428 to enable the tripping mechanism to be restored and stop the drive at 360 degrees in the operation of the shaft 428.

The fourth circuit, that which trips the drive to return the card to home position and to enable the check-back operation to be performed, extends from conductor 1783 over contacts C25a and C44a and is completed during the operation of the machine to enter therein the data which was read from the card. Contacts C25a are cam-controlled contacts which are controlled by a cam on the auxiliary cam shaft 428 and are closed at 150 degrees and opened at 210 degrees in the operation of the shaft and consequently are closed at the end of the in-sweep of the card. Contacts C44a are cam-controlled contacts which are controlled by a cam on the printer cam shaft 712 and are closed at 155 degrees and opened at 175 degrees in the operation of the shaft 712. This energizing circuit for solenoid S3 will be completed, therefore, when contacts C44a close at 155 degrees in the operation of the machine to enter therein data which was read from the card in a Balance Pick-Up operation.

The solenoid S3, in addition to operating the clutch-tripping mechanism, closes contacts S3a1 (see also Fig. 11), which by-pass contacts C44a and insure that the solenoid will remain energized until 210 degrees in the operation of the auxiliary cam shaft 428 when contacts C25a open. The solenoid S3, when energized, also opens contacts S3b2 to prevent the machine release solenoid S4 from being energized in "short cycle" operations and in recording operations.

The energizing circuit for the machine release solenoid S4 (see also Fig. 60) also includes contacts L9b1, and consequently the solenoid cannot be energized if a card is incorrectly positioned in the machine. The energizing circuit for the solenoid S4 also includes contacts L18b1 (see also Fig. 62), which open when the machine release shaft 1169 has moved to tripped position, and includes contacts S3b2, which are opened whenever the clutch trip solenoid S3 is energized, and may be completed over relay contacts R4a3 when the machine is to be released by depression of a key in control row 1 or over relay contacts R11a2 when the machine is to be released by depression of a key in control row 2. The energizing circuit for solenoid S4 may be completed over contacts C26a, conductor 1790, and contacts K1b1 (Fig. 106) in a Balance Pick-Up operation to cause the data read from the card to be entered into the machine. Contacts C26a are controlled by a cam on the auxiliary cam shaft 428 and are closed at 175 degrees and opened at 200 degrees in the operation of the shaft 428.

The check-back failure solenoid S5 (see also Fig. 9) is energized when a check-back failure causes relay R10 to be deenergized, as explained earlier herein. This solenoid, when energized, operates key-lock slides to prevent the depression of the keys which normally should be operated in the posting sequence and allows only the New Balance Non-Transfer key in row 1 to be operated to cause an operation of the machine to clear out the entry in which the check-back failure occurred. The solenoid S5 opens contacts S5b1 (Fig. 106) in the circuit to relay R1 to enable the relay to be momentarily deenergized when contacts C31a open in the corrective operation of the machine, the deenergization of relay R1 allowing contacts R1b1 to reclose and energize relay R10, which in turn opens contacts R10bc3 to deenergize solenoid S5 and allow the normal sequence of entering operations to be resumed.

The solenoid S6 (see also Fig. 10) is the balance pick-up control solenoid, which is operated to set up the controls for effecting the initiation of the pick-up operation. The solenoid will be energized when contacts R2a1 close when relay R2 is energized in response to the operation of the pick-up motor bar 113, provided that the other contacts C27a, R1a2, F1a20, R12b2, and R10ac3 are closed in the circuit to indicate that conditions are right for a pick-up operation. Contacts C27a are cam-controlled contacts which are operated by a cam on the auxiliary cam shaft 428 and are closed at 355 degrees of one operation of the shaft and opened at 20 degrees in the next operation of the shaft; consequently these contacts will be closed in the home position of the shaft, which is the proper position of the shaft prior to a pick-up operation. Contacts R1a2 are closed by relay R1 when operating potentials are being supplied to the machine and it is in condition to operate in a Balance Pick-Up operation. Contacts R12b2 will be closed when the carriage is in home position, the proper position for a Balance Pick-Up operation. Contacts F1a20 are controlled by the function control mechanism and will be opened in Install operations to prevent the pick-up operation but will be closed in Posting, Transfer, and Trial Balance operations, in which operations the Balance Pick-Up operation is involved. Contacts R10ac3 will be closed as long as there has been no check-back failure and will be opened when a check-back failure has occurred and a Balance Pick-Up operation should not take place until a corrective operation has been made.

Solenoid S7 (see also Fig. 91) is provided to maintain the aligner for the control plates 1530 for the account number differential mechanism in locking position during the first part of a recording operation to retain the account number setting therein, so that it can be used to record the account number on the card when the new balance and related data are being recorded. The energizing circuit extends over contacts R14b3, R16b2, C28a, and F1a22 and will be completed at contacts C28a early in the recording operation. Contacts R14b3 will be opened in a Balance Pick-Up operation, and contacts R16b2 will be opened in an operation in which an account number is to be recorded under control of the account number keyboard and will allow the aligner to be removed under control of the cam 1549. Contacts F1a22 are controlled by the function control mechanism and are opened in Install operations to prevent the solenoid S7 from being energized but are closed in Posting, Transfer, and Trial Balance operations to prepare the circuit. Contacts C28a are controlled by a cam on the auxiliary cam shaft 428 and are closed at 5 degrees and opened at 190 degrees in the operation of the shaft 428; hence it will be clear that, in those operations in which the solenoid S7 is energized, it will be energized during the time the low portion of the cam 1549 is opposite the roller 1548 and will maintain the aligner in locking position.

It is clear that the above control circuits cause the operations of the novel apparatus to take place in the proper sequence and provide safeguards and flexibility to enable the apparatus to perform the plurality of related types of operations reliably.

While the form of mechanism shown and described herein is admirably adapted to fulfill the objects primarily stated, it is to be understood that it is not intended to confine the invention to the one form or embodiment disclosed herein, for its is susceptible of embodiment in various other forms.

What is claimed is:

1. In an apparatus of the class described, the combination of an accounting machine operable under control of record cards; means to read data from the record cards; means controlled by the reading means to store the data read from a card and to control the accounting machine to enter the stored data therein; and safety means controlled by the reading means and operable, if all data has been read from the card, to initiate an operation of the accounting machine under control of the storing means to enter the read data into the accounting machine whereby entries are effected into the accounting machine only if all the data is read from the card.

2. In an accounting machine controlled by record cards, the combination of totalizers; entering means to enter amounts in the totalizers; means to read data from the record card; means controlled by the reading means for storing the data which is read from the card; means in the storing means settable according to the read data and operable to control the entering means to enter the data in the totalizer; and means controlled by the reading means as it controls the entry of data into the storing means and operable if all the data has been read from the record card and entered into the storing means to initiate an operation of the entering means to enable the entering means to be controlled by the means in the storing means and enter the read data into the totalizers, whereby to prevent incorrect entries which would result if all the data were not entered into the storing means.

3. In an apparatus for keeping ledger accounts on ledger cards on which balance, check-count, and other related data are printed and on which the last balance, check-count, and related data are also recorded magnetically so as to be readable and erasable, the combination of an accounting machine having totalizers and means to operate the totalizers to enter amounts therein and withdraw amounts therefrom; means to read the magnetically-recorded data on the ledger card; means controlled by the reading means to temporarily store the data which is read from the card; means in the temporary storage means for controlling the entering means of the accounting machine to enable the balance and check-count to be entered into the totalizers; and means controlled by the sensing means as an incident to its control of the storage means, to initiate an operation of the accounting machine to enable it to be controlled by the storage means to enter the balance and check-count therein if all the data has been read from the card, whereby to prevent incorrect entries if all the data is not read properly from the card.

4. In an apparatus of the class described, the combination of an accounting machine operable under control of record cards; check-back control means in the accounting machine settable by the machine according to the data entered actually into the accounting machine; means to read data from the record cards; means to feed the record cards past the reading means in a first direction and then in a reverse direction; means controlled by the reading means as a result of a first reading of a card, as it is moved past the reading means in said first direction, for entering the data into the accounting machine; and checking means jointly controlled by the check-back control means and by the reading means in a second reading of the card, as it moves past the reading means in said reverse direction, to compare the setting of the check-back control means according to the data actually entered into the accounting machine with the data actually recorded on the card, and to provide a signal if the data as entered does not agree with the data on the card, whereby to check the accuracy of the entries immediately after they are made.

5. In an apparatus of the class described, the combination of an accounting machine operable under control of record cards and including check-back control means settable according to the data entered into the accounting machine; means to read data from the record cards; means to feed the record cards past the reading means in a first direction and in a reverse direction; means controlled by the reading means as a result of a first reading of a card, as the card is fed in said first direction, for entering the data into the accounting machine; checking means set in operation by the accounting machine, when the check-back control means have been set according to data read from the card, and jointly controlled by the check-back control means and by the reading means, as the card is fed in the reverse direction in a second reading of the card to compare the setting of the check-back control means according to the data actually entered into the accounting machine with the data actually recorded on the card; and means controlled by the checking means and operable if the data as entered does not agree with the data on the card to control the accounting machine to compel a corrective operation of the accounting machine to clear the incorrect entry therefrom.

6. In an apparatus of the class described, the combination of an accounting machine operable under control of record cards and including check-back control means settable according to the data entered into the accounting machine; means to read data from the record cards; means to feed the card past the reading means to enable a first reading thereof; means controlled by the reading means as a result of a first reading of a card for entering the data into the accounting machine; means to feed the card past the reading means to enable a second reading thereof; means controlled by the accounting machine to initiate the operation of the feeding means to enable the second reading of the card after the check-back control means has been set; checking means set in operation by the accounting machine when the check-back control means have been set according to data read from the card and jointly controlled by the check-back control means and by the reading means in a second reading of the card to compare the setting of the check-back control means according to the data actually entered into the accounting machine with the data actually recorded on the card immediately after the data has been entered into the accounting machine; and interlocking means controlled by the checking means and operable if the data as entered does not agree with the data on the card, to control the accounting machine to block further entries into the accounting machine and to render controls for the accounting machine effective so that only a corrective operation of the accounting machine can be made to clear the incorrect entry therefrom.

7. In an apparatus of the class described, the combination of an accounting machine operable under control of record cards; means to read data from the record cards; means controlled by the reading means in a first reading of the card to store data read from a card and including control members settable according to the data for controlling the entry of data into the accounting machine; means to initiate an operation of the accounting machine to cause an entry to be made therein under control of the members in the storing means; checking control members in the accounting machine which are settable according to the data actually entered into the accounting machine; means controlled by the accounting machine after data has been set up in the checking control members for initiating a second reading of the card; and means jointly controlled by the checking control members and by the card-reading means during a second reading of a card to compare the data actually entered into the accounting machine with the data recorded on the card and for providing an indication if the data as entered does not agree with the data as recorded on the card, whereby to immediately check accuracy of the entries made under control of the record card.

8. In an apparatus of the class described, the combination of an accounting machine operable under control of record cards and including checking control members settable according to the data entered into the accounting machine; means to read data from the record cards; means controlled by the reading means in a first reading of the card to store data read from a card and including control members settable according to the data for controlling the entry of data into the accounting machine; means to initiate an operation of the accounting machine to cause an entry to be made therein under control of the members in the storing means; means set into operation by the accounting machine immediately after the checking control members have been set according to the data read from the card and jointly controlled by the checking control members and by the card-reading means during a second reading of a card to compare the data actually entered into the accounting machine with the data recorded on the card; and interlocking means controlled by the comparing means and operable to control the accounting machine if the data as entered does not agree with the data as recorded on the card to block further entries into the accounting machine and to enable controls for the accounting machine to permit only a corrective operation of the accounting machine to be made to clear the incorrect entry therefrom, whereby to immediately check accuracy of the entries made under control of the record card and cause a correction operation to be performed if an incorrect entry has been made.

9. In an apparatus of the class described, the combination of an accounting machine operable under control of record cards and including checking control members settable according to the data entered into the accounting machine; means to read data from the record cards; means controlled by the reading means in a first reading of the card to store data read from a card and including control members settable according to the data for controlling the entry of data into the accounting machine; means to initiate an operation of the accounting machine to cause an entry to be made therein under control of the members in the storing means; means set into operation by the accounting machine immediately after the checking control members have been set according to the data read from the card and jointly controlled by the checking control members and by the card-reading means during a second reading of a card to compare the data actually entered into the accounting machine with the data recorded on the card immediately after the data has been entered into the accounting machine; and means controlled by the comparing means and operable to control the accounting machine if the data as entered does not agree with the data as recorded on the card to compel the accounting machine to be operated in a corrective operation to clear the incorrect entry therefrom.

10. In an apparatus of the class described, the combination of an accounting machine operable under control of record cards and including check-back control members differentially settable according to the data entered into the machine; means for reading data recorded on the cards; means controlled by the reading means, during a first reading of the card, to store data read from a card and including control members differentially settable according to the read data for controlling the subsequent entry of data into the accounting machine; a first safety means controlled by the reading means as an incident to the reading means controlling the storing means and operable to initiate an operation of the accounting machine to enter the data therein under control of the differentially-settable members of the storing means, only if all the data is read from the record card, whereby to prevent incomplete entries from being made; and a second safety means jointly controlled by the reading means in a second reading of the card and by the check-back control members to immediately compare the data actually entered into the machine as indicated by the setting of the members with the data actually recorded on the card and provide an indication if the data as actually entered into the machine does not agree with the data recorded on the card, whereby to provide a further check on the accuracy of the entries.

11. In an apparatus of the class described, the combination of an accounting machine operable under control of record cards and including check-back control members differentially settable according to the data entered into the machine; means for reading data recorded on the cards; means controlled by the reading means, during a first reading of the card, to store data read from a card and including control members differentially settable according to the read data for controlling the subsequent entry of data into the accounting machine; a first safety means controlled by the reading means as an incident to the reading means controlling the storing means and operable to initiate an operation of the accounting machine to enter the data therein under control of the differentially-settable members of the storing means, only if all the data is read from the record card, whereby to prevent incomplete entries from being made; a second safety means set in operation by the accounting machine after the check-back control members have been set according to the data entered into the accounting mechanism under control of the card and jointly controlled by the reading means in a second reading of the card and by the check-back control members to immediately compare the data actually entered into the machine as indicated by the setting of the members with the data actually recorded on the card; and interlocking means controlled by the second safety means and operable if the data as actually entered into the machine does not agree with the data recorded on the card, to block further entries into the accounting machine and to enable controls for the accounting machine so that only a corrective operation of the accounting machine can be made to clear the incorrect entry therefrom.

12. In an apparatus for keeping ledger accounts on ledger cards on which balance, check-count, and other related data are printed and on which cards the last balance, check-count, and account number are also recorded magnetically so as to be readable and erasable, the combination of an accounting machine having totalizers and means to operate the totalizers to enter amounts therein and withdraw amounts therefrom; a presettable means on which the account number is set up; a first reading means to read the balance and check-count magnetically recorded on the ledger card; means controlled by the first reading means to temporarily store the balance and check-count which are read from the card; means in the temporary storage means for controlling the entering means of the accounting machine to enable the balance and check-count to be entered into the totalizers; other reading means for reading the account number from the card; account number storage means controlled by the other reading means and settable according to the account number read from the card; account number comparing means controlled by the presettable means, on which the account number is set, and by the account number storage means and operable to provide a signal when the account number read from the card agrees with the account number set on the presettable means; and means controlled by both reading means as an incident to their control of their respective storage means and by the account number comparing means, to initiate an operation of the accounting machine to enable it to be controlled by the storage means to enter the balance and check-count therein if the account numbers agree and if all the data has been read from the card, whereby to prevent incorrect entries if either the account numbers do not agree or if all the data is not read from the card.

13. In a machine of the class described adapted to be controlled according to balances and control numbers recorded on ledger cards, the combination of a totalizer for receiving the balance read from the card; entry means for entering the balance into the totalizer; means for reading the balance from a ledger card; storage means controlled by the balance reading means and including means settable according to the balance read from the card to control the entering means; a control number set-up means on which a control number is set; means to read a control number from the ledger card; storage means controlled by the control number reading means and settable according to the control number read from the ledger card; a comparing means controlled by the control number set-up means and by the control number storage means for comparing the control number as read from the card with the control number set in the set-up means; and means controlled by the comparing means and operable only if the control numbers agree, to initiate an operation of the entering means under control of the balance storage means to enter the balance into the accumulator.

14. In an apparatus of the class described, the combination of an accounting machine operable to receive an old balance entry under control of data recorded magnetically in channels on a ledger card and to receive additional entries to form a new balance and operable in new balance operations to print new balances on the card; a plurality of magnetic heads, one for each channel on the ledger card and each head being capable of reading and recording data magnetically on the card; card-feeding means to sweep the card inwardly and outwardly past the heads in reading and also in recording operations; means to initiate a reading operation and cause the card-feeding means to operate; reading circuits controlled by the heads for reading data from the ledger card during the inward sweep of the card in a reading operation; storage means controlled by the reading circuits and settable according to the data which is recorded magnetically on the card; means controlled by the reading circuits for initiating an operation of the accounting machine to enter the data therein under control of the storage means if data has been read from each channel on the card; checking means in the accounting machine settable according to the data entered therein; means jointly controlled by the checking means in the accounting machine and by the reading circuits during the outward sweep of the card in reading operations to compare the entry actually made in the accounting machine with the data recorded on the card and to provide an indication if they disagree; means controlled by the accounting machine and operable after a new balance printing operation, to initiate a recording operation and cause the card-feeding means to operate; and recording circuits for energizing the heads during the inward sweep of the ledger card in recording operations to erase the data previously magnetically recorded thereon and for distinctively energizing the heads under control of the accounting machine for different extents of the outsweep of the card to record new balance data by the distinctive patterns of magnetization in the channels.

15. In an apparatus for keeping ledger accounts on ledger cards on which balance, check-count, and other related data are printed in line-space relation and on which cards the last balance, check-count, and line number of the line on which the next printing is to take place are also recorded magnetically so as to be readable and erasable, the combination of an accounting machine having totalizers and means to operate the totalizers to enter amounts therein and withdraw amounts therefrom and having means to position the card to the proper line to receive printing; means to read the magnetically recorded data on the ledger card; means controlled by the reading means to temporarily store the data which is read from the card; means in the temporary storage means for setting up controls for the card-positioning means and for controlling the entering means of the accounting machine to enable the balance and check-count to be entered into the totalizers; and means controlled by the reading means as an incident to its control of the storage means, to initiate an operation of the accounting machine to enable it to be controlled by the storage means to enter the balance and check-count therein if all the data has been read from the card, whereby to prevent incorrect entries if all the data is not read from the card.

16. In an apparatus for keeping ledger accounts on ledger cards on which balance and other related data are printed in line-space relation and on which card the last balance and the line number of the line on which the next printing is to take place and other related data are also recorded magnetically in channels so as to be readable and erasable, the combination of an accounting machine having totalizers and means to operate the totalizers to enter balance amounts therein and withdraw amounts therefrom and having means to position the card to the proper line to receive printing; means to read the magnetically-recorded balance amount on the ledger card; means controlled by the reading means to temporarily store the balance amount which is read from the card; means in the temporary storage means for controlling the entering means of the accounting machine to enable the balance amount to be entered into the totalizers; means to read the line number which is recorded in two channels on the card; means settable under control of the line number reading means according to the line number read from the two channels and including a differential mechanism for integrating the numbers read from the two channels and positioning a control member for the card-positioning means an extent corresponding to the line number read from the card; means controlled by the reading means as an incident to its control of the storage means, to initiate an operation of the accounting machine to enable it to be controlled by the storage means to enter the balance therein; and means in the accounting machine and operable in the first operation of the accounting machine after the operation in which the data read from the card was entered therein, for enabling the card-positioning means to be controlled by its control member to position the card according to the line number read from the card.

17. In an apparatus for keeping ledger accounts on ledger cards on which balances and other related data are printed in line-space relation and on which card the last balance, the line number of the line on which the next printing is to take place, and other related data are also recorded magnetically in channels so as to be readable and erasable, the combination of an accounting machine having totalizers and means to operate the totalizers to enter balance amounts therein and withdraw amounts therefrom and having means to position the card to the proper line to receive printing; means to read the magnetically-recorded balance on the ledger card; means controlled by the reading means to temporarily store the balance which is read from the card; means in the temporary storage means for controlling the entering means of the accounting machine to enable the balance to be entered into the totalizer; means to read the line number which is recorded in two channels on the card; means settable under control of the line number reading means according to the line number read from the two channels and including a differential mechanism for integrating the numbers read from the two channels and positioning a control member for the card-positioning means an extent corresponding to the line number read from the card; means controlled by the reading means as an incident to its control of the storage means, to initiate an operation of the accounting machine to enable it to be controlled by the storage means to enter the balance therein; means in the accounting machine and operable in the first operation of the accounting machine after the operation in which the data read from the card was entered therein, for enabling the card-positioning means to be controlled by its control member to position the card according to the line number read from the card; and manually-operable means for controlling the line to which the card is to be positioned and including a driving means for directly positioning the control member for the card-positioning means, to directly set the control member for a desired line or to readjust the setting of the member after it has been set under control of the data read from the card whereby the card-positioning means can be operated to position the card to the desired line in the operation of the accounting machine following the setting of the control member.

18. In a machine for calculating new balances and for recording the new balances by printing on a ledger card and also by magnetizing a plurality of channels on the ledger card in a pattern to represent the last printed balance, the combination of a plurality of recording heads, one for each channel; means to sweep the ledger card inwardly past the heads a predetermined fixed distance from a home position and then sweep the card outwardly past the heads to home position; means operable at the end of a new-balance-printing operation to initiate an operation of the means to cause the inward and outward sweeps of the card past the heads; erasing circuits for energizing the heads during the in-sweep of the card to magnetize the channels throughout their length with one polarity to erase any data previously stored thereon; and recording circuits controlled by the machine according to the new balance for energizing the heads during the outward sweep to magnetize the channels with the opposite polarity throughout those portions of their lengths according to the data to be recorded therein, whereby to provide a pattern of magnetization in each channel consisting of magnetization of one polarity for a portion of its length and magnetization of the opposite polarity for the rest of its length, with the change in polarity occurring at the point in the channel corresponding to the data recorded therein.

19. In a machine for calculating new balances and for recording the new balances by printing them in line-space relation on a ledger card and for recording the last printed balance and the number of the line on which the next printing is to take place magnetically in a plurality of channels on the ledger card, the combination of a plurality of recording heads, one for each channel; means to sweep the ledger card inwardly past the heads a predetermined fixed distance from a home position and then sweep the card outwardly past the heads to home position; means operable at the end of a new-balance-printing operation to initiate an operation of the means to cause the inward and outward sweeps of the card past the heads; erasing circuits for energizing the heads during the in-sweep of the card to magnetize the channels throughout their length with one polarity to erase any data previously stored thereon; means operable during the in-sweep of the card to set up recording channels according to the number of the next line on which printing is to take place; and recording circuits controlled by the machine according to the new balance and according to the line number recording controls for energizing the heads during the outward sweep to magnetize the channels with the opposite polarity throughout those portions of their lengths according to the balance and line number to be recorded therein, whereby to provide a pattern of magnetization in each channel consisting of magnetization of one polarity for a portion of its length and magnetization of the opposite polarity for the rest of its length, with the change in polarity occurring at the point in the channel corresponding to the data recorded therein.

20. In a machine for calculating new balances and for recording the new balances by printing them in line-space relation on a ledger card and for recording the last printed balance and the number of the line on which the next printing is to take place magnetically in a plurality of channels on the ledger card, the combination of a plurality of recording heads, one for each channel; means to sweep the ledger card inwardly past the heads a predetermined fixed distance from a home position and then sweep the card outwardly past the heads to home position; means operable at the end of a new-balance-printing operation to initiate an operation of the means to cause the inward and outward sweeps of the card past the heads; erasing circuits for energizing the heads during the in-sweep of the card to magnetize the channels throughout their length with one polarity to erase any data previously stored thereon; means operable during the in-sweep of the card to set up recording controls according to the number of the next line on which printing is to take place, said line number recording controls including means which become operable when the controls are set following the recording of a balance on the last line of a card, to cause the zero line number to be recorded instead of the next higher line number; and recording circuits controlled by the machine according to the the new balance and according to the line number recording controls for energizing the heads during the outward sweep to magnetize the channels with the opposite polarity throughout those portions of their length according to the balance and line number to be recorded therein, whereby to provide a pattern of magnetization in each channel consisting of magnetization of one polarity for a portion of its length and magnetization of the opposite polarity for the rest of its length, with the change in polarity occurring at the point in the channel corresponding to the data recorded therein.

21. In an apparatus of the class described, the combination of an accounting machine operable under control of record cards having data recorded thereon by distinctive data-representing patterns of magnetism; a plurality of magnetic pick-up heads; card transport means to sweep the card from a home position past the heads in one direction and to sweep the card in the opposite direction past the heads to return the card to home position; reading circuits including the pick-up heads for reading the magnetically-recorded data; storage means controlled by the reading circuits during the sweep of the card past the heads in said one direction to store the read data, said storage means including members settable according to the stored data for controlling the entry of the data into the accounting machine; means to initiate an operation of the card transport to sweep the card in said one direction past the heads to enable the reading circuits to be effective to control the storage means to store the read data therein; and control means controlled by the reading circuits and selectively operable to initiate an operation of the accounting machine to enter the read data therein if all the data has been read from the card, or to initiate a further operation of the card transport means to return the card in said opposite direction immediately to home position without entering the data in the accounting machine if all the data has not been read from the card.

22. In an apparatus of the class described, the combination of an accounting machine operable under control of record cards having data recorded thereon by distinctive data-representing patterns of magnetism, said accounting machine including checking means settable according to data entered therein; a plurality of magnetic pick-up heads; card transport means to sweep the card from a home position past the heads in one direction and to sweep the card in the opposite direction past the heads to return the card to home position; reading circuits including the pick-up heads for reading the magnetically-recorded data; storage means controlled by the reading circuits during the sweep of the card past the heads in said one direction to store the read data, said storage means including members settable according to the stored data for controlling the entry of the data into the accounting machine; means to initiate an operation of the card transport means to sweep the card in said one direction past the heads to enable the reading circuits to be effective to control the storage means to store the read data therein; control means controlled by the reading circuits and selectively operable to initiate an operation of the accounting machine to enter the read data therein and to set the checking means according to the entered data if all the data has been read from the card, or to initiate a further operation of the card transport means to return the card in said opposite direction immediately to home position if all the data has not been read from the card; means operable during the operation of the accounting machine which was initiated by the control means for initiating an operation of the card transport means to return the card in said opposite direction to home position as the entry is being made in the accounting machine; safety means jointly controlled by checking means of the accounting machine and by the reading means as it reads the data on the card during the out-sweep which was initiated by the entry of data into the accounting machine, and operable to provide a signal if the data actually entered into the machine and data actually recorded on the card do not agree; and means operable by the control means if all the data has not been read from the card, for disabling the safety means when the card is immediately returned to home position without the data having been entered into the accounting machine.

23. In an apparatus of the class described, the combination of an accounting machine operable under control of record cards having data recorded thereon by distinctive data-representing patterns of magnetism; a plurality of magnetic pick-up heads; card transport means to sweep the card from a home position past the heads in one direction and to sweep the card in the opposite direction past the heads to return the card to home position; reading circuits including the pick-up heads for reading the magnetically-recorded data; storage means controlled by the reading circuits during the sweep of the card past the heads in said one direction to store the read data, said storage means including members settable according to the stored data for controlling the entry of the data into the accounting machine; means to initiate an operation of the card transport means to sweep the card in said one direction past the heads to enable the reading circuits to be effective to control the storage means to store the read data therein; control means controlled by the reading circuits and selectively operable to initiate an operation of the accounting machine to enter the read data therein if all the data has been read from the card, or to initiate a further operation of the card transport means to return the card in said opposite direction immediately to home position without entering the data in the accounting machine if all the data has not been read from the card; and means operable during the operation of the accounting machine which was initiated by the control means, for initiating an operation of the card transport means to return the card in said opposite direction to home position as the entry is being made in the accounting machine.

24. In an apparatus of the class described, the combination of an accounting machine operable under control of record cards having a balance and an account number recorded thereon by distinctive digit-representing patterns of magnetism; presettable means settable to represent an account number; a plurality of magnetic pick-up heads; card transport means to sweep the card from a home position past the heads in one direction and to sweep the card in the opposite direction past the heads to return the card to home position; reading circuits including said pick-up heads and operable to read the balance and the account number magnetically recorded on the card; storage means controlled by the balance-reading circuits, during the sweep of the card in said one direction, to store the balance, said storage means including members settable to represent the balance and operable to control the entry of the balance into the accounting machine; storage means controlled by the account-number-reading circuits during the sweep of the card in said one direction, to store the account number therein; means to initiate an operation of the card transport means to sweep the card in said one direction past the heads to enable the reading circuits to be effective to control the storage means to store the balance and account numbers therein; account-number-comparing means jointly controlled by the presettable means and by the account number storage means and selectively operable to initiate an operation of the accounting machine to enter the balance therein under control of the settable members of the balance storage means if the account numbers agree, or to initiate a further operation of the card transport means to return the card in said other direction immediately to home position if the account numbers do not agree; and means operable during the operation of the accounting machine which was initiated by the account-number-comparing means, for initiating an operation of the card transport means to return the card to home position as the entry is being made in the accounting machine.

25. In an apparatus of the class described, the combination of an accounting machine operable under control of record cards having a balance and an account number recorded thereon by distinctive digit-representing patterns of magnetism; a keyboard settable to represent an account number; a plurality of magnetic pick-up heads; card transport means to sweep the card from a home position past the heads in one direction and to sweep the card in the opposite direction past the heads to return the card to home position; reading circuits including said pick-up heads and operable to read the balance and the account number magnetically recorded on the card; storage means controlled by the balance reading circuits during the sweep of the card in said one direction, to store the balance, said storage means including members settable to represent the balance and operable to control the entry of the balance into the accounting machine; storage means controlled by the account-number-reading circuits during the sweep of the card in said one direction, to store the account number therein; means to initiate an operation of the card transport means to sweep the card in said one direction past the heads to enable the reading circuits to be effective to control the storage means to store the balance and account numbers therein; account-number-comparing means jointly controlled by the account number keyboard and by the account number storage means to check for the agreement between the account number set up on the keyboard means and the account number set up in the storage means; cycling means controlled by the reading circuits and by the account-number-comparing means and selectively operable to initiate an operation of the accounting machine to enter the balance therein under control of the settable members of the balance storage means if the account numbers agree and if all the data is read from the card, or to initiate a further operation of the card transport means to return the card in said other direction immediately to home position if either the account numbers do not agree or if any of the data is not read from the card; and means operable during the operation of the accounting machine which was initiated by the cycling means, for initiating an operation of the card transport means to return the card to home position as the entry is being made in the accounting machine.

26. In an apparatus of the class described, the combination of an accounting machine operable under control of record cards having a balance and a control number recorded thereon by distinctive digit-representing patterns of magnetism; presettable means settable to represent a control number; a plurality of magnetic pick-up heads; card transport means to sweep the card from a home position past the heads in one direction and to sweep the card in the opposite direction past the heads to return the card to home position; reading circuits including said pick-up heads and operable to read the balance and the control number magnetically recorded on the card; storage means controlled by the balance-reading circuits, during the sweep of the card in said one direction, to store the balance, said storage means including members settable to represent the balance and operable to control the entry of the balance into the accounting machine; storage means controlled by the control-number-reading circuits during the sweep of the card in said one direction, to store the control number therein; means to initiate an operation of the card transport means to sweep the card in said one direction past the heads to enable the reading circuits to be effective to control the storage means to store the balance and the control number therein; and control-number-comparing means jointly controlled by the control number storage means and by the presettable means and selectively operable to initiate an operation of the accounting machine to enter the balance therein under control of the settable members of the balance storage means if the control numbers agree, or to initiate a further operation of the card transport means to return the card in said other direction immediately to home position without effecting an entry of the balance into the accounting machine if the control numbers do not agree.

27. In an apparatus of the class described, the combination of an accounting machine operable to receive old balance entries under control of data recorded on a card and including a keyboard for controlling the accounting machine to enable additional amount entries to be made to the old balance to form a new balance; card transport means to sweep the card from a home position past a reading station in one direction and to sweep the card in the opposite direction past the reading station to return the card to home position; reading means for reading the data recorded on the card; storage means controlled by the reading means during the sweep of the card past the reading station, to store the read data, said storage means including members settable according to the stored data for controlling the entry of the data in a subsequent operation of the accounting machine; balance pick-up control means for initiating an operation of the card transport means to sweep the card in said one direction past the reading station to enable the reading means to be effective to control the storage means to store the read data therein; and control means controlled by the keys of the accounting machine keyboard and operable if any one of the keys is depressed when the balance pick-up control means is operated, to cause the card to be swept in said one direction, to cause a further operation of the card transport means to sweep the card in said other direction to home position immediately without entering the read data into the accounting machine.

28. In a machine for keeping ledger accounts on ledger cards on which balances are printed and the last balance and a control number are recorded magnetically so as to control the machine, the combination of a control number keyboard on which a control number is set, said control number keyboard being normally operable in balance pick-up operations to control a comparing mechanism which compares the control number set up in the keyboard with a control number read from the card; recording means for recording the control number magnetically on the card; a record key on the control number keyboard; means operable in response to an operation of the record key for enabling the keyboard to control the recording means instead of the comparing means, thereby to cause the control number set on the keyboard to be recorded on the card; and means operable in the recording operation to restore the comparing mechanism to the control of the control number keyboard, whereby the control by the keyboard is automatically returned to the comparing mechanism as soon as the keyboard has finished its control in the recording operation.

29. In a machine for keeping ledger accounts on ledger cards in a form including a printed record of balances, other entries, and item counts in line-space relation and also a sensible, effaceable record of the last balance, item count, and the number of the line on which the next printing is to occur, said machine being operable in posting operations and also in transfer operations in which the effaceable data is transferred from one card to another, as at the end of an accounting period, the combination of sensing means to read the balance from the card; sensing means to read the item count from the card; sensing means to read the line number from the card; means controlled by the several sensing means for entering the data, as read, into respective portions of the machine; recording means controlled by the machine to print the data on the card and to record the data in sensible effaceable form on the card; function control means settable to condition the machine for transfer operations; and means controlled by the function control means, when set to condition the machine for a transfer operation, for disabling the item count sensing means and the line number sensing means to automatically prevent the reading of this data as recorded on the card and cause zeros to be entered into the machine instead of this data, whereby as a result of transfer operations to cause a new item count to begin with the entries on said other card and to cause the printing to begin on the first line of said other card.

30. In a machine for keeping ledger accounts on ledger cards in a form including a printed record of balances, other entries, and item counts in line-space relation and also a sensible, effaceable record of the last balance and item count and the number of the line on which the next printing is to occur, said machine being capable of performing several types of operations, one of which types being a posting operation which consists of a balance pick-up operation in which the last balance, item count, and line number are read from a card and entered into the machine, further entering operations in which additional entries are made to form a new balance, new item count and new line number, and concludes with a new balance recording operation in which the old data is erased from the card and the new balance, new item count and the new line number are recorded on the card, and another of said types of operation being a transfer operation to transfer the data for the account from one card to another, as at the end of an accounting period, which transfer operation consists of a balance pick-up operation to read data from one card and enter it into the machine, and a recording operation under control of the machine to record the data on the new card, the combination of sensing means for reading the balance; sensing means for reading the item count; sensing means for reading the line number; means controlled by the several sensing means for entering the data as read into respective portions of the machine; recording means operable under control of the machine for making printed and effaceable records on the card; function control means settable to determine whether the machine will operate in posting operations or in transfer operations; and means operated by the function control means, when set to cause transfer operations, for disabling the item count sensing means and the line number sensing means to prevent the reading of the item count and line number from the one card, thereby causing zeros to be entered into the machine automatically instead of the item count and line number recorded on said one card, so that zeros will be recorded under control of the machine on the new card in the transfer operation, to cause a new item count to begin with entries on the new card and cause the entries to be printed on the first line of the new card.

31. In an apparatus of the class described, the combination of an accounting machine operable under control of record cards and including check-back control means settable according to the data entered into the accounting machine; means to read data from the record cards; card-handling means operable to feed the card past the reading means in one direction to enable a first reading of the card to be made, to arrest the card, after it has been fed in said one direction, until the accounting machine has operated to set the check-back control means and thereafter to feed the card in the reverse direction past the reading means to enable a second reading of the card to be made; means controlled by the reading means during the first reading of a card for entering the data into the accounting machine; and checking means jointly controlled by the check-back control means and by the reading means during the second reading of the card to compare the setting of the check-back control means according to the data actually entered into the accounting machine with the data actually recorded on the card, and to provide a signal if the data as entered does not agree with the data on the card, whereby to check the accuracy of the entries immediately after they are made.

32. In an apparatus of the class described, the combination of an accounting machine operable under control of record cards and including check-back control means settable according to the data entered into the accounting machine; means to read data from the record cards; means to feed the card past the reading means in one direction, to arrest the card after it has been fed in said one direction until the accounting machine has operated and to thereafter feed the card past the reading means in the opposite direction; means controlled by the reading means as a result of a first reading of a card, as the card is fed in said one direction, for entering the data into the accounting machine; checking means set in operation by the accounting machine when the check-back control means have been set according to data read from the card and jointly controlled by the check-back control means and by the reading means in a second reading of the card, as the card is fed in said opposite direction, to compare the setting of the check-back control means according to the data actually entered into the accounting machine with the data actually recorded on the card immediately after the data has been entered into the accounting machine; and interlocking means controlled by the checking means and operable if the data as entered does not agree with the data on the card, to control the accounting machine to block further entries into the accounting machine and to render controls for the accounting machine effective so that only a corrective operation of the accounting machine can be made to clear the incorrect entry therefrom.

References Cited in the file of this patent
UNITED STATES PATENTS

| | | |
|---|---|---|
| 2,388,354 | Wheeler | Nov. 6, 1945 |
| 2,536,915 | Dayger et al. | Jan. 2, 1951 |
| 2,611,538 | Hatton | Sept. 23, 1952 |
| 2,652,196 | Sterling | Sept. 15, 1953 |

UNITED STATES PATENT OFFICE

CERTIFICATE OF CORRECTION

Patent No. 2,947,475                                        August 2, 1960

Konrad Rauch et al.

It is hereby certified that error appears in the printed specification of the above numbered patent requiring correction and that the said Letters Patent should read as corrected below.

Column 11, line 28, for "27" read -- 127 --; column 23, line 48, for "sequennce" read -- sequence --; column 30, line 73, for "suds" read -- studs --; column 35, lines 47 and 48, for "solenod" read -- solenoid --; column 37, line 7, for "rollers" read -- roller --; line 11, for "different" read -- differential --; column 38, line 5, for "openingg" read -- opening --; column 52, line 10, for "Fig." read -- Row --; column 55, line 21, after "key" insert -- in --; column 58, lines 9 and 10, for "pivotted" read -- pivoted --; line 66, for "full" read -- fully --; column 68, line 37, for "resister" read -- resistor --; line 71, for "operation" read -- operations --; column 74, line 65, for the heading "Control circuit", in italics, read -- Control circuits --, in italics; column 77, line 13, for "ande" read -- and --; column 79, line 9, for "pawl-heck" read -- pawl-check --; line 51, for "failre" read -- failure --; column 92, lines 35 and 36, for "energiding" read -- energizing --; line 38, for "length" read -- lengths --.

Signed and sealed this 18th day of April 1961.

(SEAL)
Attest:

ERNEST W. SWIDER                                    DAVID L. LADD
Attesting Officer                                        Commissioner of Patents